United States Patent
Sato et al.

(10) Patent No.: US 12,458,605 B2
(45) Date of Patent: Nov. 4, 2025

(54) LIPID NANOPARTICLE

(71) Applicants: National University Corporation Hokkaido University, Hokkaido (JP); Nitto Denko Corporation, Osaka (JP)

(72) Inventors: Yusuke Sato, Hokkaido (JP); Hideyoshi Harashima, Hokkaido (JP); Kazuki Hashiba, Osaka (JP); Masamitsu Taguchi, Osaka (JP); Sachiko Sakamoto, Osaka (JP); Takuya Shishido, Osaka (JP); Ayaka Otsu, Osaka (JP); Yoshiki Maeda, Osaka (JP)

(73) Assignees: National University Corporation Hokkaido University, Hokkaido (JP); Nitto Denko Corporation, Osaka (JP)

( * ) Notice: Subject to any disclaimer, the term of this patent is extended or adjusted under 35 U.S.C. 154(b) by 389 days.

(21) Appl. No.: 18/247,612

(22) PCT Filed: Oct. 1, 2021

(86) PCT No.: PCT/JP2021/036449
§ 371 (c)(1),
(2) Date: Mar. 31, 2023

(87) PCT Pub. No.: WO2022/071582
PCT Pub. Date: Apr. 7, 2022

(65) Prior Publication Data
US 2024/0024252 A1   Jan. 25, 2024

(30) Foreign Application Priority Data
Oct. 2, 2020   (JP) .................................. 2020-167928

(51) Int. Cl.
*A61K 9/51*   (2006.01)
*A61K 48/00*   (2006.01)
(Continued)

(52) U.S. Cl.
CPC ........ *A61K 9/5123* (2013.01); *A61K 48/0041* (2013.01); *C12N 15/113* (2013.01);
(Continued)

(58) Field of Classification Search
CPC .................................................. A61K 9/5123
See application file for complete search history.

(56) References Cited

U.S. PATENT DOCUMENTS

| 2015/0005363 A1 | 1/2015 | Ansell et al. |
| 2017/0020819 A1 | 1/2017 | Adami et al. |

(Continued)

FOREIGN PATENT DOCUMENTS

| JP | 2015-505838 A | 2/2015 |
| JP | 2019-151589 A | 9/2019 |

(Continued)

OTHER PUBLICATIONS

Dong et al., "Lipopeptide nanoparticles for potent and selective siRNA delivery in rodents and nonhuman primates", Proceedings of the National Academy of Sciences of the United States of America (2014) 111(11):3955-3960.

(Continued)

*Primary Examiner* — Benjamin J Packard
(74) *Attorney, Agent, or Firm* — Knobbe, Martens, Olson & Bear, LLP

(57) ABSTRACT

The present invention addresses the problem of providing lipid nanoparticles which function as gene transfer carriers capable of selective transfer to the liver or spleen. Lipid nanoparticles which contain a pH-sensitive cationic lipid represented by formula (I) [a represents an integer of 3-5; b represents 0 or 1; $R^1$ and $R^2$ each independently represent a group represented by general formula (A) ($R^{11}$ and $R^{12}$ each independently represent a linear or branched $C_{2-15}$ alkyl group; c represents 0 or 1; v represents an integer of 4-12);

(Continued)

and X represents a group represented by general formula (B)(d represents an integer of 0-3; and $R^3$ and $R^4$ each independently represent a $C_{1-4}$ alkyl group or $C_{2-4}$ alkenyl group, while $R^3$ and $R^4$ may form a 5- to 7-membered non-aromatic heterocycle) or represents a 5- to 7-membered non-aromatic heterocyclic group]. (I) $(R^1)(R^2)C(OH)$—$(CH_2)a$-$(O$—$CO)b$-$X$. (A): $(R^{11})(R^{12})$—$CH$—$(CO$—$O)c$-$(CH_2)v$-. (B):—$(CH_2)d$-$N(R^3)(R^4)$.

$$(R^1)(R^2)C(OH)\text{—}(CH_2)a\text{—}(O\text{—}CO)b\text{-}X \quad (I)$$

$$(R^{11})(R^{12})\text{—}CH\text{—}(CO\text{—}O)c\text{—}(CH_2)v\text{-} \quad (A)$$

$$\text{—}(CH_2)d\text{-}N(R^3)(R^4) \quad (B)$$

17 Claims, 3 Drawing Sheets

Specification includes a Sequence Listing.

(51) Int. Cl.
  *C12N 15/113* (2010.01)
  *C12N 15/88* (2006.01)

(52) U.S. Cl.
  CPC .......... *C12N 15/88* (2013.01); *C12N 2310/14* (2013.01); *C12N 2320/32* (2013.01)

(56) References Cited

U.S. PATENT DOCUMENTS

| | | |
|---|---|---|
| 2017/0273905 A1 | 9/2017 | Harashima et al. |
| 2020/0129431 A1 | 4/2020 | Harashima et al. |
| 2021/0129103 A1 | 5/2021 | Tokeshi et al. |

FOREIGN PATENT DOCUMENTS

| | | | |
|---|---|---|---|
| WO | WO 2013/086322 A1 | 6/2013 | |
| WO | WO 2015/178343 A1 | 5/2015 | |
| WO | WO 2018/190423 A1 | 10/2018 | |
| WO | WO 2018/230710 A1 | 12/2018 | |

OTHER PUBLICATIONS

Gilleron et al., "Image-based analysis of lipid nanoparticle-mediated siRNA delivery, intracellular trafficking and endosomal escape", Nature Biotechnology (2013) 31(7):638-646.

Jayaraman et al., "Maximizing the Potency of siRNA Lipid Nanoparticles for Hepatic Gene Silencing in Vivo", Angewandte Chemie International Edition (2012) 51:8529-8533.

Leung et al., "Lipid Nanoparticles Containing siRNA Synthesized by Microfluidic Mixing Exhibit an Electron-Dense Nanostructured Core", Journal of Physical Chemistry C (2012) 116(34):18440-18450.

Maier et al., "Biodegradable Lipids Enabling Rapidly Eliminated Lipid Nanoparticles for Systemic Delivery of RNAi Therapeutics", Molecular Therapy (2013) 21(8):1570-1578.

Nakamura et al., "Small-sized, stable lipid nanoparticle for the efficient delivery of siRNA to human immune cell lines", Scientific Reports, 2016, 6:37849, p. 1-9.

Nakamura, T., "Development of a Nano DDS for Cancer Immmunotherapy Based on Lipid Nanoparticles", Yakugaku Zasshi, 2018, vol. 138, p. 1443-1449.

Nakamura et al., "Reducing the Cytoxicity of Lipid Nanoparticles Associated with a Fusogenic Cationic Lipid in a Natural Killer Cell Line by introducing a Polycation-based siRNA Core", Molecular Pharmaceutics (2018) 15:2142-2150.

Nakamura et al., "Lipid nanoparticles fuse with cell membranes of immune cells at low temperatures leading to the loss of transfection activity" International Journal of Pharmaceuticals (2020) 587:119652:1-9.

Sato et al., "Relationship Between the Physicochemical Properties of Lipid Nanoparticles and the Quality of siRNA Delivery to Liver Cells", Molecular Therapy (2016) 24:788-795.

Sato et al., "Understanding structure-activity relationships of pH-sensitive cationic lipids facilitates the rational identification of promising lipid nanoparticles for delivering siRNAs in vivo", Journal of Controlled Release (2019) 295:140-152.

Watanabe et al., "In Vivo therapeutic potential of Dicer-hunting siRNAs targeting infectious hepatitis C virus." Scientific Reports (2014) 4:4750:1-11.

Wittrup et al., "Visualizing lipid-formulated siRNA release from endosomes and target gene knockdown", Nature Biotechnology (2015) 33(8):870-876.

Xu et al., "Quantitation of Physiological and Biochemical Barriers to siRNA Liver Delivery via Lipid Nanoparticle Platform", Molecular Pharmaceutics (2014), 11:1424-1434.

Yamamoto et al., "Novel pH-sensitive multifunctional envelope-type nanodevice for siRNA-based treatments for chronic HBV infection", Journal of Hepatology (2016) 64:547-555.

International Search Report and Written Opinion mailed Nov. 22, 2021 for PCT Application No. PCT/JP2021/036449, filed Oct. 1, 2021.

Office Action issued in Taiwanese Application No. 110136757, dated May 28, 2025.

Search Report dated Jun. 4, 2025 issued in Chinese Application No. 2021800675221, filed on Oct. 1, 2021.

Office Action and Search Report dated Apr. 16, 2025 in Russian Application No. 2023111158/04, filed on Oct. 1, 2021.

[Fig. 1]
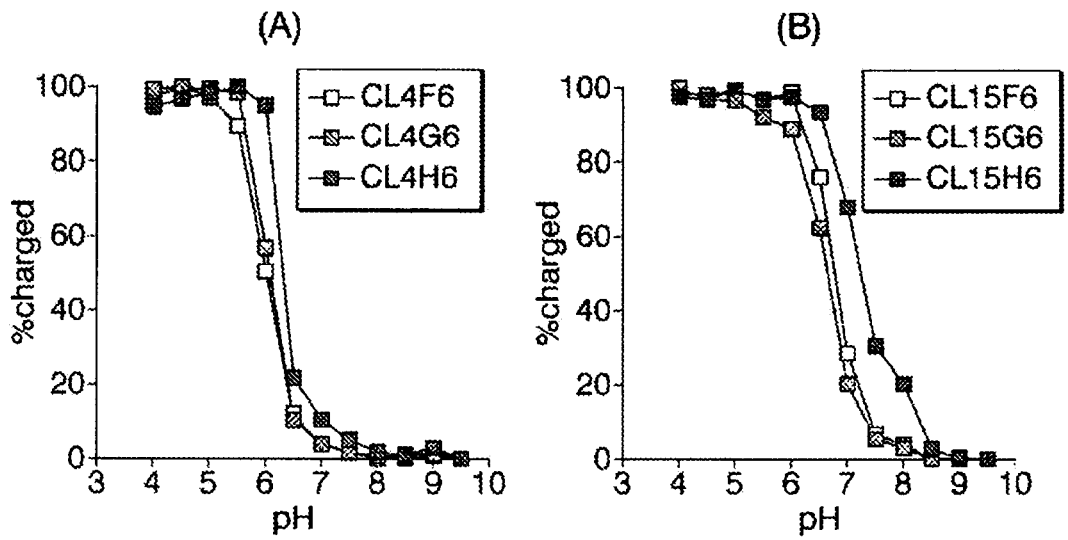
[Fig. 2]
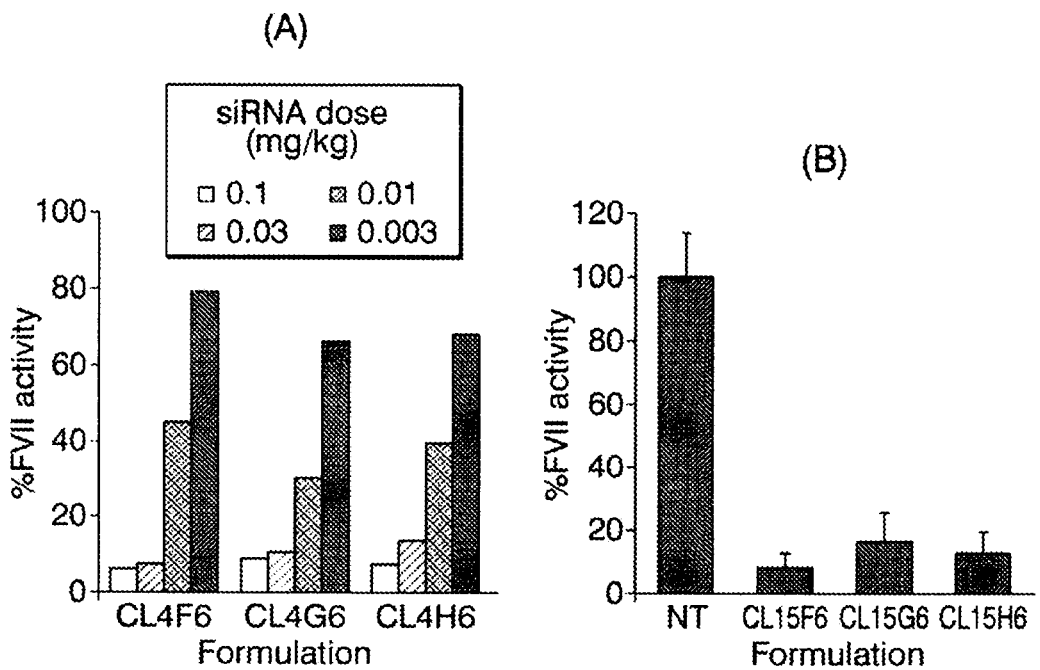

[Fig. 3]
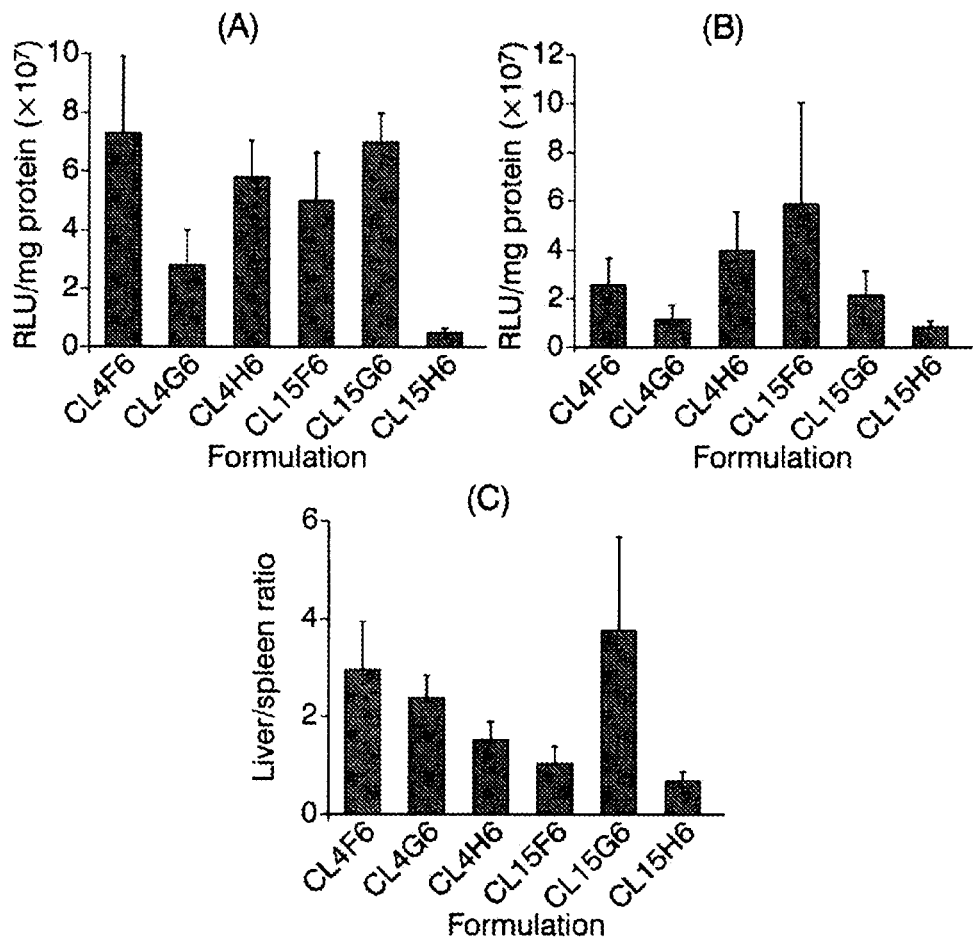
[Fig. 4]
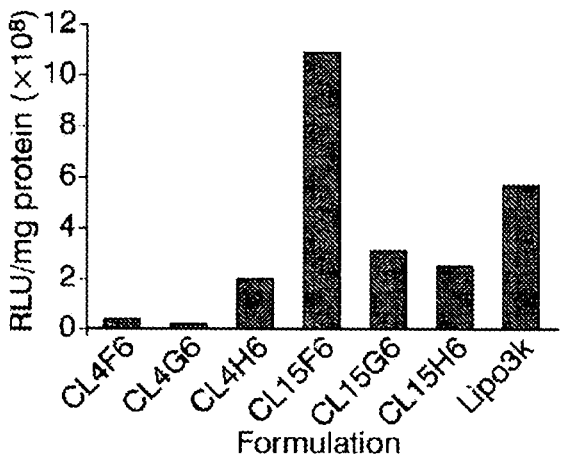

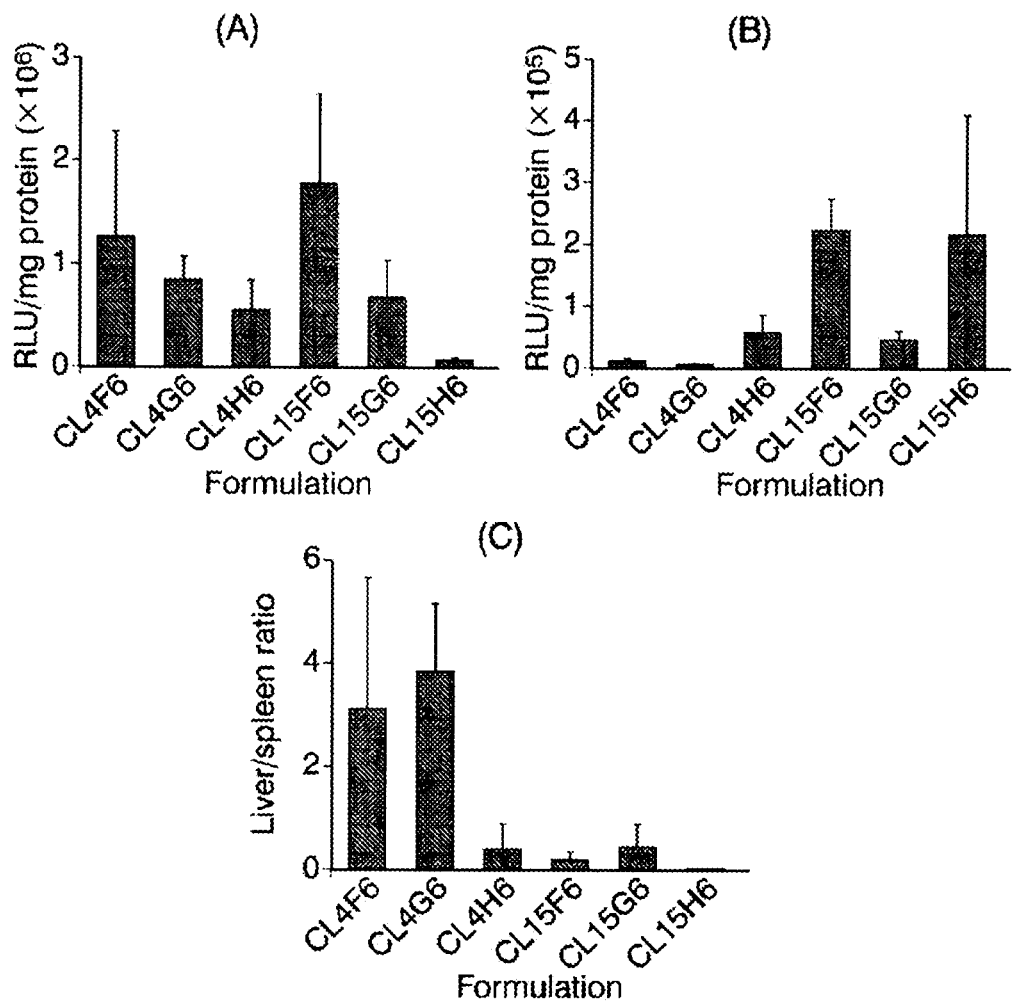
[Fig. 5]

```
                              SEQUENCE LISTING

<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: Description of Artificial Sequence: Sense siRNA
      for F7, a chimera of DNA and RNA.

<400> SEQUENCE: 1
ggaucaucuc aagucuuact                                                  20

<210> SEQ ID NO 2
<211> LENGTH: 21
<212> TYPE: DNA
<213> ORGANISM: Artificial Sequence
<220> FEATURE:
<223> OTHER INFORMATION: Description of Artificial Sequence: Antisense
      siRNA for F7, a chimera of DNA and RNA.

<400> SEQUENCE: 2
guaagacuug agaugaucct t                                                21
```

LIPID NANOPARTICLE

The present application is the national phase entry of PCT Application No. PCT/JP2021/036449, filed Oct. 1, 2021, which claims priority to JP Application No. 2020-167928, filed Oct. 2, 2020, both of which are incorporated by reference in their entireties.

SEQUENCE LISTING IN ELECTRONIC FORMAT

The present application is being filed along with an Electronic Sequence Listing in ST.25 format. The Electronic Sequence Listing is provided as a file entitled KUZU1_044APC_SL.txt created Mar. 30, 2023, which is approximately 1 KB in size. The information in the Electronic Sequence Listing is incorporated herein by reference in its entirety in accordance with 35 U.S.C. § 1.52 (e).

TECHNICAL FIELD

The present invention relates to lipid nanoparticles which are useful as gene transfer carriers capable of selective transfer to the liver or spleen.

BACKGROUND ART

Lipid nanoparticles (LNPs) are used as carriers to encapsulate lipophilic drugs and nucleic acids such as siRNA (short interfering RNA) and mRNA to deliver to target cells. For example, lipid nanoparticles comprising pH-sensitive cationic lipids as constituent lipids, which are electrically neutral at physiological pH and change to cationic in a weakly acidic pH environment such as endosome, are reported as lipid nanoparticles which serve as carriers to efficiently deliver nucleic acids such as siRNA into target cells (Patent Literature 1 and Non-Patent Literature 1).

As pH-sensitive cationic lipid, for example, Jayaraman et al. developed DLin-MC3-DMA and achieved 0.005 mg siRNA/kg at $ED_{50}$ in factor VII (F7) knockdown in mouse liver (Non-Patent Literature 2). The inventors have also developed their own pH-sensitive cationic lipid YSK05 and YSK13-C3, which have achieved 0.06 and 0.015 mg siRNA/kg respectively at $ED_{50}$ in F7 knockdown (Non-Patent Literatures 3-5). In addition, Maier et al. developed L319 which biodegradability was imparted to MC3-DMA, and reported 0.01 mg siRNA/kg at $ED_{50}$, which achieved both high degree of safety and biodegradability (Non-Patent Literatures 6-8). However, it has been clarified that the endosomal escape efficiency of lipid nanoparticles comprising these pH-sensitive cationic lipids is still only a few percent (Non-Patent Literature 9), and the development of technologies which can further improve bioavailability is desired.

Furthermore, Dong et al. found a unique lipid-like substance cKK-E12 through high-throughput screening and achieved 0.002 mg siRNA/kg at $ED_{50}$ in F7 knockdown (Non-Patent Literature 10). The technology is the best in terms of activity in the literature, but there is no knowledge of safety aspects such as toxicity at high doses or biodegradability of the lipids.

PRIOR ART LITERATURES

Patent Literatures (PLs)

[PL1] WO 2018/230710
[PL2] WO 2018/190423

Non-Patent Literatures (NPLs)

[NPL1] Sato et al., Journal of controlled Release, 2019, vol. 295, p. 140-152
[NPL2] Jayaraman et al., Angewandte Chemie International Edition, 2012, vol. 51, p. 8529-8533
[NPL3] Watanabe et al., Scientific Reports, 2014, 4:4750, DOI: 10.1038/srep04750
[NPL4] Yamamoto et al., Journal of Hepatology, 2016, vol. 64, p. 547-555
[NPL5] Sato et al., Molecular Therapy, 2016, vol. 24, p. 788-795
[NPL6] Maier et al., Molecular Therapy, 2013, vol. 21(8), p. 1570-1578
[NPL7] Wittrup et al., Nature Biotechnology, 2015, vol. 33(8), p. 870-876
[NPL8] Xu et al., Molecular Pharmaceutics, 2014, vol. 11, p. 1424-1434
[NPL9] Gilleron et al., Nature Biotechnology, 2013, vol. 31(7), p. 638-646
[NPL10] Dong, Proceedings of the National Academy of Sciences of the United States of America, 2014, vol. 111 (11), p. 3955-3960
[NPR11] Leung et al., Journal of Physical Chemistry C Nanomater Interfaces, 2012, vol. 116(34), p. 18440-18450

SUMMARY OF THE INVENTION

Problems to be Solved by the Invention

The present invention addresses the purposes of providing lipid nanoparticles which function as gene transfer carriers capable of selective transfer to the liver or spleen, and of providing lipid nanoparticles with excellent safety.

Means of Solving the Problems

The inventors found that lipid nanoparticles comprising pH-sensitive cationic lipids with branched-chain hydrocarbon chains as their constituent lipids are highly selective to the liver or spleen and useful as gene transfer carriers which are highly expressed specifically in the liver or spleen.

Namely, the present invention provides following lipid nanoparticles.

[1-1] A lipid nanoparticle which comprises pH-sensitive cationic lipids represented by formula (I):

[Chem. 1]

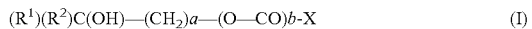
$$(R^1)(R^2)C(OH)\text{—}(CH_2)a\text{—}(O\text{—}CO)b\text{-}X \qquad (I)$$

wherein a represents an integer of 3-5; b represents 0 or 1; $R^1$ and $R^2$ each independently represent a group represented by general formula (A):

[Chem. 2]

$$(R^{11})(R^{12})\text{—}CH\text{—}(CO\text{—}O)c\text{—}(CH_2)v\text{-} \qquad (A)$$

wherein $R^{11}$ and $R^{12}$ each independently represent a linear or branched $C_{5-15}$ alkyl group; c represents 0 or 1; v represents an integer of 4-12;

and X represents a group represented by general formula (B):

[Chem. 3]

$$\text{—}(CH_2)d\text{-}N(R^3)(R^4) \qquad (B)$$

wherein d represents an integer of 0-3; $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group).

[1-2] The lipid nanoparticle of above [1-1], further comprising sterol-modified lipids and polyalkylene glycol-modified lipids.

[1-3] The lipid nanoparticle of above [1-1] or [1-2], containing nucleic acids.

[1-4] The lipid nanoparticle of above [1-3], wherein the nucleic acid is siRNA.

[1-5] The lipid nanoparticle of above [1-3], wherein the nucleic acid is mRNA or plasmid DNA.

[1-6] The lipid nanoparticle of any of above [1-3]-[1-5], wherein the nucleic acid is a gene to be expressed in liver cells.

[1-7] A pharmaceutical composition comprising the lipid nanoparticle of any of above [1-1]-[1-6] as an active ingredient.

[1-8] The pharmaceutical composition of above [1-7], used for gene therapy.

[1-9] A method for expressing a foreign gene, wherein the lipid nanoparticle of any of above [1-1]-[1-6], encapsulating foreign genes of interest to be expressed in liver cells, is administered to a test animal (wherein excluding humans) and expressing the foreign genes in the liver of the test animal.

[2-1] A lipid nanoparticle which comprises pH-sensitive cationic lipids represented by formula (I), their stereoisomers or mixture of the stereoisomers and nucleic acid, wherein the nucleic acid is mRNA or plasmid DNA:

[Chem. 4]

$$(R^1)(R^2)C(OH)\text{—}(CH_2)a\text{—}(O\text{-}GO)b\text{-}X \qquad (I)$$

wherein a represents an integer of 3-5; b represents 0 or 1; $R^1$ and $R^2$ each independently represent a group represented by general formula (A):

[Chem. 5]

$$(R^{11})(R^{12})\text{—}CH\text{—}(CO\text{—}O)G\text{-}(CH_2)v\text{-} \qquad (A)$$

wherein $R^{11}$ and $R^{12}$ each independently represent a linear or branched $C_{2-15}$ alkyl group; c represents 0 or 1; v represents an integer of 4-12;

and X represents a group represented by general formula (B):

[Chem. 6]

$$\text{—}(CH_2)d\text{-}N(R^3)(R^4) \qquad (B)$$

wherein d represents an integer of 0-3; $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group).

[2-2] The lipid nanoparticle of [2-1], wherein the pH-sensitive cationic lipid is represented by formula:

[Chem. 7-1]

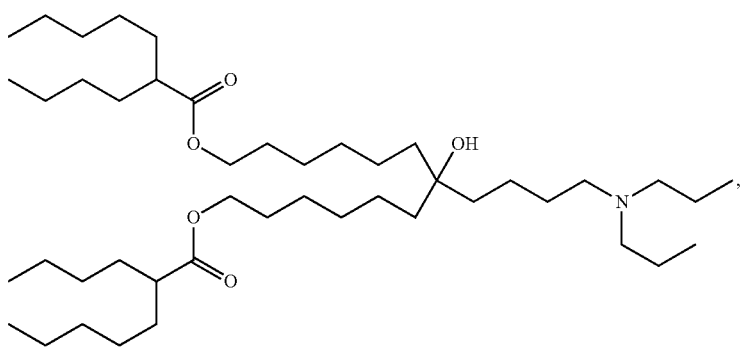

CL4F 7-4

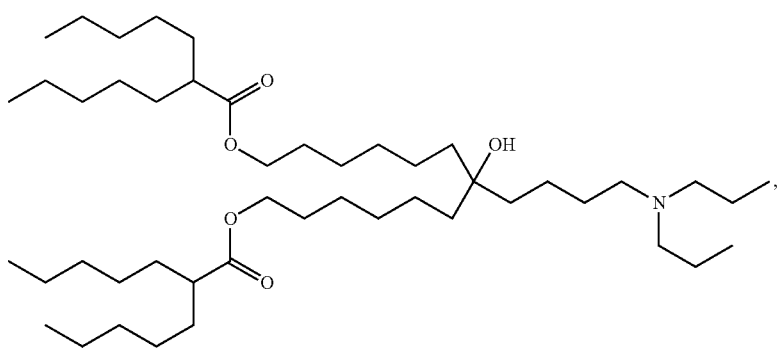

CL4F 7-5

-continued
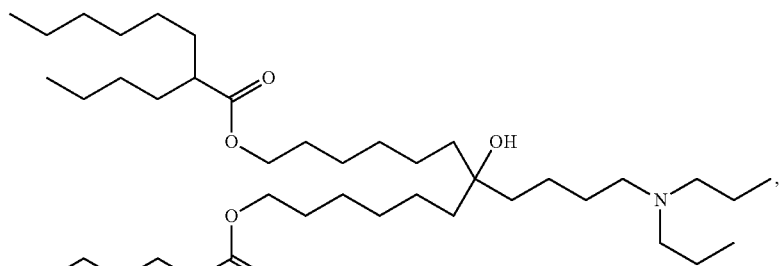
CL4F 8-4
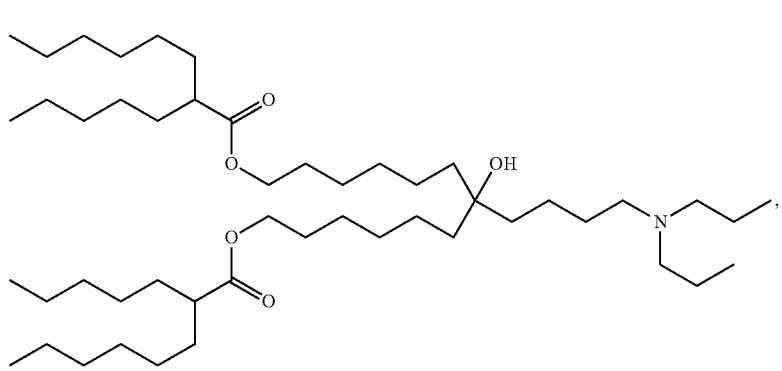
CL4F 8-5
[Chem. 7-2]
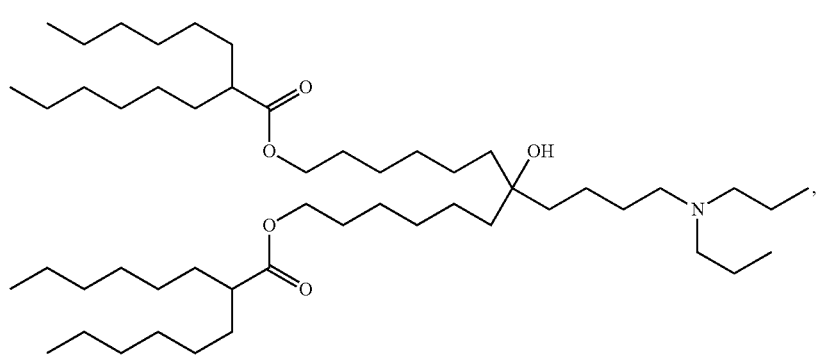
CL4F 8-6
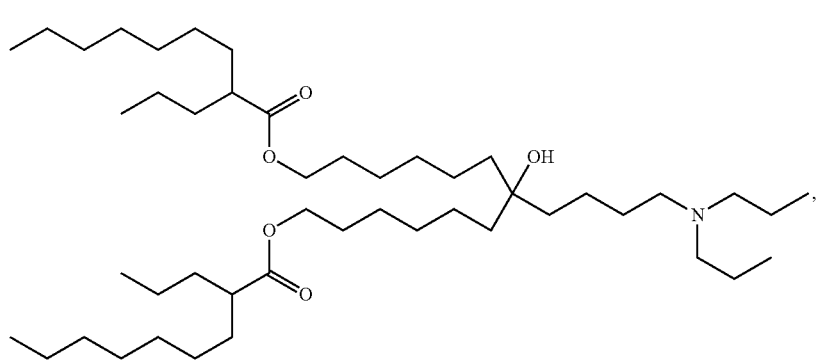
CL4F 9-3

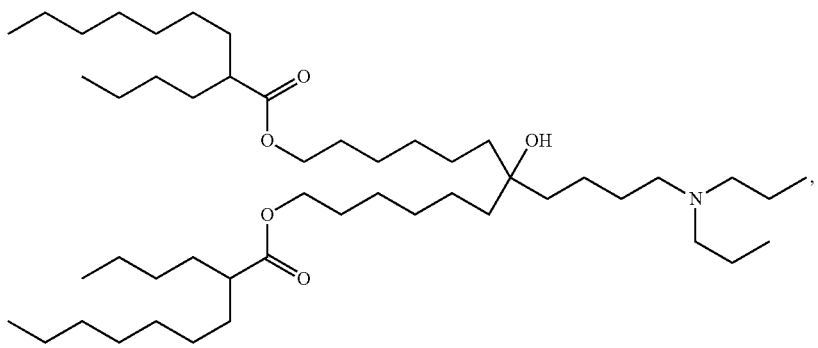
CL4F 9-4
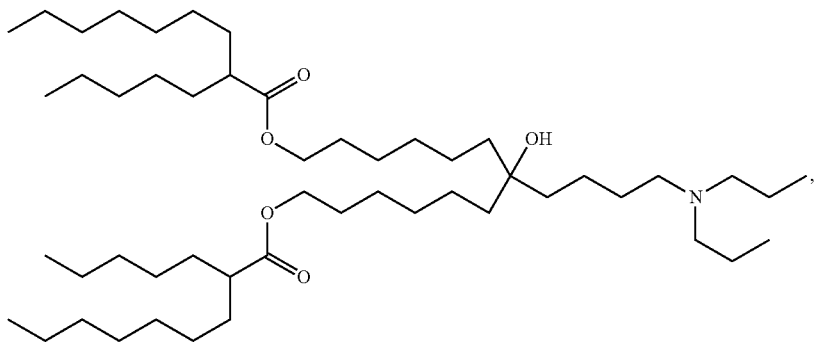
CL4F 9-5
[Chem. 7-3]
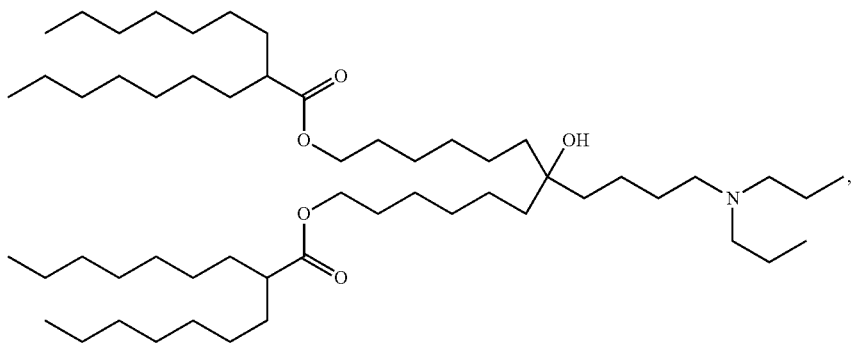
CL4F 9-7
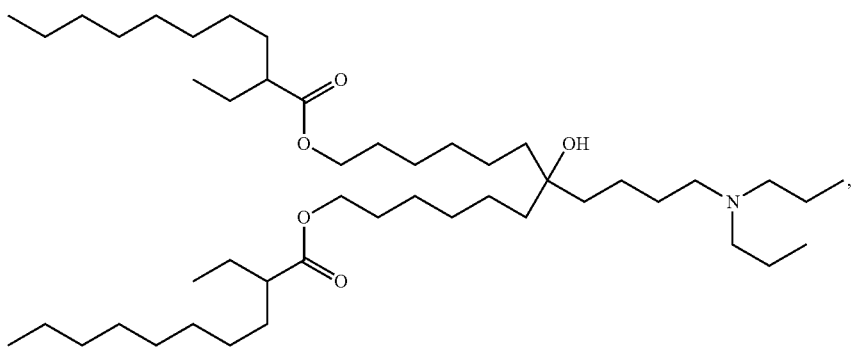
CL4F 10-2

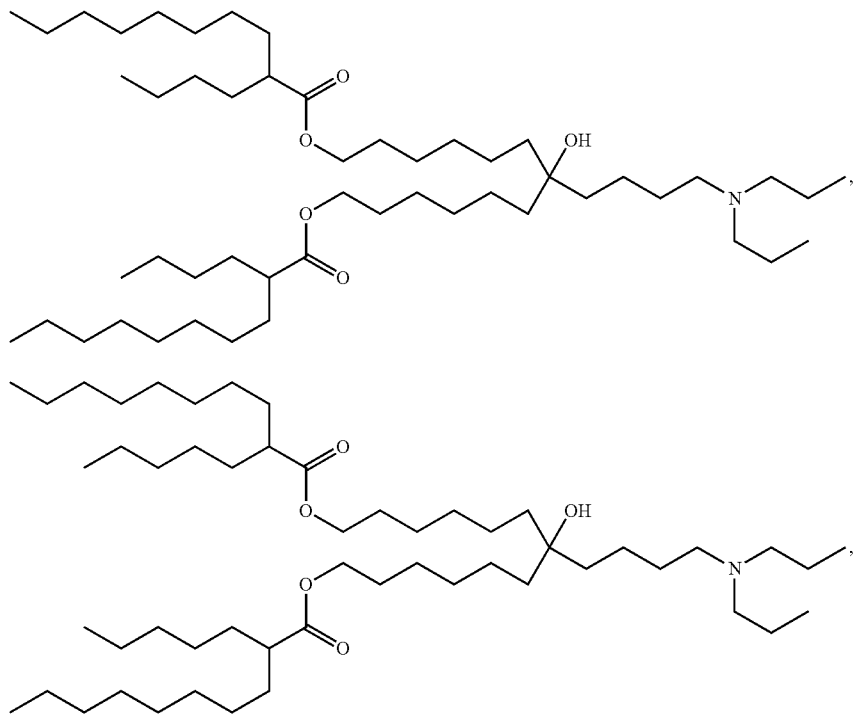
CL4F 10-4
CL4F 10-5
[Chem. 7-4]
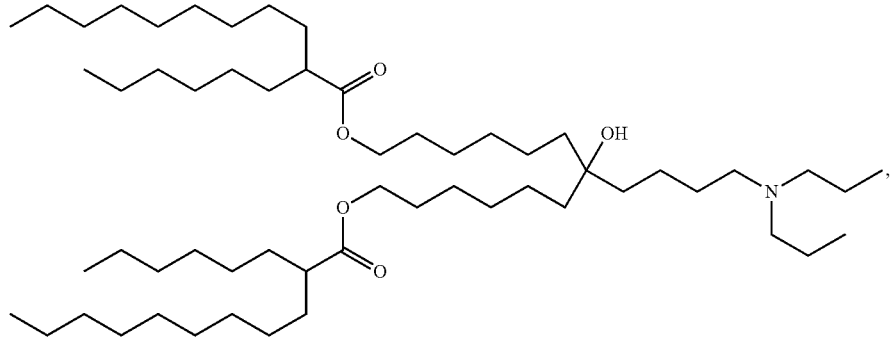
CL4F 11-6
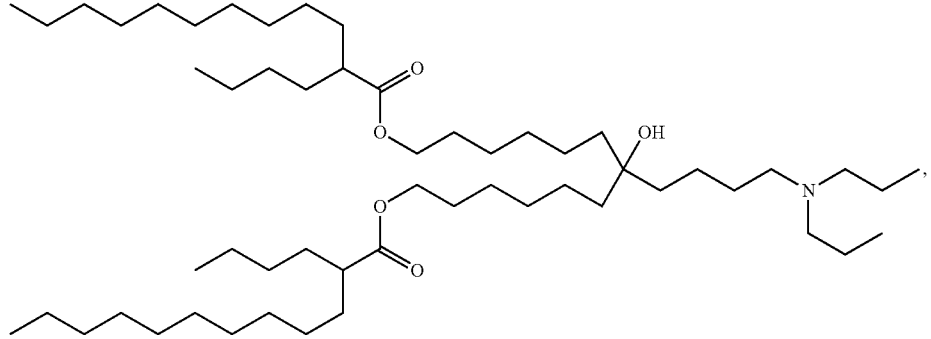
CL4F 12-4

-continued
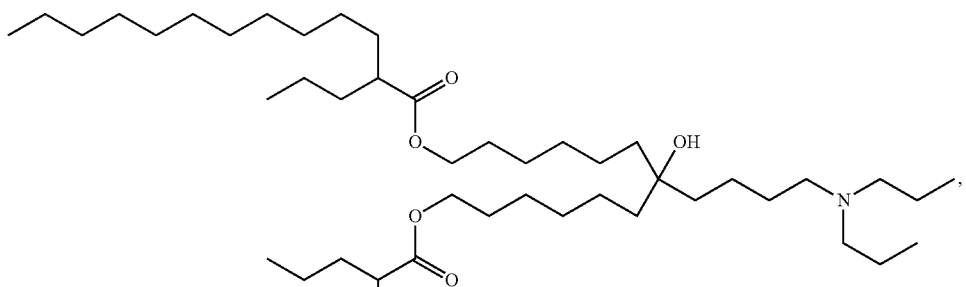
CL4F 13-3
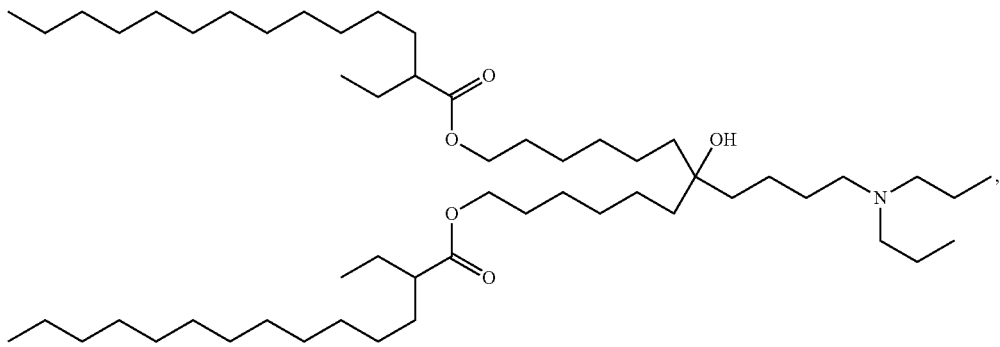
CL4F 14-2
[Chem. 7-5]
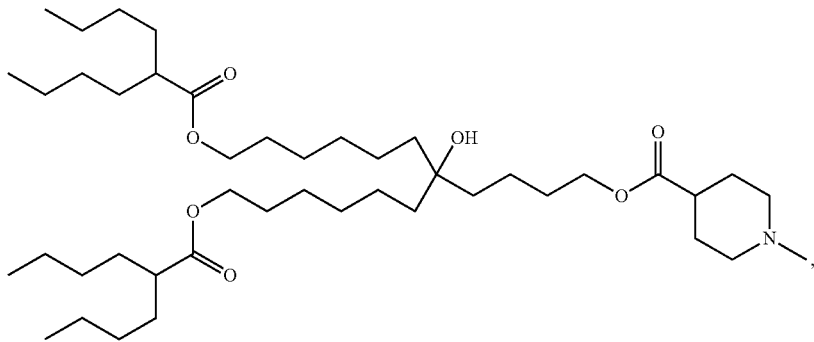
CL15F 6-4
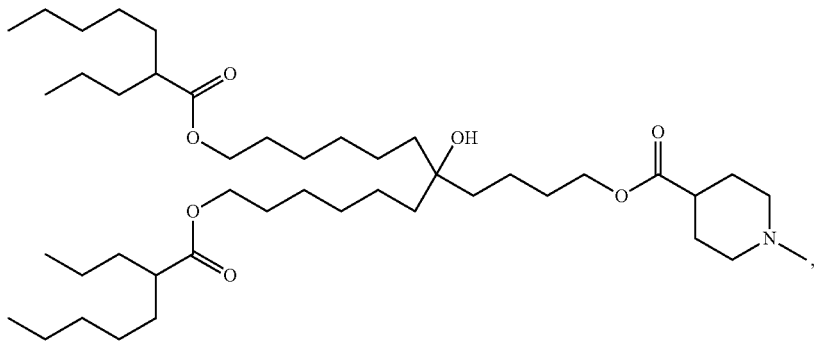
CL15F 7-3

-continued
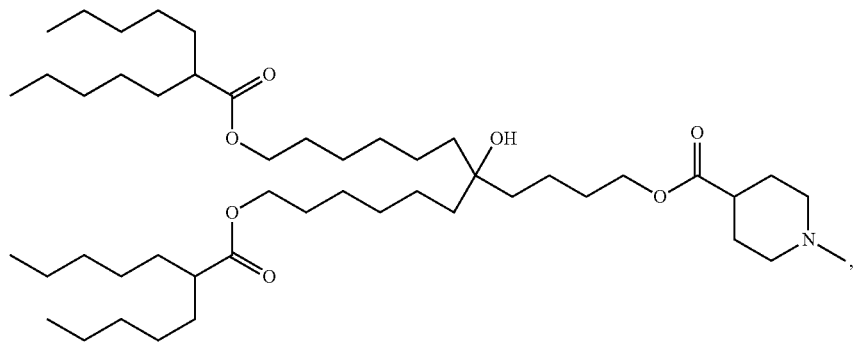
CL15F 7-5
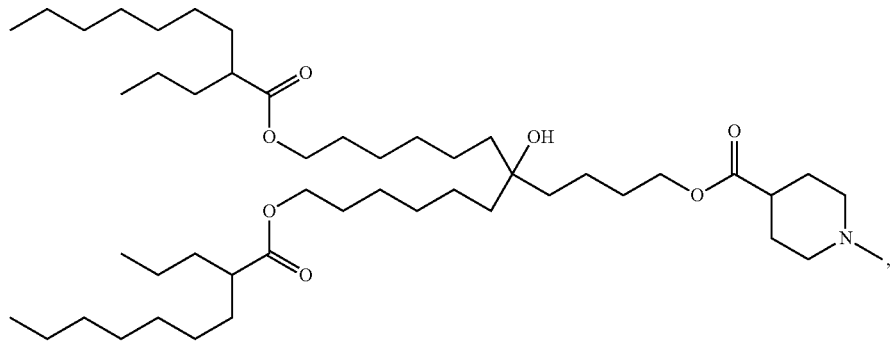
CL15F 9-3
[Chem. 7-6]
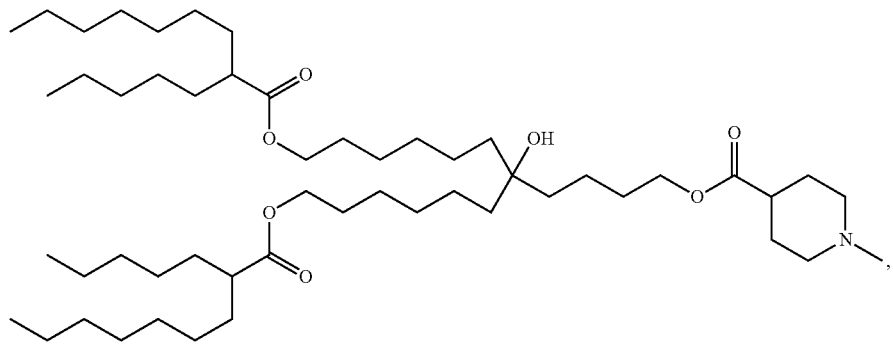
CL15F 9-5
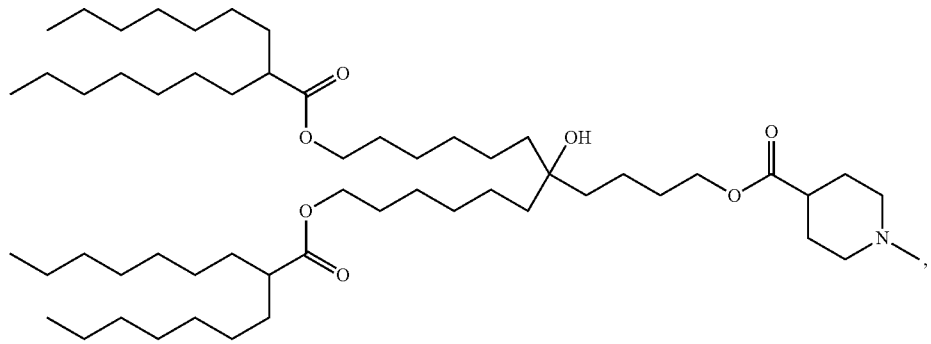
CL15F 9-7

-continued
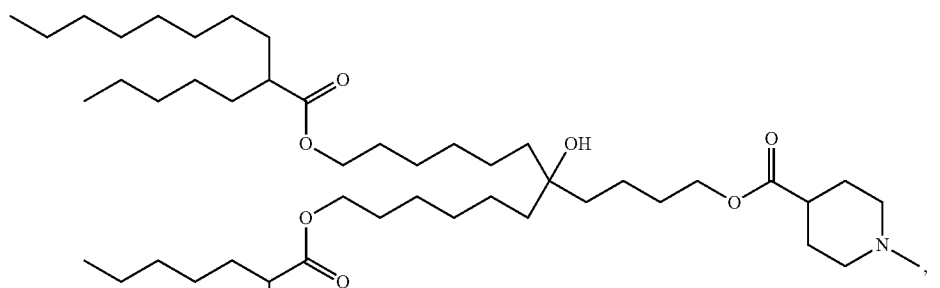
CL15F 10-5
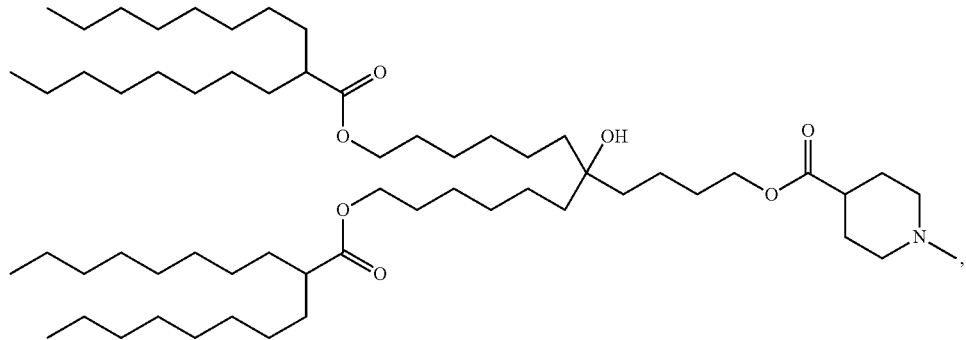
CL15F 10-8
[Chem. 7-7]
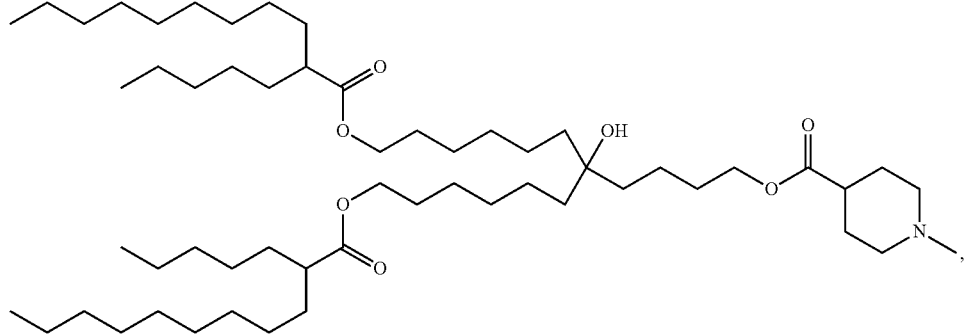
CL15F 11-5
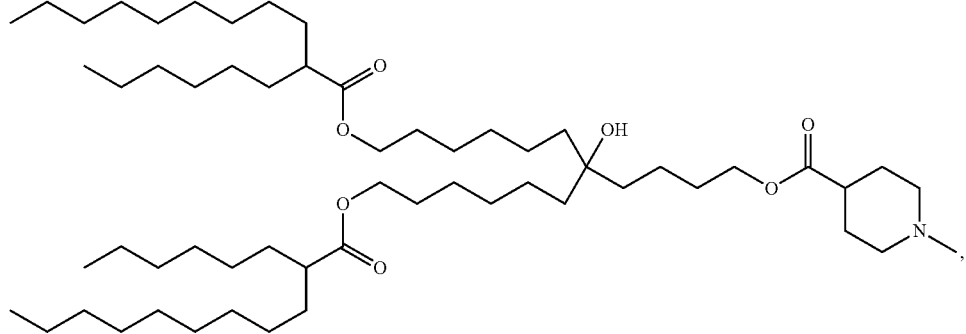
CL15F 11-6

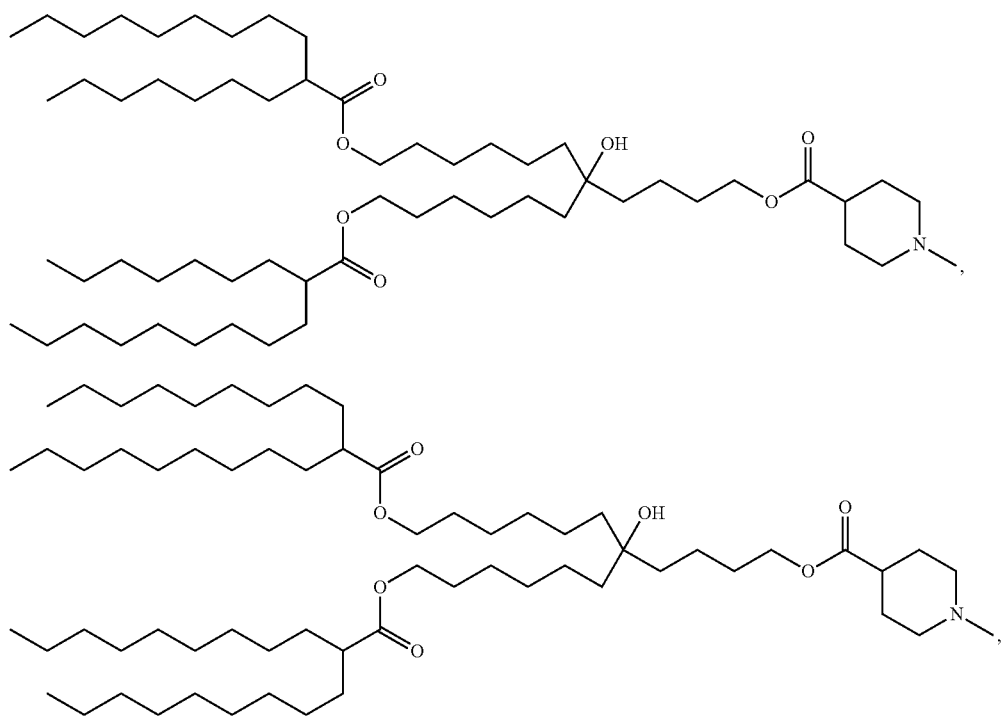
CL15F 11-7
CL15F 11-9
[Chem. 7-8]
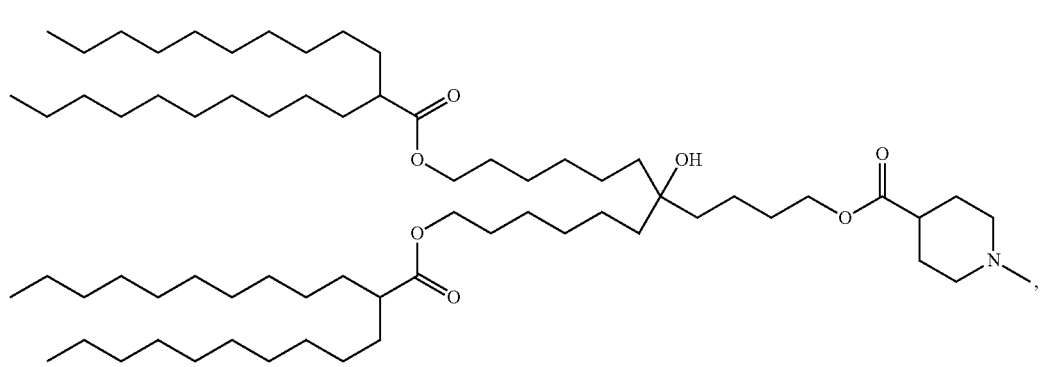
CL15F 12-10
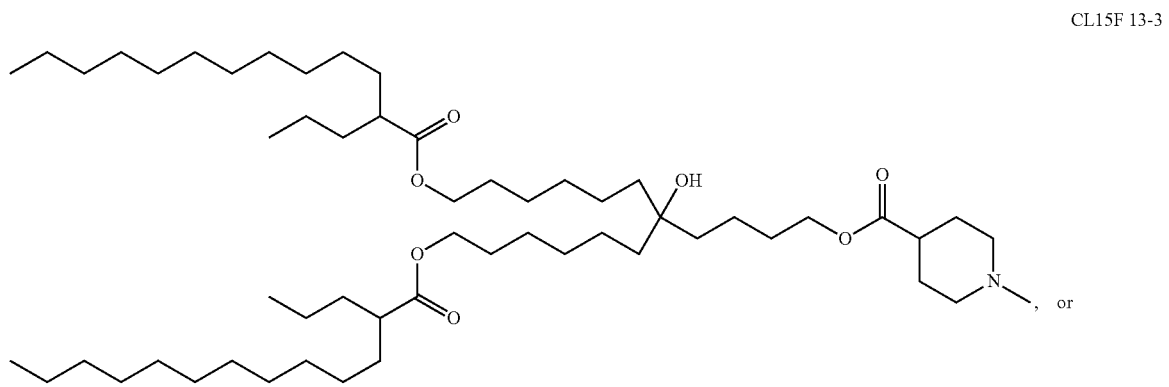
CL15F 13-3, or

CL15F 14-2

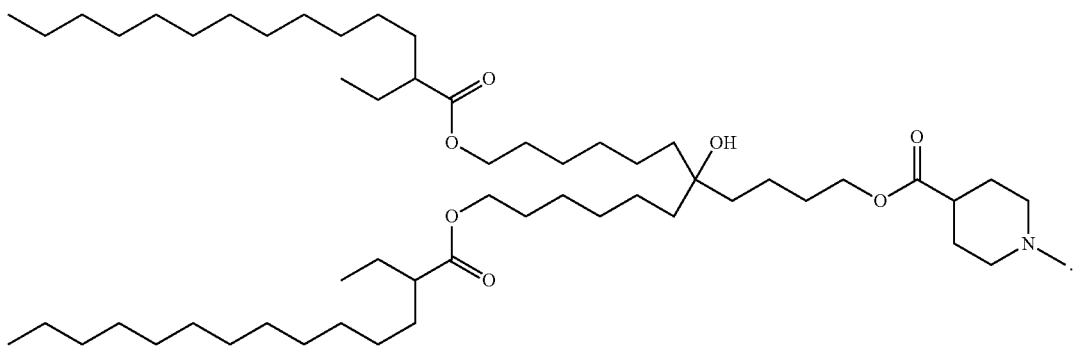

[3-1] A pharmaceutical compositions for transfer to spleen comprising pH-sensitive cationic lipids represented by formula (I), and its stereoisomers or mixture of the stereoisomers:

[Chem. 8]

$$(R^1)(R^2)C(OH)—(CH_2)a—(O—CO)b-X \qquad (I)$$

wherein a represents an integer of 3-5; b represents 0 or 1; $R^1$ and $R^2$ each independently represent a group represented by general formula (A):

[Chem. 9]

$$(R^{11})(R^{12})—CH—(CO—O)c—(CH_2)v- \qquad (A)$$

wherein $R^{11}$ and $R^{12}$ each independently represent a linear or branched $C_{2-15}$ alkyl group; c represents 0 or 1; v represents an integer of 4-12;

and X represents a group represented by general formula (B):

[Chem. 10]

$$—(CH_2)d-N(R^3)(R^4) \qquad (B)$$

wherein d represents an integer of 0-3; $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group).

[3-2] The pharmaceutical compositions of [3-1], wherein the pH-sensitive cationic lipid is represented by following formula:

[Chem. 11-1]

CL4F 7-4

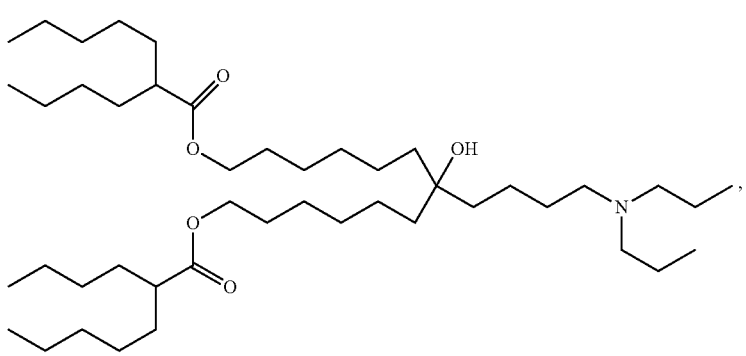

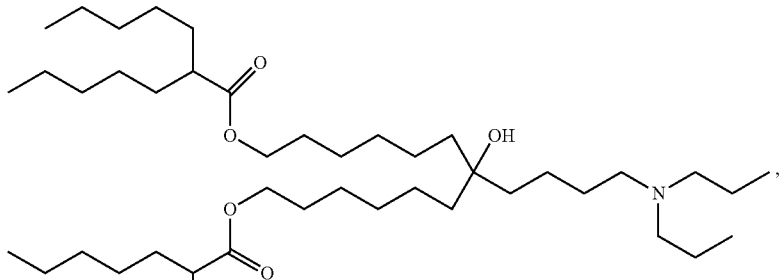
CL4F 7-5
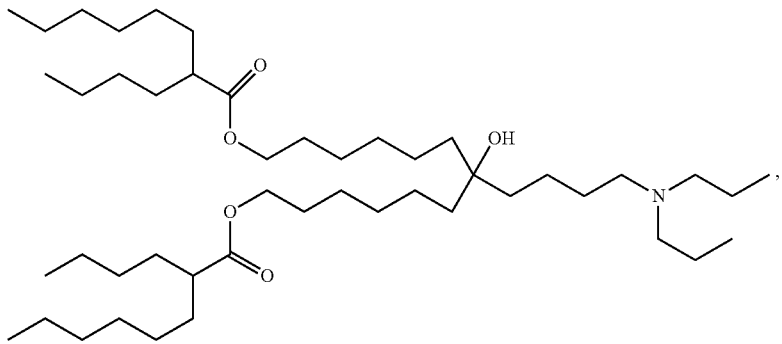
CL4F 8-4
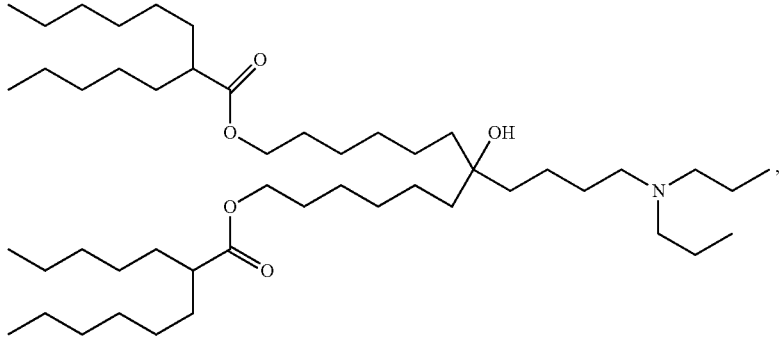
CL4F 8-5
[Chem. 11-2]
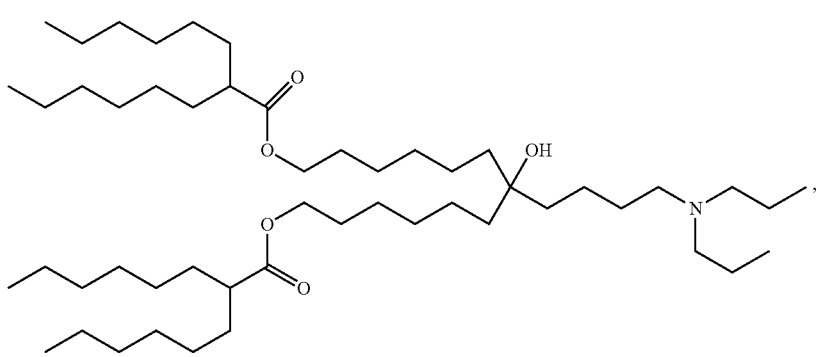
CL4F 8-6

-continued
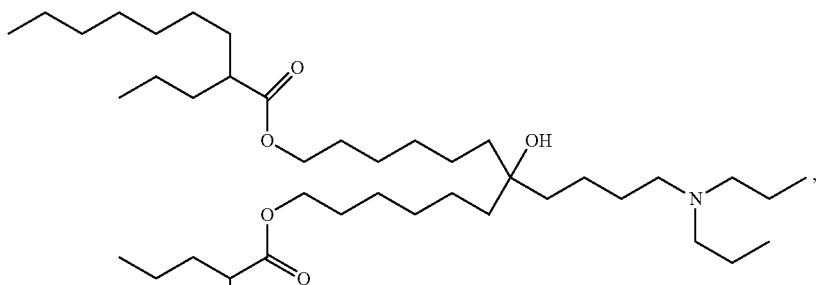
CL4F 9-3
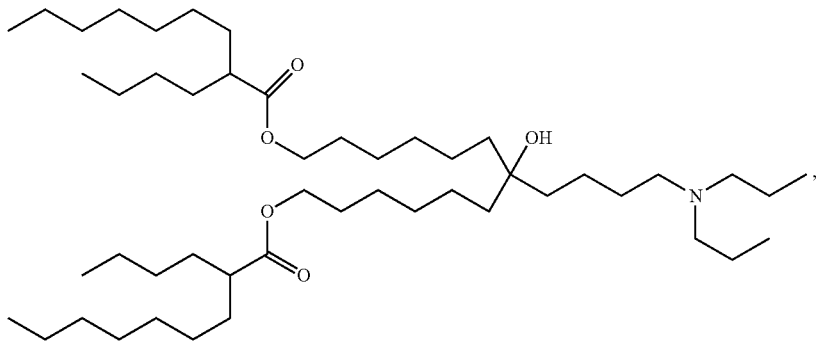
CL4F 9-4
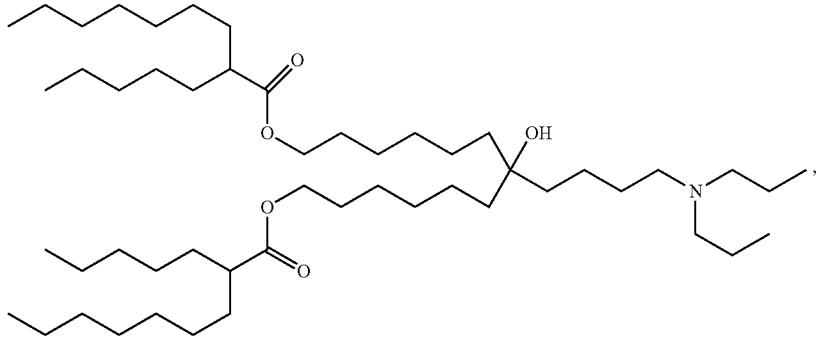
CL4F 9-5
[Chem. 11-3]
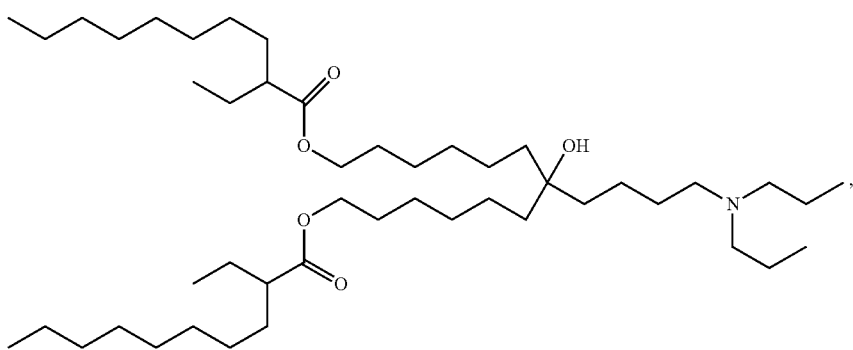
CL4F 10-2

-continued
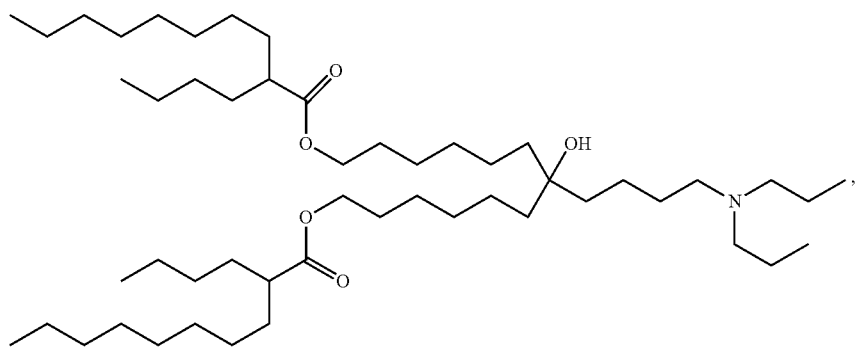
CL4F 10-4
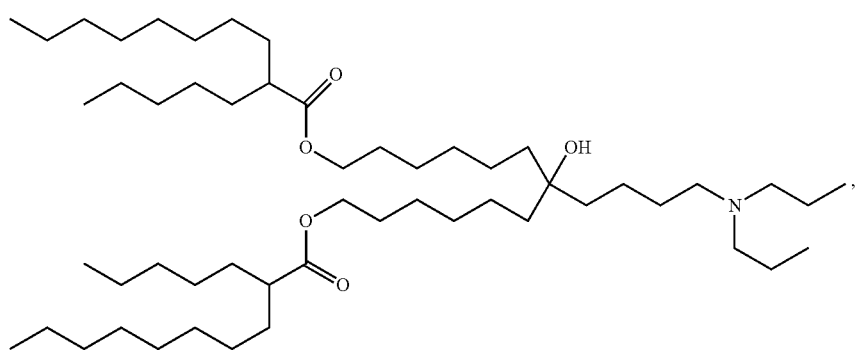
CL4F 10-5
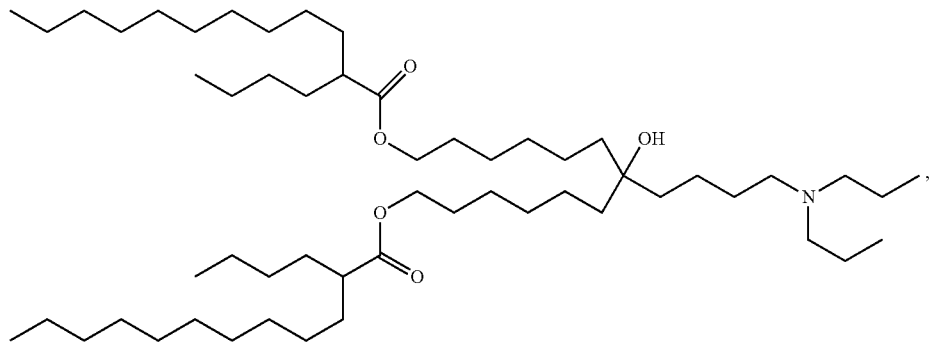
CL4F 12-4
[Chem. 11-4]
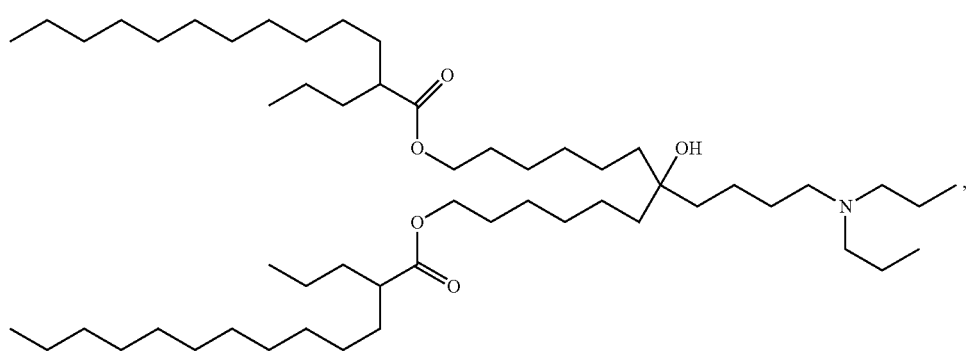
CL4F 13-3

-continued
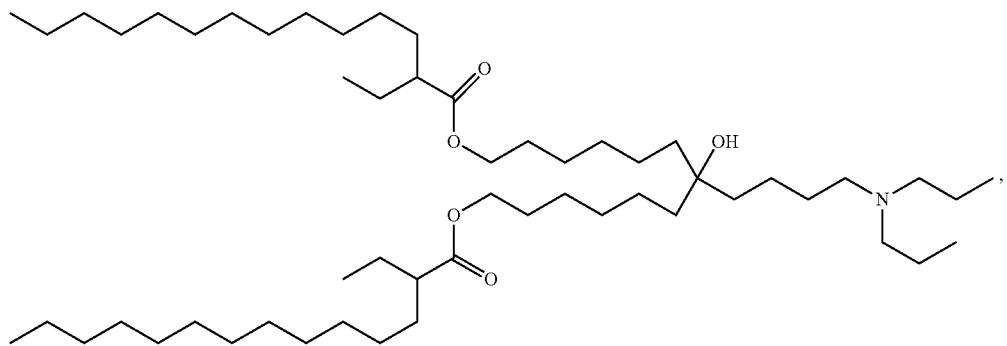
CL4F 14-2
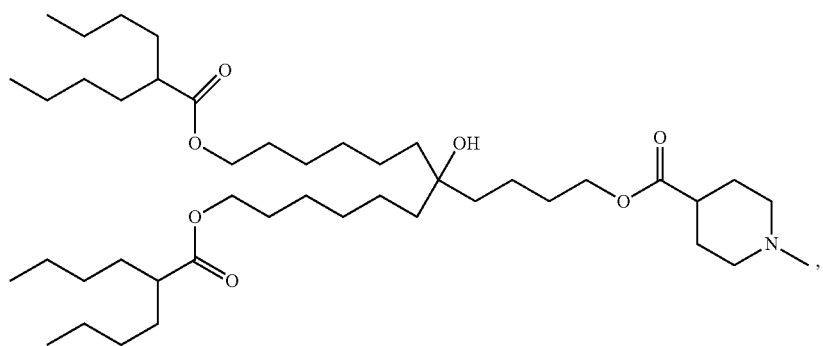
CL15F 6-4
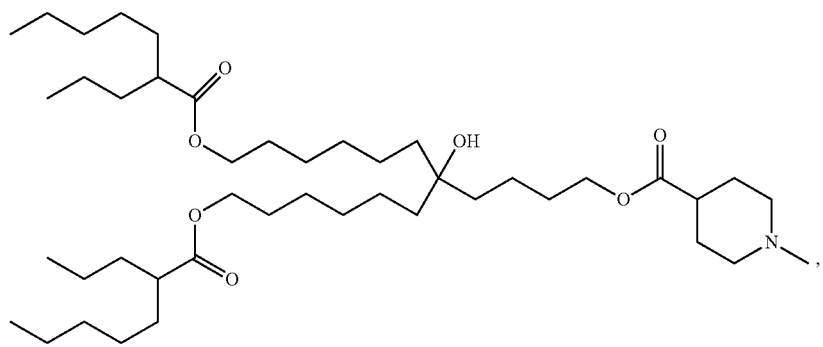
CL15F 7-3
[Chem. 11-5]
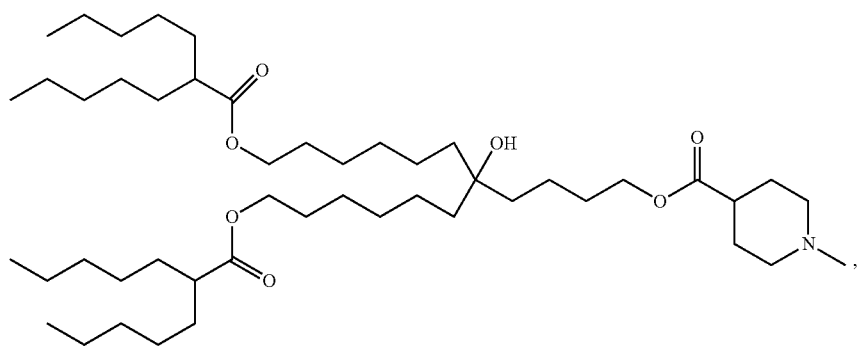
CL15F 7-5

-continued
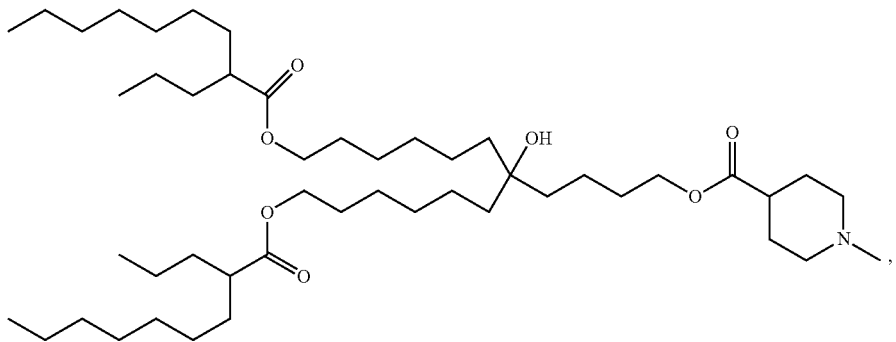
CL15F 9-3
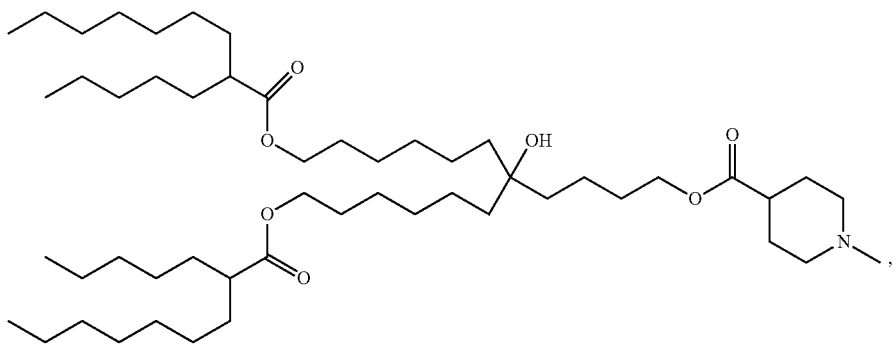
CL15F 9-5
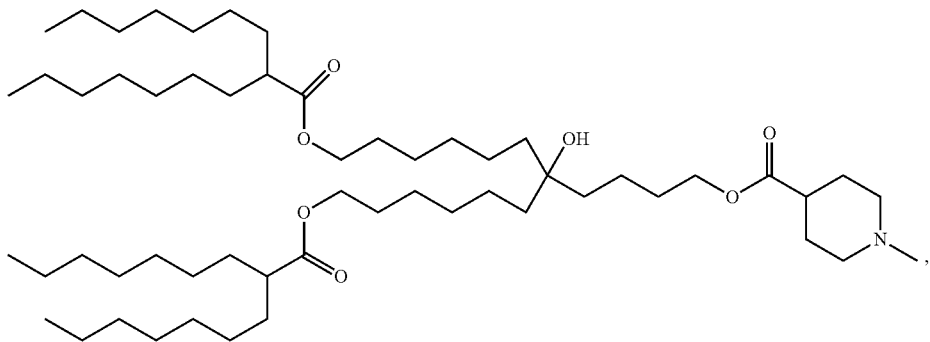
CL15F 9-7
[Chem. 11-6]
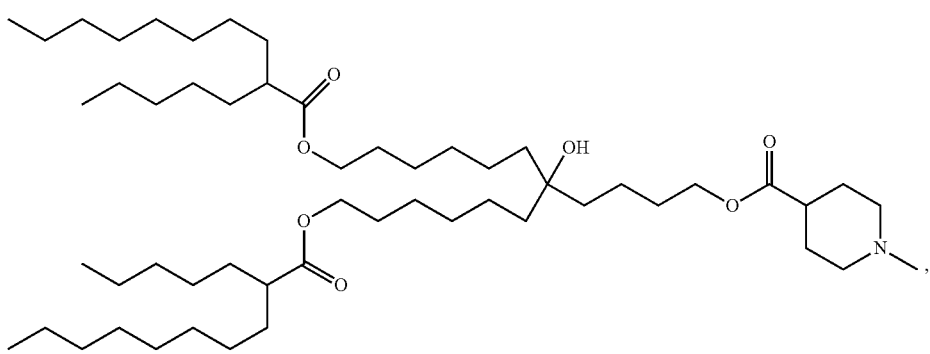
CL15F 10-5

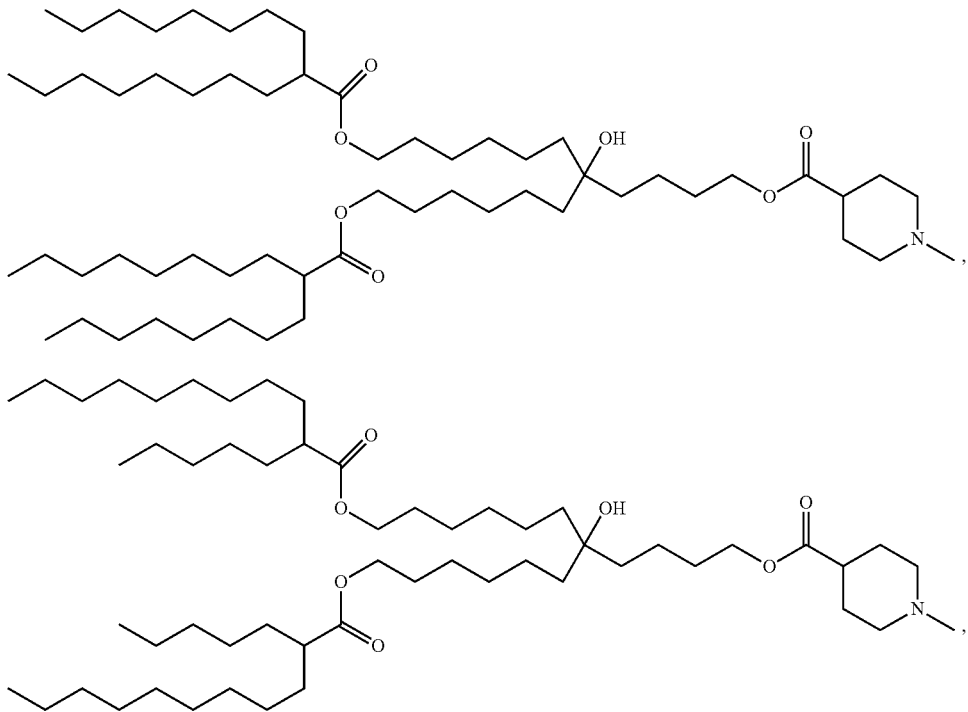
CL15F 10-8
CL15F 11-5
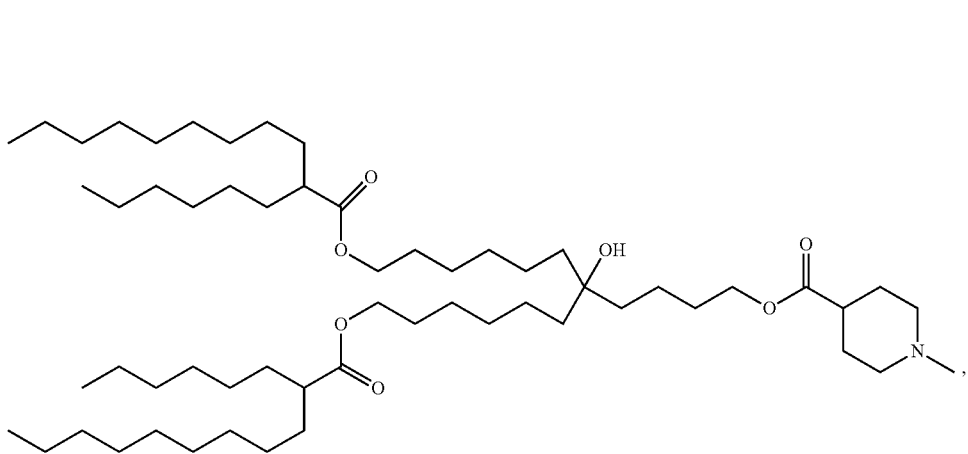
CL15F 11-6
[Chem. 11-7]
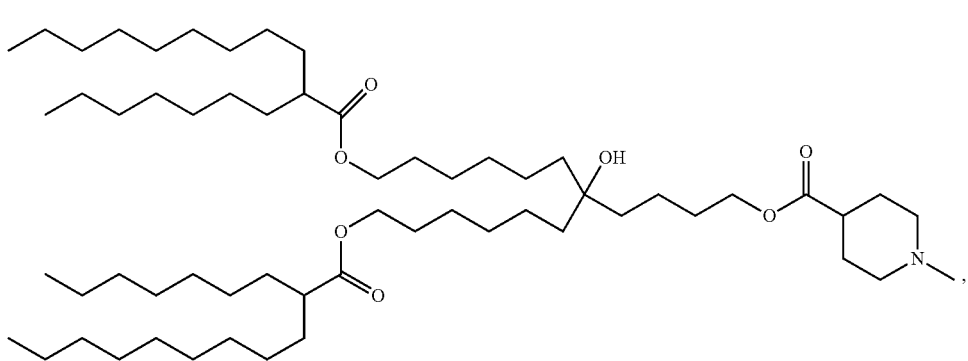
CL15F 11-7

-continued
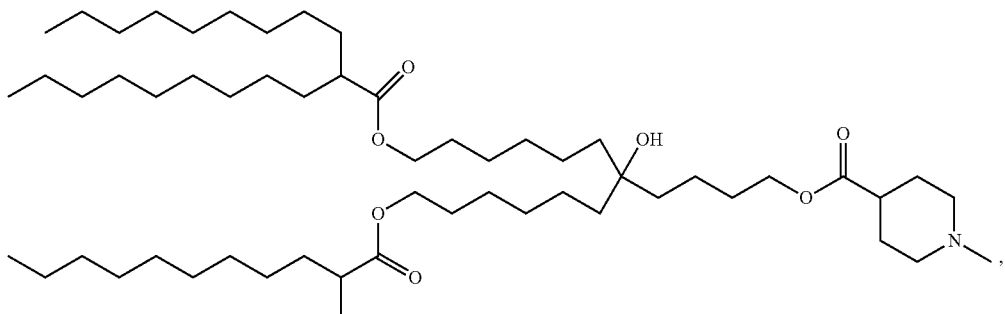
CL15F 11-9
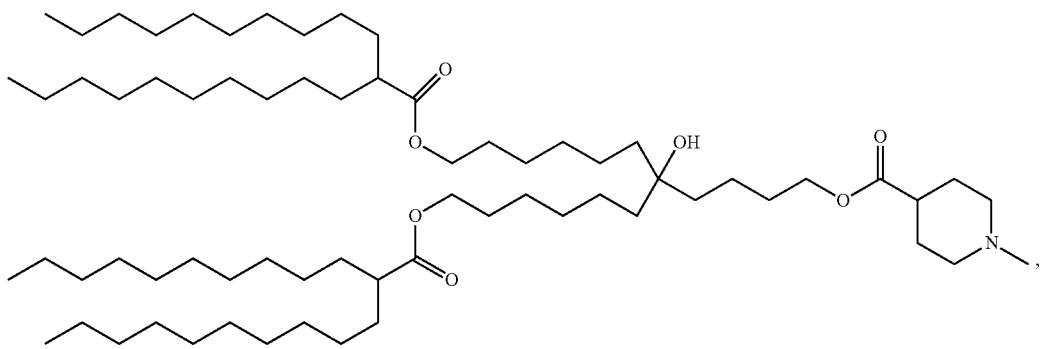
CL15F 12-10
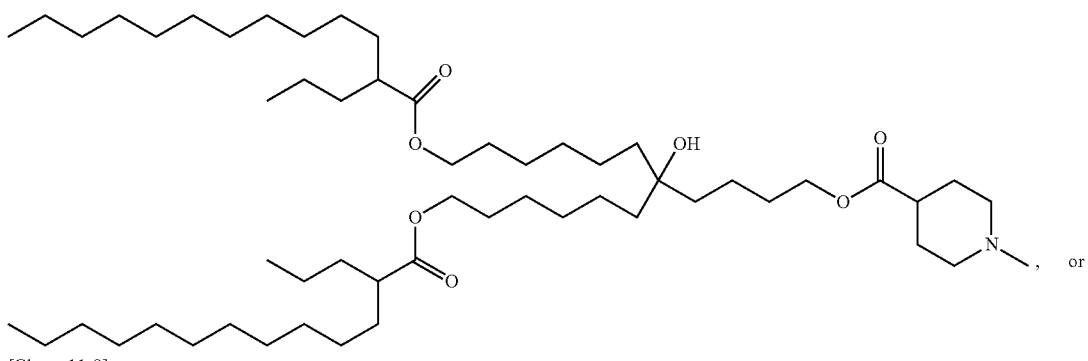
CL15F 13-3
[Chem. 11-8]
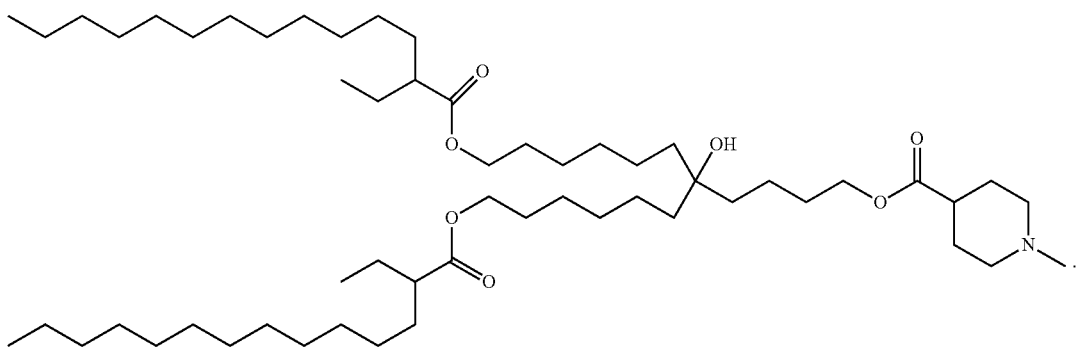
CL15F 14-2
[4-1] A pH-sensitive cationic lipid represented by formula (I), its stereoisomers or mixture of the stereoisomers:
[Chem. 12]
$$(R^1)(R^2)C(OH)-(CH_2)a-(O-CO)b-X \quad (I)$$
wherein a represents an integer of 3-5; b represents 0 or 1; $R^1$ and $R^2$ each independently represent a group represented by general formula (A):
[Chem. 13]
$$(R^{11})(R^{12})-CH-(CO-O)c-(CH_2)v- \quad (A)$$

wherein $R^{11}$ and $R^{12}$ each independently represent a linear or branched $C_{2-15}$ alkyl group; c represents 0 or 1; v represents an integer of 4-12;

and X represents a group represented by general formula (B):

[Chem. 14]

$$—(CH_2)d\text{-}N(R^3)(R^4) \quad (B)$$

wherein d represents an integer of 0-3; and $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group); wherein the pH-sensitive cationic lipids of the following formulas are excluded:

[Chem. 15]

CL4F6

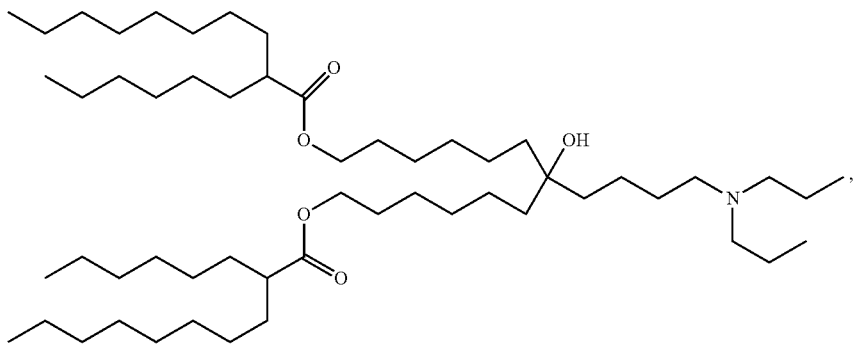

CL15F6

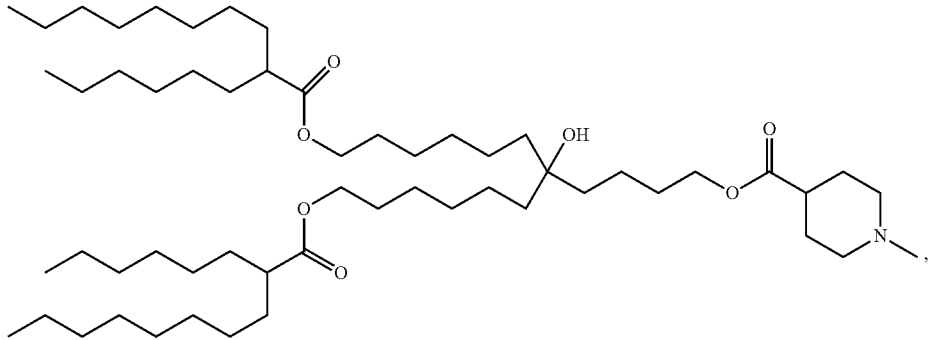

CL4G6

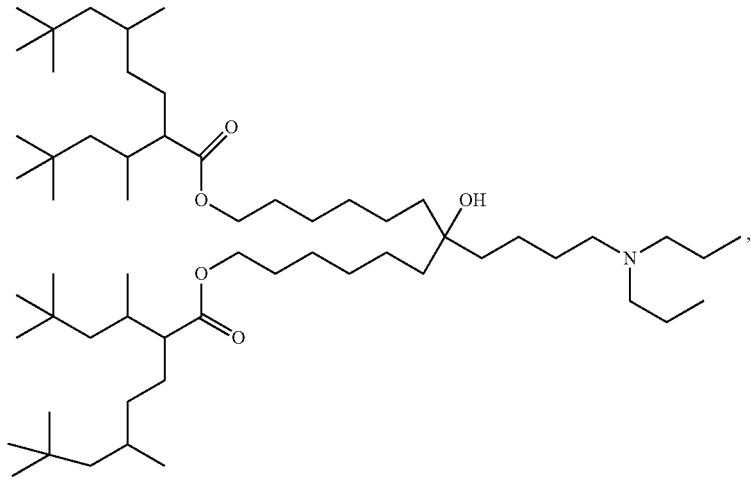

-continued
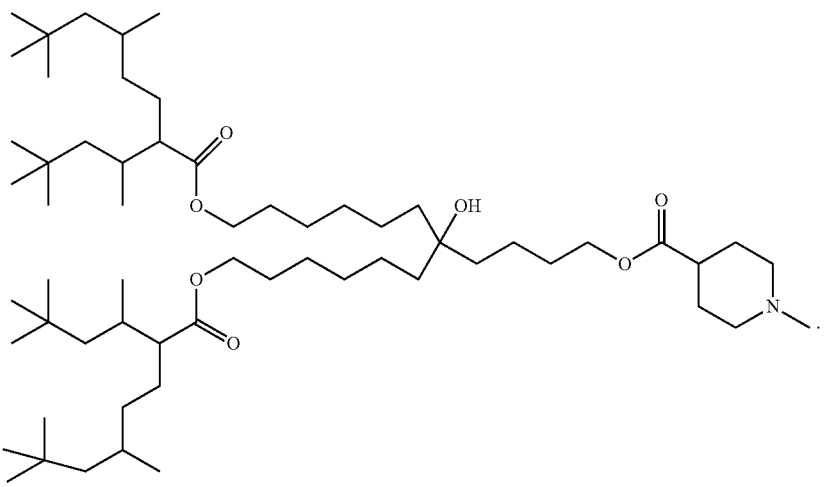
CL15G6
[4-2] The pH-sensitive cationic lipids of [4-1], and its stereoisomers or mixture of the stereoisomers, wherein the pH-sensitive cationic lipids are represented by following formulas:
[Chem. 16-1]
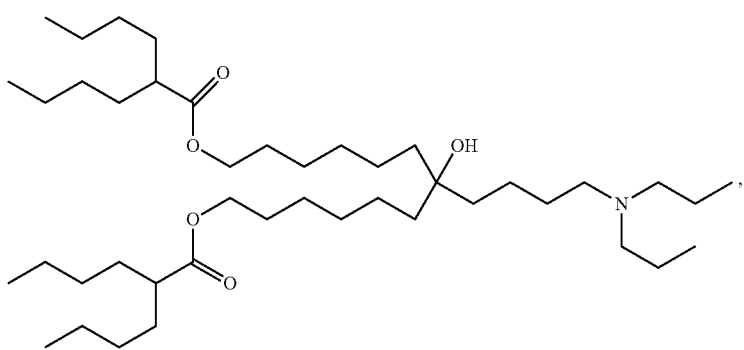
CL4F 6-4
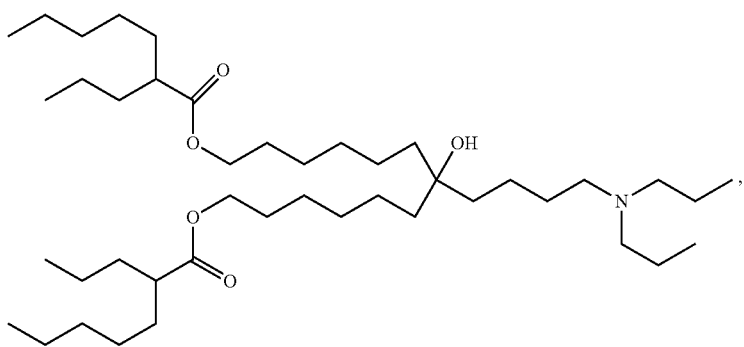
CL4F 7-3

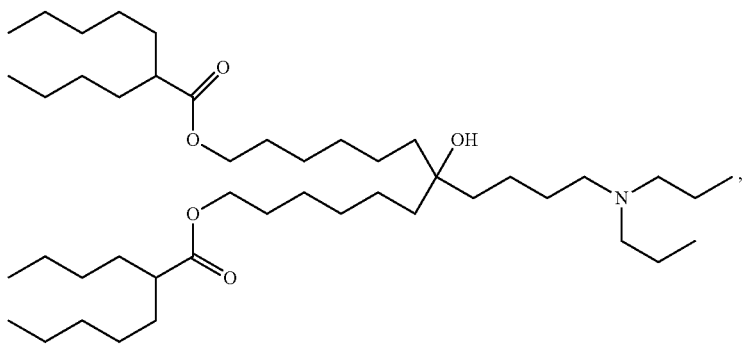
CL4F 7-4
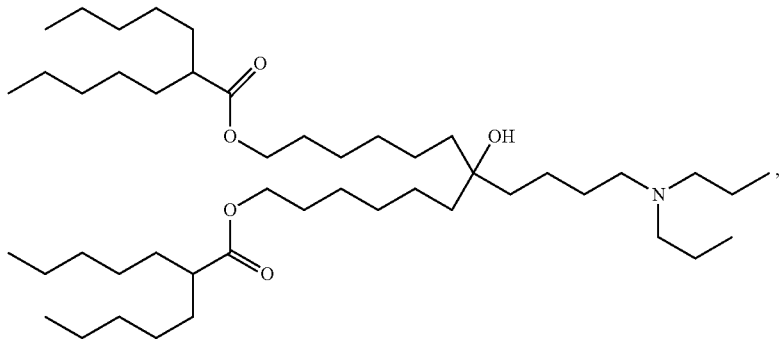
CL4F 7-5
[Chem. 16-2]
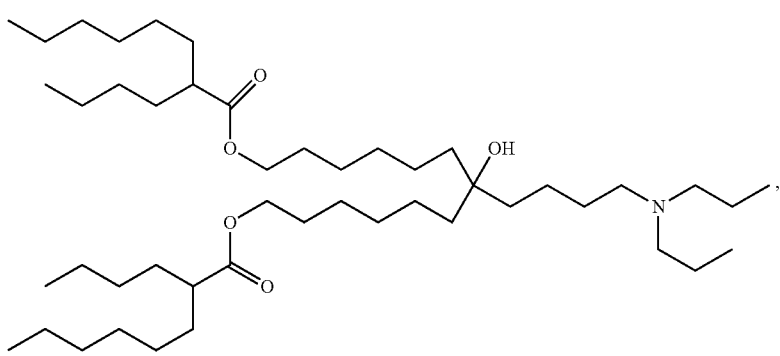
CL4F 8-4
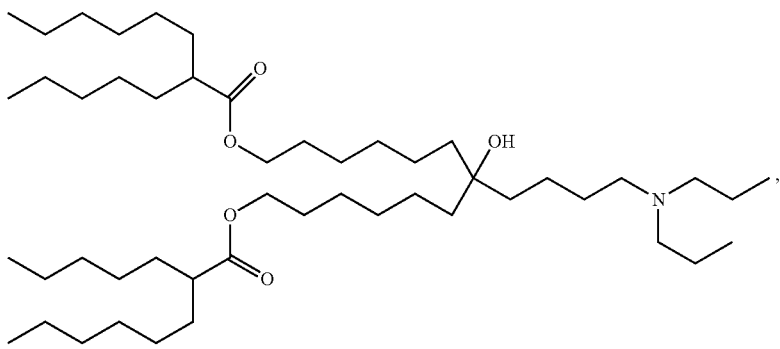
CL4F 8-5

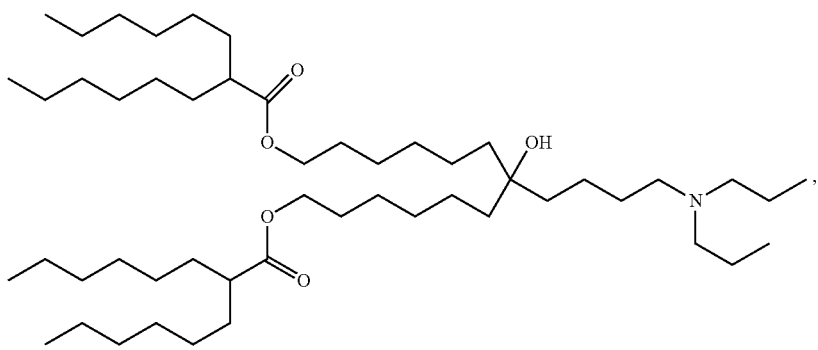
CL4F 8-6
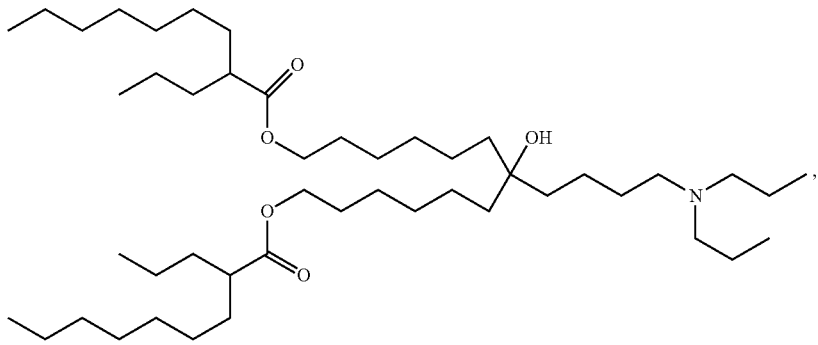
CL4F 9-3
[Chem. 16-3]
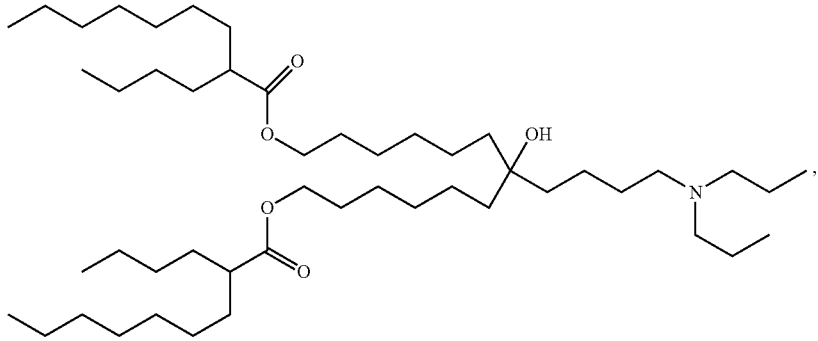
CL4F 9-4
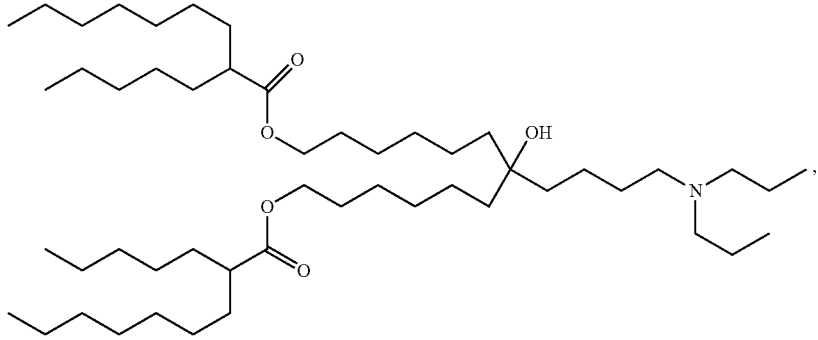
CL4F 9-5

-continued
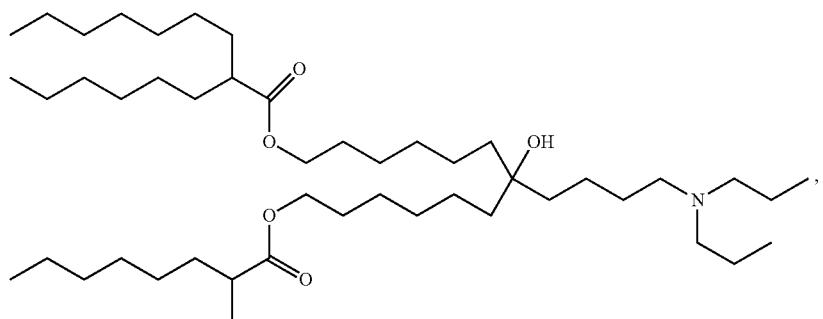
CL4F 9-6
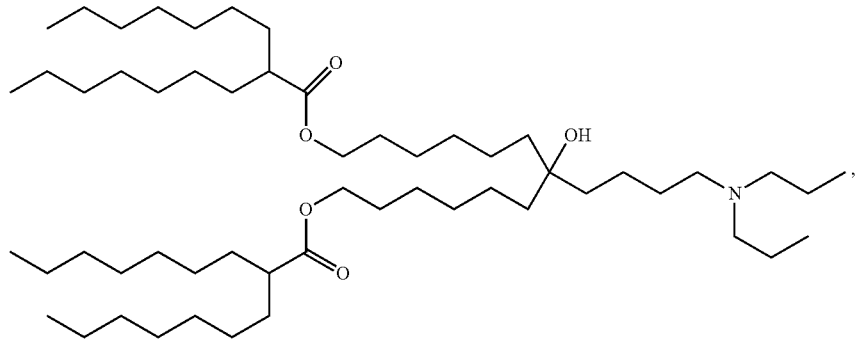
CL4F 9-7
[Chem. 16-4]
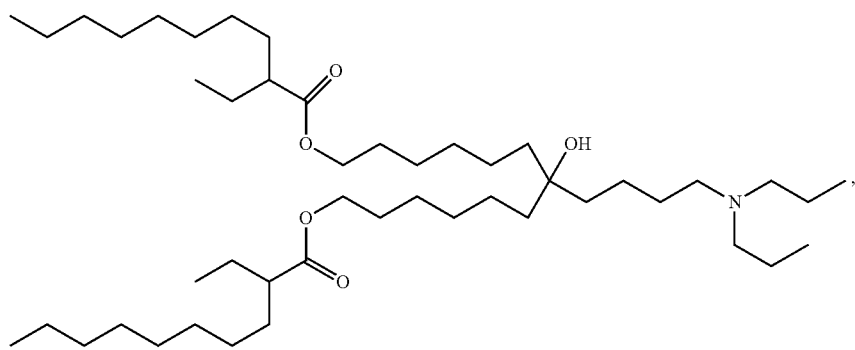
CL4F 10-2
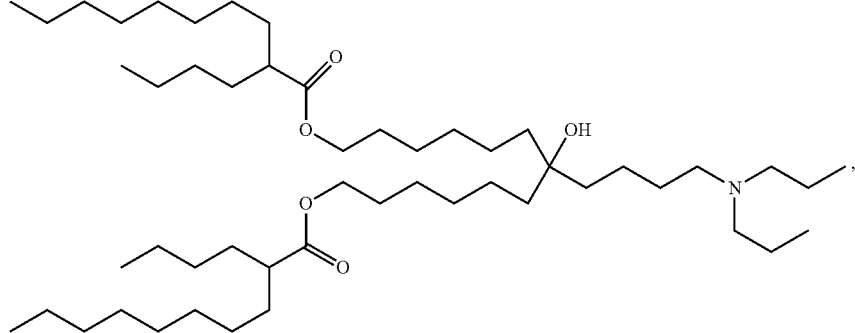
CL4F 10-4

-continued
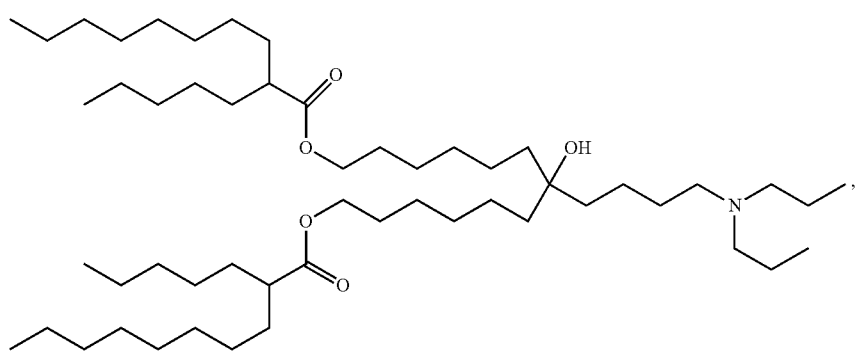
CL4F 10-5
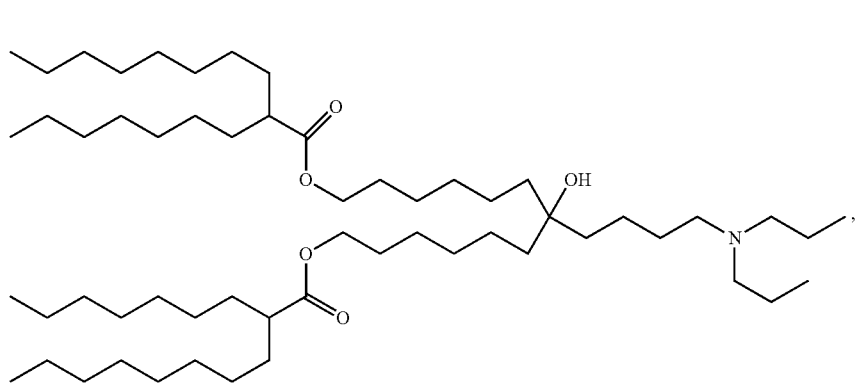
CL4F 10-7
[Chem. 16-5]
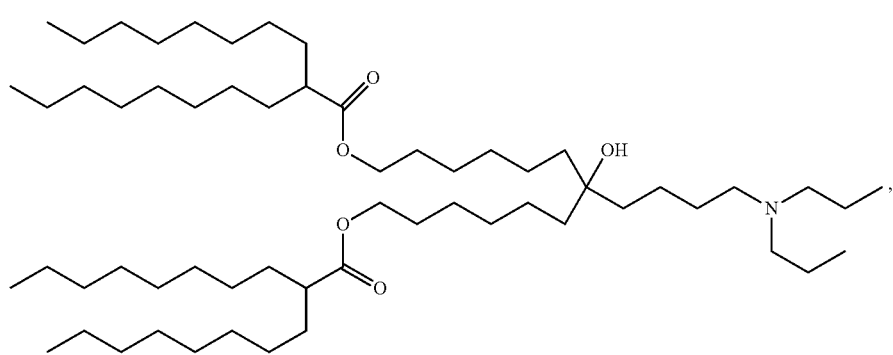
CL4F 10-8
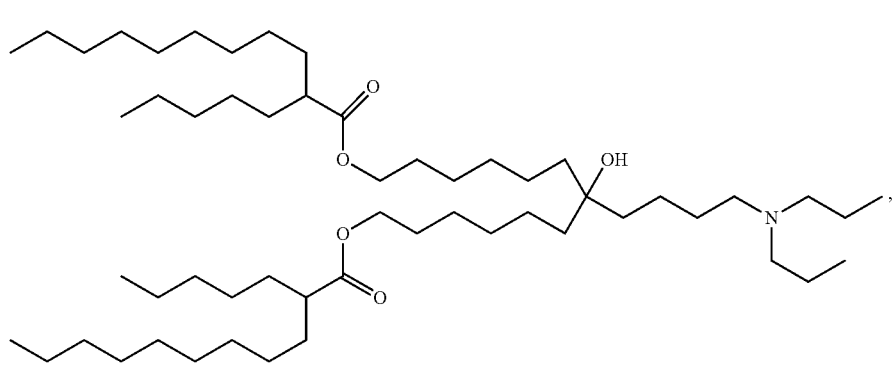
CL4F 11-5

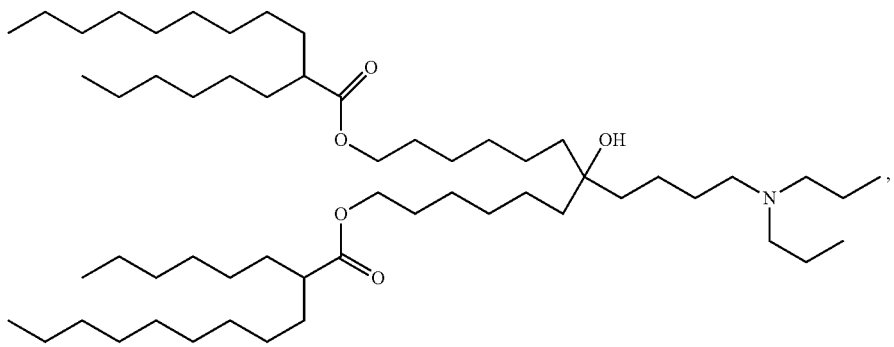
CL4F 11-6
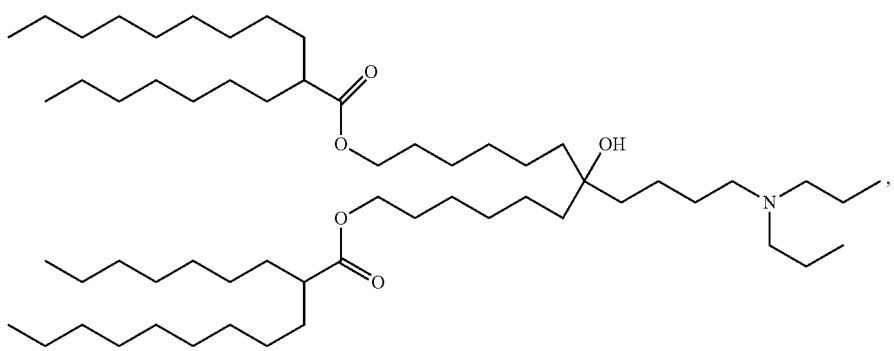
CL4F 11-7
[Chem. 16-6]
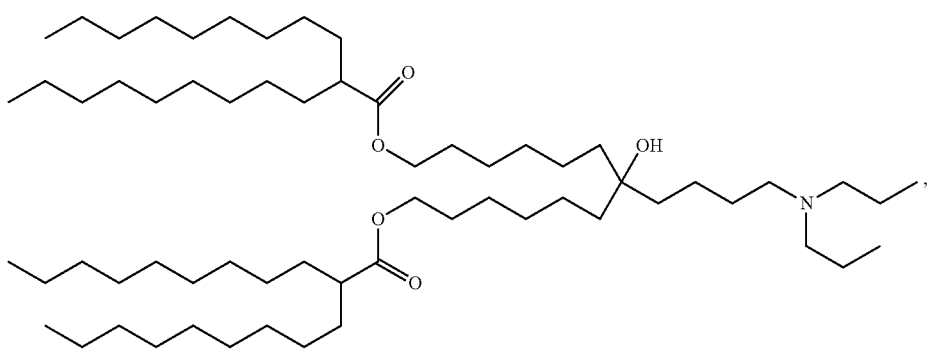
CL4F 11-9
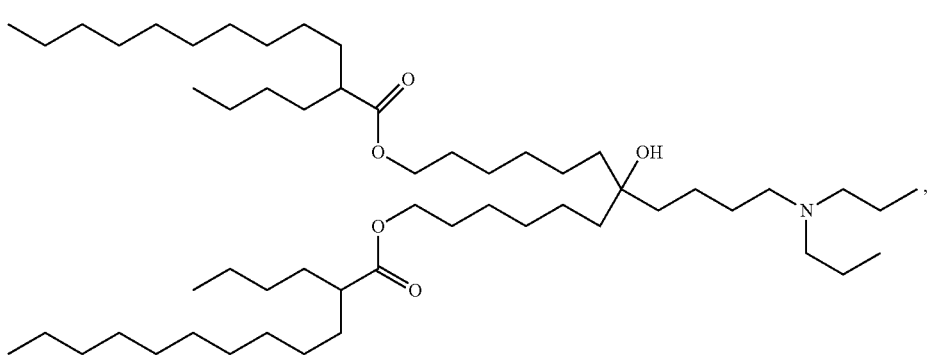
CL4F 12-4

-continued
CL4F 12-6
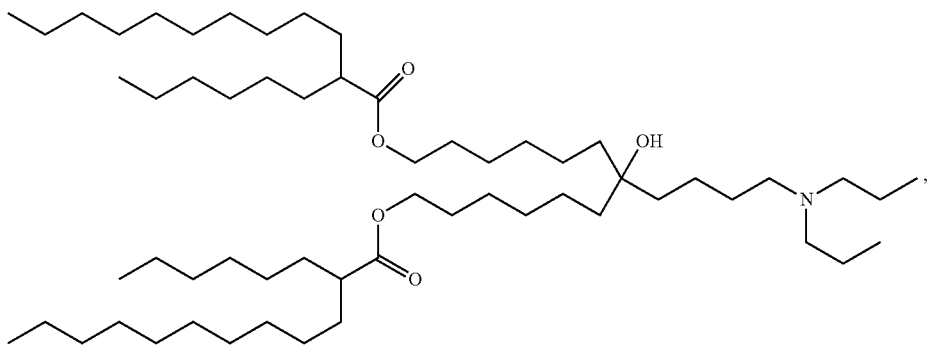
CL4F 12-10
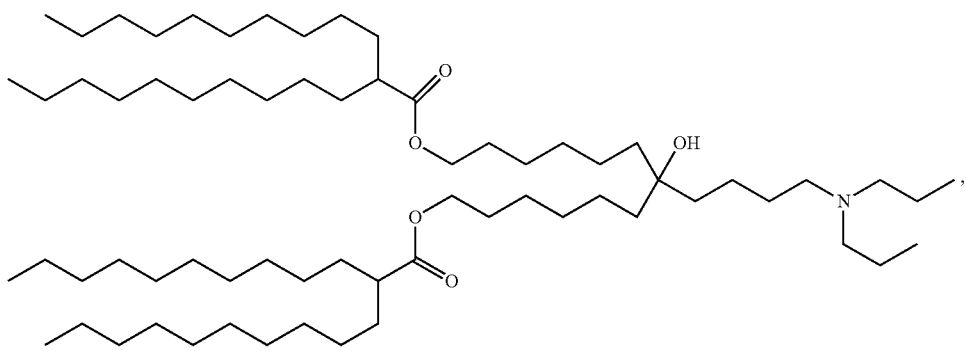
[Chem. 16-7]
CL4F 13-3
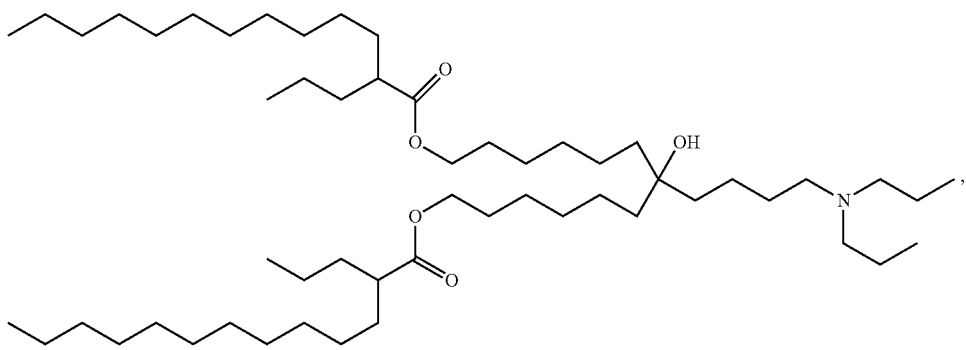
CL4F 14-2
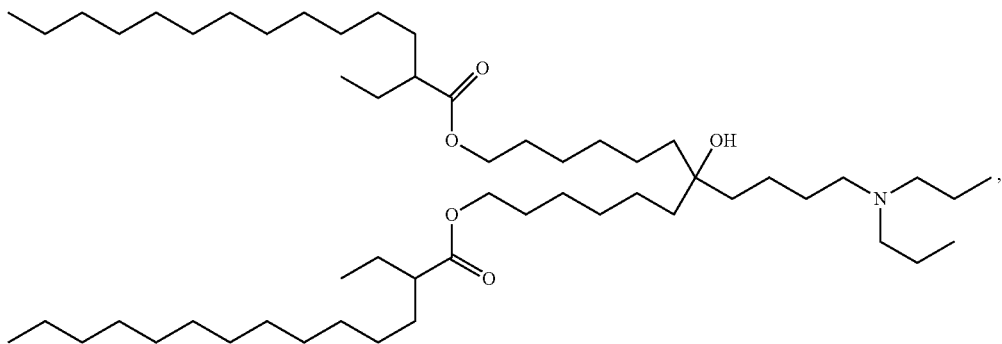

CL15F 6-4
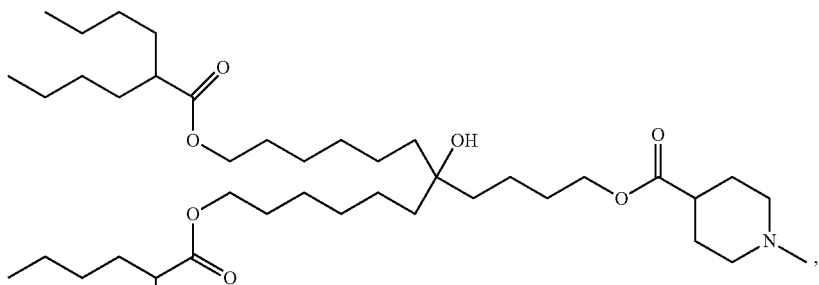
CL15F 7-3
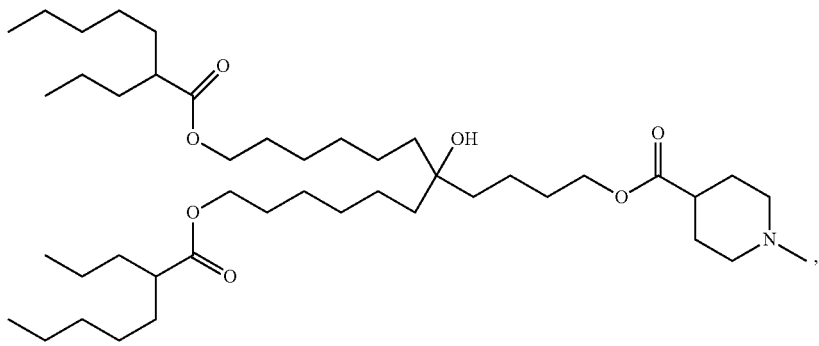
[Chem. 16-8]
CL15F 7-5
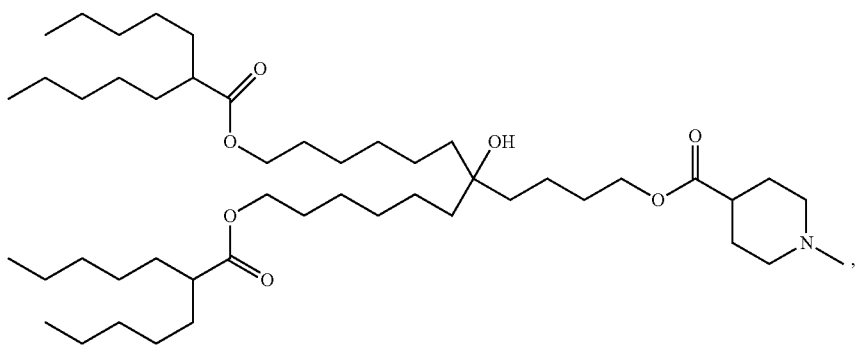
CL15F 8-6
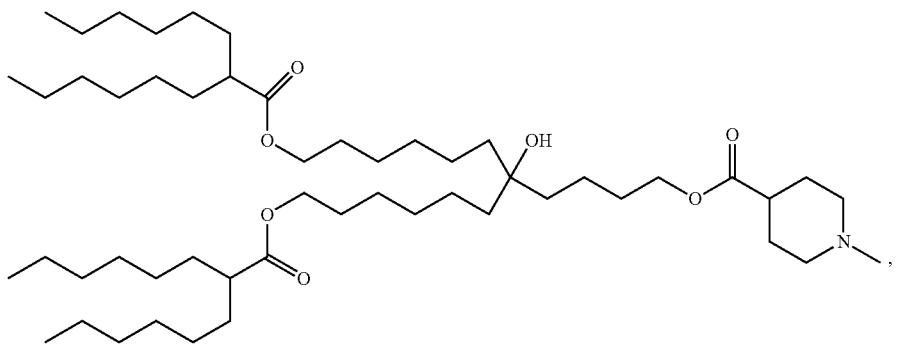

CL15F 9-3
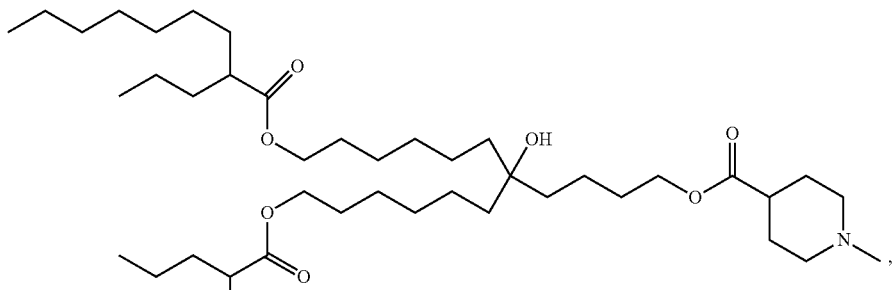
CL15F 9-5
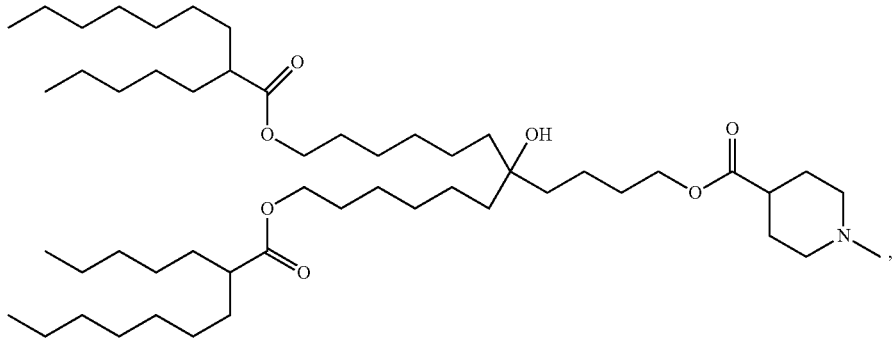
[Chem. 16-9]
CL15F 9-7
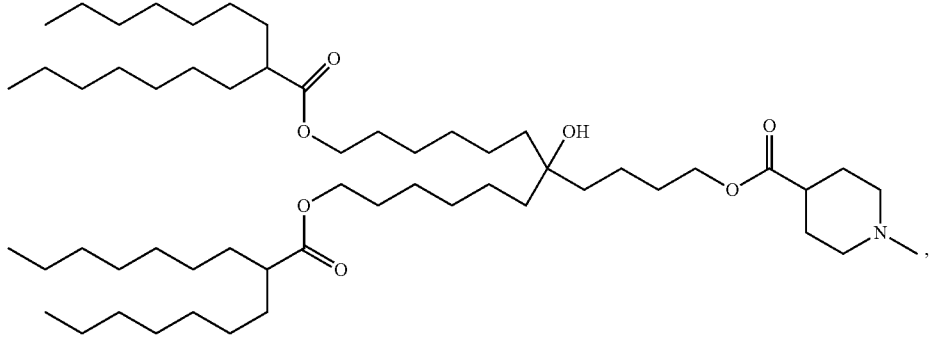
CL15F 10-4
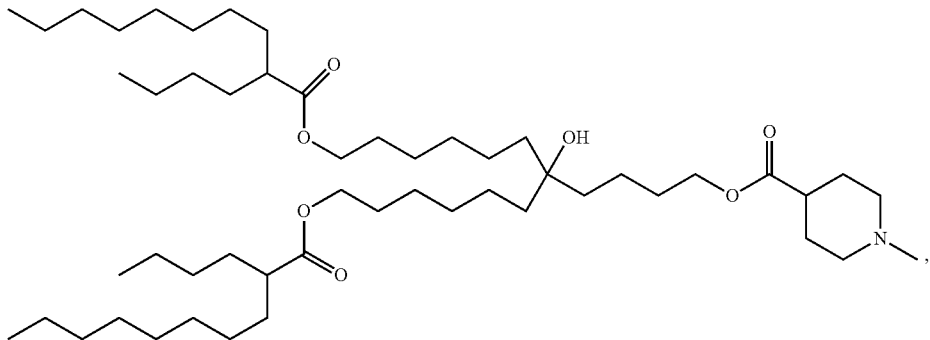

-continued
CL15F 10-5
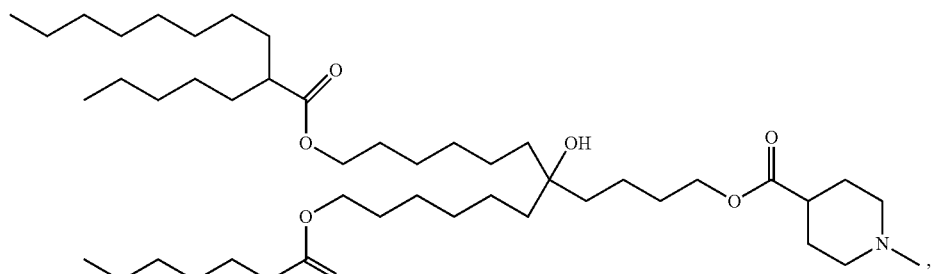
CL15F 10-8
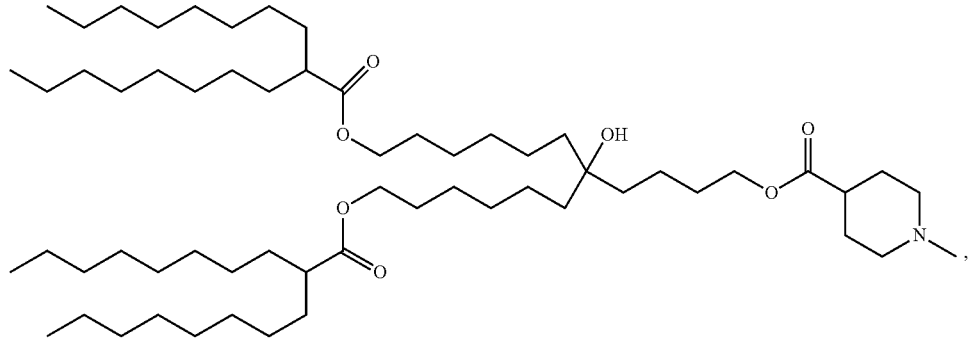
[Chem. 16-10]
CL15F 11-5
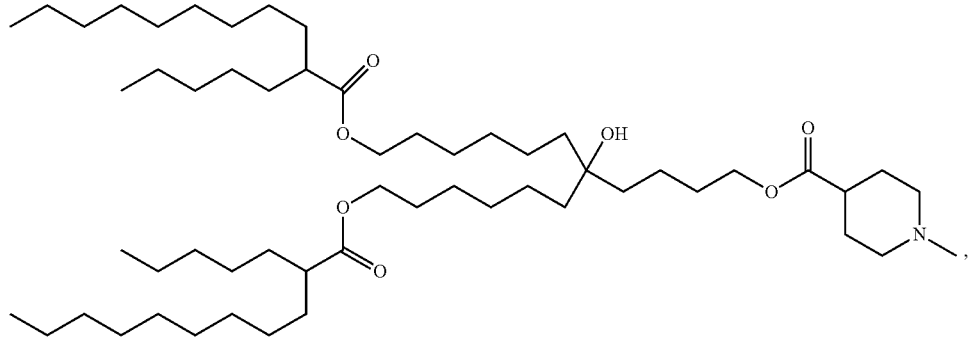
CL15F 11-6
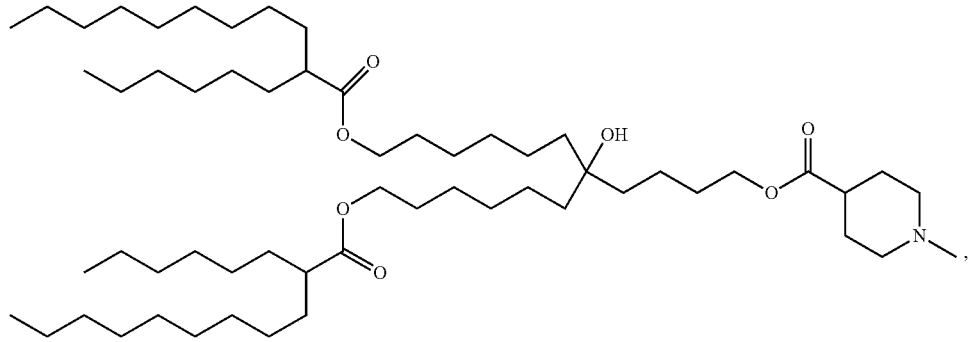

-continued
CL15F 11-7
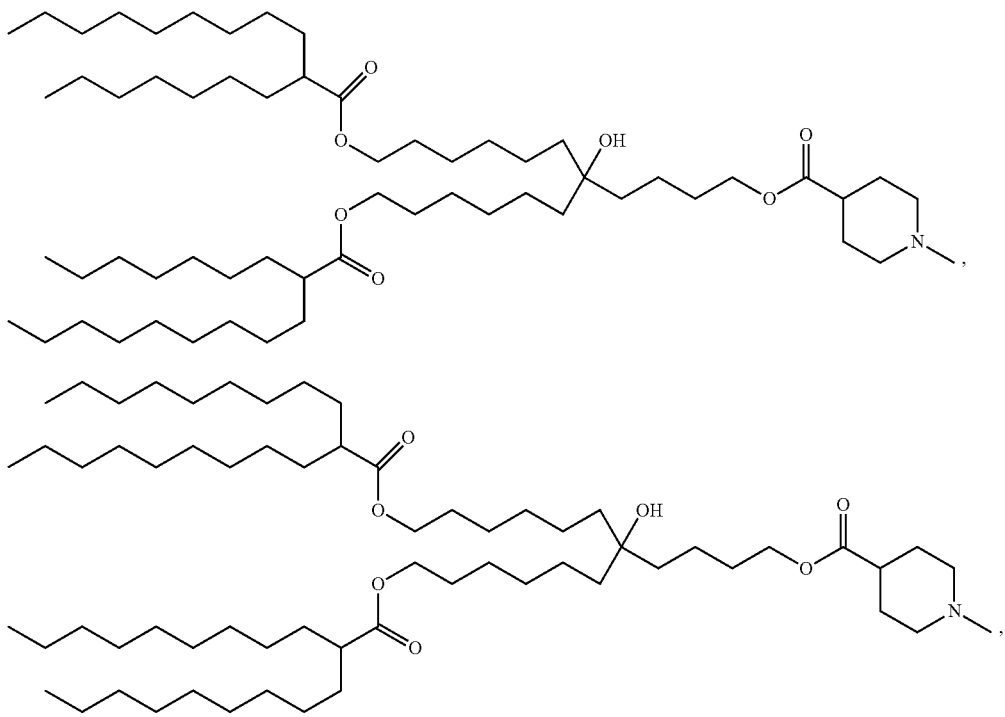
CL15F 11-9
CL15F 12-4
[Chem. 16-11]
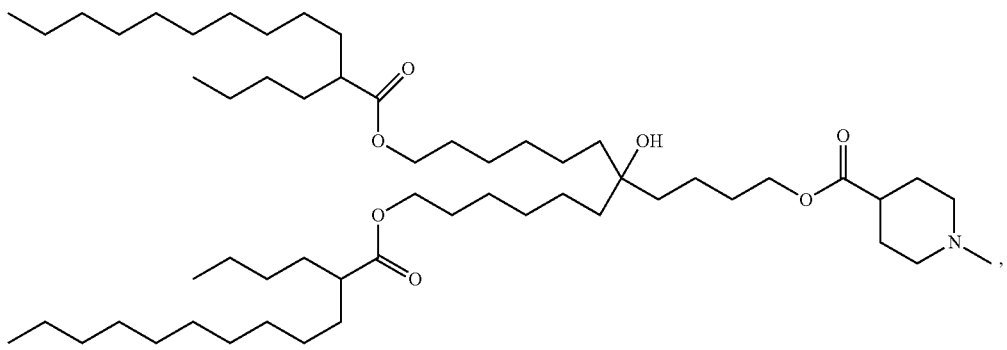
CL15F 12-10
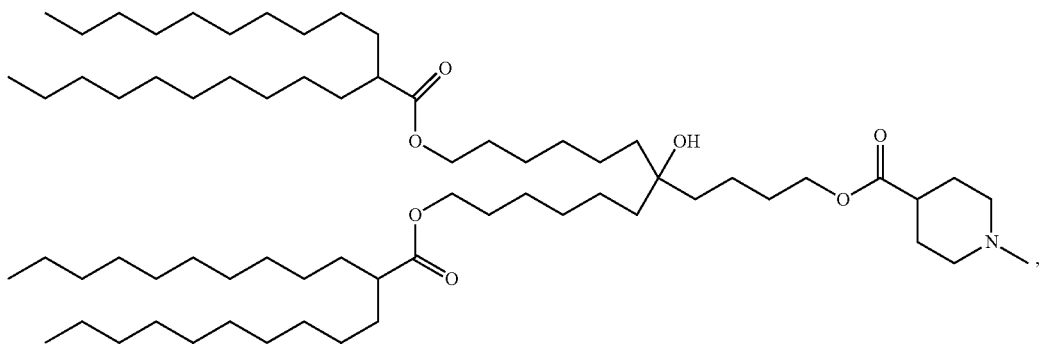

CL15F 13-3

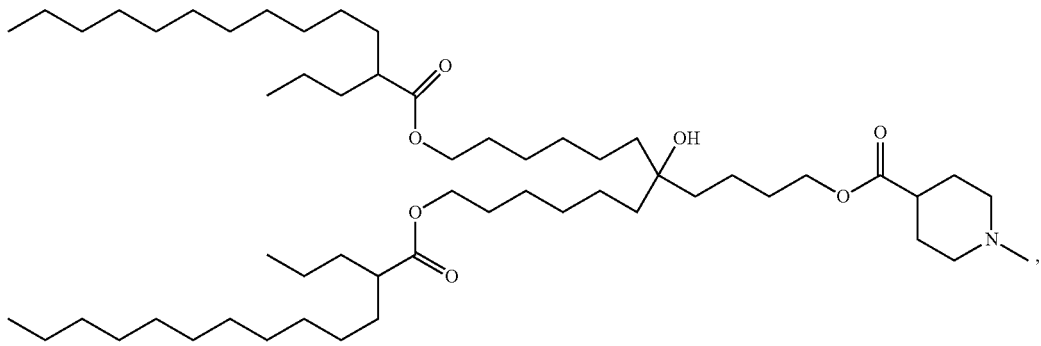

CL15F 14-2

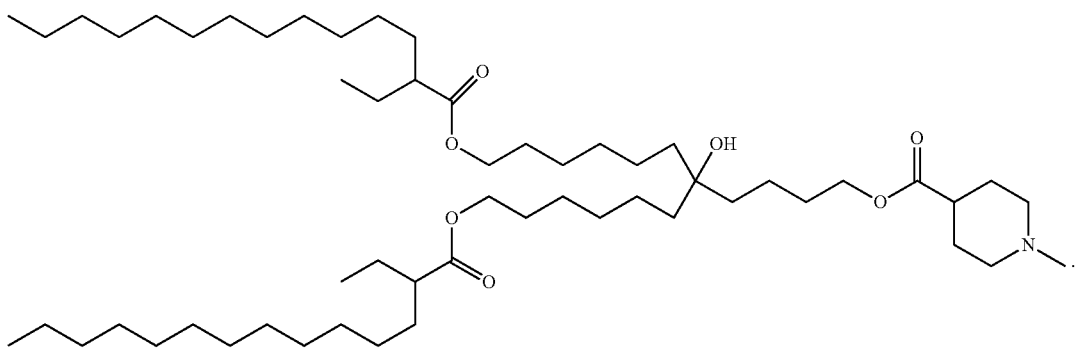

[5-1] A lipid nanoparticle formulation comprising:
(i) sterols or sterol derivatives;
(ii) polyalkylene glycol-modified lipids;
(iii) nucleic acids;
(iv) buffers;
(v) disaccharides; and
(vi) pH-sensitive cationic lipids represented by formula (I) and its stereoisomers or mixtures of the stereoisomers:

[Chem. 17]

$(R^1)(R^2)C(OH)-(CH_2)a-(O-CO)b-X$  (I)

wherein a represents an integer of 3-5; b represents 0 or 1; $R^1$ and $R^2$ each independently represent a group represented by general formula (A):

[Chem. 18]

$(R^{11})(R^{12})-CH-(CO-O)c-(CH_2)v-$  (A)

wherein $R^{11}$ and $R^{12}$ each independently represent a linear or branched $C_{2-15}$ alkyl group; c represents 0 or 1; v represents an integer of 4-12;

and X represents a group represented by general formula (B):

[Chem. 19]

$-(CH_2)d-N(R^3)(R^4)$  (B)

wherein d represents an integer of 0-3; and $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group).

[5-2] The lipid nanoparticle formulation of [5-1], wherein the pH-sensitive cationic lipids are represented by following formulas:

[Chem. 20-1]
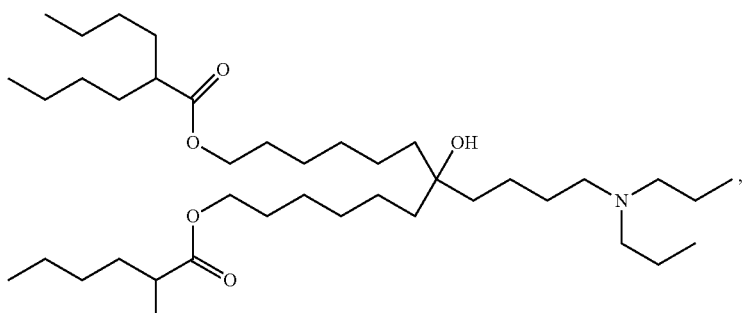
CL4F 6-4
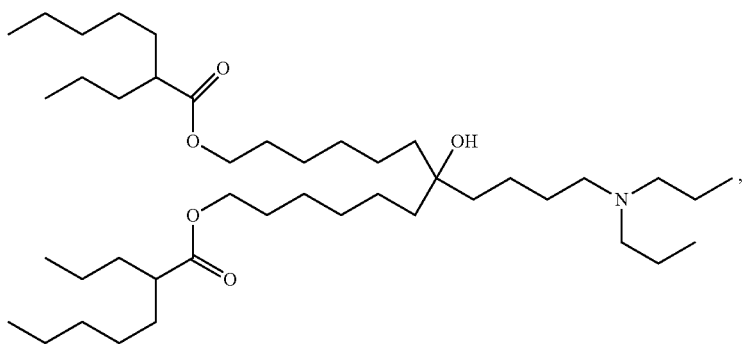
CL4F 7-3
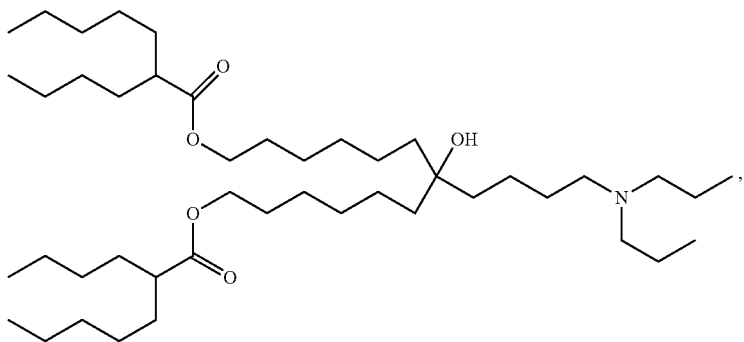
CL4F 7-4
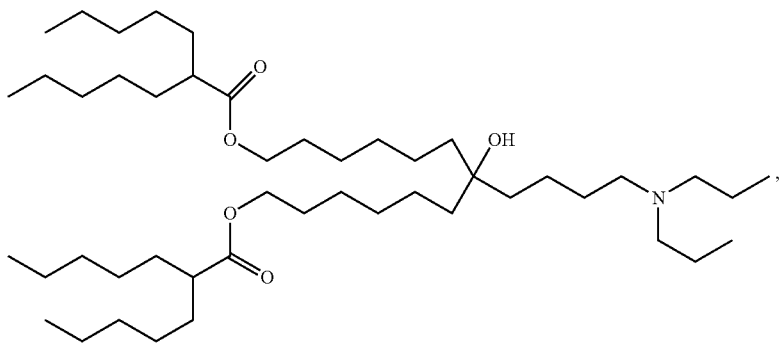
CL4F 7-5

-continued
[Chem. 20-2]
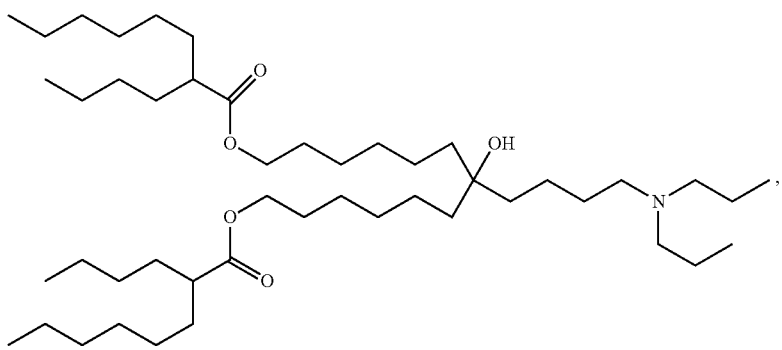
CL4F 8-4
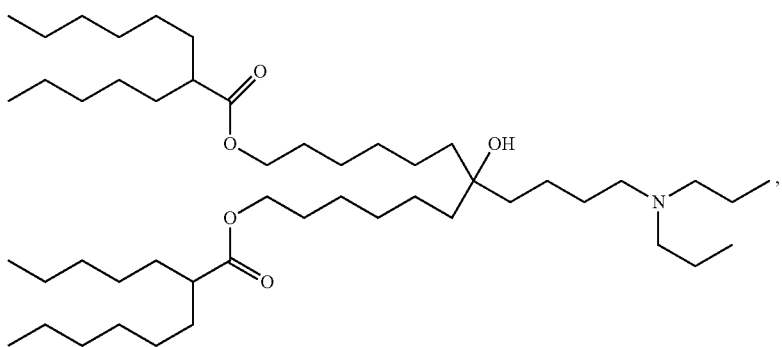
CL4F 8-5
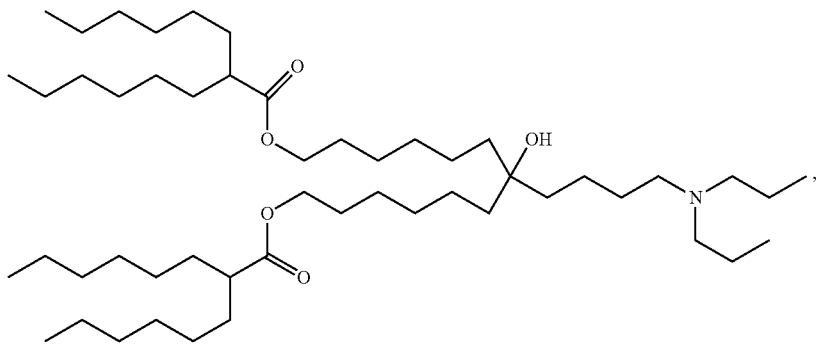
CL4F 8-6
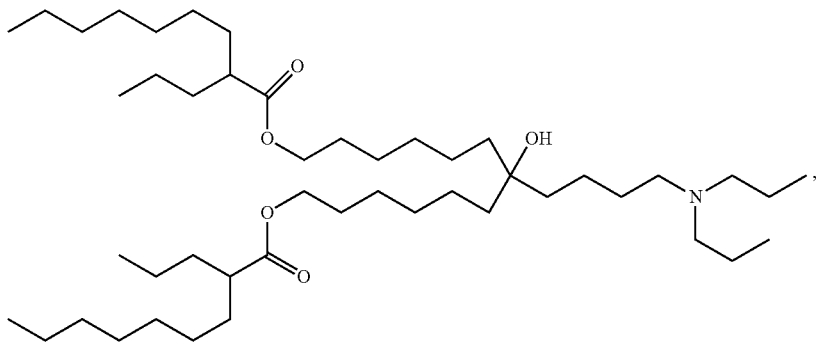
CL4F 9-3

[Chem. 20-3]
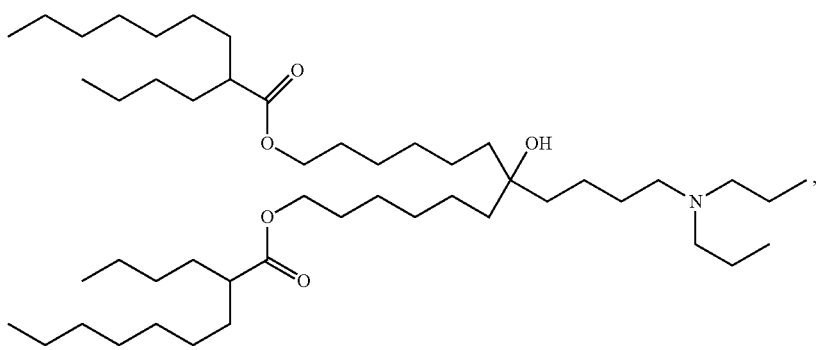
CL4F 9-4
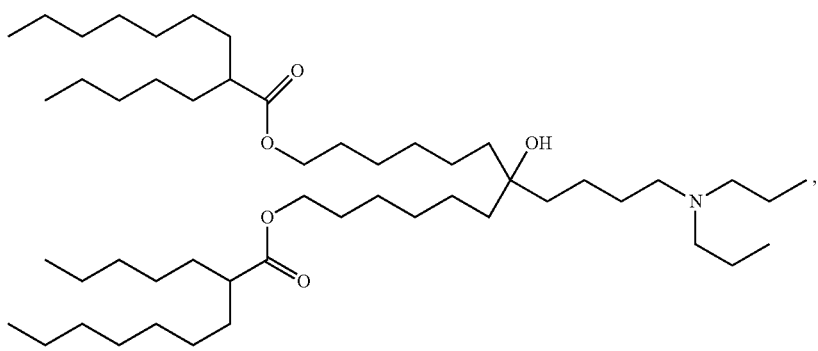
CL4F 9-5
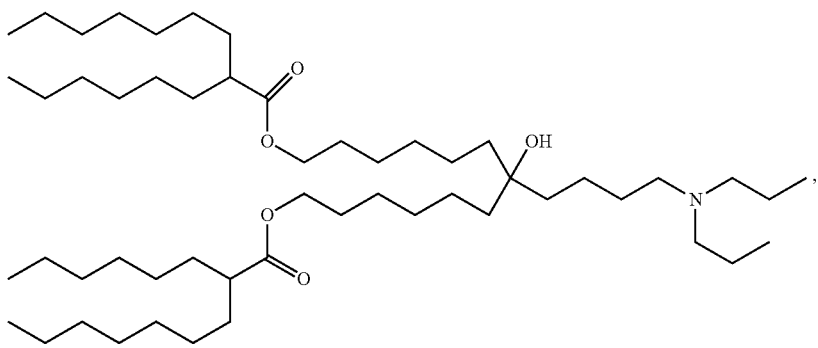
CL4F 9-6
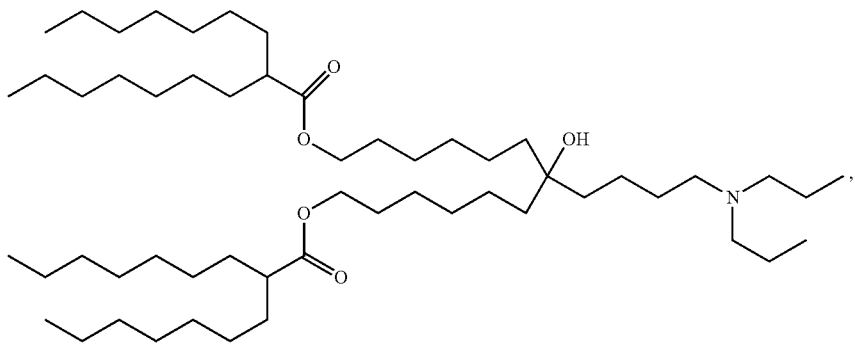
CL4F 9-7

[Chem. 20-4]
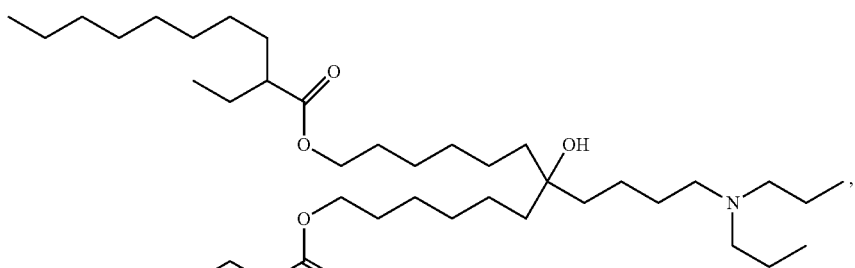
CL4F 10-2
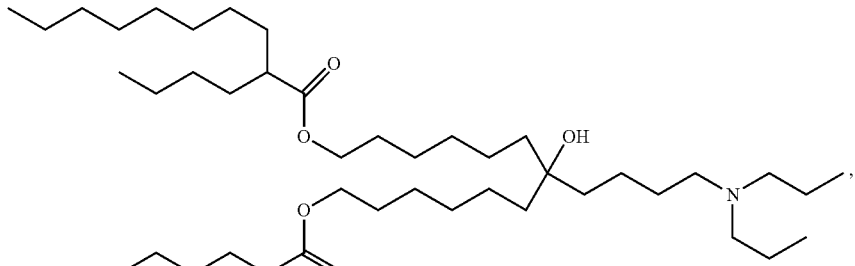
CL4F 10-4
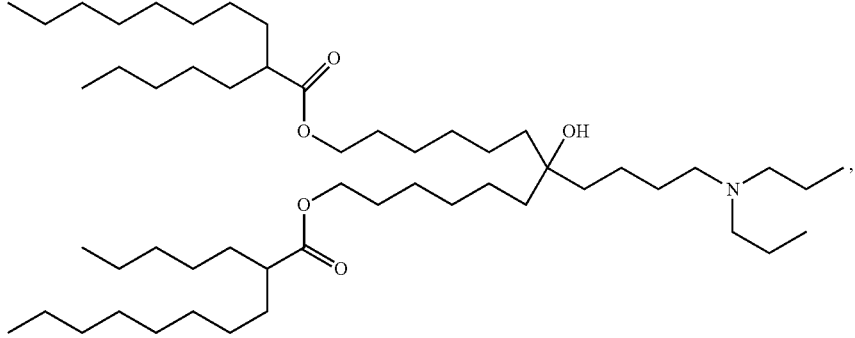
CL4F 10-5
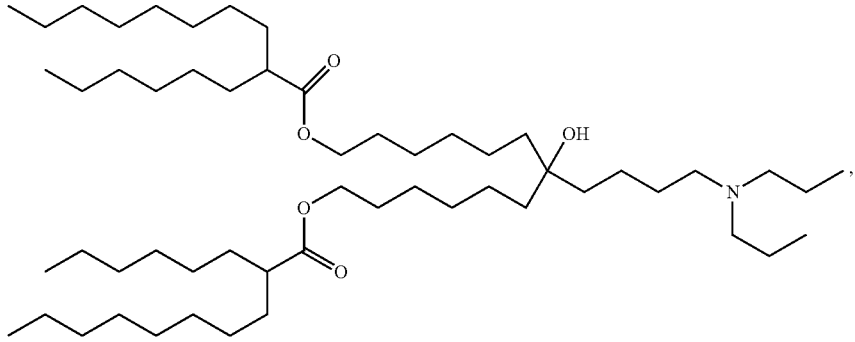
CL4F6

[Chem. 20-5]
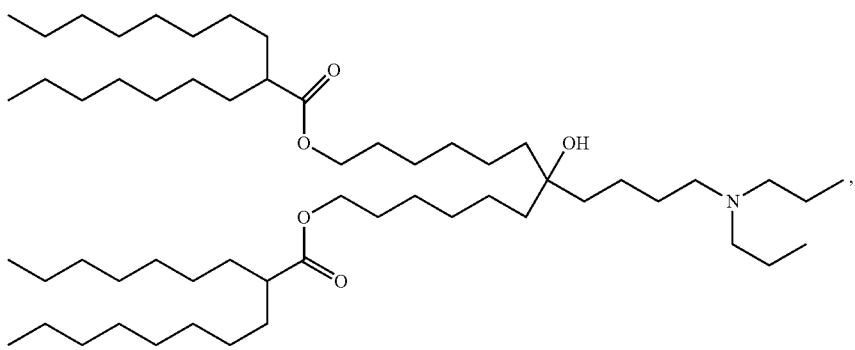
CL4F 10-7
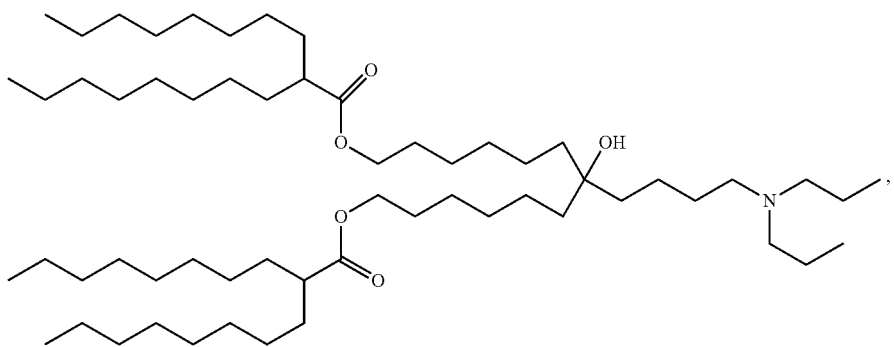
CL4F 10-8
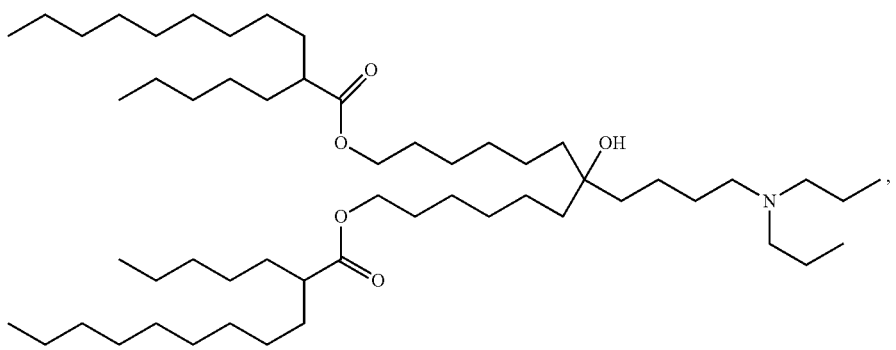
CL4F 11-5
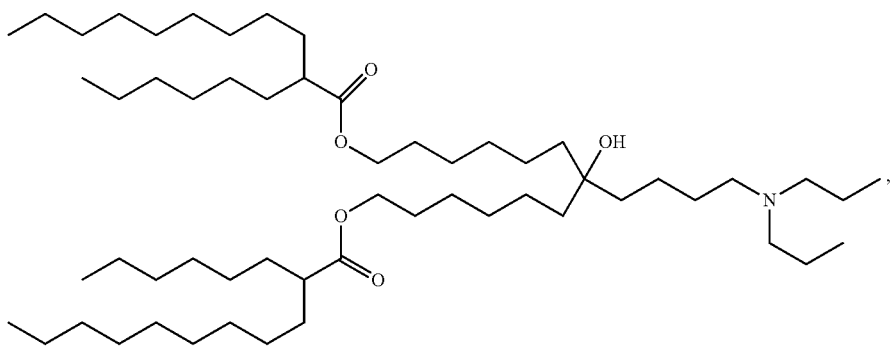
CL4F 11-6

-continued
[Chem. 20-6]
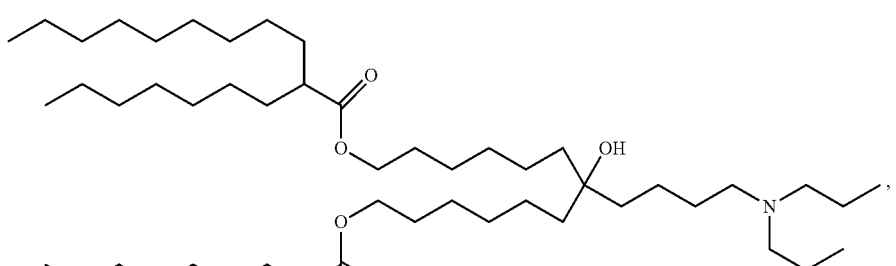
CL4F 11-7
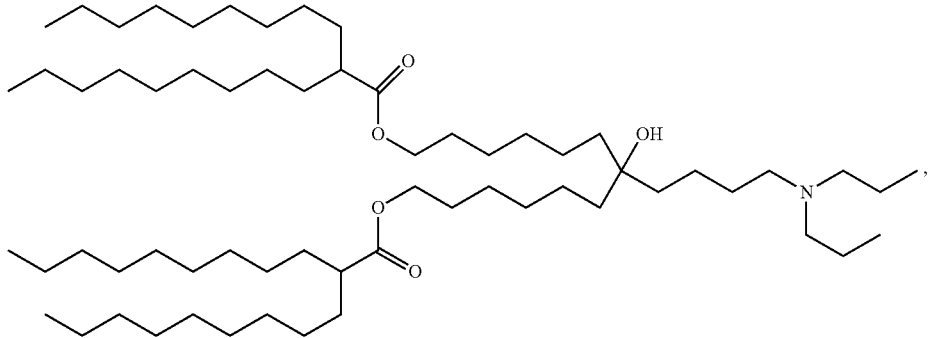
CL4F 11-9
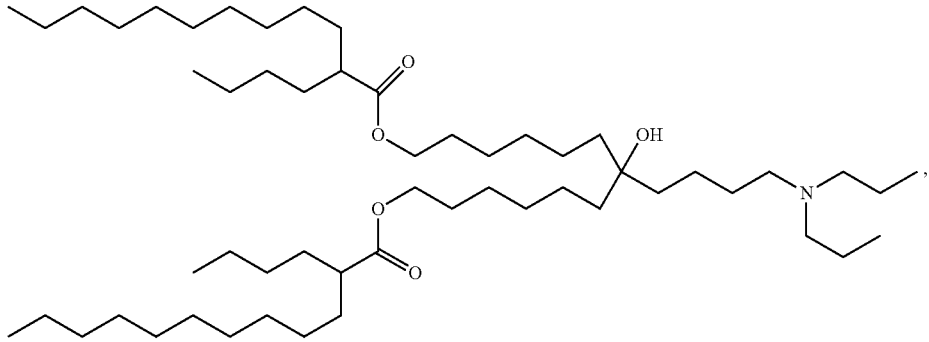
CL4F 12-4
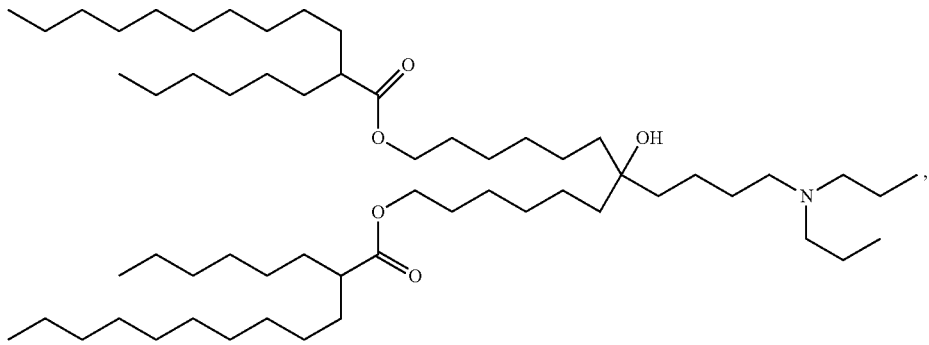
CL4F 12-6

-continued
[Chem. 20-7]
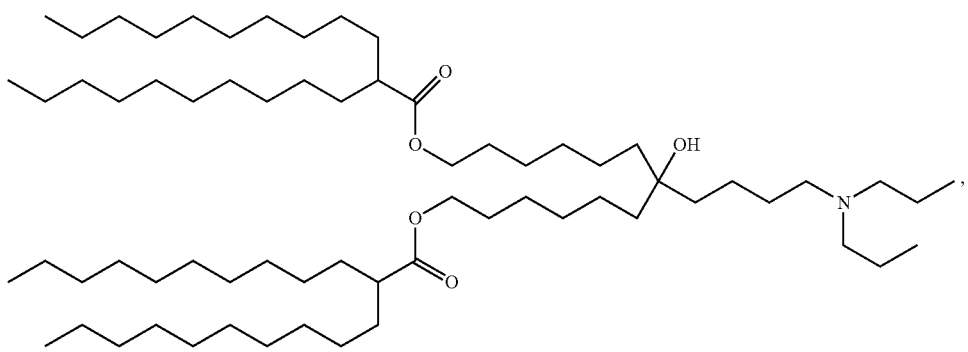
CL4F 12-10
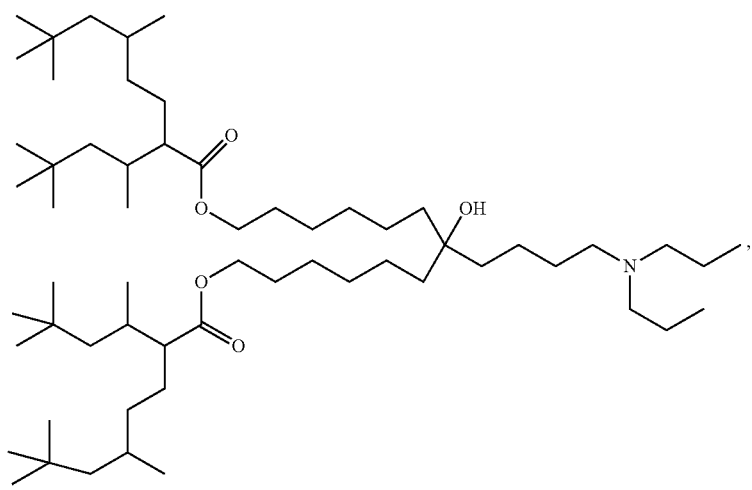
CL4G6
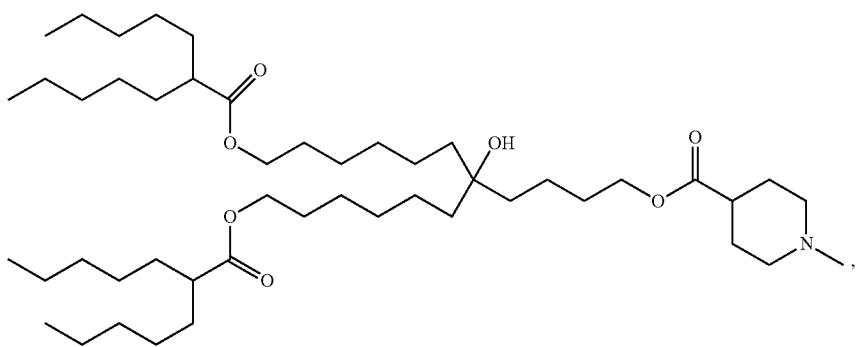
CL15F 7-5
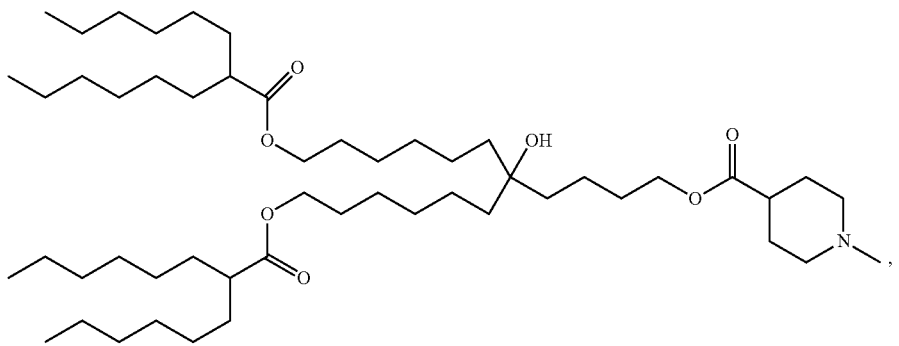
CL15F 8-6

[Chem. 20-8]
-continued
CL15F 9-3
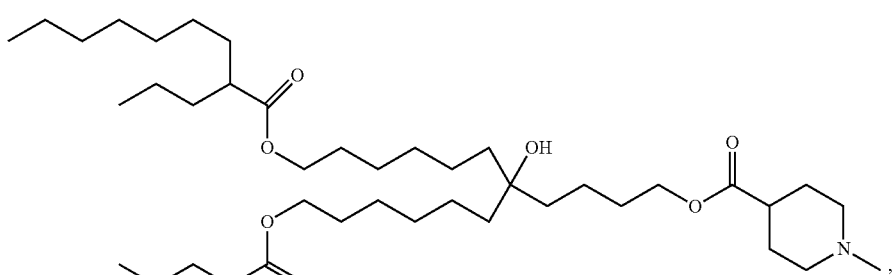
CL15F 9-5
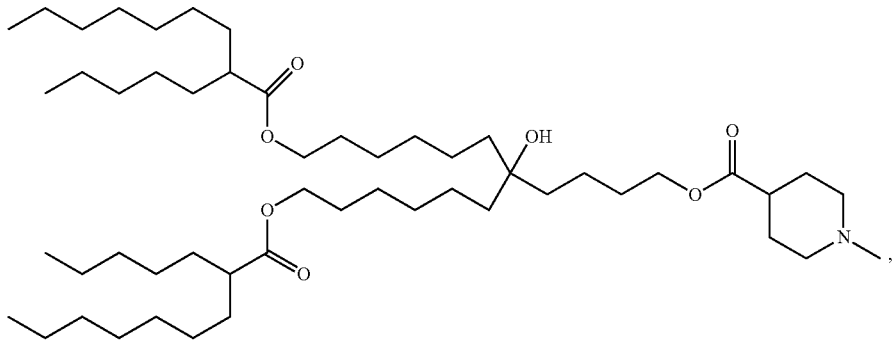
CL15F 9-7
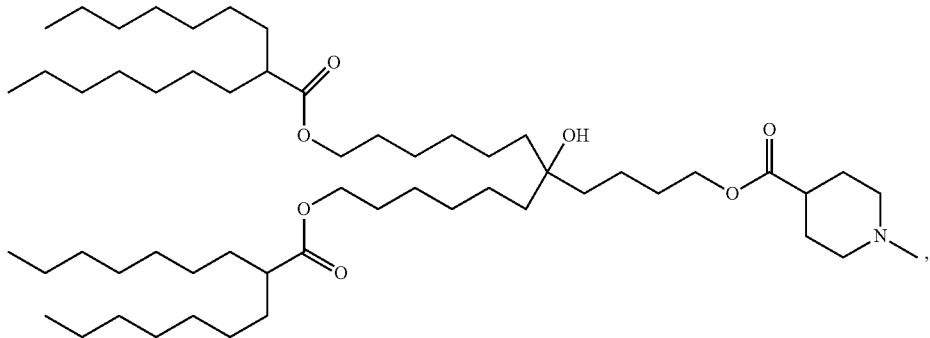
CL15F 10-4
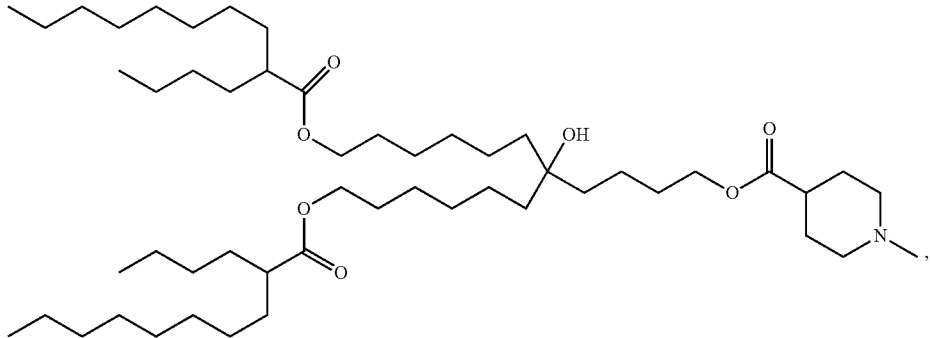

-continued
[Chem. 20-9]
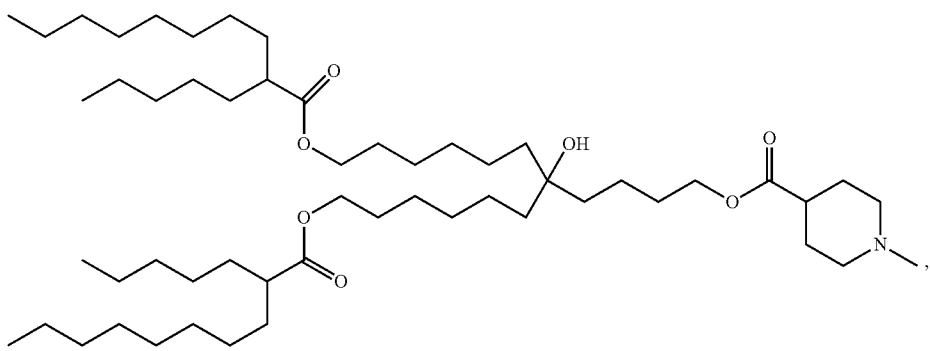
CL15F 10-5
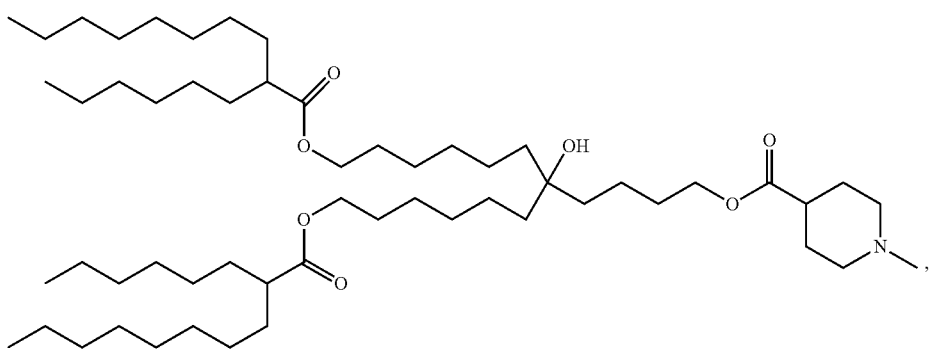
CL15F6
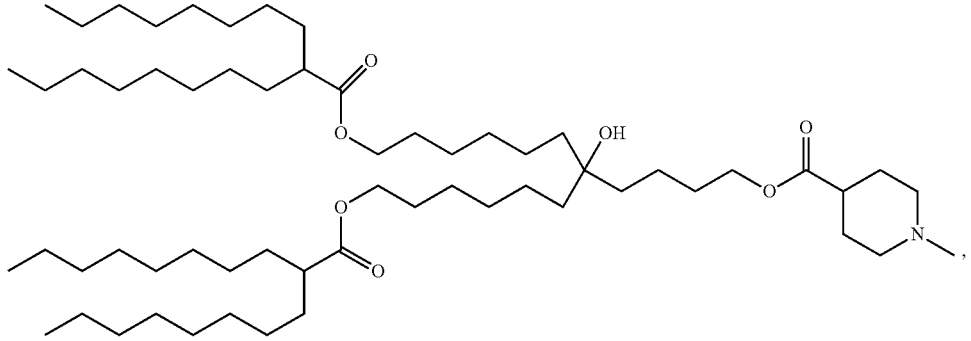
CL15F 10-8
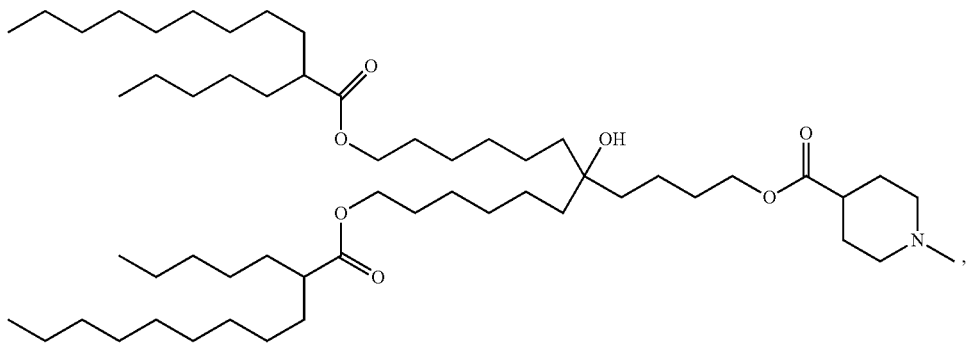
CL15F 11-5

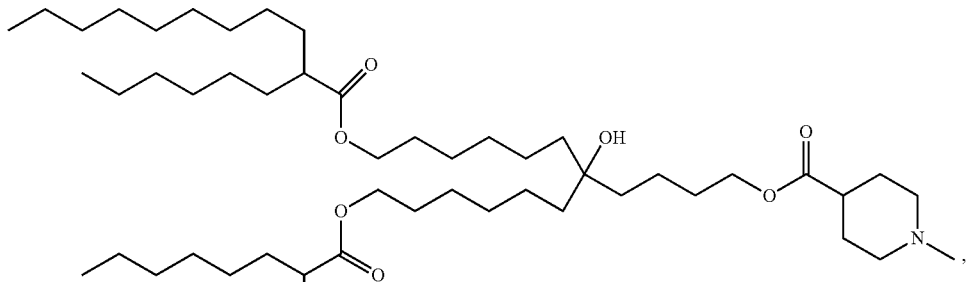
CL15F 11-6
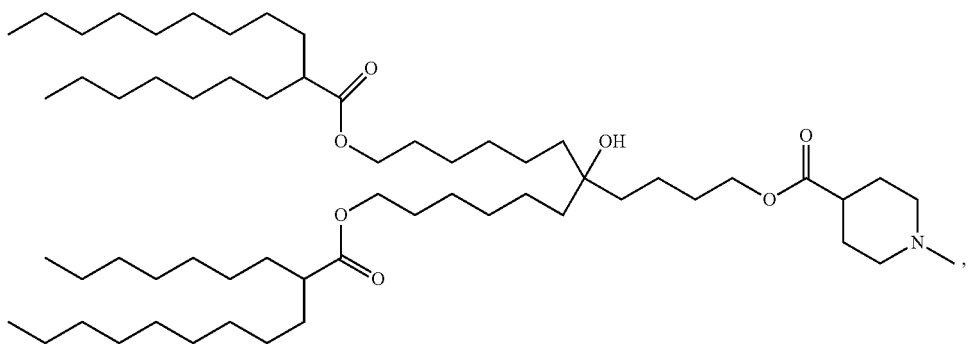
CL15F 11-7
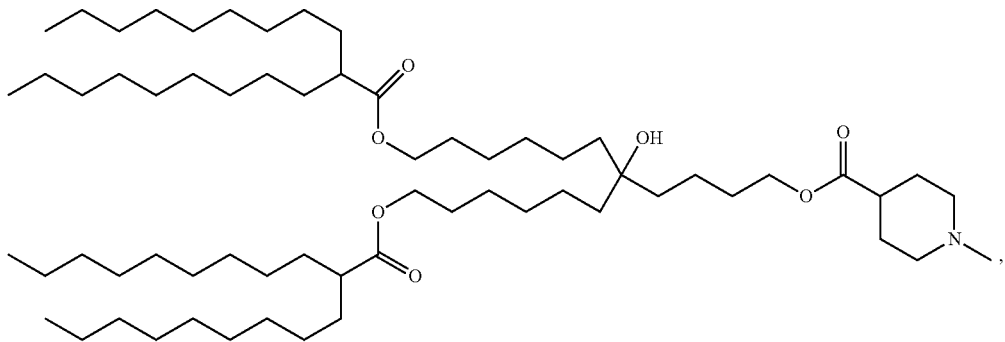
CL15F 11-9
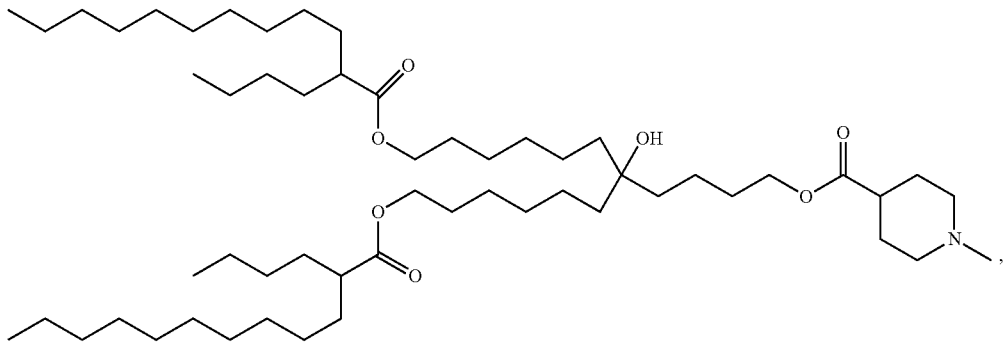
CL15F 12-4

[Chem. 20-11]
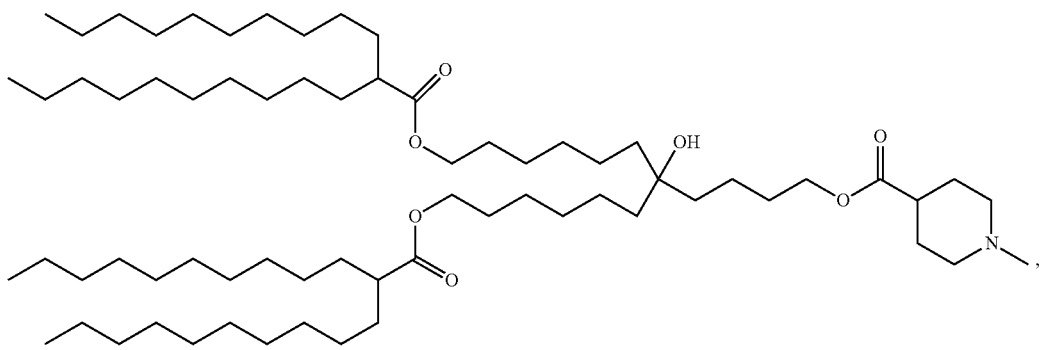
CL15F 12-10
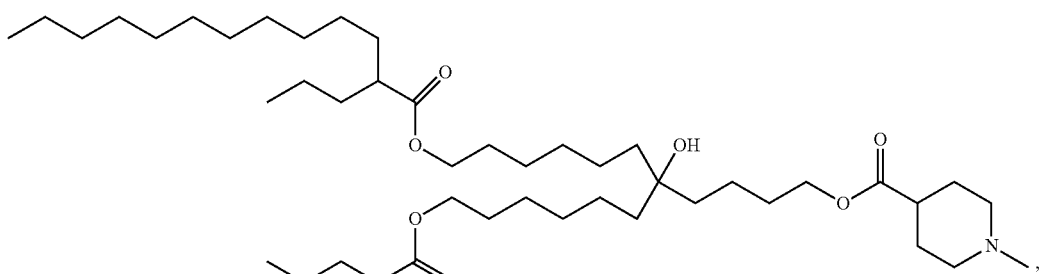
CL15F 13-3
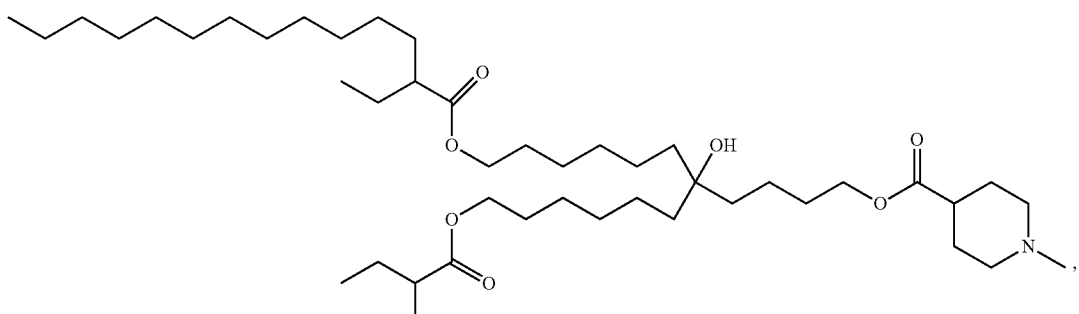
CL15F 14-2
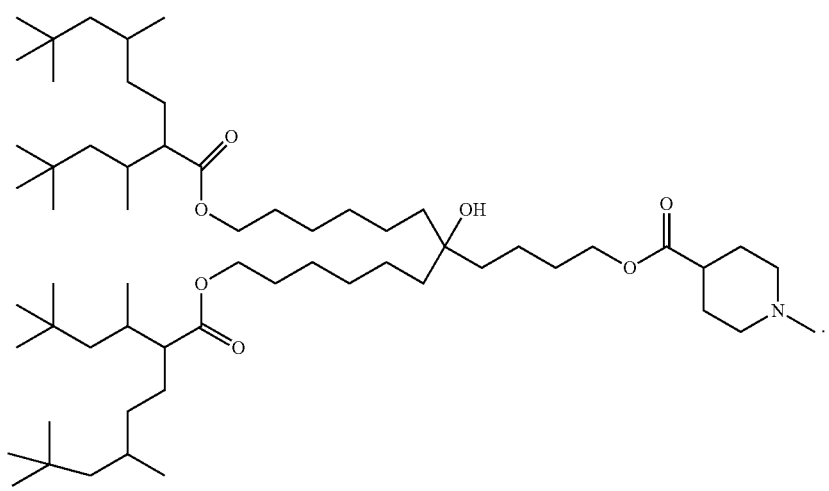
CL15G6

[5-3] The lipid nanoparticle formulation of [5-1] or [5-2], wherein the nucleic acid is mRNA.

[5-4] The lipid nanoparticle formulation of any of [5-1]-[5-3], wherein the lipid nanoparticles are suspended in an aqueous solution.

[5-5] The lipid nanoparticle formulation of [5-4], wherein the concentration of the disaccharides is 1%-20% by weight.

[5-6] The lipid nanoparticle formulation of either [5-4] or [5-5], which is pH 6.8-pH 8.0 at 25° C.

[5-7] The lipid nanoparticle formulation of any of [5-1]-[5-3], which was lyophilized.

[5-8] Resuspended formulation in which water or aqueous solution is added to the lipid nanoparticle formulation of [5-7].

[6-1] A production method of a pH-sensitive cationic lipid represented by formula (I), and its stereoisomers or mixture of the stereoisomers:

[Chem. 21]

$$(R^1)(R^2)C(OH)-(CH_2)a-(O-CO)b-X \quad (I)$$

wherein a represents an integer of 3-5; b represents 0 or 1; $R^1$ and $R^2$ each independently represent a group represented by general formula (A):

[Chem. 22]

$$(R^{11})(R^{12})-CH-(CO-O)c-(CH_2)v- \quad (A)$$

wherein $R^{11}$ and $R^{12}$ each independently represent a linear or branched $C_{2-15}$ alkyl group; c represents 0 or 1; v represents an integer of 4-12;

and X represents a group represented by general formula (B):

[Chem. 23]

$$-(CH_2)d-N(R^3)(R^4) \quad (B)$$

wherein d represents an integer of 0-3; and $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group(s)), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group); wherein the chemical formula of the pH-sensitive cationic lipid is represented by the following formula:

[Chem. 24]

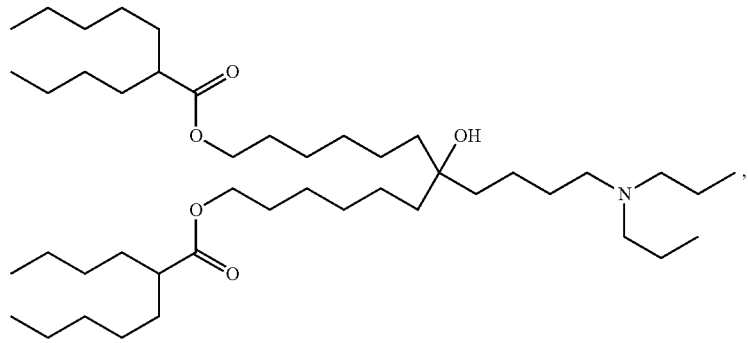

CL4F 7-4

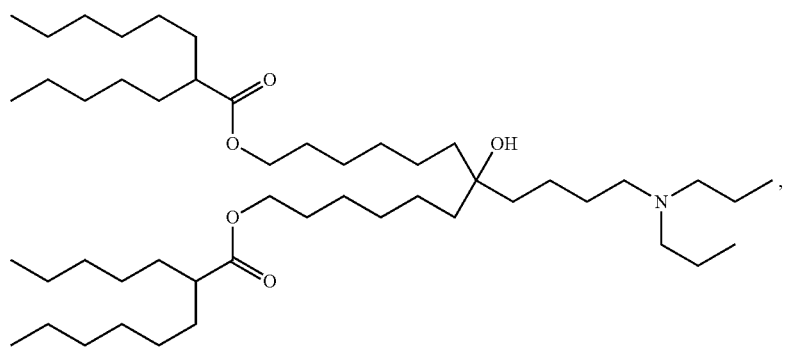

CL4F 8-5

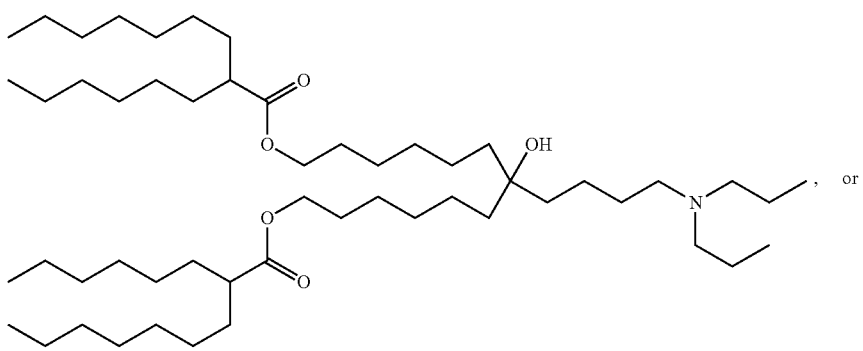

CL4F 9-6

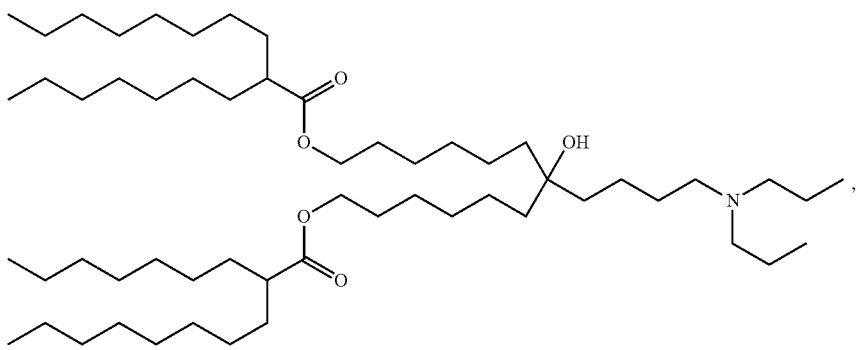

CL4F 10-7 and the production method comprises at least a process of reacting alkylcarboxylic acid with alkyl halide in the presence of organolithium, dimethylpropylene urea (DMPU), and tetrahydrofuran (THF) to obtain branched fatty acid.

[6-2] The production method of [6-1], wherein the volume ratio between the tetrahydrofuran (THF) and the dimethylpropylene urea (DMPU) in the process is 10:1-1:1 (v/v).

[6-3] The production method of [6-1] or [6-2], wherein the organolithium is lithium diisopropylamide (LDA).

[6-4] The production method of any of [6-1]-[6-3], wherein the alkyl halide is iodoalkyl.

[6-5] The production method of any of [6-1]-[6-4], further comprising a process of purifying the branched fatty acid by reversed phase chromatography.

[6-6] A production method of a pH-sensitive cationic lipid represented by formula (I), and its stereoisomers or mixture of the stereoisomers:

[Chem. 25]

$$(R^1)(R^2)C(OH)—(CH_2)a—(O—CO)b—X \quad (I)$$

wherein a represents an integer of 3-5; b represents 0 or 1; $R^1$ and $R^2$ each independently represent a group represented by general formula (A):

[Chem. 26]

$$(R^{11})(R^{12})—CH—(CO—O)c—(CH_2)v— \quad (A)$$

wherein $R^{11}$ and $R^{12}$ each independently represent a linear or branched $C_{2-15}$ alkyl group; c represents 0 or 1; v represents an integer of 4-12;

and X represents a group represented by general formula (B):

[Chem. 27]

$$—(CH_2)d-N(R^3)(R^4) \quad (B)$$

wherein d represents an integer of 0-3; and $R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group), or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group);

wherein the chemical formula of the pH-sensitive cationic lipid is represented by the following formula:

[Chem. 28-1]
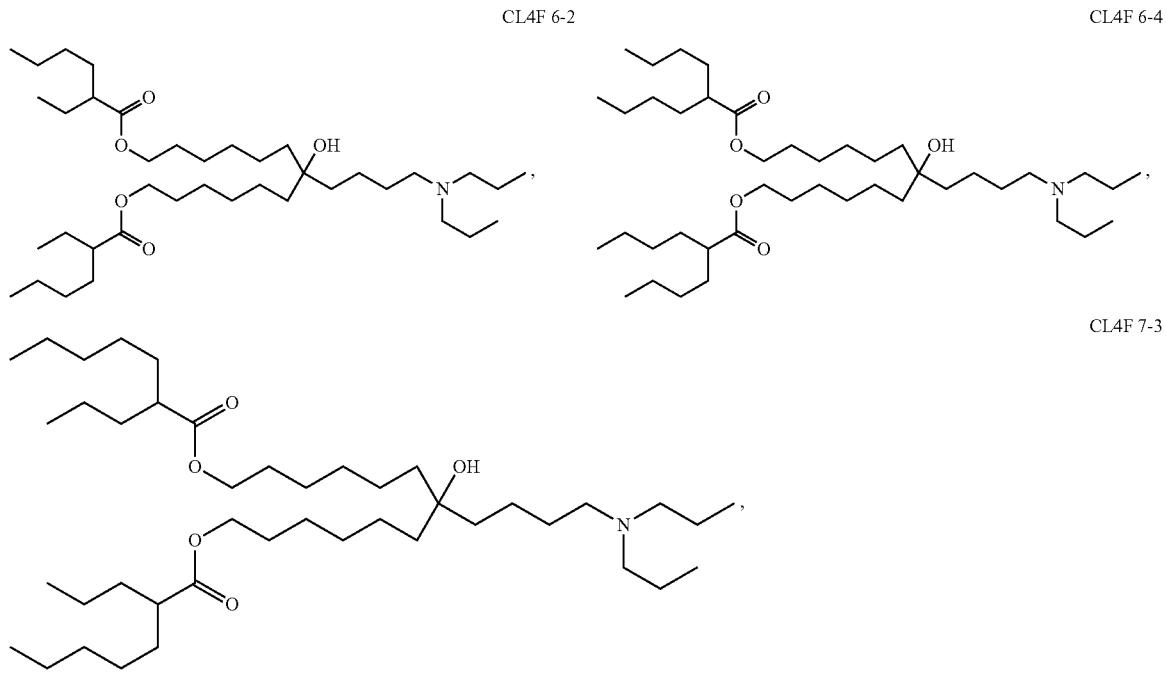
CL4F 6-2
CL4F 6-4
CL4F 7-3
CL4F 7-5
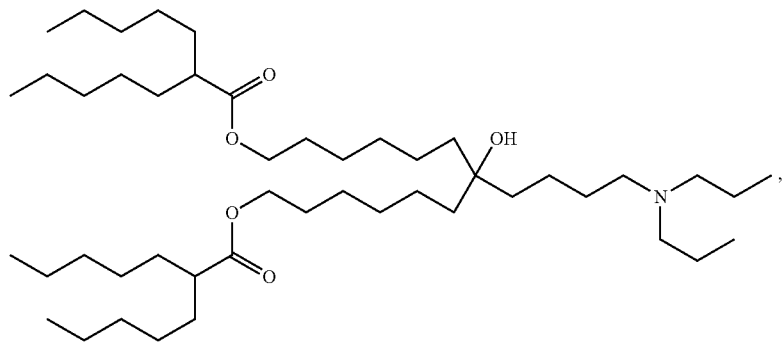
[Chem. 28-2]
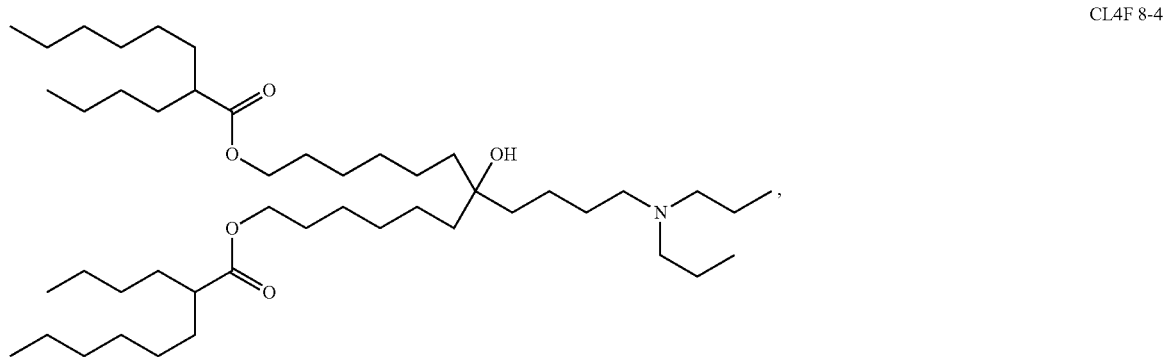
CL4F 8-4

CL4F 8-6
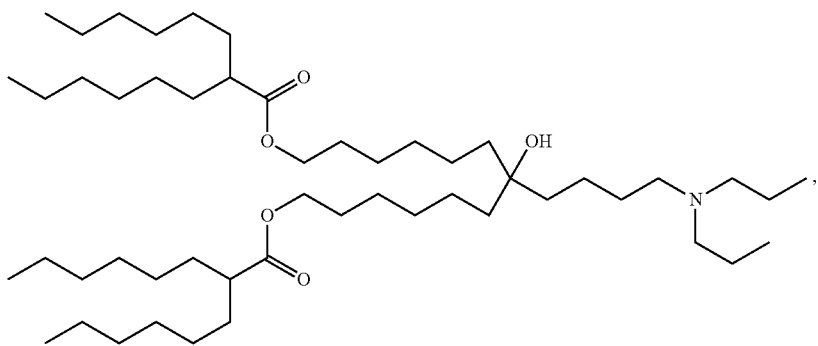
CL4F 9-3
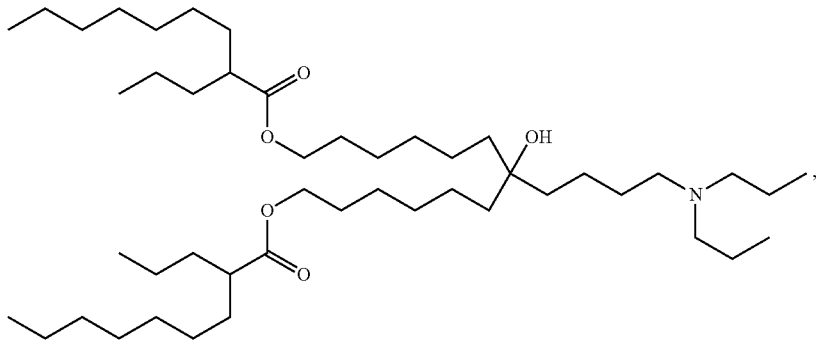
CL4F 9-4
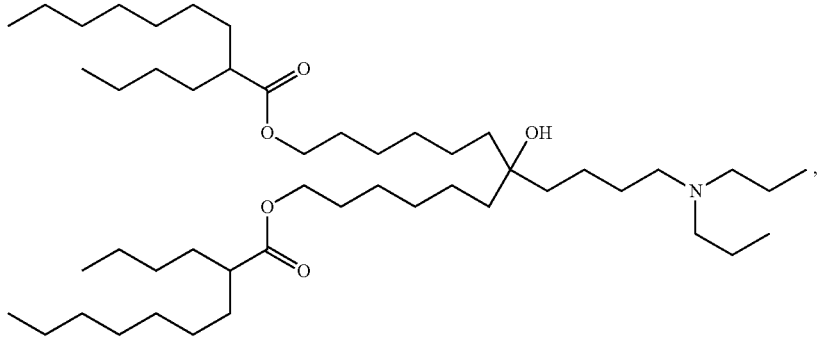
[Chem. 28-3]
CL4F 9-5
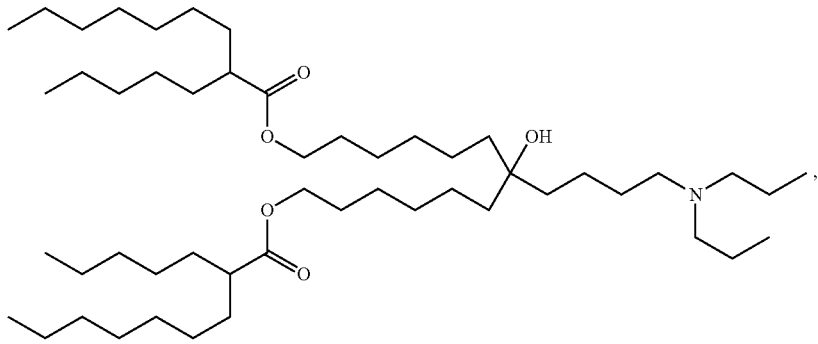

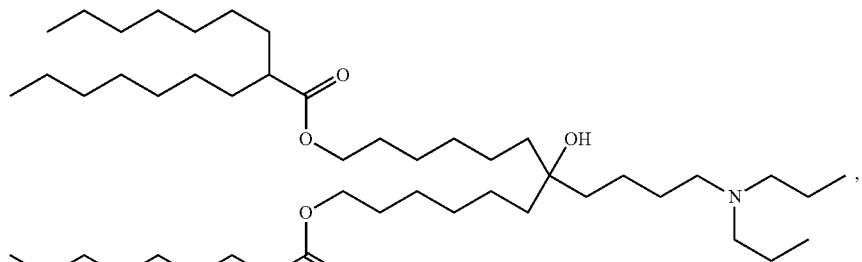
CL4F 9-7
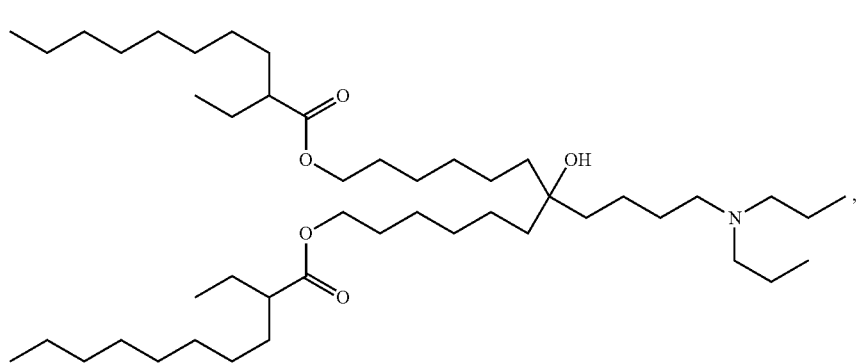
CL4F 10-2
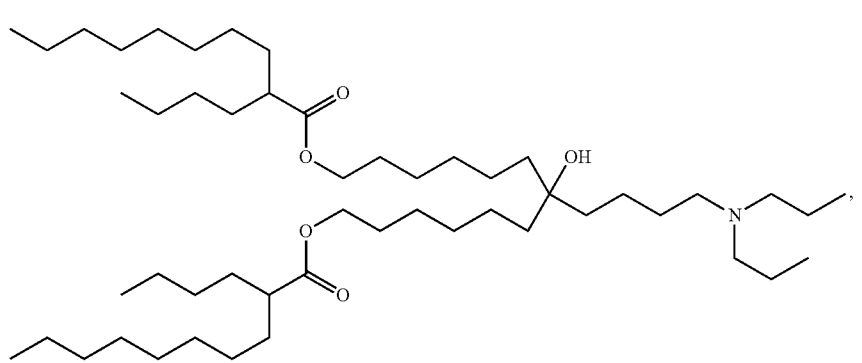
CL4F 10-4
[Chem. 28-4]
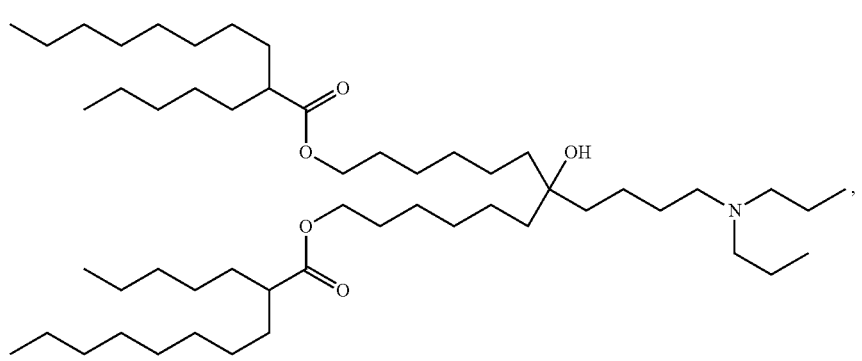
CL4F 10-5

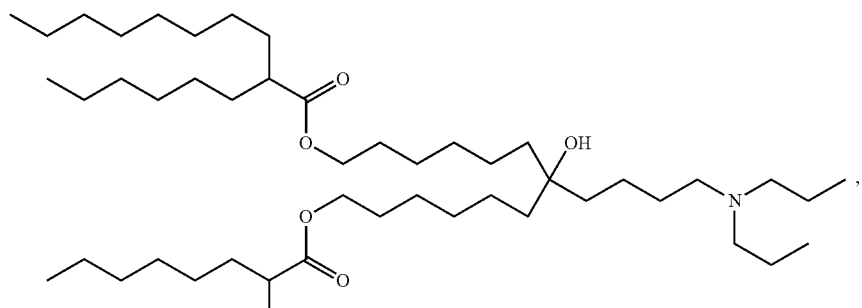
CL4F6
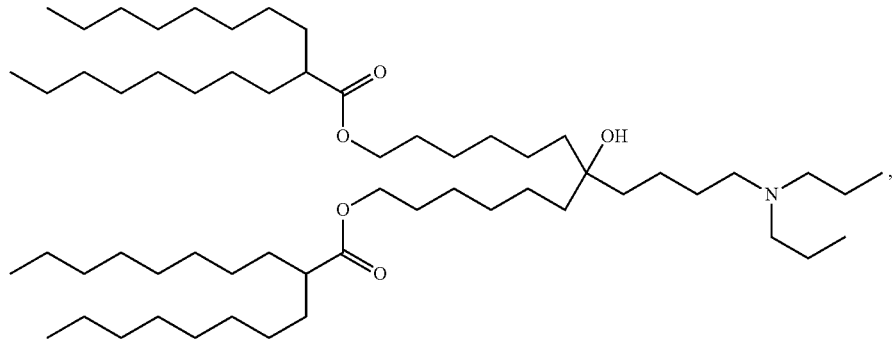
CL4F 10-8
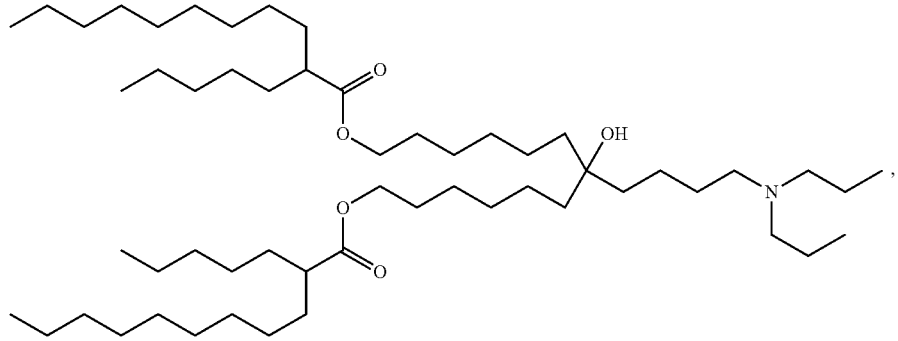
CL4F 11-5
[Chem. 28-5]
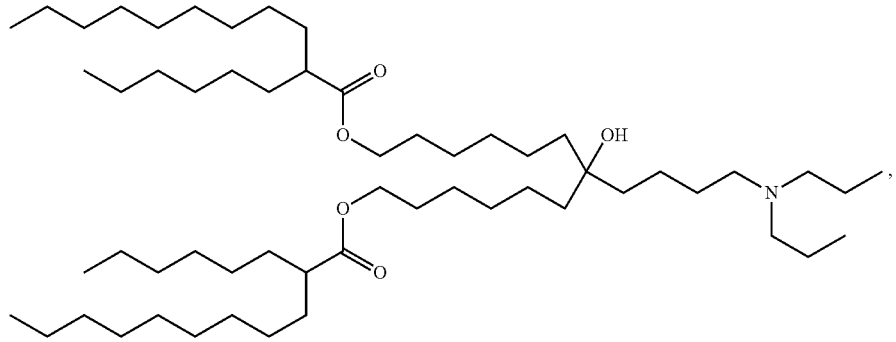
CL4F 11-6

-continued
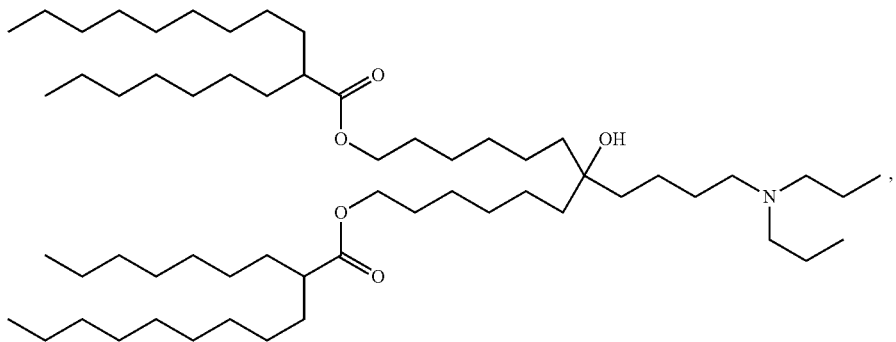
CL4F 11-7
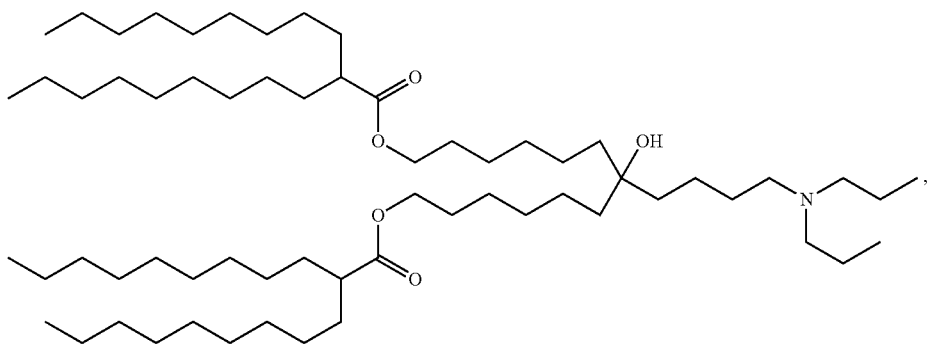
CL4F 11-9
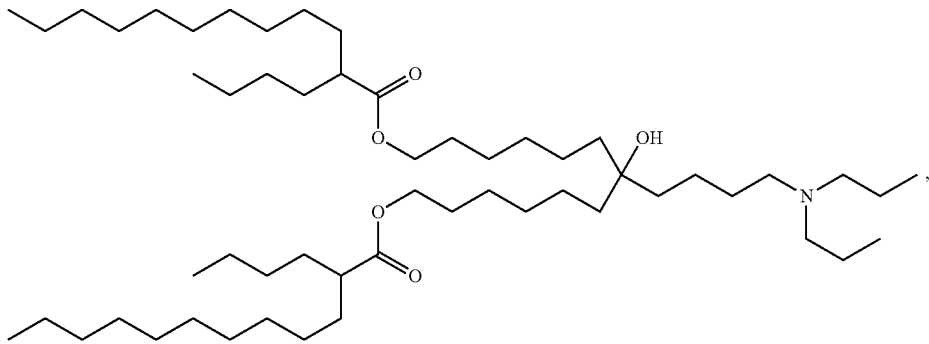
CL4F 12-4
[Chem. 28-6]
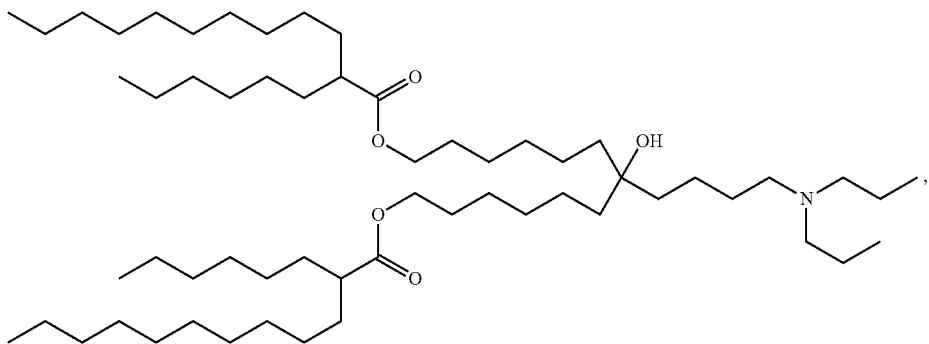
CL4F 12-6

-continued
CL4F 12-10
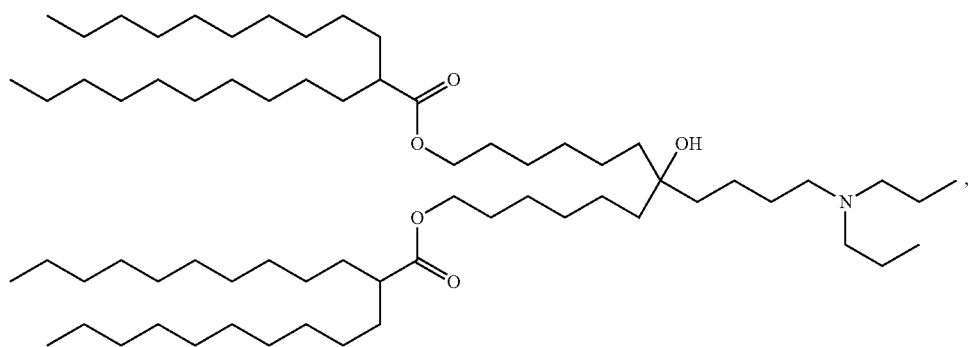
CL4F 13-3
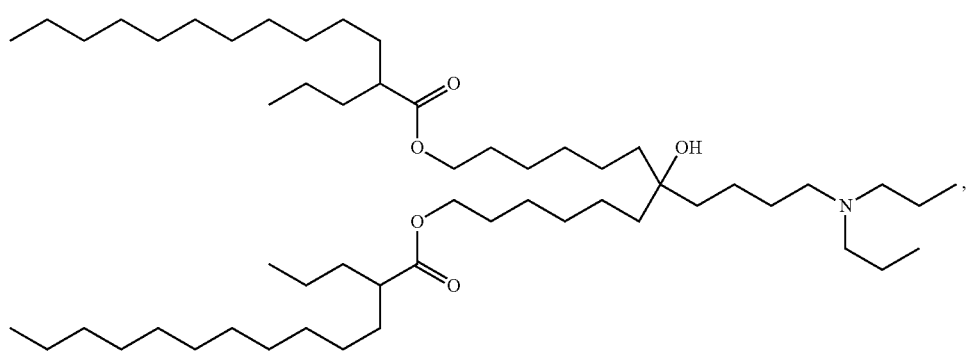
CL4F 14-2
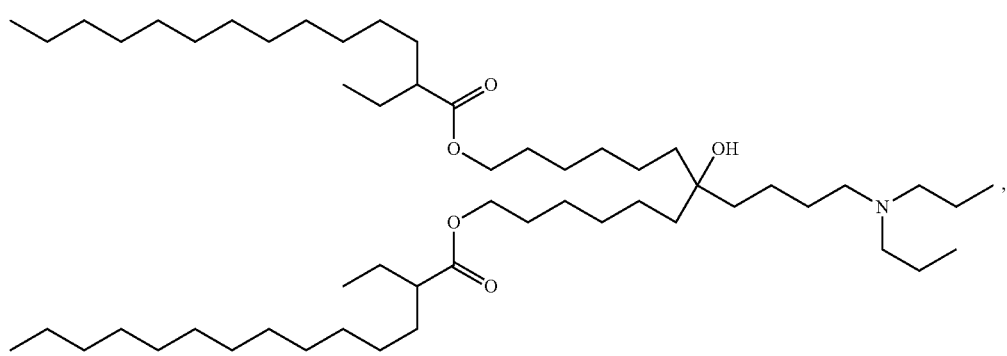
[Chem. 28-7]
CL4F 16-1
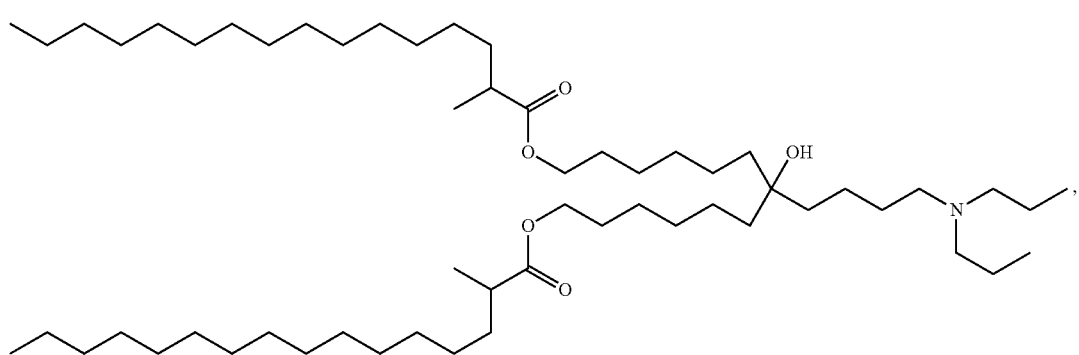

-continued
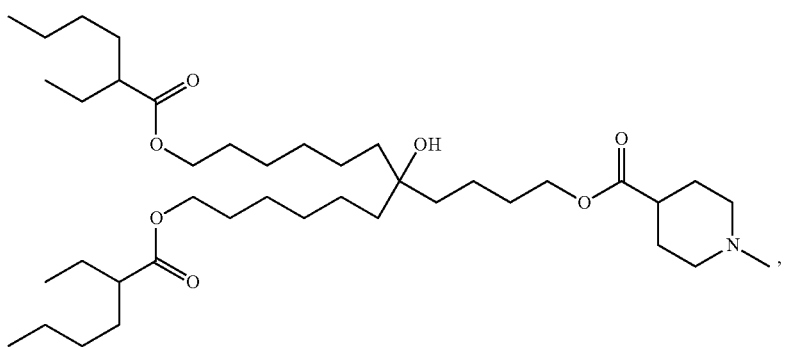
CL15F 6-2
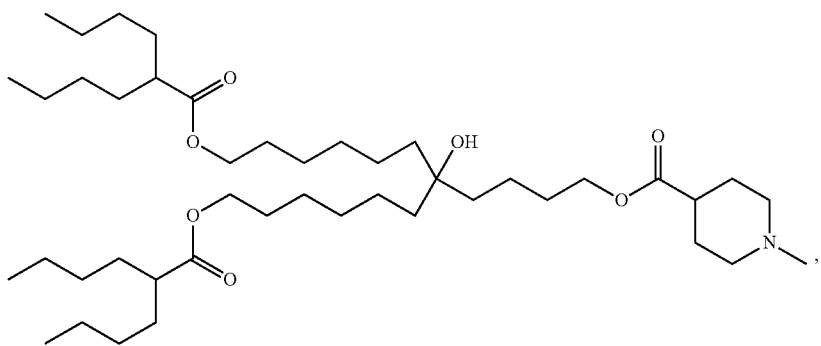
CL15F 6-4
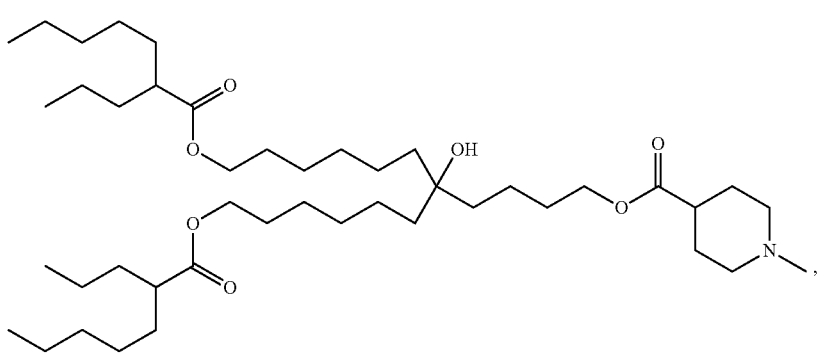
CL15F 7-3
[Chem. 28-8]
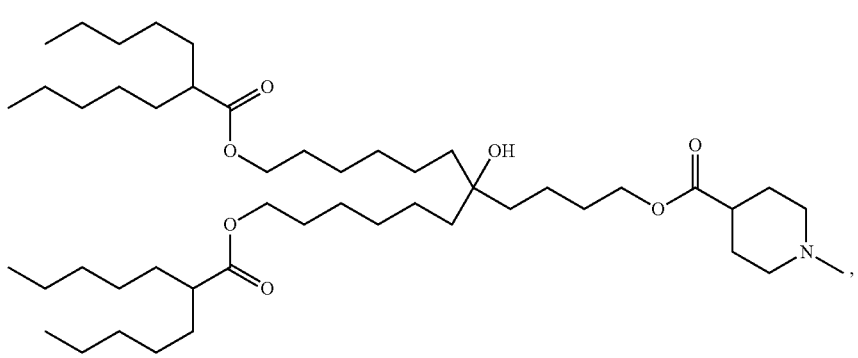
CL15F 7-5

-continued
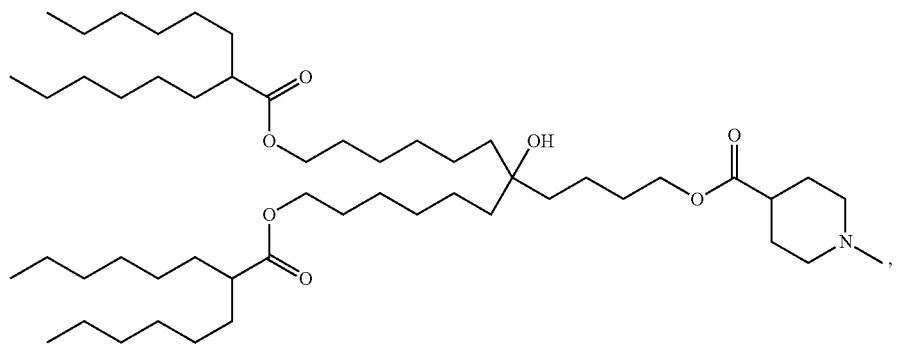
CL15F 8-6
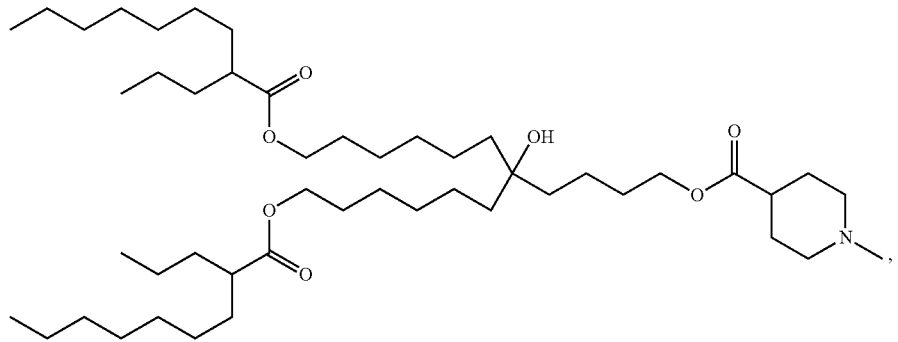
CL15F 9-3
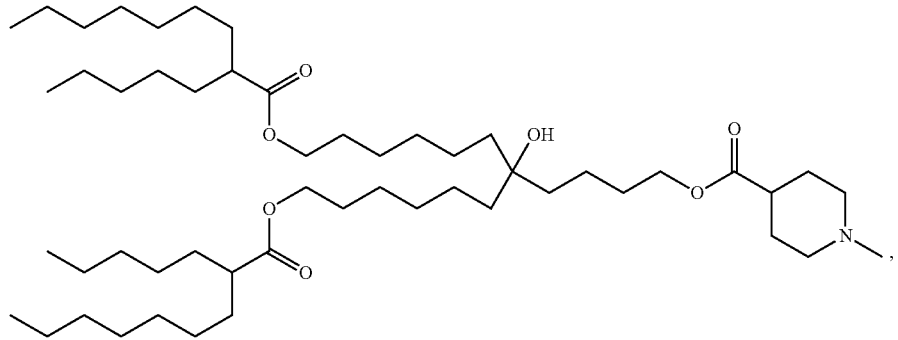
CL15F 9-5
[Chem. 28-9]
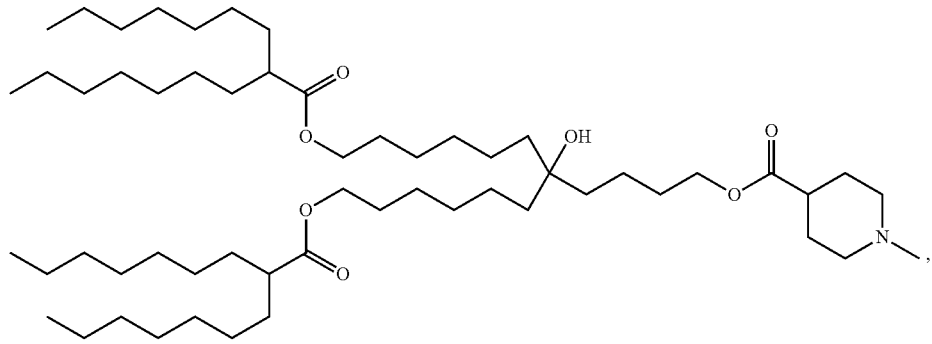
CL15F 9-7

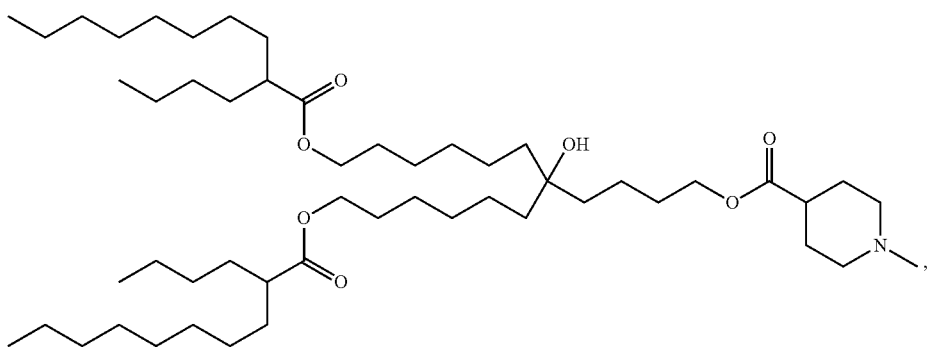
CL15F 10-4
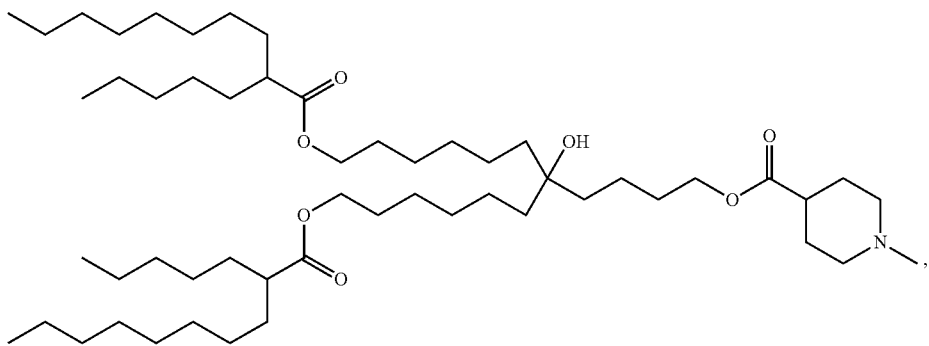
CL15F 10-5
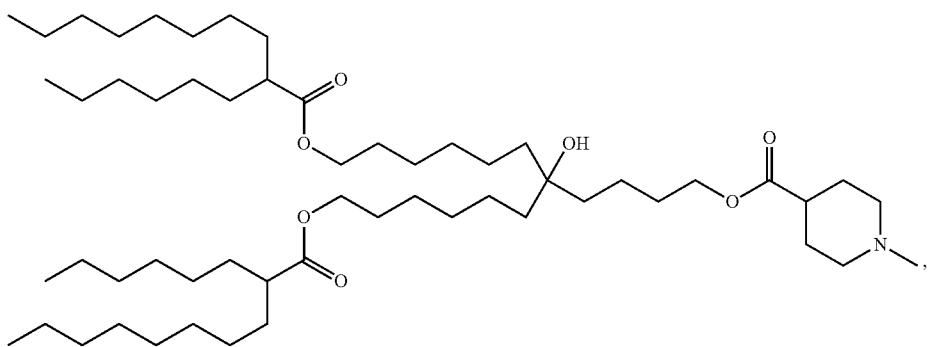
CL15F6
[Chem. 28-10]
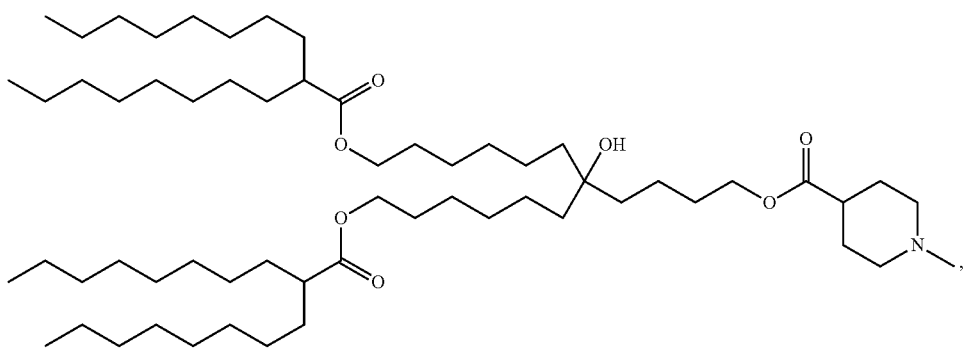
CL15F 10-8

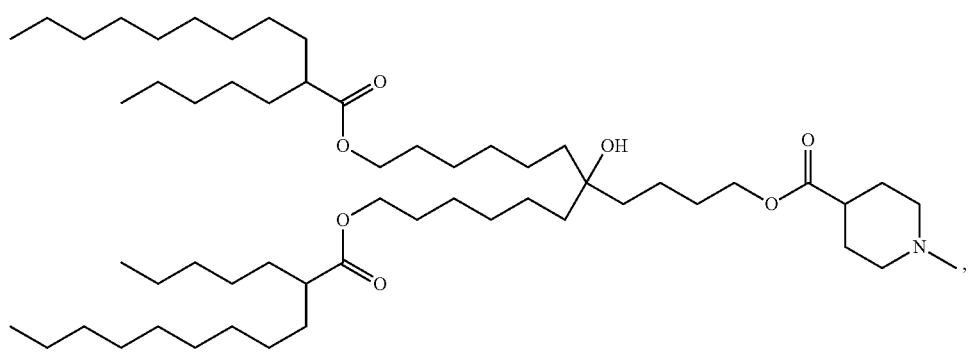
CL15F 11-5
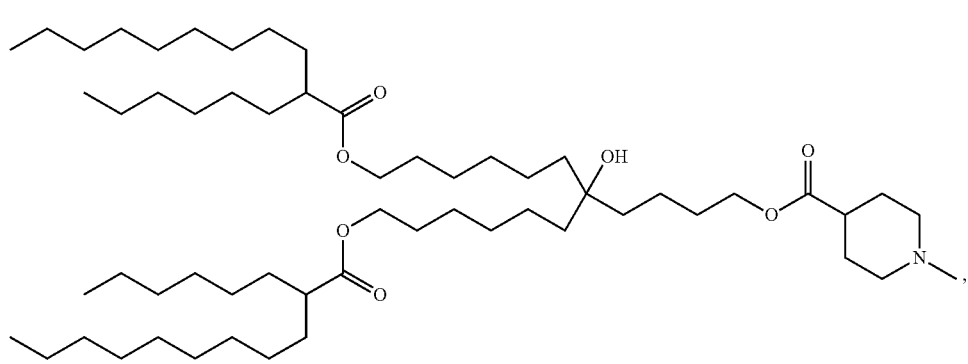
CL15F 11-6
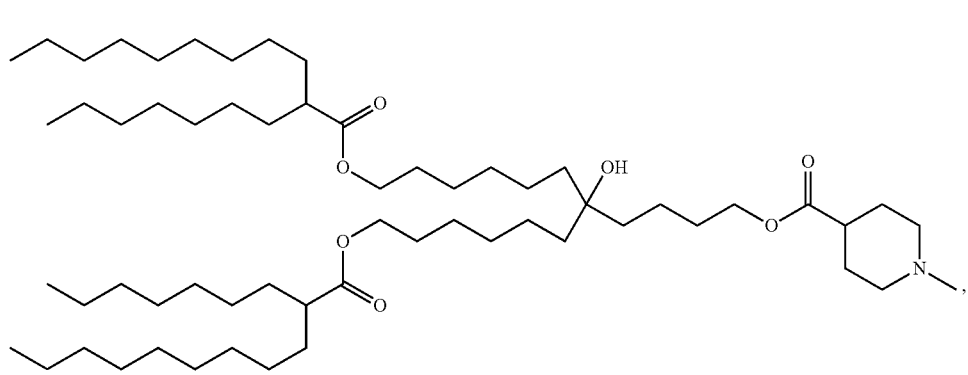
CL15F 11-7
[Chem. 28-11]
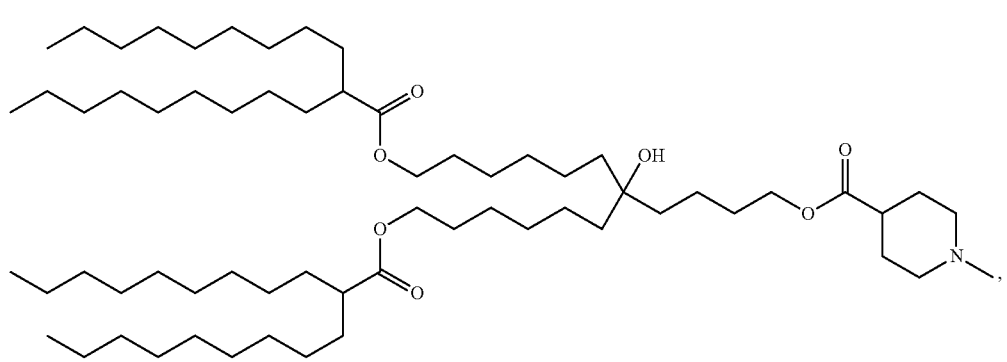
CL15F 11-9

-continued
CL15F 12-4
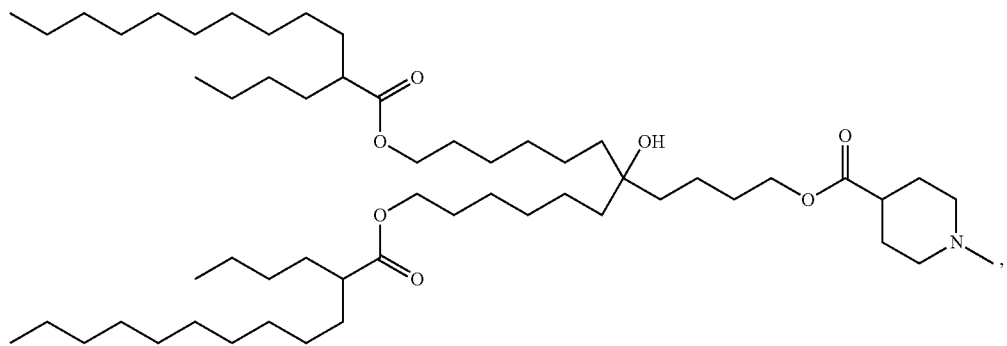
CL15F 12-10
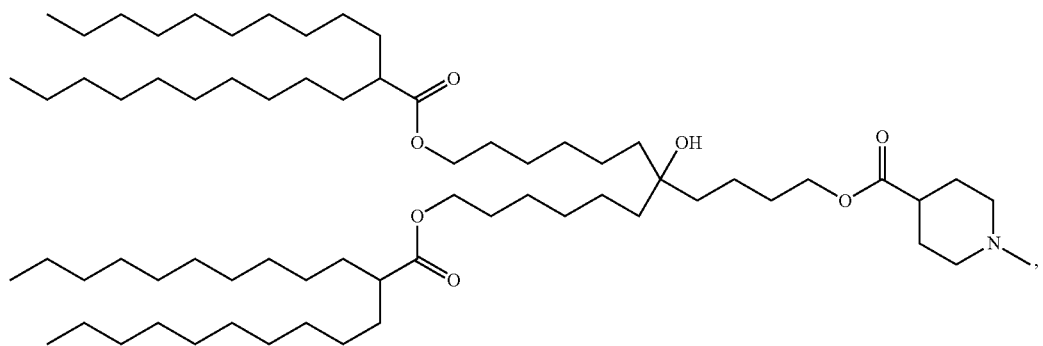
CL15F 13-3
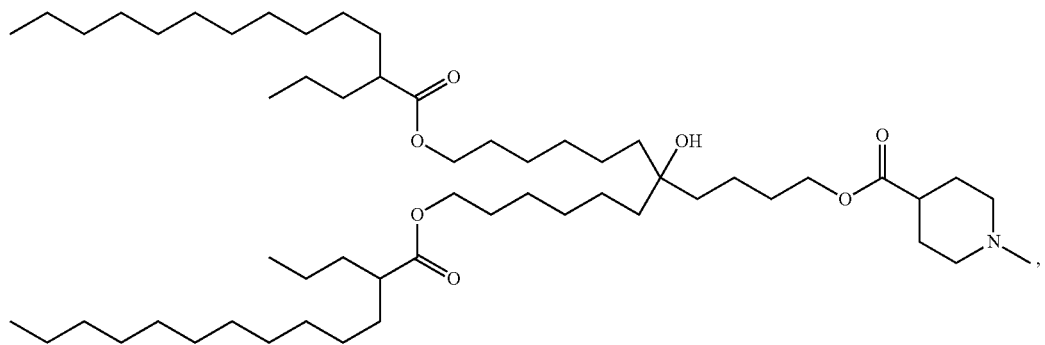
[Chem. 28-12]
CL15F 14-2
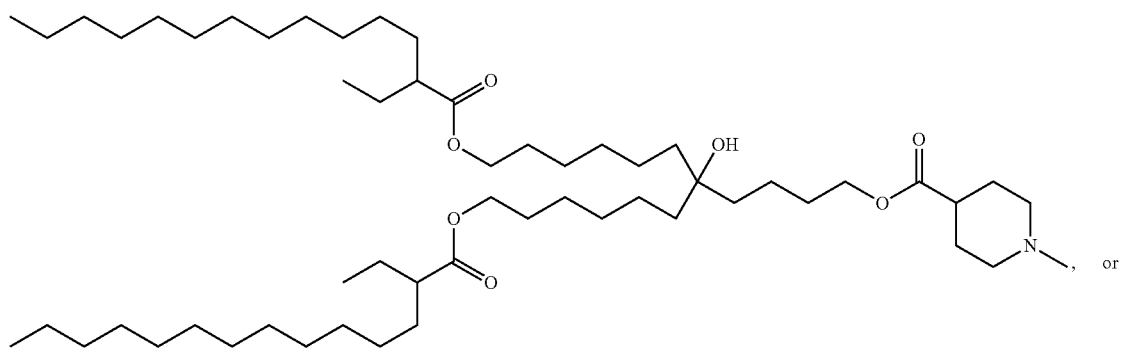, or -continued

CL15F 16-1

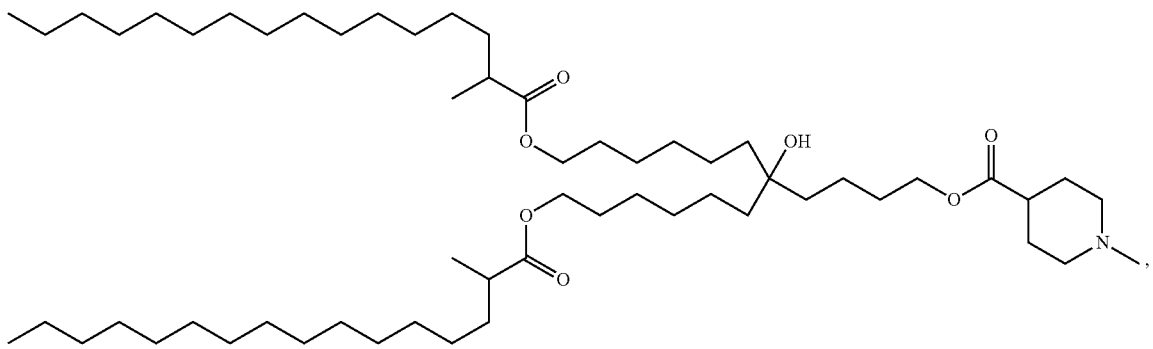

and the production method comprises at least a process of hydrolysis treatment and heat treatment of a reaction solution obtained by reacting malonic ester with alkyl halide in the presence of base to obtain branched fatty acid.

[6-7] The production method of [6-6], wherein the malonic ester is dimethyl malonate.

[6-8] The production method of [6-6] or [6-7], wherein the alkyl halide is iodoalkyl.

[6-9] The production method of any of [6-6]-[6-8], wherein the base is selected from the group consisting of sodium hydride, calcium hydride, sodium ethoxide and bis(trismethylsilyl)amido lithium.

[6-10] The production method of any of [6-6]-[6-9], wherein any of sodium hydroxide, calcium hydroxide, and lithium hydroxide is used in the hydrolysis treatment.

[6-11] The production method of any of [6-6]-[6-10], wherein the heat treatment is carried out at 120° C.-170° C. simultaneously with and/or after the hydrolysis treatment.

[6-12] The production method of any of [6-6]-[6-11], further comprising a process of purifying the branched fatty acid by reversed phase chromatography.

Effect of the Invention

The lipid nanoparticles according to the present invention can highly express the encapsulated gene in the liver or spleen. Therefore, the lipid nanoparticles are useful as liver-specific gene delivery carriers or spleen-specific gene delivery carriers used for gene therapy. In addition, the lipid nanoparticles according to the present invention have excellent stability.

BRIEF DESCRIPTION OF THE DRAWINGS

FIG. 1 shows the results of measuring pKa of each F7siRNA-loaded lipid nanoparticle in Example 1. FIG. 1(A) shows the results of lipid nanoparticles prepared using CL4F6, CL4G6, or CL4H6, and FIG. 1(B) shows the results of lipid nanoparticles prepared using CL15F6, CL15G6, or CL15H6.

FIG. 2 shows the results of calculating relative plasma F7 enzyme activity (%) of mice administered each F7siRNA-loaded lipid nanoparticles in Example 1. FIG. 2(A) shows the results of mice administered lipid nanoparticles prepared using CL4F6, CL4G6, or CL4H6, and FIG. 2(B) shows the results of mice administered lipid nanoparticles prepared using CL15F6, CL15G6, or CL15H6.

FIG. 3 shows the results of measuring Nluc activity (RLU/mg protein) in the liver and spleen of mice administered each NlucmRNA-loaded lipid nanoparticles in Example 2.

FIG. 4 shows the results of measuring Fluc activity of HeLa-GFP cells introduced each pFluc-loaded lipid nanoparticles in Example 3.

FIG. 5 shows the results of measuring Fluc activity (RLU/mg protein) in the liver and spleen of mice administered each pFluc-loaded lipid nanoparticles in Example 3.

EMBODIMENTS FOR CARRYING OUT THE INVENTION

Embodiments of the present invention will be specifically described below. In the specification of this application, "X1-X2 (X1 and X2 are real numbers satisfying X1<X2)" means "X1 or more and X2 or less".

The lipid nanoparticles according to the present invention are lipid nanoparticles comprising pH-sensitive cationic lipids represented by the following general formula (I) (hereinafter may be referred to as "pH-sensitive cationic lipids of the present invention"). By having pH-sensitive cationic lipids represented by the general formula (I) as a constituent lipid of the lipid nanoparticles, the lipid nanoparticles according to the present invention are highly selective to the liver or spleen.

[Chem. 29]

$$(R^1)(R^2)(OH)—(CH_2)a—(O—CO)b-X \qquad (I)$$

In general formula (I), a represents an integer of 3-5, but preferably 4.

b represents 0 or 1. When b is 0, it means that there is no —O—CO— group and it is a single bond.

In general formula (I), $R^1$ and $R^2$ each independently represent a group represented by the following general formula (A). In general formula (A), $R^{11}$ and $R^{12}$ each independently represent a linear or branched $C_{2-15}$ alkyl group (alkyl group having carbon number of 2-15); c represents 0 or 1; v represents an integer of 4-12.

[Chem. 30]

$$(R^{11})(R^{12})—CH—(CO—O)c—(CH_2)v- \qquad (A)$$

The linear or branched $C_{2-15}$ alkyl groups include:
n-ethyl group;
n-propyl group, 1-methylethyl group;
n-butyl group, 1-methylpropyl group, 2-methylpropyl group, 1,1-dimethylethyl group;

n-pentyl group, 1-methylbutyl group, 2-methylbutyl group, 3-methylbutyl group, 1-ethylpropyl group, 1,1-dimethylpropyl group, 2,2-dimethylpropyl group;

n-hexyl group, 1-methylpentyl group, 2-methylpentyl group, 3-methylpentyl group, 4-methylpentyl group, 1-ethylbutyl group, 1,1-dimethylbutyl group, 2,2-dimethylbutyl group, 3,3-dimethylbutyl group, 1,2-dimethylbutyl group, 1-methyl-2,2-dimethylbutyl group;

n-heptyl group, 1-methylhexyl group, 2-methylhexyl group, 3-methylhexyl group, 4-methylhexyl group, 5-methylhexyl group, 1-ethylpentyl group, 1,1-dimethylpentyl group, 2,2-dimethylpentyl group, 3.3-dimethylpentyl group, 4.4-dimethylpentyl group, 1-methyl-3,3-dimethylbutyl group, 2-methyl-3.3-dimethylbutyl group;

n-octyl group, 1-methylheptyl group, 2-methylheptyl group, 3-methylheptyl group, 4-methylheptyl group, 5-methylheptyl group, 6-methylheptyl group, 1-ethylhexyl group, 1,1-dimethylhexyl group, 2,2-dimethylhexyl group, 3.3-dimethylhexyl group, 4.4-dimethylhexyl group, 5.5-dimethylhexyl group, 1-methyl-4.4-dimethylpentyl group, 2-methyl-4.4-dimethylpentyl group, 3-methyl-4.4-dimethylpentyl group;

n-nonyl group, 1-methyloctyl group, 2-methyloctyl group, 3-methyloctyl group, 4-methyloctyl group, 5-methyloctyl group, 6-methyloctyl group, 7-methyloctyl group, 1-ethylheptyl group; 1,1-dimethylheptyl group, 2,2-dimethylheptyl group, 3.3-dimethylheptyl group, 4,4-dimethylheptyl group, 5.5-dimethylheptyl group, 6,6-dimethylheptyl group, 1-methyl-5,5-dimethylhexyl group, 2-methyl-5.5-dimethylhexyl group, 3-methyl-5.5-dimethylhexyl group, 4-methyl-5.5-dimethylhexyl group;

n-decyl group, 1-methylnonyl group, 2-methylnonyl group, 3-methylnonyl group, 4-methylnonyl group, 5-methylnonyl group, 6-methylnonyl group, 7-methylnonyl group, 8-methylnonyl group, 1-ethyloctyl group, 1,1-dimethyloctyl group, 2,2-dimethyloctyl group, 3,3-dimethyloctyl group, 4.4-dimethyloctyl group, 5.5-dimethyloctyl group, 6,6-dimethyloctyl group, 7.7-dimethyloctyl group, 1-methyl-6,6-dimethylheptyl group, 2-methyl-6,6-dimethylheptyl group, 3-methyl-6,6-dimethylheptyl group, 4-methyl-6,6-dimethylheptyl group, 5-methyl-6.6-dimethylheptyl group;

n-undecyl group, 1-methyldecyl group, 2-methyldecyl group, 3-methyldecyl group, 4-methyldecyl group, 5-methyldecyl group, 6-methyldecyl group, 7-methyldecyl group, 8-methyldecyl group, 9-methyldecyl group, 1-ethylnonyl group, 1,1-dimethylnonyl group, 2,2-dimethylnonyl group, 3.3-dimethylnonyl group, 4.4-dimethylnonyl group, 5.5-dimethylnonyl group, 6,6-dimethylnonyl group, 7.7-dimethylnonyl group, 8.8-dimethylnonyl group, 1-methyl-7,7-dimethyloctyl group, 2-methyl-7.7-dimethyloctyl group, 3-methyl-7.7-dimethyloctyl group, 4-methyl-7.7-dimethyloctyl group, 5-methyl-7.7-dimethyloctyl group, 6-methyl-7.7-dimethyloctyl group;

n-dodecyl group, 1-methylundecyl group, 2-methylundecyl group, 3-methylundecyl group, 4-methylundecyl group, 5-methylundecyl group, 6-methylundecyl group, 7-methylundecyl group, 8-methylundecyl group, 9-methylundecyl group, 10-methylundecyl group, 1-ethyldecyl group, 1,1-dimethyldecyl group, 2,2-dimethyldecyl group, 3,3-dimethyldecyl group, 4,4-dimethyldecyl group, 5,5-dimethyldecyl group, 6,6-dimethyldecyl group, 7.7-dimethyldecyl group, 8.8-dimethyldecyl group, 9,9-dimethyldecyl group, 1-methyl-8.8-dimethylnonyl group, 2-methyl-8,8-dimethylnonyl group, 3-methyl-8.8-dimethylnonyl group, 4-methyl-8.8-dimethylnonyl group, 5-methyl-8.8-dimethylnonyl group, 6-methyl-8.8-dimethylnonyl group, 7-methyl-8,8-dimethylnonyl group;

n-tridecyl group, 1-methyldodecyl group, 2-methyldodecyl group, 3-methyldodecyl group, 4-methyldodecyl group, 5-methyldodecyl group, 6-methyldodecyl group, 7-methyldodecyl group, 8-methyldodecyl group, 9-methyldodecyl group, 10-methyldodecyl group, 11-methyldodecyl group, 1-ethylundecyl group, 1,1-dimethylundecyl group, 2,2-dimethylundecyl group, 3.3-dimethylundecyl group, 4.4-dimethylundecyl group, 5.5-dimethylundecyl group, 6.6-dimethylundecyl group, 7.7-dimethylundecyl group, 8.8-dimethylundecyl group, 9,9-dimethylundecyl group, 10.10-dimethylundecyl group, 1-methyl-9,9-dimethyldecyl group, 2-methyl-9,9-dimethyldecyl group, 3-methyl-9,9-dimethyldecyl group, 4-methyl-9,9-dimethyldecyl group, 5-methyl-9,9-dimethyldecyl group, 6-methyl-9,9-dimethyldecyl group, 7-methyl-9,9-dimethyldecyl group, 8-methyl-9,9-dimethyldecyl group;

n-tetradecyl group, 1-methyltridecyl group, 2-methyltridecyl group, 3-methyltridecyl group, 4-methyltridecyl group, 5-methyltridecyl group, 6-methyltridecyl group, 7-methyltridecyl group, 8-methyltridecyl group, 9-methyltridecyl group, 10-methyltridecyl group, 11-methyltridecyl group, 12-methyltridecyl group, 1-ethyldodecyl group, 1,1-dimethyldodecyl group, 2,2-dimethyldodecyl group, 3.3-dimethyldodecyl group, 4.4-dimethyldodecyl group, 5,5-dimethyldodecyl group, 6,6-dimethyldodecyl group, 7.7-dimethyldodecyl group, 8,8-dimethyldodecyl group, 9,9-dimethyldodecyl group, 10.10-dimethyldodecyl group, 11.11-dimethyldodecyl group, 1-methyl-10.10-dimethylundecyl group, 2-methyl-10.10-dimethylundecyl group, 3-methyl-10.10-dimethylundecyl group, 4-methyl-10,10-dimethylundecyl group, 5-methyl-10,10-dimethylundecyl group, 6-methyl-10.10-dimethylundecyl group, 7-methyl-10,10-dimethylundecyl group, 8-methyl-10.10-dimethylundecyl group, 9-methyl-10.10-dimethylundecyl group;

n-pentadecyl group, 1-methyltetradecyl group, 2-methyltetradecyl group, 3-methyltetradecyl group, 4-methyltetradecyl group, 5-methyltetradecyl group, 6-methyltetradecyl group, 7-methyltetradecyl group, 8-methyltetradecyl group, 9-methyltetradecyl group, 10-methyltetradecyl group, 11-methyltetradecyl group, 12-methyltetradecyl group, 13-methyltetradecyl group, 1-ethyltridecyl group, 1,1-dimethyltridecyl group, 2,2-dimethyltridecyl group, 3.3-dimethyltridecyl group, 4.4-dimethyltridecyl group, 5.5-dimethyltridecyl group, 6.6-dimethyltridecyl group, 7.7-dimethyltridecyl group, 8.8-dimethyltridecyl group, 9,9-dimethyltridecyl group, 10.10-dimethyltridecyl group, 11.11-dimethyltridecyl group, 12.12-dimethyltridecyl group, 1-methyl-11,11-dimethyldodecyl group, 2-methyl-11,11-dimethyldodecyl group, 3-methyl-11,11-dimethyldodecyl group, 4-methyl-11,11-dimethyldodecyl group, 5-methyl-11,11-dimethyldodecyl group, 6-methyl-11,11-dimethyldodecyl group, 7-methyl-11.11-dimethyldodecyl group, 8-methyl-11,11-dimethyldodecyl group, 9-methyl-11,11-dimethyldodecyl group, 10-methyl-11,11-dimethyldodecyl group, etc.

In general formula (A), $R^{11}$ and $R^{12}$ are, preferably, each independently a linear or branched $C_{2-12}$ alkyl group (alkyl group having carbon number of 2-12), more preferably a linear or branched $C_{5-12}$ alkyl group (alkyl group having carbon number of 5-12), further more preferably a linear or branched $C_{5-10}$ alkyl group (alkyl group having carbon number of 5-10), most preferably a linear or branched $C_{6-9}$ alkyl group (alkyl group having carbon number of 6-9). In addition, in the pH-sensitive cationic lipids of the present invention, $R^1$ and $R^2$ may be groups represented by general formula (A), and may be the same groups or may be different groups to each other.

In general formula (I), X represents a group represented by following general formula (B) or a 5- to 7-membered non-aromatic heterocycle group. The 5- to 7-membered non-aromatic heterocyclic group which X represents is bound to (O—CO)b- by a carbon atom.

[Chem. 31]

(B)

In general formula (B), d represents an integer of 0-3. When d is 0, it means that there is no —(CH$_2$)— group and it is a single bond.

In general formula (B), $R^3$ and $R^4$ each independently represent $C_{1-4}$ alkyl group (alkyl group having carbon number of 1-4) or $C_{2-4}$ alkenyl group (alkenyl group having carbon number of 2-4). In $C_{1-4}$ alkyl group or $C_{2-4}$ alkenyl group which $R^3$ and $R^4$ represent, one or two hydrogen atoms may be replaced with phenyl group(s). $R^3$ and $R^4$ may be $C_{1-4}$ alkyl group or $C_{2-4}$ alkenyl group, and may be the same groups or may be different groups to each other.

$C_{1-4}$ alkyl groups include methyl group, ethyl group, propyl group, isopropyl group, n-butyl group, isobutyl group, and tert-butyl group. $C_{2-4}$ alkenyl groups include vinyl group, 1-propenyl group, 2-propenyl group, 1-methylvinyl group, 2-methyl-1-propenyl group, 1-butenyl group, 2-butenyl group, and 3-butenyl group.

In general formula (B), $R^3$ and $R^4$ may be bound to each other to form a 5- to 7-membered non-aromatic heterocyclic ring. The 5- to 7-membered non-aromatic heterocyclic groups formed by $R^3$ and $R^4$ bound to each other include, for example, 1-pyrrolidinyl group, 1-piperidinyl group, 1-morpholinyl group, and 1-piperazinyl group. In the 5- to 7-membered non-aromatic heterocyclic groups formed by $R^3$ and $R^4$ bound to each other, one or two hydrogen atoms in the ring may be replaced with $C_{1-4}$ alkyl group or $C_{2-4}$ alkenyl group. When two hydrogen atoms in said ring are replaced with $C_{1-4}$ alkyl group or $C_{2-4}$ alkenyl group, they may be replaced with the same groups or by different groups.

In general formula (I), when X is a 5- to 7-membered non-aromatic heterocyclic group, the hetero atoms comprised in said heterocyclic group can include nitrogen atom, oxygen atom, or sulfur atom, etc. The hetero atom constituting the heterocycle in said heterocyclic group may be one, or two or more same or different hetero atoms. The heterocycle in said heterocyclic group may be a saturated heterocycle and may comprise one or more double bonds, but the heterocycle is never an aromatic ring.

The pH-sensitive cationic lipids of the present invention are preferably compounds wherein:
in general formula (I), $R^1$ and $R^2$ are each independently groups wherein:
in general formula (A), $R^{11}$ and $R^{12}$ are each independently a linear or branched $C_{2-12}$ alkyl groups, c is 1, v is an integer of 6-10;
a is an integer of 3-5, b is 1, and X is a 5- to 7-membered nonaromatic heterocyclic group (bound to (O—CO)b- by a carbon atom in the heterocyclic group), preferably 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group);
or compounds wherein:
in general formula (I), $R^1$ and $R^2$ are each independently groups wherein:
in general formula (A), $R^{11}$ and $R^{12}$ are each independently a linear or branched $C_{2-12}$ alkyl groups, c is 1, v is an integer of 6-10;
a is an integer of 3-5, b is 0, and X is a group wherein:
in general formula (B), d is 0, $R^3$ and $R^4$ are each independently $C_{1-4}$ alkyl group or $C_{2-4}$ alkenyl group (in the $C_{1-4}$ alkyl group or $C_{2-4}$ alkenyl group which $R^3$ and $R^4$ represent, one or two hydrogen atoms may be replaced with phenyl group(s)). In addition, they are preferably compounds wherein:
in general formula (I), $R^1$ and $R^2$ are each independently groups wherein:
in general formula (A), $R^{11}$ and $R^{12}$ are each independently a linear or branched $C_{5-12}$ alkyl groups, c is 1, v is an integer of 6-10;
a is an integer of 3-5, b is 1, and X is a 5- to 7-membered nonaromatic heterocyclic group (bound to (O—CO)b- by a carbon atom in the heterocyclic group), preferably 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group);
or compounds wherein:
in general formula (I), $R^1$ and $R^2$ are each independently groups wherein: in general formula (A), $R^{11}$ and $R^{12}$ are each independently a linear or branched $C_{5-12}$ alkyl groups, c is 1, v is an integer of 6-10;
a is an integer of 3-5, b is 0, and X is a group wherein:
in general formula (B), d is 0, $R^3$ and $R^4$ are each independently $C_{1-4}$ alkyl group or $C_{2-4}$ alkenyl group (in the $C_{1-4}$ alkyl group or $C_{2-4}$ alkenyl group which $R^3$ and $R^4$ represent, one or two hydrogen atoms may be replaced with phenyl group(s)). Most especially, the pH-sensitive cationic lipids of the present invention is preferably compounds wherein:
in general formula (I), $R^1$ and $R^2$ are each independently groups wherein:
in general formula (A), $R^{11}$ and $R^{12}$ are each independently a linear or branched $C_{6-9}$ alkyl groups, c is 1, v is an integer of 6-10; and
a is an integer of 3-5, b is 1, and X is 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group); or compounds wherein:
in general formula (I), $R^1$ and $R^2$ are each independently groups wherein:
in general formula (A), $R^{11}$ and $R^{12}$ are each independently a linear or branched $C_{6-9}$ alkyl groups, c is 1, v is an integer of 6-10; and
a is an integer of 3-5, b is 0, and X is a group wherein:
in general formula (B), d is 0, $R^3$ and $R^4$ are each independently $C_{1-4}$ alkyl group.

The pH-sensitive cationic lipids of the present invention are more preferably compounds wherein:
in general formula (I), $R^1$ and $R^2$ are each independently groups wherein:
in general formula (A), $R^{11}$ and $R^{12}$ are each independently a straight-chain $C_{6-9}$ alkyl groups, c is 1, v is an integer of 6-10; and
a is an integer of 3-5, b is 1, and X is 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group); compounds wherein:
in general formula (I), $R^1$ and $R^2$ are each independently groups wherein:
in general formula (A), $R^{11}$ and $R^{12}$ are each independently a branched-chain $C_{6-9}$ alkyl groups, c is 1, v is an integer of 6-10; and
a is an integer of 3-5, b is 1, and X is 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group); compounds wherein:
in general formula (I), $R^1$ and $R^2$ are each independently groups wherein:
in general formula (A), $R^{11}$ and $R^{12}$ are each independently a straight-chain $C_{6-9}$ alkyl groups, c is 1, v is an integer of 6-10; and
a is an integer of 3-5, b is 0, and X is a group wherein:
in general formula (B), d is 0, $R^3$ and $R^4$ are each independently $C_{1-4}$ alkyl group; compounds wherein:
in general formula (I), $R^1$ and $R^2$ are each independently groups wherein:
in general formula (A), $R^{11}$ and $R^{12}$ are each independently a branched-chain $C_{6-9}$ alkyl groups, c is 1, v is an integer of 6-10; and
a is an integer of 3-5, b is 0, and X is a group wherein:
in general formula (B), d is 0, $R^3$ and $R^4$ are each independently $C_{1-4}$ alkyl group.

The pH-sensitive cationic lipids of the present invention are especially preferably compounds wherein:
in general formula (I), $R^1$ and $R^2$ are the same groups and groups wherein:
in general formula (A), $R^{11}$ and $R^{12}$ are each independently a straight-chain $C_{6-9}$ alkyl groups, c is 1, v is an integer of 6-10; and
a is an integer of 3-5, b is 1, and X is 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group); compounds wherein:
in general formula (I), $R^1$ and $R^2$ are the same groups and groups wherein:
in general formula (A), $R^{11}$ and $R^{12}$ are each independently a branched-chain $C_{6-9}$ alkyl groups, c is 1, v is an integer of 6-10; and
a is an integer of 3-5, b is 1, and X is 1-pyrrolidinyl group, 1-piperidinyl group, 1-morpholinyl group, or 1-piperazinyl group (bound to (O—CO)b- by a carbon atom in the ring, and one hydrogen atom may be replaced with $C_{1-4}$ alkyl group or $C_{2-4}$ alkenyl group); compounds wherein:
in general formula (I), $R^1$ and $R^2$ are the same groups and groups wherein:
in general formula (A), $R^{11}$ and $R^{12}$ are each independently a straight-chain $C_{6-9}$ alkyl groups, c is 1, v is an integer of 6-10; and
a is an integer of 3-5, b is 0, and X is a group wherein:
in general formula (B), d is 0, $R^3$ and $R^4$ are each independently $C_{1-4}$ alkyl group; compounds wherein:
in general formula (I), $R^1$ and $R^2$ are the same groups and groups wherein:
in general formula (A), $R^{11}$ and $R^{12}$ are each independently a branched-chain $C_{6-9}$ alkyl groups, c is 1, v is an integer of 6-10; and
a is an integer of 3-5, b is 0, and X is a group wherein:
in general formula (B), d is 0, $R^3$ and $R^4$ are each independently $C_{1-4}$ alkyl group.

The pH-sensitive cationic lipids of the present invention are, for example, pH-sensitive cationic lipids having following structures, their stereoisomers or mixtures of the stereoisomers:

[Chem. 32-1]

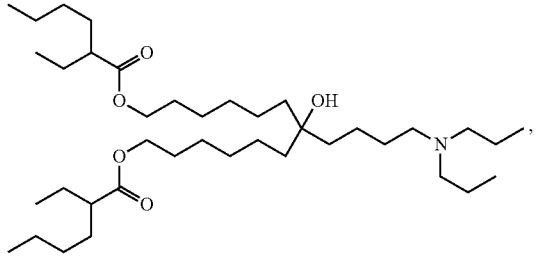

CL4F 6-2

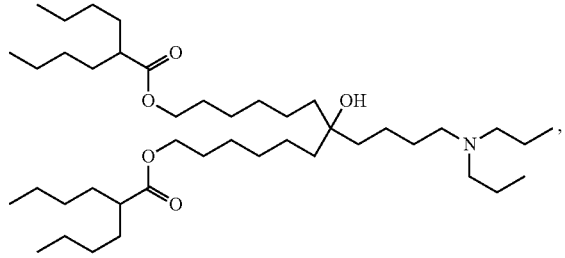

CL4F 6-4

-continued
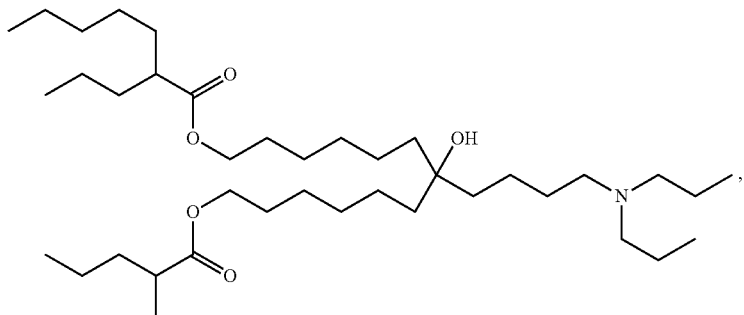
CL4F 7-3
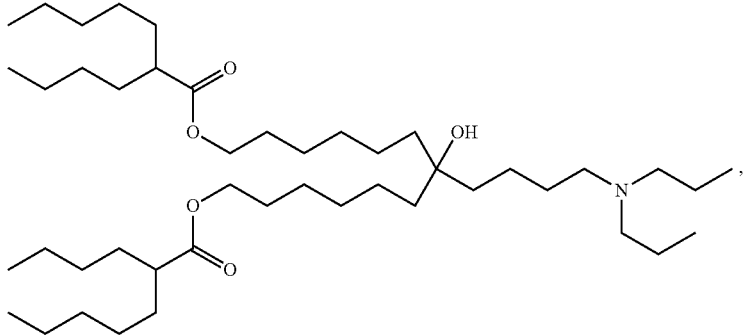
CL4F 7-4
[Chem. 32-2]
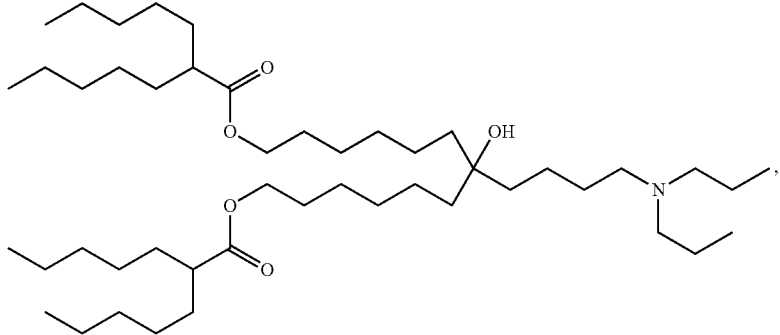
CL4F 7-5
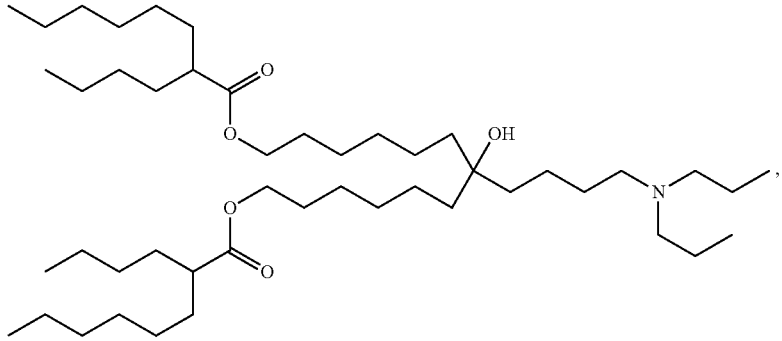
CL4F 8-4

-continued
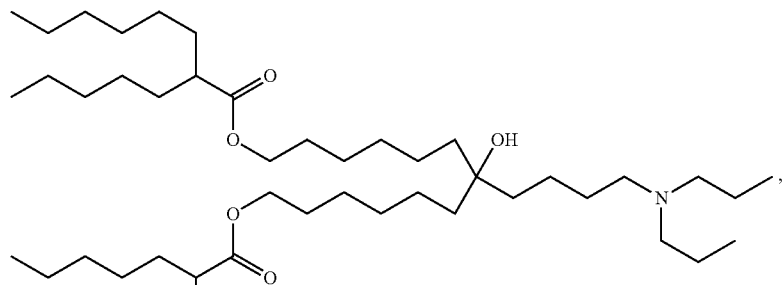
CL4F 8-5
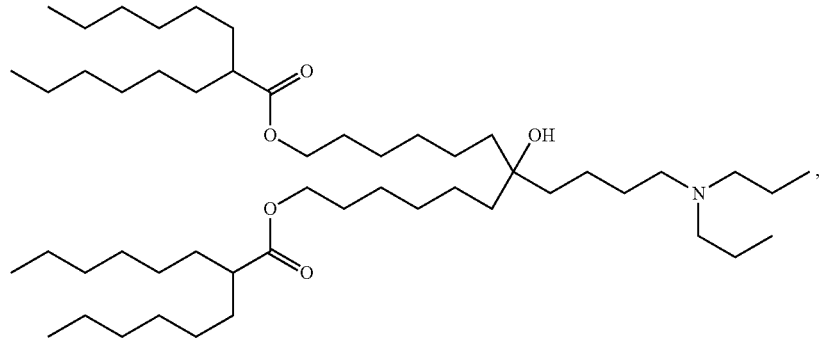
CL4F 8-6
[Chem. 32-3]
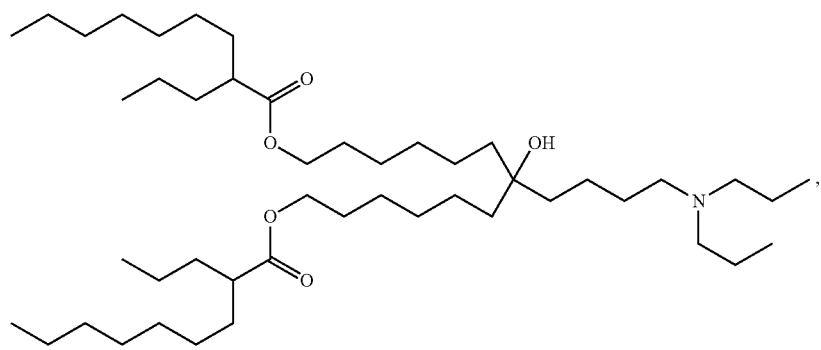
CL4F 9-3
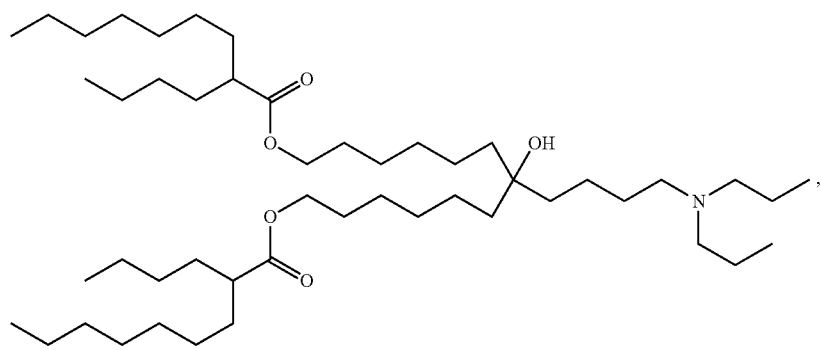
CL4F 9-4

-continued
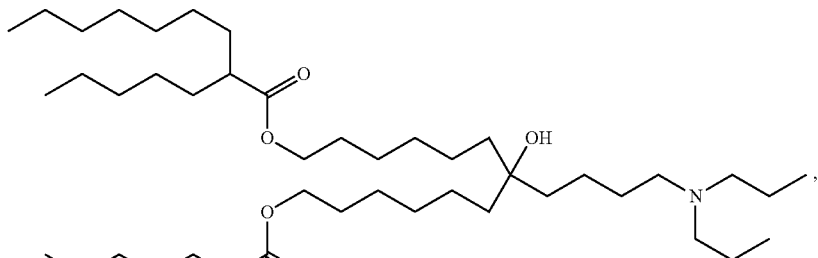
CL4F 9-5
CL4F 9-6
[Chem. 32-4]
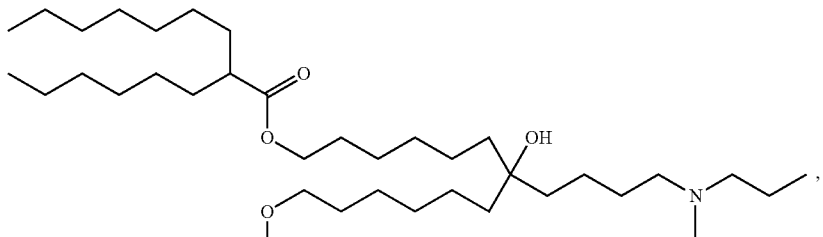
CL4F 9-7
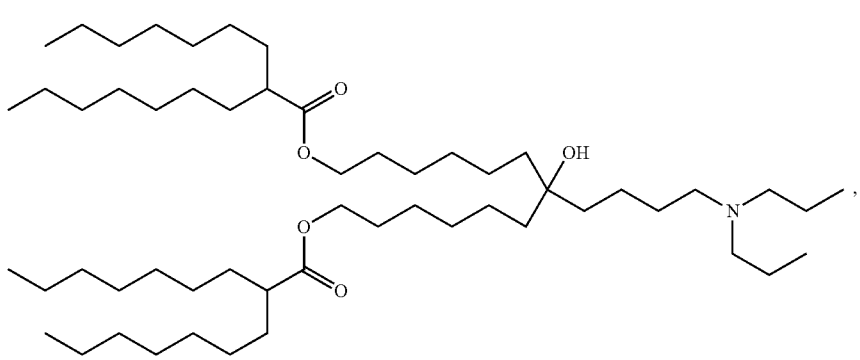
CL4F 10-2
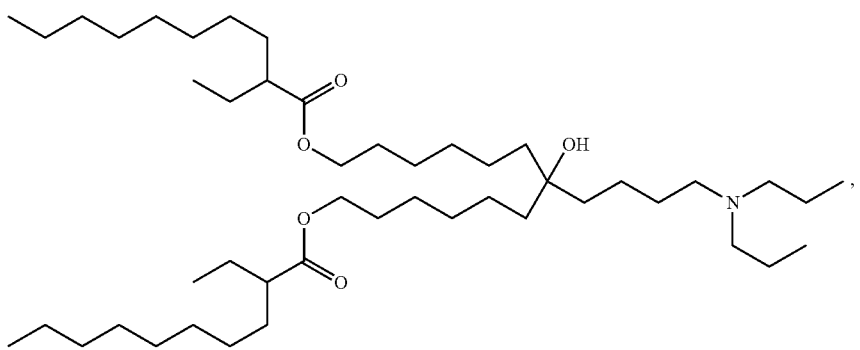

-continued
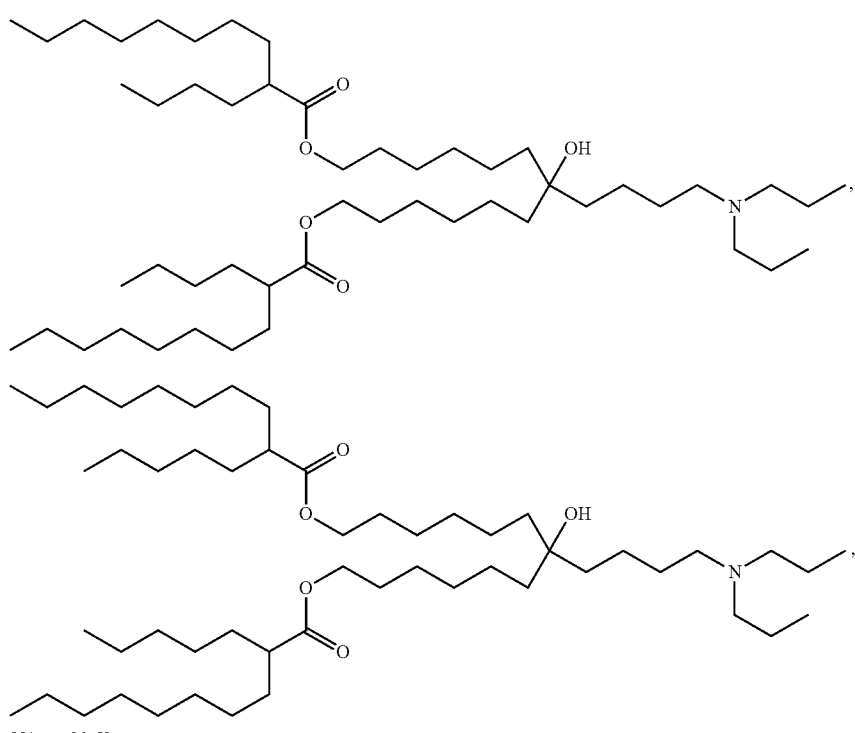
CL4F 10-4
CL4F 10-5
[Chem. 32-5]
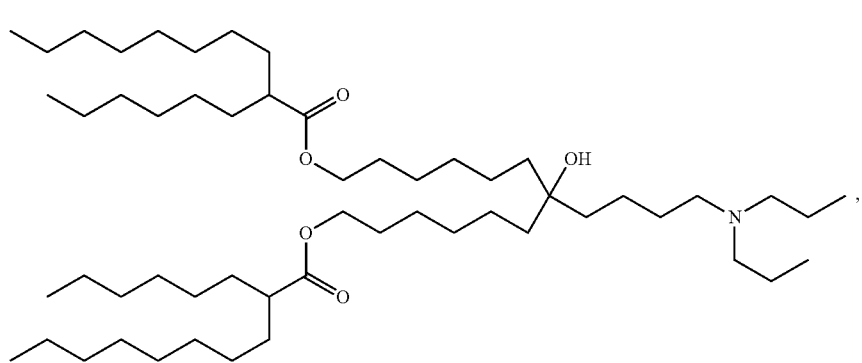
CL4F6
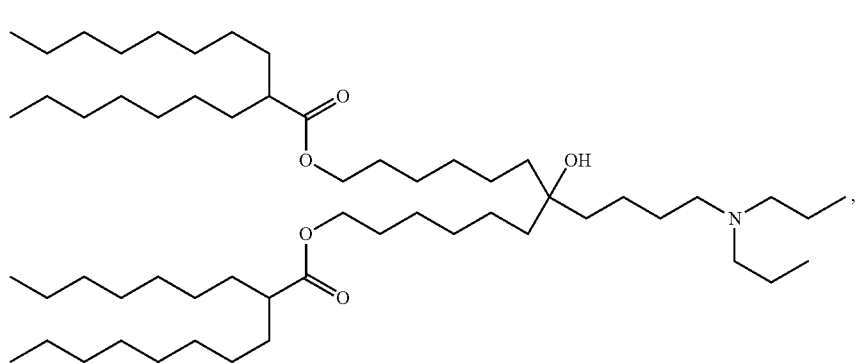
CL4F 10-7

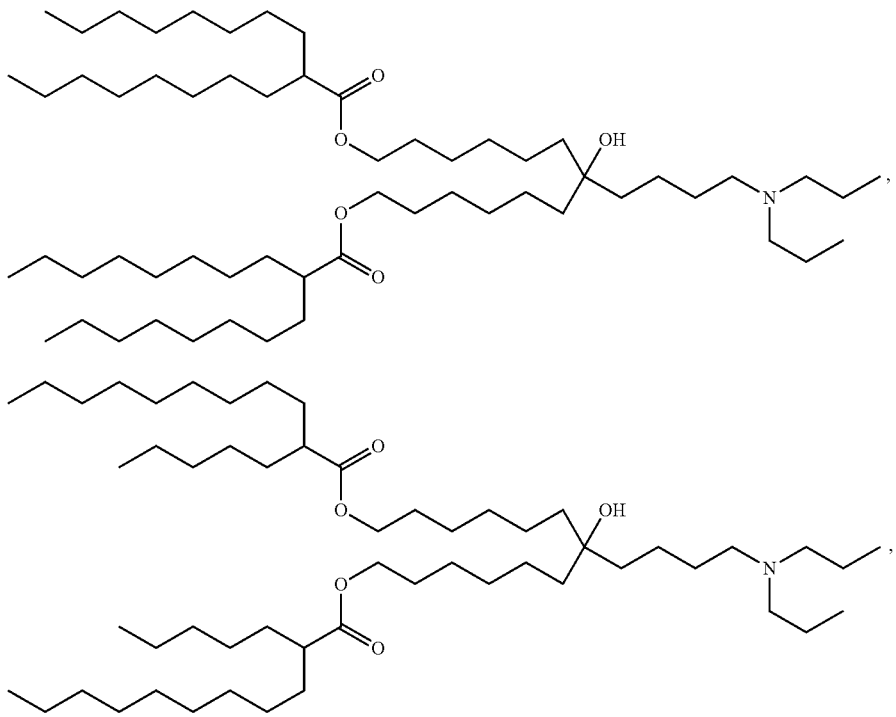
CL4F 10-8
CL4F 11-5
[Chem. 32-6]
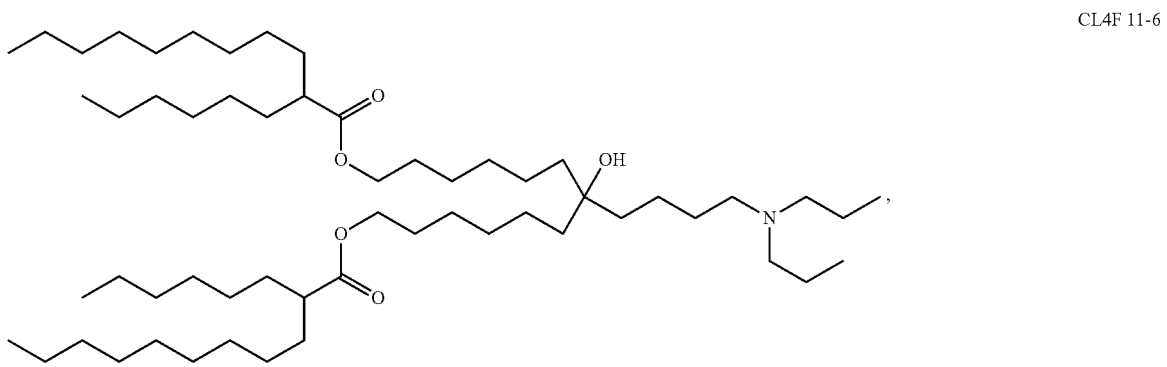
CL4F 11-6
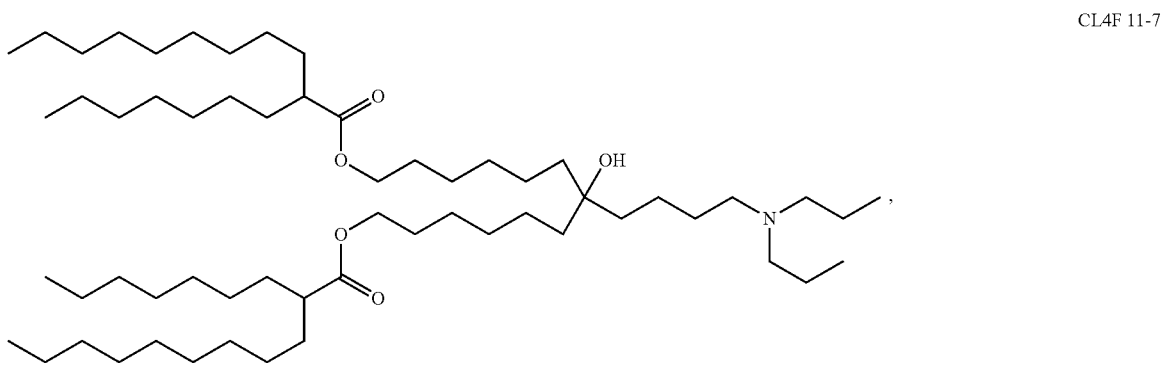
CL4F 11-7

-continued
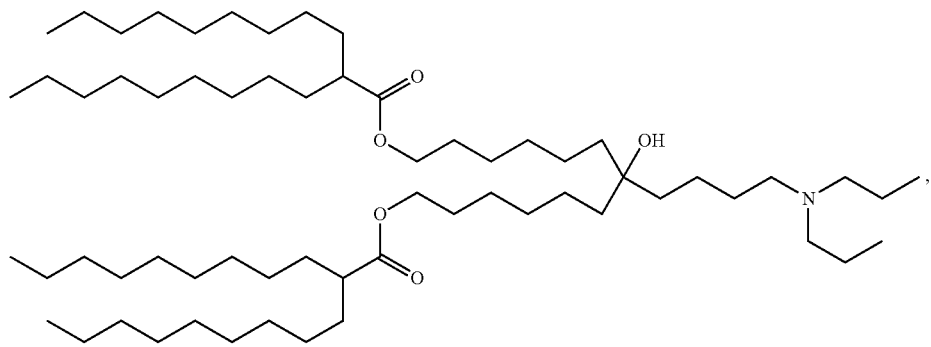
CL4F 11-9
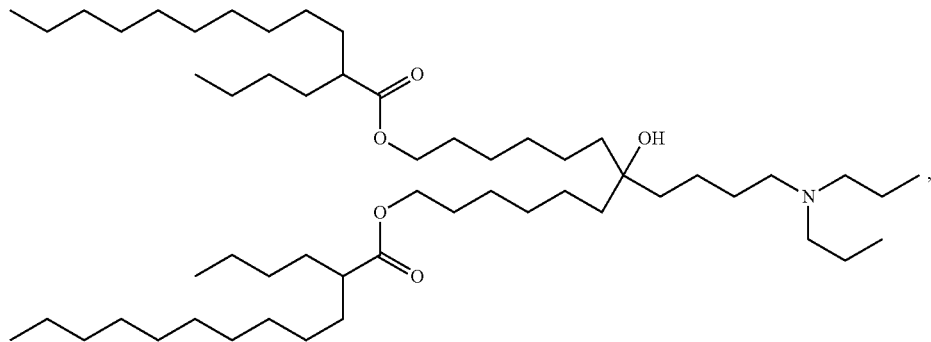
CL4F 12-4
[Chem. 32-7]
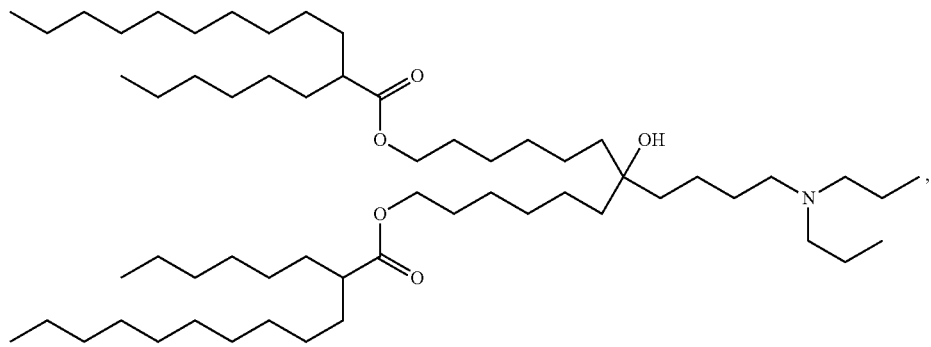
CL4F 12-6
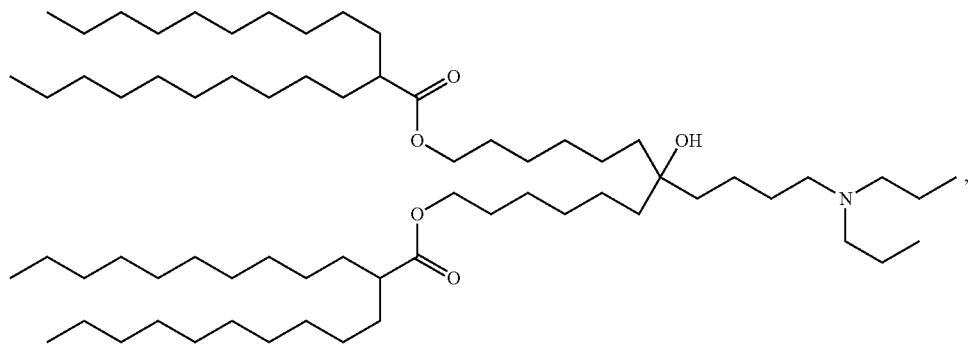
CL4F 12-10

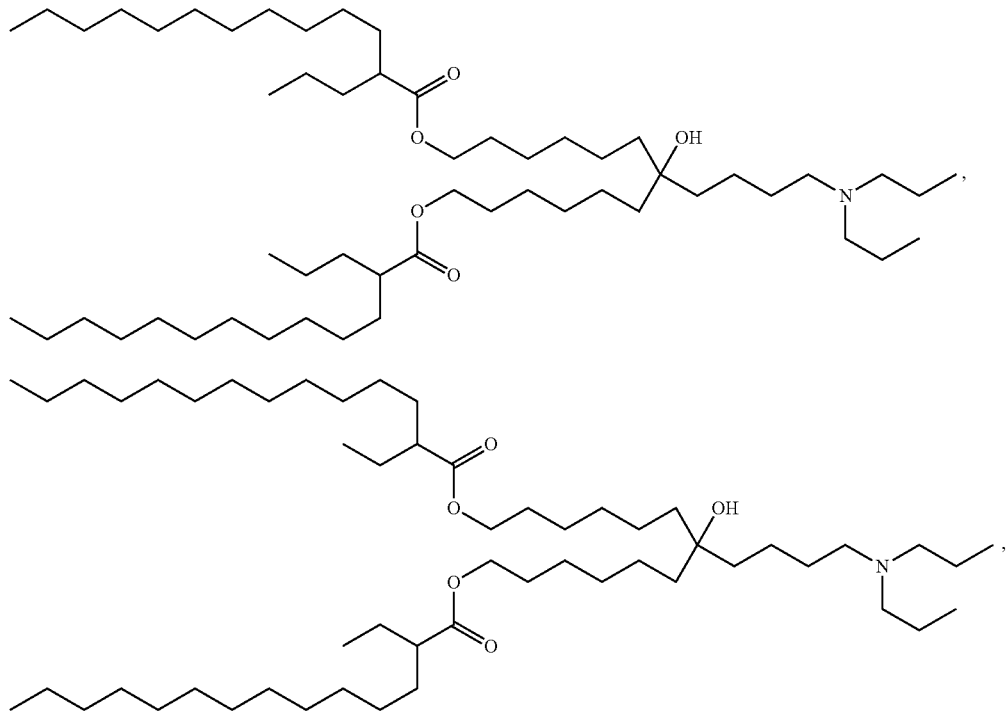
CL4F 13-3
CL4F 14-2
[Chem. 32-8]
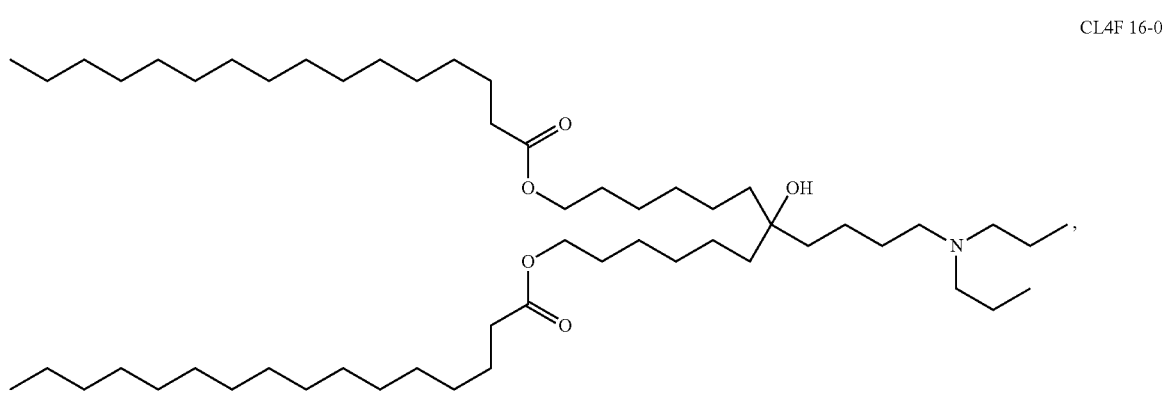
CL4F 16-0
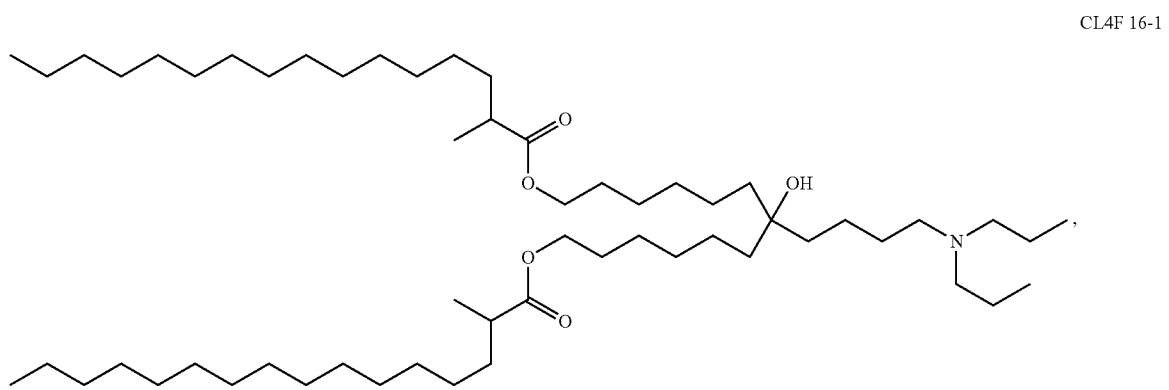
CL4F 16-1

-continued
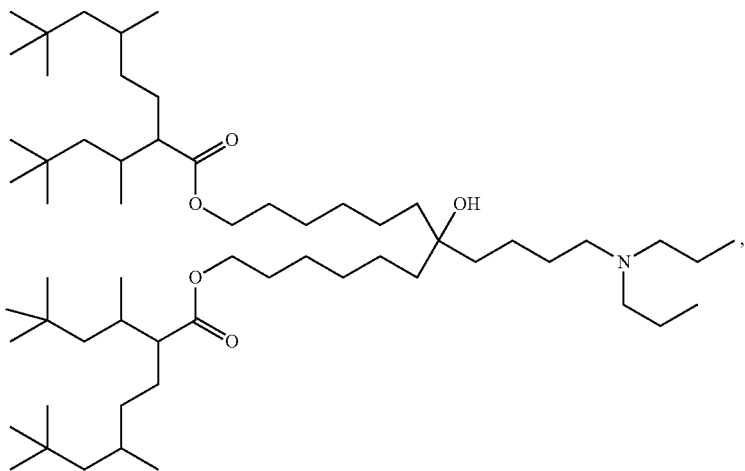
CL4F6
[Chem. 32-9]
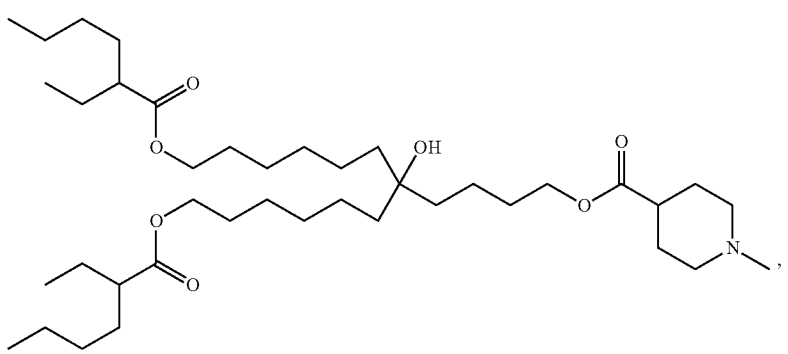
CL15F 6-2
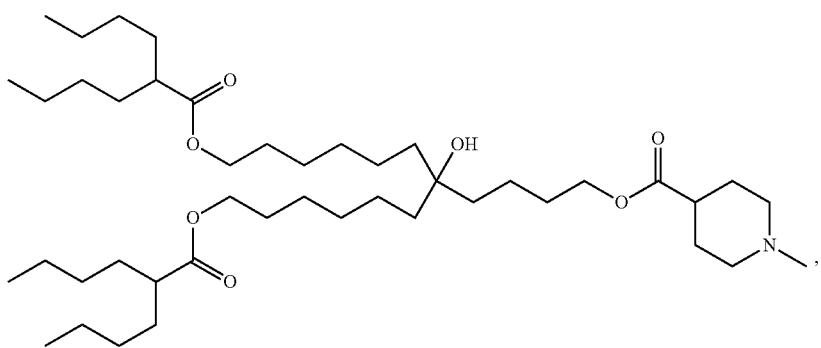
CL15F 6-4
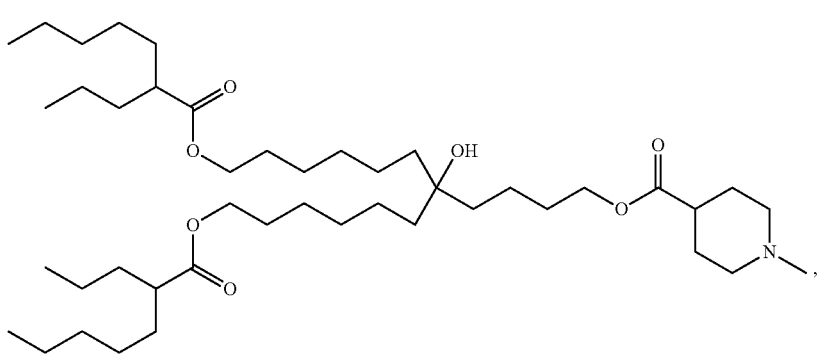
CL15F 7-3

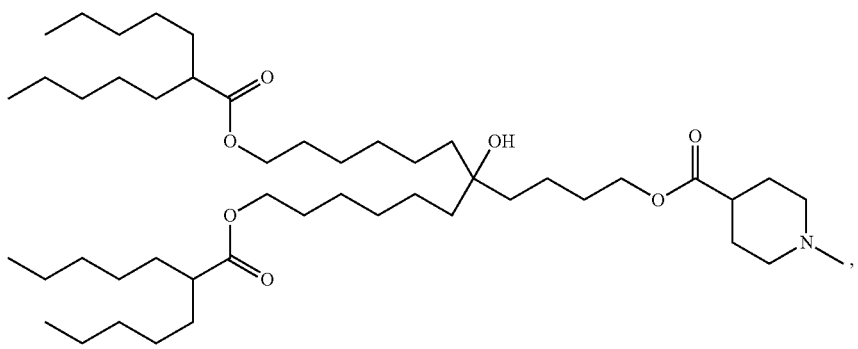
CL15F 7-5
[Chem. 32-10]
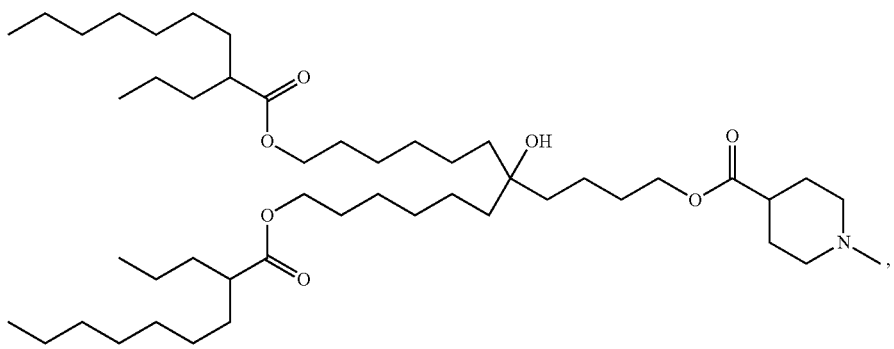
CL15F 8-6
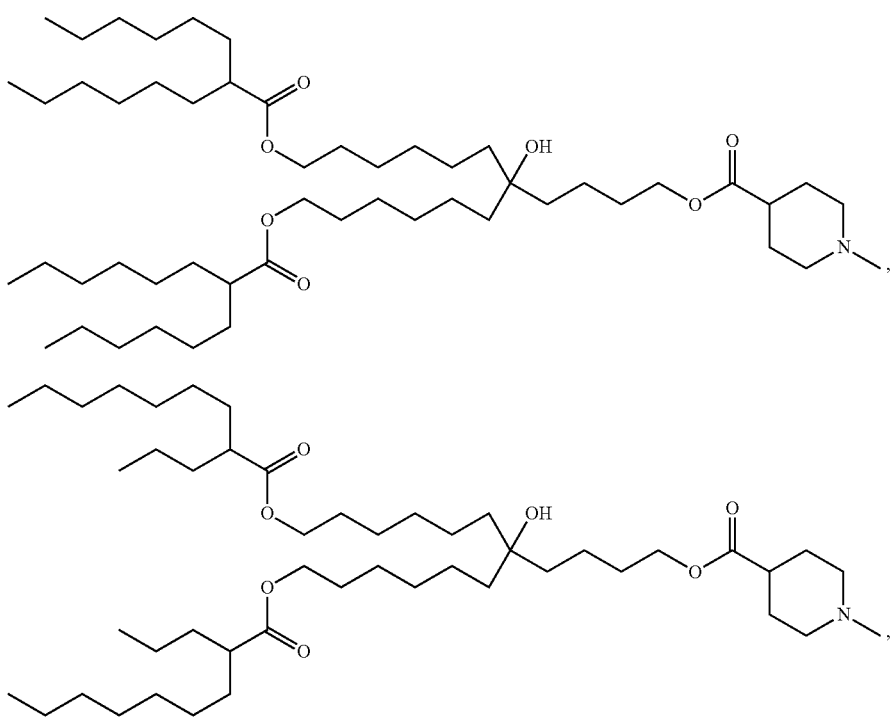
CL15F 9-3
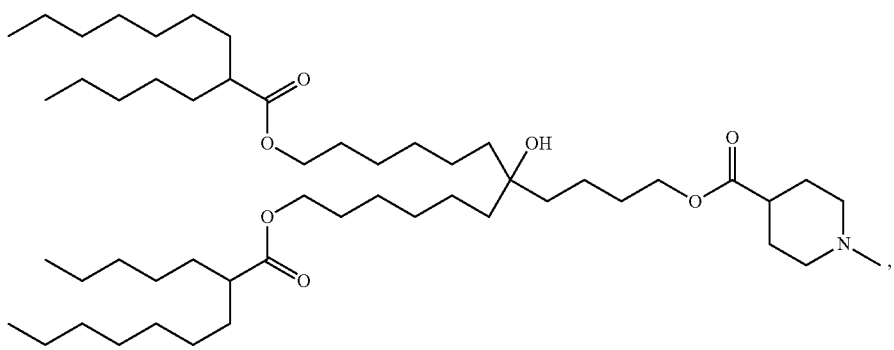
CL15F 9-5

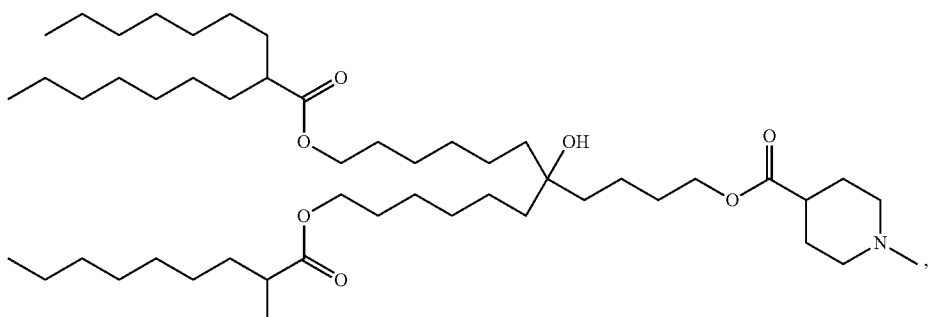
CL15F 9-7
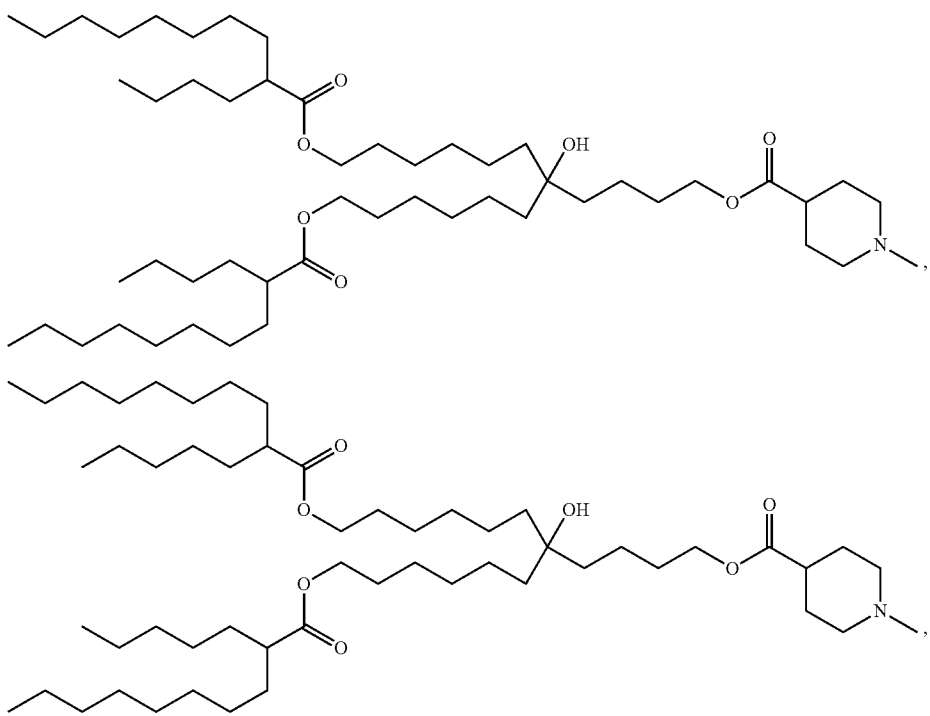
[Chem. 32-11]
CL15F 10-4
CL15F 10-5
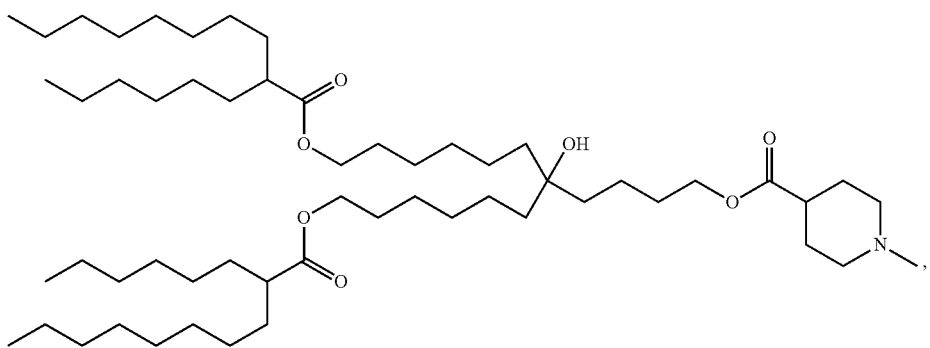
CL15F6

CL15F 10-8
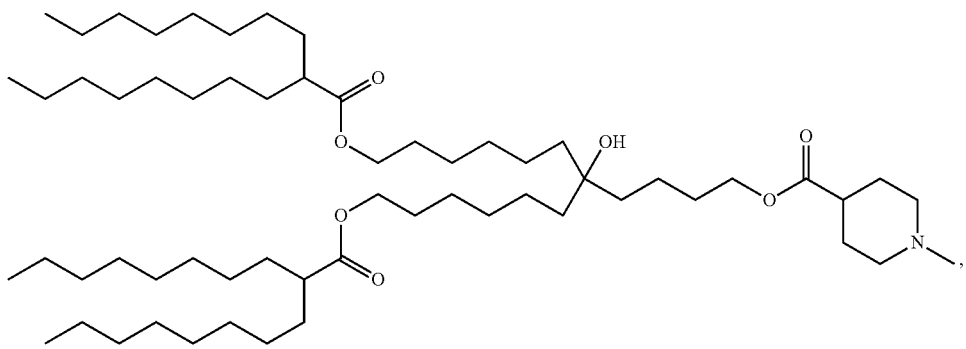
[Chem. 32-12]
CL15F 11-5
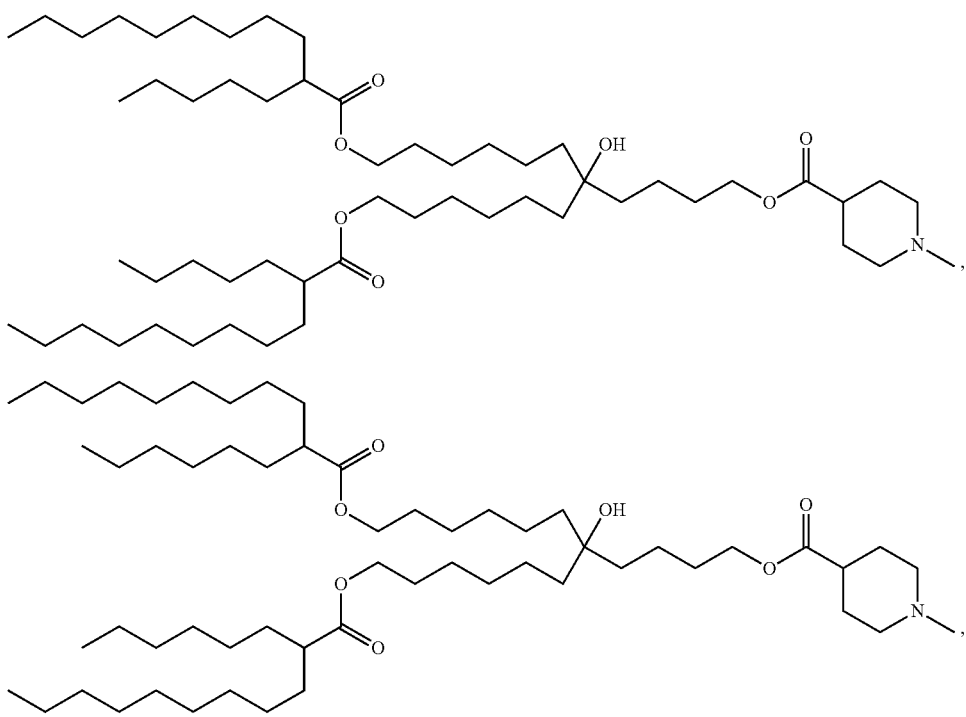
CL15F 11-6
CL15F 11-7
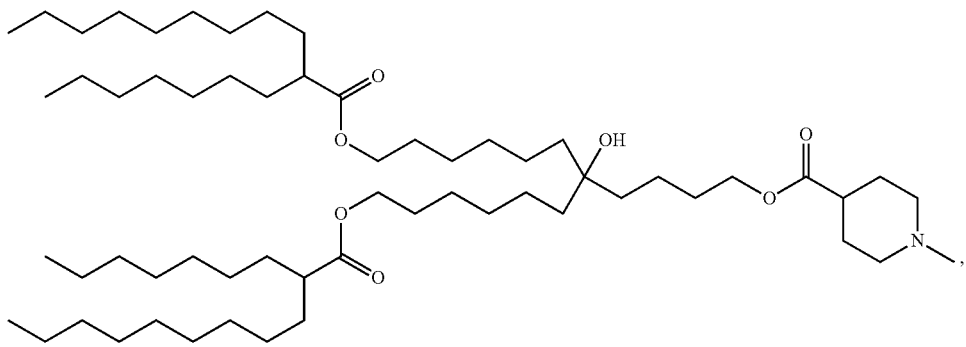

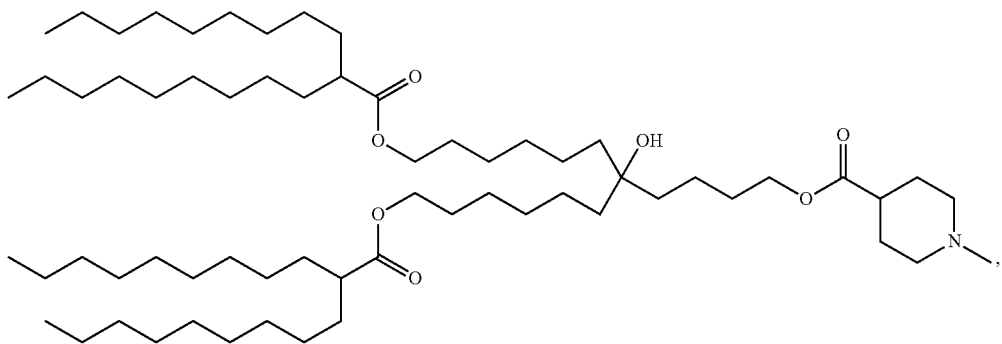
CL15F 11-9
[Chem. 32-13]
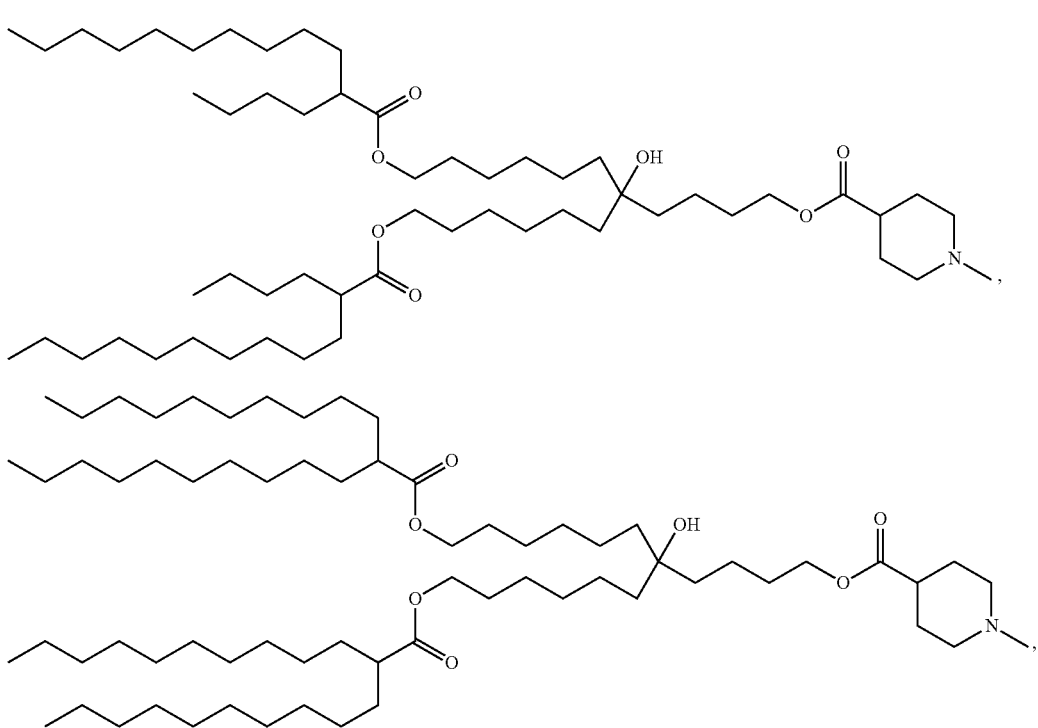
CL15F 12-4
CL15F 12-10
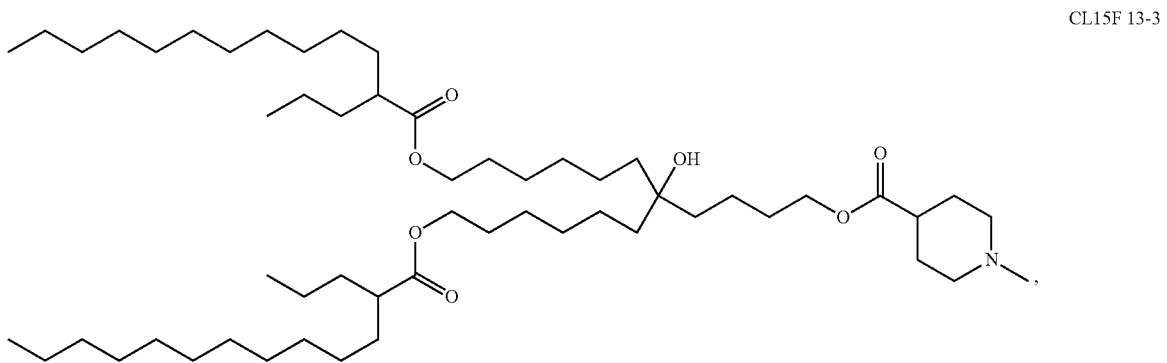
CL15F 13-3

-continued
CL15F 14-2
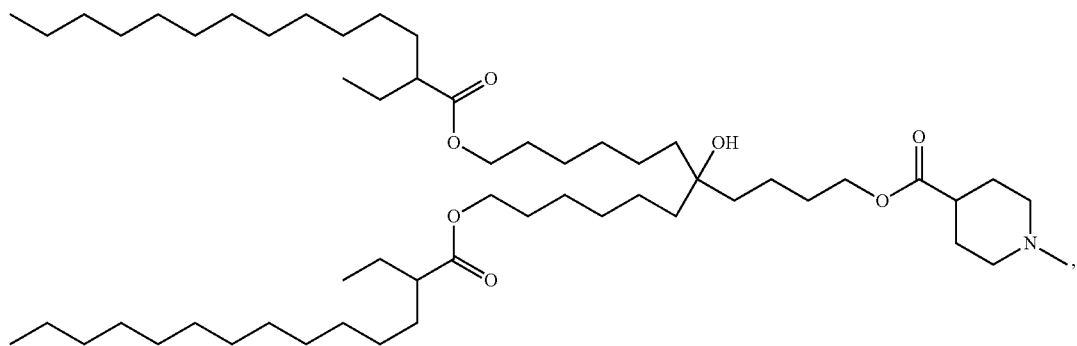
[Chem. 32-14]
CL15F 16-0
CL15F 16-1
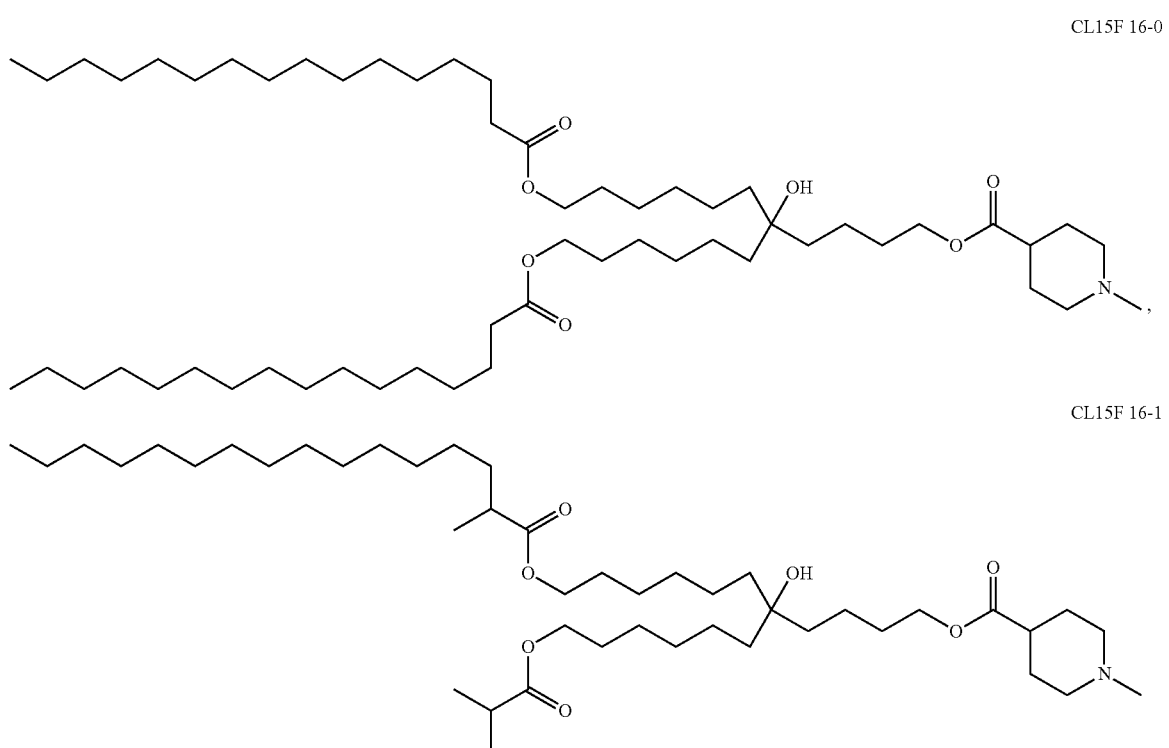
CL15G6
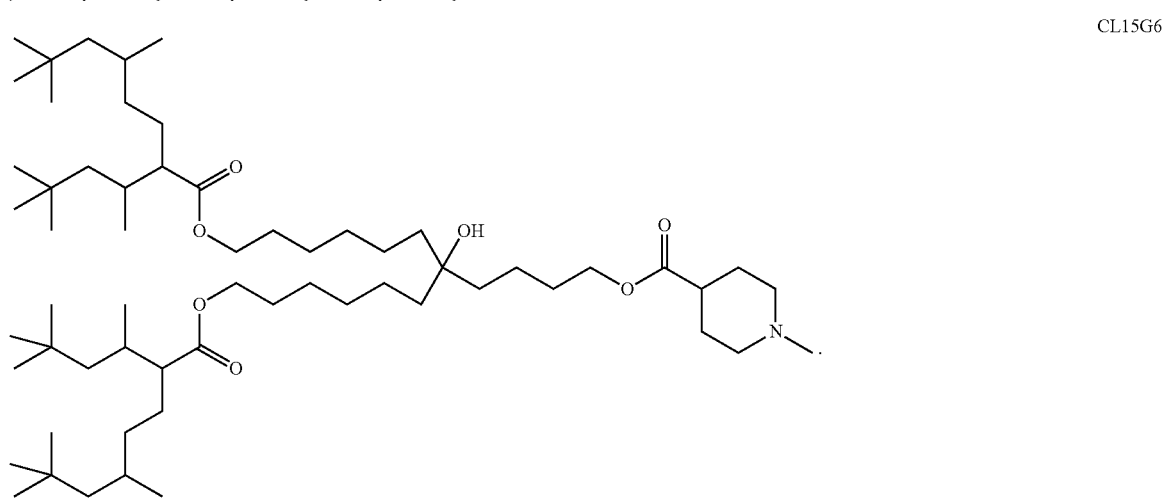

The present invention, in one aspect, relates to the pH-sensitive cationic lipids of the present invention.

The pKa of the pH-sensitive cationic lipids represented by general formula (I) is not particularly limited, but can be selected, for example, in the range of approximately between 4.0 and 9.0, preferably approximately between 4.5 and 8.5, and it is preferable to select each substituent type to give a pKa in these ranges.

The pH-sensitive cationic lipids represented by general formula (I) can be easily produced, for example, by the methods specifically shown in the examples herein. By referring to these production methods and appropriately selecting raw material compounds, reagents, and reaction conditions, one skilled in the art can easily produce any lipids included in the range of general formula (I).

The group represented by general formula (A) is a group with branched structure in which two hydrocarbon chains ($R^{11}$ and $R^{12}$) are linked to α-CO—O— group. That is, the pH-sensitive cationic lipids of the present invention have two branched-chain hydrocarbon chains ($R^1$ and $R^2$), which become hydrophobic scaffolds which are embedded in the lipid membranes of the lipid nanoparticles. The lipid nanoparticles according to the present invention have the characteristic of being highly selective to the liver or spleen by making pH-sensitive cationic lipids of the present invention with hydrophobic scaffolds consisting of branched-chain structures, as a constituent component of the lipids.

The pH-sensitive cationic lipids of the present invention which constitute the lipid nanoparticles of the present invention may have only one type or may have two or more types. When the pH-sensitive cationic lipids of the present invention which constitute the lipid nanoparticles of the present invention have two or more types, the amount of pH-sensitive cationic lipids of the present invention means the total amount of lipid molecules which corresponds to the pH-sensitive cationic lipids of the present invention in the lipid molecules constituting the lipid nanoparticles.

The higher the ratio of the pH-sensitive cationic lipids of the present invention in the lipid molecules constituting the lipid nanoparticles, the higher the uptake efficiency of the lipid nanoparticles into the target cells. Therefore, in the lipid nanoparticles according to the present invention, the ratio of the amount of pH-sensitive cationic lipids of the present invention to the amount of total lipids constituting the lipid nanoparticles ([amount of pH-sensitive cationic lipids of the present invention (mol)]/([amount of total lipids constituting the lipid nanoparticles (mol)])×100%) is preferably 20 mol % or more. On the other hand, when the ratio of pH-sensitive cationic lipids in the lipid molecules constituting the lipid nanoparticles is too large, it may be difficult to sufficiently reduce the particle size. Since the uptake efficiency of the lipid nanoparticles into target cells is sufficient and lipid nanoparticles with sufficiently small particle size can be obtained, the ratio of the amount of pH-sensitive cationic lipid of the present invention to the amount of total lipid constituting the lipid nanoparticles in the lipid nanoparticles according to the present invention is more preferably 30 mol % or more, further preferably 30-70 mol %, and more further preferably 40-60 mol %.

In the constituent lipids of the lipid nanoparticles according to the present invention, lipids which are generally used to form liposomes can generally be used as lipids other than the pH-sensitive cationic lipids of the present invention. Such lipids include, for example, phospholipid, sterol or sterol derivative, glycolipid, or saturated or unsaturated fatty acids, etc. These can be used in one type or a combination of two or more types.

The phospholipids can include glycerophospholipids such as phosphatidylserine, phosphatidylinositol, phosphatidylglycerol, phosphatidylethanolamine, phosphorylcholine, cardiolipin, plasmalogen, ceramide phosphorylglycerol phosphate, phosphatidic acid; sphingophospholipids such as sphingomyelin, ceramide phosphorylglycerol, ceramide phosphoryl ethanolamine; etc. In addition, phospholipids derived from natural products such as egg yolk lecithin and soy lecithin can also be used. Fatty acid residues in glycerophospholipids and sphingophospholipids are not particularly limited, but can include, for example, saturated or unsaturated fatty acid residues having carbon number of 12-24, saturated or unsaturated fatty acid residues having carbon number of 14-20 are preferable. Specifically, acyl groups derived from fatty acids such as lauric acid, myristic acid, palmitic acid, palmitoleic acid, stearic acid, oleic acid, linoleic acid, linolenic acid, arachidic acid, arachidonic acid, behenic acid, and lignoceric acid can be included. When these glycerolipids or sphingolipids have two or more fatty acid residues, all fatty acid residues may be the same group or may be different group from each other.

Sterols or sterol derivatives include, for example, animal-derived sterols such as cholesterol, cholesterol succinic acid, lanosterol, dihydrolanosterol, desmosterol, and dihydrocholesterol; plant-derived sterols (phytosterols) such as stigmasterol, sitosterol, β-sitosterol, campesterol, brassicasterol; microorganism-derived sterols such as zymosterol and ergosterol, etc. Glycolipids include, for example, glyceroglycolipids such as sulfoxyribosylglyceride, diglycosyl diglyceride, digalactosyl diglyceride, galactosyl diglyceride, glycosyl diglyceride; sphingoglycolipids such as galactosylcerebroside, lactosylcerebroside, ganglioside; etc. Saturated or unsaturated fatty acids include, for example, saturated or unsaturated fatty acids having carbon number of 12-20 such as palmitic acid, oleic acid, stearic acid, arachidonic acid, and myristic acid.

The constituent lipids of the lipid nanoparticles according to the present invention, in addition to the pH-sensitive cationic lipids of the present invention, preferably comprise neutral lipid, more preferably comprise phospholipid or sterol, further preferably comprise sterol, and more further preferably comprise cholesterol.

The lipid nanoparticles according to the present invention preferably comprise polyalkylene glycol-modified lipids as a lipid component. Polyalkylene glycol is a hydrophilic polymer, and, by constructing lipid nanoparticles using polyalkylene glycol-modified lipids as lipid membrane constituent lipids, surface of the lipid nanoparticles can be modified with polyalkylene glycol. Surface modification with polyalkylene glycol may be able to enhance the stability such as blood retention of lipid nanoparticles.

As polyalkylene glycol, for example, polyethylene glycol, polypropylene glycol, polytetramethylene glycol, polyhexamethylene glycol, etc. can be used. The molecular weight of polyalkylene glycol is, for example, approximately between 300 and 10,000, preferably approximately between 500 and 10,000, further preferably approximately between 1,000 and 5,000.

For example, stearylated polyethylene glycol (e.g., PEG-45 stearate (STR-PEG45), etc.) can be used for modification of lipids by polyethylene glycol. Additionally, polyethylene glycol derivatives such as N-[carbonyl-methoxypolyethylene glycol-2000]-1,2-dipalmitoyl-sn-glycero-3-phosphoethanolamine, n-[carbonyl-methoxypolyethylene glycol-5000]-1,2-dipalmitoyl-sn-glycero-3-phosphoethanolamine, N-[carbonyl-methoxypolyethylene glycol-750]-1,2-distearoyl-sn-glycero-3-phosphoethanolamine, N-[carbonyl-methoxypolyethylene glycol-2000]-1,2-distearoyl-sn-glycero-3-phosphoethanolamine, N-[carbonyl-methoxypolyethylene glycol-5000]-1,2-distearoyl-sn-glycero-3-phosphoethanolamine, 1,2-dimyristoyl-rac-glycero-3-methoxypolyethylene glycol-2000 (PEG-DMG), etc. can be used, but polyalkylene glycolated lipids are not limited to these.

The ratio of polyalkylene glycol-modified lipids to the total amount of lipids constituting the lipid nanoparticles according to the present invention is not particularly limited as long as the amount does not impair the liver or spleen selectivity by the pH-sensitive cationic lipids of the present invention, specifically, the liver-specific gene expression activity or spleen-specific gene expression activity when the lipid nanoparticles according to the present invention are used as gene carriers. For example, the ratio of polyalkylene glycol-modified lipids to the total amount of lipids constituting the lipid nanoparticles is preferably to be 0.5-3 mol %.

The lipid nanoparticles according to the present invention can be subjected to appropriate surface modification, etc. as necessary.

The lipid nanoparticles according to the present invention can be modified on the surface with hydrophilic polymers, etc. to enhance blood retention. Surface modification may be able to be achieved by using lipids modified with these modifying groups as constituent lipid of the lipid nanoparticles.

In the production of lipid nanoparticles according to the present invention, for example, glycophorin, ganglioside GM1, phosphatidylinositol, ganglioside GM3, glucuronic acid derivatives, glutamic acid derivatives, and polyglycerol phospholipid derivatives, etc. can be used as lipid derivatives to enhance blood retention. In addition, dextran, pullulan, ficoll, polyvinyl alcohol, styrene-maleic anhydride alternating copolymer, divinyl ether-maleic anhydride alternating copolymer, amylose, amylopectin, chitosan, mannan, cyclodextrin, pectin and carrageenan, etc., other than polyalkylene glycol, can be used for surface modification, as hydrophilic polymers to enhance blood retention.

In addition, in order to facilitate nuclear translocation of the lipid nanoparticles according to the present invention, for example, lipid nanoparticles can be surface-modified with oligosaccharide compounds with three or more saccharides. The type of oligosaccharide compounds with three or more saccharides is not particularly limited, but for example, oligosaccharide compounds in which approximately between 3 and 10 saccharide units are bound can be used, preferably oligosaccharide compounds in which approximately between 3 and 6 saccharide units are bound can be used. Among them, preferably, oligosaccharide compounds with trimer or hexamer of glucose can be used, and, further preferably, oligosaccharide compounds with trimer or tetramer of glucose can be used. More specifically, isomaltotriose, isopanose, maltotriose, maltotetraose, maltopentaose, or maltohexaose, etc. can be preferably used, among which maltotriose, maltotetraose, maltopentaose, or maltohexaose with α1-4 bound glucose are further preferable. Particularly preferred are maltotriose or maltotetraose, and most preferred is maltotriose. Surface modification amount of lipid nanoparticles by oligosaccharide compound is not particularly limited, but, for example, it is approximately between 1 and 30 mol %, preferably approximately between 2 and 20 mol %, and more preferably approximately between 5 and 10 mol % to the total lipid amount.

The method for surface modifying lipid nanoparticles with oligosaccharide compound is not particularly limited, but, for example, liposomes in which lipid nanoparticles are surface modified with monosaccharides such as galactose and mannose (WO 2007/102481) are known, so the method for the surface modification described in the publication can be employed. The surface modification method described in this publication can be adopted. All of the disclosures in above publication shall be included by reference as the disclosures in the specification of this application.

In addition, the lipid nanoparticles according to the present invention can also be imparted any one or more functions such as temperature change sensitive function, membrane permeability function, gene expression function, and pH-sensitive function. Adding these functions appropriately can improve the retention of lipid nanoparticles in the blood and allow the lipid nanoparticles to efficiently escape from endosomes after endocytosis in target cells, allowing encapsulated nucleic acids to be expressed more efficiently in the liver cells or the spleen cells.

The lipid nanoparticles according to the present invention may comprise one or more substances selected from the group consisting of anti-oxidizing agents such as tocopherol, propyl gallate, ascorbyl palmitate, or butylated hydroxytoluene, charged substances, and membrane polypeptides, etc. Charged substances which impart positive charges can include, for example, saturated or unsaturated aliphatic amines such as stearylamine and oleylamine, and charged substances which impart negative charges can include, for example, dicetyl phosphate, cholesteryl hemisuccinate, phosphatidylserine, phosphatidylinositol, phosphatidic acid, etc. Membrane polypeptides include, for example, membrane extrinsic polypeptide or membrane intrinsic polypeptide, etc. The compounded amount of these substances is not particularly limited and can be appropriately selected according to the purpose.

The size of the lipid nanoparticles according to the present invention is, since high delivery efficiency to the liver cells or the spleen cells in vivo can be easily achieved, preferably 400 nm or less in average particle diameter, more preferably 300 nm or less in average particle diameter, further preferably 200 nm or less in average particle diameter, and more further preferably 150 nm or less. In addition, the average particle size of the lipid nanoparticles means the number-average particle size measured by dynamic light scattering (DLS). Measurement by dynamic light scattering can be carried out by usual method using commercially available DLS equipment, etc.

The polydispersity index (PDI) of the lipid nanoparticles according to the present invention is approximately between 0.01 and 0.7, preferably approximately between 0.01 and 0.6, further preferably approximately between 0.03 and 0.3. The zeta potential at pH 7.4 can be in the range of −50 mV-5 mV, preferably −45 mV-5 mV.

The morphology of the lipid nanoparticles according to the present invention is not particularly limited, but can include, for example, unilamellar liposome, multilayer liposome, spherical micelle, or unshaped layered structure as morphology dispersed in aqueous solvent. The lipid nanoparticles according to the present invention are preferably unilamellar liposome, multilayer liposome.

The lipid nanoparticles according to the present invention preferably encapsulate components for the purpose of being delivered into the target cells inside the particle covered with lipid membranes. The components which the lipid nanoparticles according to the present invention encapsulate inside the particles are not limited as long as they are sized available to be encapsulated. The lipid nanoparticles according to the present invention can encapsulate any substance such as nucleic acids, saccharides, peptides, low molecular weight compounds, and metallic compounds.

The component encapsulated in the lipid nanoparticles according to the present invention is preferably nucleic acid. The nucleic acid may be DNA, or may be RNA, or also may be analogs or derivatives thereof (e.g., peptide nucleic acid (PNA) or phosphorothioate DNA, etc.). The nucleic acids to be encapsulated in the lipid nanoparticles according to the present invention may be single-stranded nucleic acids, may be double-stranded nucleic acids, also may be linear, or cyclic.

In one embodiment of the present invention, the lipid nanoparticles according to the present invention comprise pH-sensitive cationic lipids of the present invention, their stereoisomers or mixtures of the stereoisomers, and nucleic acids.

The nucleic acids to be encapsulated in the lipid nanoparticles according to the present invention preferably comprise a foreign gene to be expressed in the target cell, more preferably they are nucleic acids which functions to express the foreign gene in the cell by being taken up into the cell. The foreign genes may be genes originally comprised in the genomic DNA of the target cells (preferably liver and spleen cells), or they may be genes not comprised in the genomic DNA. Such nucleic acids include gene expression vectors comprising nucleic acids consisting of base sequences encoding genes of interest to be expressed. The gene expression vectors may be present as extrachromosomal genes in the introduced cell, or it may be taken up into the genomic DNA by homologous recombination.

The gene expression vectors to be encapsulated in the lipid nanoparticles according to the present invention are not particularly limited, and vectors generally used in gene therapy, etc. can be used. The gene expression vectors to be encapsulated in the lipid nanoparticles according to the present invention are preferably nucleic acid vectors such as plasmid vectors. The plasmid vectors may remain in a circular form or may be encapsulated in the lipid nanoparticles according to the present invention in a in a pre-cut linear form. The gene expression vectors can be designed by usual method using commonly used molecular biological tools based on the base sequence information of the gene of the target to be expressed, and can be produced by various known methods.

The nucleic acids to be encapsulated in the lipid nanoparticles according to the present invention are also preferably functional nucleic acids which control the expression of target genes present in the target cells. The functional nucleic acids include antisense oligonucleotide, antisense DNA, antisense RNA, siRNA, microRNA, and mRNA, etc. Also, they may be plasmid DNA (pDNA) becoming siRNA expression vectors which express siRNA in the cells. The siRNA expression vectors can be prepared from commercially available siRNA expression vectors, also which may be appropriately modified. The nucleic acids to be encapsulated in the lipid nanoparticles according to the present invention are preferably mRNA or pDNA, because of its high selectivity especially to the liver or spleen.

In one embodiment of the present invention, the lipid nanoparticles according to the present invention comprise pH-sensitive cationic lipids of the present invention, their stereoisomers or mixtures of the stereoisomers, and nucleic acids, wherein the nucleic acid is mRNA or plasmid DNA.

The production method of lipid nanoparticles according to the present invention is not particularly limited, and any method available to those skilled in the art can be adopted. As an example, they can be produced by, after forming a lipid film by dissolving all lipid components in an organic solvent such as chloroform and then drying under reduced pressure by an evaporator or spray drying by a spray dryer, adding components to be encapsulated into the lipid nanoparticles (for example, aqueous solvent comprising nucleic acids, etc.) to dried above mixture, then emulsifying by emulsifier such as homogenizer, ultrasonic emulsifier, or high pressure jet spray emulsifier, etc. They can also be produced by a well-known method for producing liposomes, for example, reversed-phase evaporation method. If the size of the lipid nanoparticles is to be controlled, extrusion (extruding filtration) may be carried out under high pressure using membrane filter with uniform pore size, etc.

The composition of the aqueous solvents (dispersion media) is not particularly limited, but can include, for example, buffer solutions such as phosphate buffer solution, citrate buffer solution, and phosphate buffered physiological saline, physiological saline, and culture media for cell culture. These aqueous solvents (dispersion media) can stably disperse lipid nanoparticles, but they may furthermore be added saccharides (aqueous solution) such as: monosaccharides such as glucose, galactose, mannose, fructose, inositol, ribose, and xylose; disaccharides such as lactose, sucrose, cellobiose, trehalose, and maltose; trisaccharides such as raffinose and meredinose; polysaccharides such as cyclodextrin; sugar alcohols such as erythritol, xylitol, sorbitol, mannitol, maltitol; and polyalcohols (aqueous solution) such as glycerin, diglycerin, polyglycerin, propylene glycol, polypropylene glycol, ethylene glycol, diethylene glycol, triethylene glycol, polyethylene glycol, ethylene glycol monoalkyl ether, diethylene glycol monoalkyl ether, 1,3-butylene glycol. In order to stably store the lipid nanoparticles dispersed in this aqueous solvent for a long time, it is desirable to eliminate electrolytes in the aqueous solvent as much as possible in terms of physical stability such as aggregation control, etc. In addition, in terms of chemical stability of the lipids, it is desirable to set the pH of the aqueous solvent between weak acidity and near neutral (approximately between pH 3.0 and 8.0) and/or to remove dissolved oxygen by nitrogen bubbling, etc.

The lipid nanoparticles according to the present invention also can be produced by alcohol dilution method using flow channel. The method is a method for producing lipid nanoparticles by introducing a solution in which lipid components are dissolved in alcohol solvent and a solution in which water-soluble components to be included in lipid nanoparticles are dissolved in aqueous solvent from different flow channels and merging them together. By using microchannel with built-in three-dimensional micromixer which can achieve instantaneous mixing of two liquids, lipid nanoparticles with a diameter of about 30 nm can be produced at high reproducibility (Non-Patent Literature 11). As a flow channel used for production, it is preferable to use a flow channel structure with simple two-dimensional structure in which baffles (obstacle plates) with a fixed width relative to the channel width are arranged alternately on both sides in the micro-sized flow channel where raw material solution flows as described in Patent Literature 2, because it is possible to form nano-sized lipid particle formation system with high particle size control. Aforementioned solvents can be used for aqueous solvents used in the alcohol dilution method.

When obtained aqueous dispersions of lipid nanoparticles is lyophilized or spray dried, the stability may be able to be improved using, for example, saccharide (aqueous solution) such as: monosaccharides such as glucose, galactose, mannose, fructose, inositol, ribose, and xylose; disaccharides such as lactose, sucrose, cellobiose, trehalose, and maltose; trisaccharides such as raffinose and meredinose; polysaccharides such as cyclodextrin; sugar alcohols such as erythritol, xylitol, sorbitol, mannitol, maltitol. In addition, when freezing above aqueous dispersions, the stability may be able to be improved using, for example, aforementioned saccharides and polyalcohols (aqueous solutions) such as glycerin, diglycerin, polyglycerin, propylene glycol, polypropylene glycol, ethylene glycol, diethylene glycol, triethylene glycol, polyethylene glycol, ethylene glycol monoalkyl ether, diethylene glycol monoalkyl ether, 1,3-butylene glycol.

In one embodiment of the present invention, the lipid nanoparticles according to the present invention are lyophilized.

The present invention, in one aspect, relates to lipid nanoparticle formulations comprising the pH-sensitive cationic lipids of the present invention, their stereoisomers or mixtures of the stereoisomers. The present invention, in another aspect, relates to lipid nanoparticle formulations comprising (i) sterols or sterol derivatives, (ii) polyalkylene glycol-modified lipids, (iii) nucleic acids, (iv) buffers, (v) disaccharides, and (vi) the pH-sensitive cationic lipids of the present invention, their stereoisomers or mixtures of the stereoisomers.

Sterols or sterol derivatives include, for example, cholesterol and sitosterol, etc., preferably cholesterol.

Polyalkylene glycol-modified lipids include, for example, polyethylene glycol-modified lipids and polypropylene glycol-modified lipids, etc., preferably polyethylene glycol-modified lipids.

Nucleic acids include, for example, siRNA, pDNA, and mRNA, etc., preferably mRNA.

Buffers include, for example, HEPES buffers, phosphate buffers, and tris buffers, etc.

Disaccharides include, for example, lactose, sucrose, cellobiose, trehalose, and maltose, etc., preferably sucrose. The concentration of the disaccharides in the lipid nanoparticle formulations is, for example, 1%-20% by weight, preferably 5%-15% by weight. The molar ratio of sterols or sterol derivatives to pH-sensitive cationic lipids, their stereoisomers or mixtures of the stereoisomers is, for example, 68.5:20-28.5:60.

In the present invention, lipid nanoparticle formulations may be prepared by suspending lipid nanoparticles with aqueous solution.

The pH of the lipid nanoparticle formulations of the present invention is, for example, 5.5-8.5 at 25° C., preferably 6.8-8.0.

The present invention, in one aspect, relates to a resuspended formulations in which the lipid nanoparticle formulations are resuspended by addition of water or aqueous solution.

The lipid nanoparticles of the present invention have excellent stability. The lipid nanoparticles of the invention are, for example, stable for 1 week or more when kept at −80° C., and/or stable for 1 week, 2 weeks, 3 weeks, 4 weeks, 5 weeks or more when kept at 5° C., and/or stable for 1 week, 2 weeks, 3 weeks, 4 weeks, 5 weeks or more when kept at 25° C., and/or stable for 3 days, 1 week, 2 weeks, 3 weeks, 4 weeks, 5 weeks or more when kept at 40° C.

For the quality of lipid nanoparticles, lipid nanoparticles may be defined as lipid nanoparticles remaining in good quality, for example, when they are allowed to stand at a predetermined temperature and kept for a predetermined period of time, then the average particle size, PDI, and nucleic acid encapsulation rate are compared with the values immediately after the preparation, if following three conditions are satisfied: the average particle size is maintained within +/−20 nm based on the date of lipid nanoparticle preparation, PDI remains high uniformity with a value of 0.2 or less, and the nucleic acid encapsulation rate is also maintained at 80% or more.

For example, it may be evaluated according to the following criteria:
 Good: particle size is within +/−20 nm of the particle size immediately after preparation, and PDI is 0.2 or less, and encapsulation rate is 80% or more;
 No good: particle size is greater than +/−20 nm of the particle size immediately after preparation, or encapsulation rate is less than 80%.

For example, lipid nanoparticles which remain in good quality with standing at 5° C. for more than one week or those which remain in good quality with standing at 40° C. for more than one week may be evaluated as lipid nanoparticles with excellent stability.

When the lipid nanoparticles according to the present invention in which gene expression vectors are encapsulated are administered to an individual animal, the gene expression vectors encapsulated in the lipid nanoparticles are expressed more selectively in the liver or spleen more than in other organs. Similarly, when the lipid nanoparticles according to the present invention in which siRNA expression vectors are encapsulated are administered to an individual animal, the siRNA expression vectors encapsulated in the lipid nanoparticles are expressed more selectively in the liver or spleen more than in other organs, and expression of the genes targeted by the expression vectors is restrained. For example, when lipid nanoparticles according to the present invention in which foreign genes of interest to be expressed in liver or spleen cells are administered to a test animal, the foreign gene can be expressed in the liver or spleen of the test animal.

This highly selective gene expression activity for the liver or spleen allows the lipid nanoparticles according to the present invention to function as gene expression carriers which target the liver or spleen. The foreign genes are expressed in the liver or spleen of the test animal by administering to the test animal after the foreign genes of interest to be expressed in liver cells or spleen cells are encapsulated into the lipid nanoparticles according to the present invention. Therefore, the lipid nanoparticles according to the present invention are useful as active components in pharmaceutical compositions used for gene therapy, especially they are useful as active components in pharmaceutical compositions used for gene therapy in which the liver or spleen is the target organ.

The present invention, in one aspect, relates to pharmaceutical compositions for liver delivery comprising the pH-sensitive cationic lipids of the present invention, their stereoisomers or mixtures of the stereoisomers.

The present invention, in another aspect, relates to pharmaceutical compositions for spleen delivery comprising the pH-sensitive cationic lipids of the present invention, their stereoisomers or mixtures of the stereoisomers.

The animal to which the lipid nanoparticles according to the present invention are administered is not particularly limited and may be human or may be an animal other than human. Non-human animals include mammals such as cattle, pig, horse, sheep, goat, monkey, dog, cat, rabbit, mouse, rat, hamster, and guinea pig, and birds such as chicken, quail, and duck, etc.

The pH-sensitive cationic lipids of the present invention, their stereoisomers or mixtures of the stereoisomers are synthesized by condensing the basic structure, 7-(4-(dipropylamino)butyl)tridecane-1,7,13-triol or 5,11-dihydroxy5-(6-hydroxyhexyl)undecyl 1-methylpiperidine-4-carboxylate, with branched fatty acids.

The present invention, in one aspect, relates to a production method of the pH-sensitive cationic lipids of the present invention, their stereoisomers or mixtures of the stereoisomers. In one embodiment of the present invention, the production method of the pH-sensitive cationic lipids of the present invention comprises at least a process (process A) of reacting alkylcarboxylic acid with alkyl halide in the presence of organolithium, dimethylpropylene urea (DMPU) and tetrahydrofuran (THF) to obtain branched fatty acid.

In the method, the alkylcarboxylic acids are, for example, octanoic acid, decanoic acid, tridecanoic acid, hexanoic acid, heptanoic acid, octanoic acid, nonanoic acid, decanoic acid, undecanoic acid, dodecanoic acid, tridecanoic acid, tetradecanoic acid, pentadecanoic acid and hexadecenoic acid.

In the method, alkyl halides are, for example, 1-iodohexane, 1-iodobutane, 2-iodohexane, 1-bromohexane, iodomethane, iodoethane, 1-iodopropane, 1-iodobutane, 1-iodopentane, 1-iodohexane, 1-iodoheptane, 1-iodooctane, 1-iodononane, 1-iodododecane, 1-iodoundecane, 1-iodododecane, 1-iodotridecane, 1-iodotetradecane, 1-iodopentadecane and 1-iodohexadecane.

In the method, the organolithium is, for example, lithium diisopropylamidolithium (LDA), t-butyllithium, and n-butyllithium.

In one embodiment of the present invention, the production method of the pH-sensitive cationic lipids of the present invention comprises at least a process (process B) of hydrolysis treatment and heat treatment of a reaction solution obtained by reacting malonic ester with alkyl halide in the presence of base, to obtain branched fatty acid.

In the method, the malonic esters are, for example, dimethyl malonate, diethyl malonate, diisopropyl malonate, and preferably dimethyl malonate.

In the method, the alkyl halide is, for example, iodoalkyl, and the iodoalkyl is, for example, 1-iodohexane, 1-iodopropane, 2-iodohexane.

In the method, the base is, for example, sodium hydride, calcium hydride, sodium ethoxide and bis(trismethylsilyl)amido lithium, preferably sodium hydride.

In the method, the hydrolysis treatment is carried out using, for example, any of sodium hydroxide, calcium hydroxide, and lithium hydroxide.

In the method, the heat treatment is carried out simultaneously with and/or after the hydrolysis treatment, preferably at 120° C.-170° C., more preferably at 150° C.-170° C.

The method further comprises a process of purifying branched fatty acid by reversed phase chromatography.

In branched fatty acids used in the synthesis of the following compounds:

[Chem. 33]

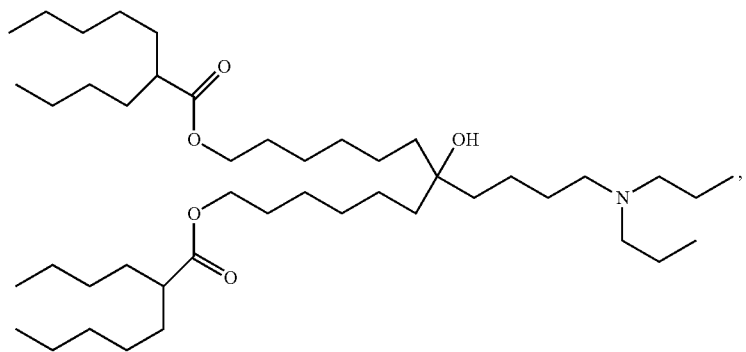

CL4F 7-4

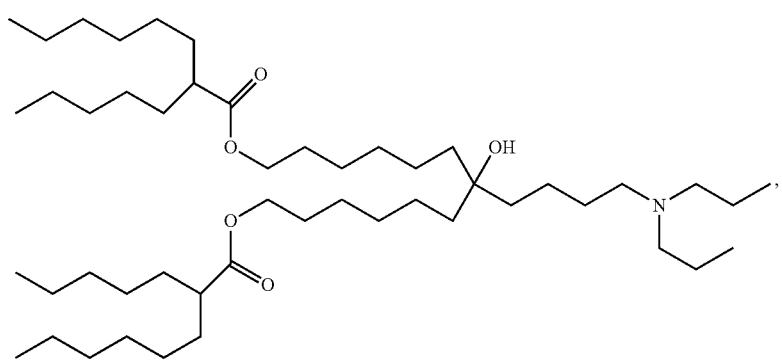

CL4F 8-5

CL4F 9-6
CL4F 10-7
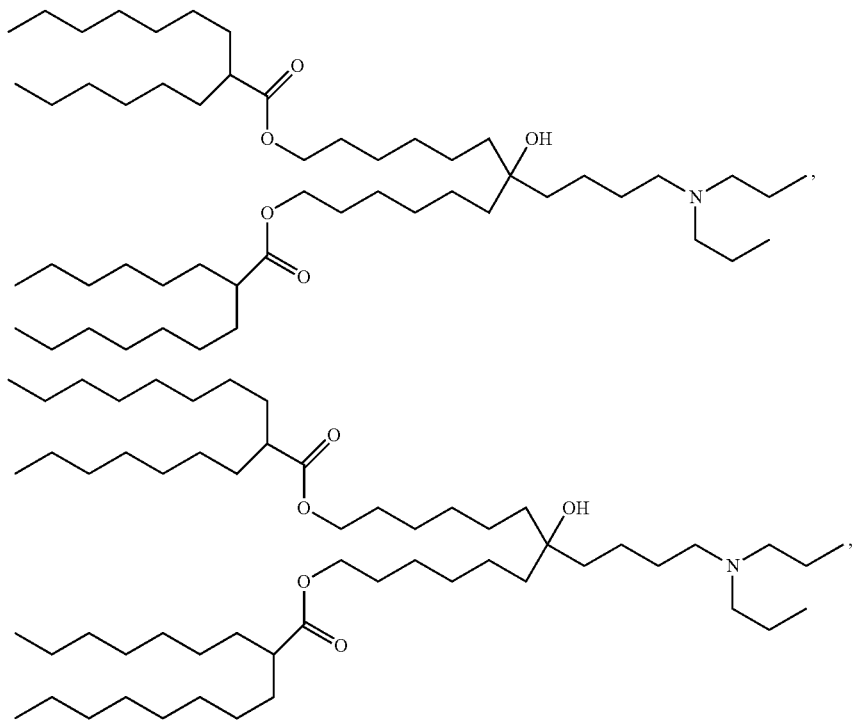
branched fatty acids are obtained in better yield by process A than process B.
In branched fatty acids used in the synthesis of the following compounds:
[Chem. 34-1]
CL4F 6-2
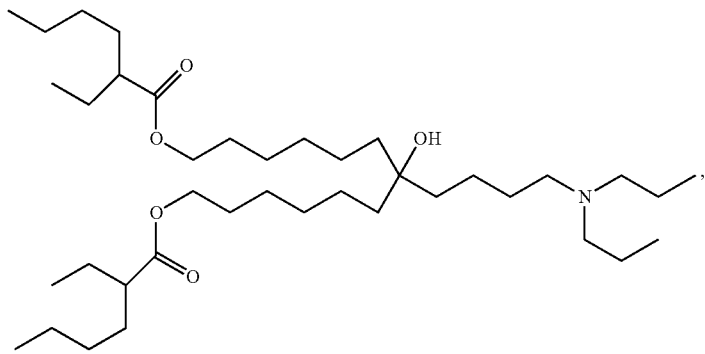
CL4F 6-4
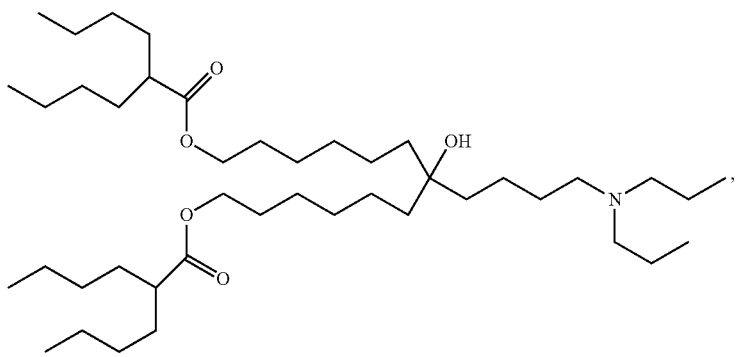

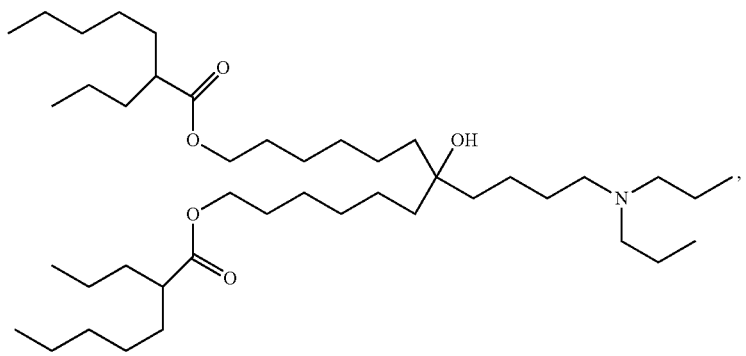
CL4F 7-3
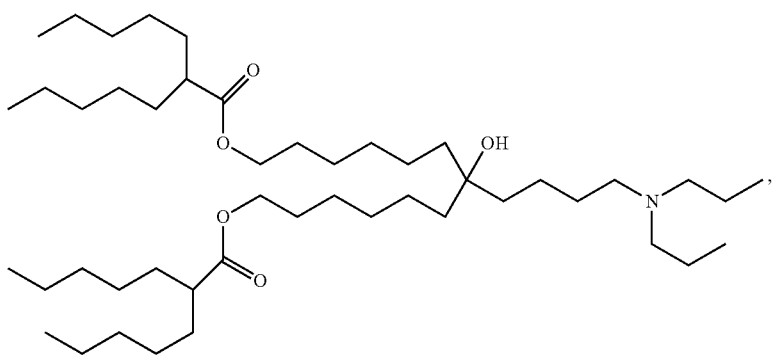
CL4F 7-5
[Chem. 34-2]
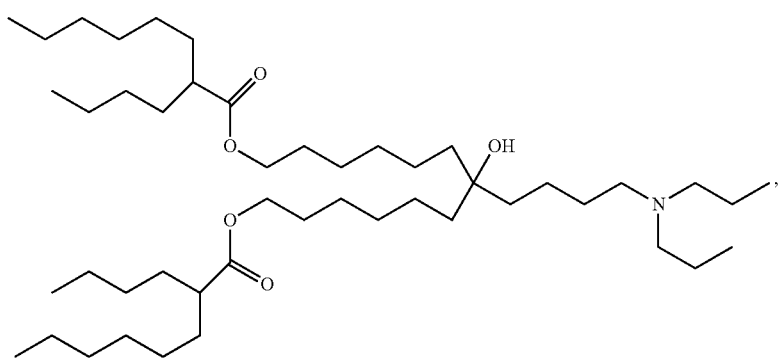
CL4F 8-4
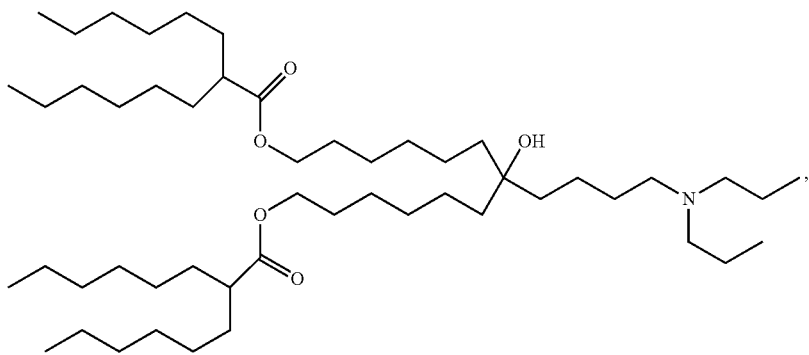
CL4F 8-6

-continued
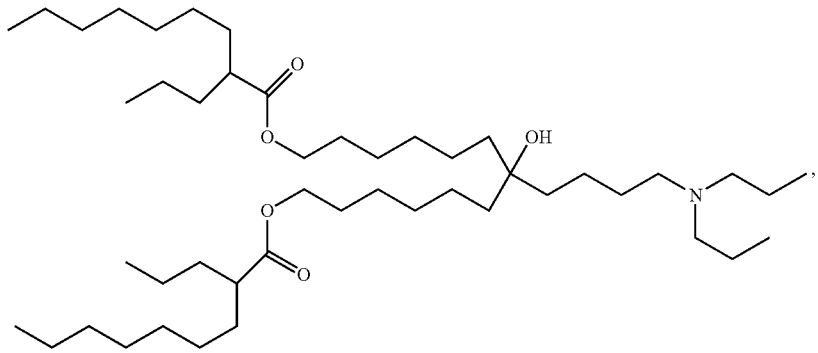
CL4F 9-3
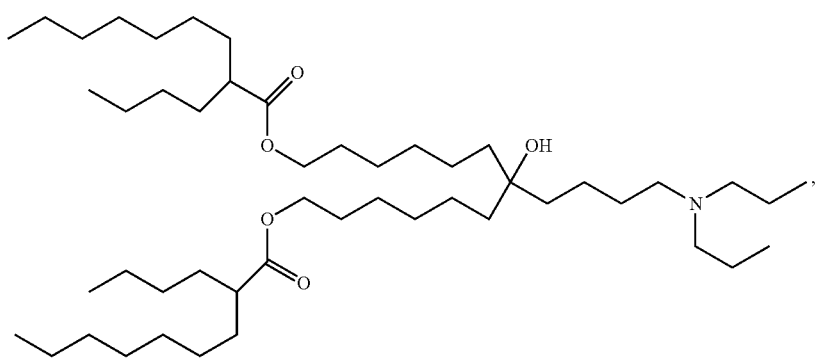
CL4F 9-4
[Chem. 34-3]
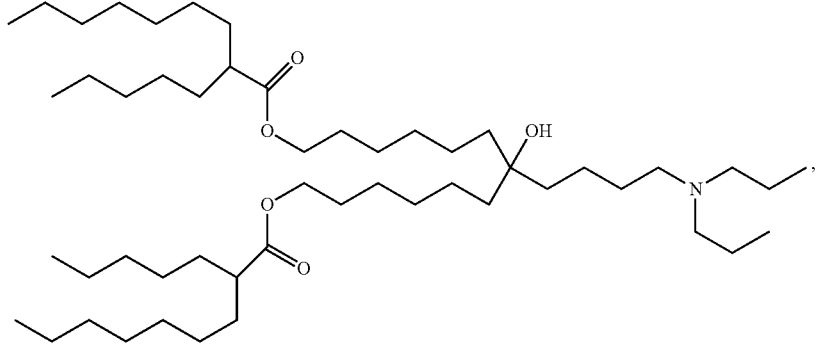
CL4F 9-5
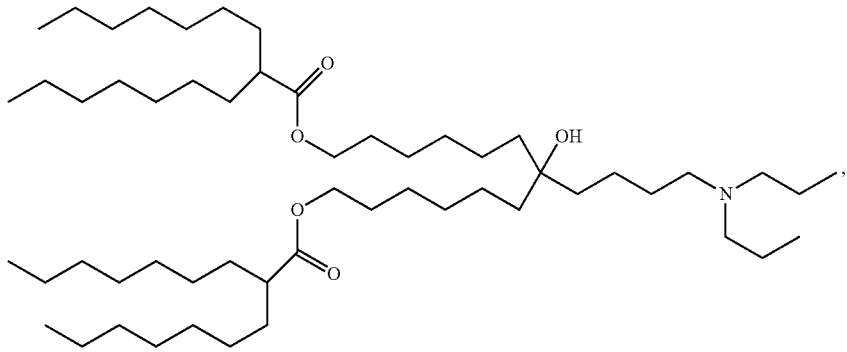
CL4F 9-7

-continued
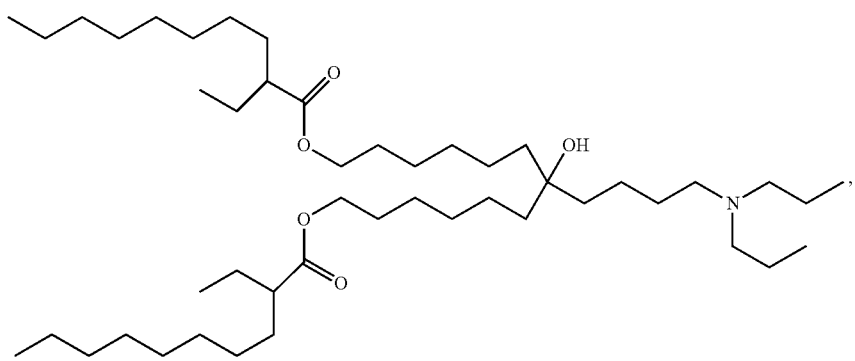
CL4F 10-2
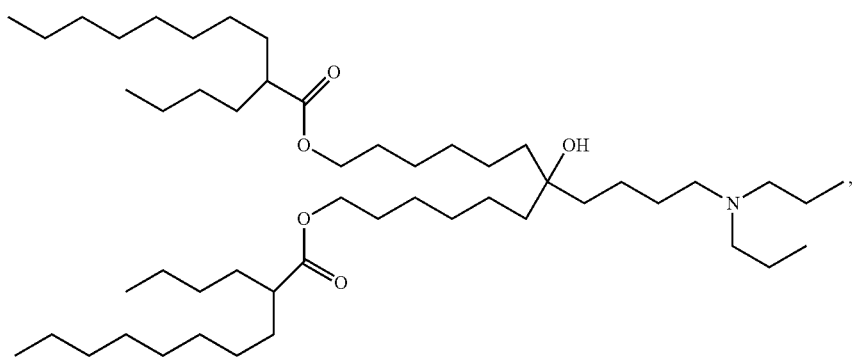
CL4F 10-4
[Chem. 34-4]
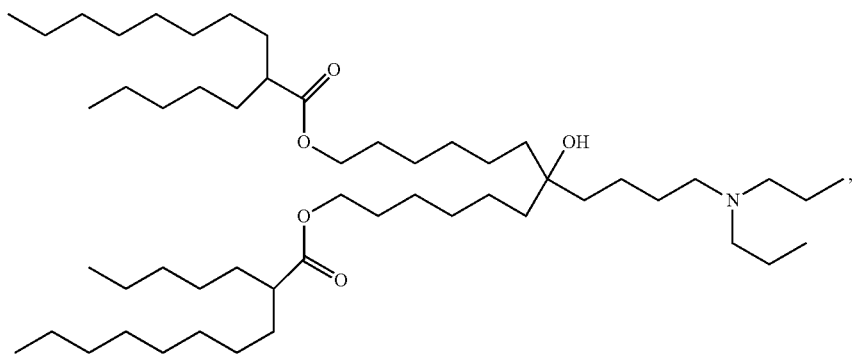
CL4F 10-5
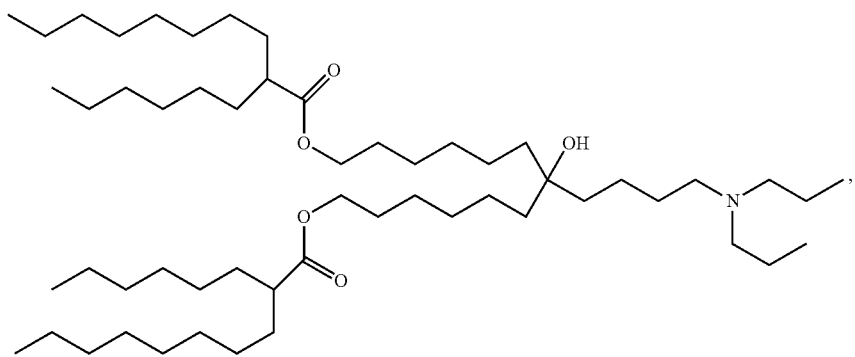
CL4F6

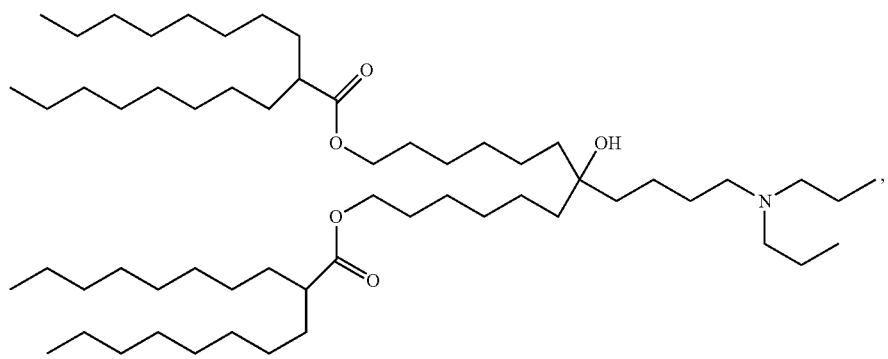
CL4F 10-8
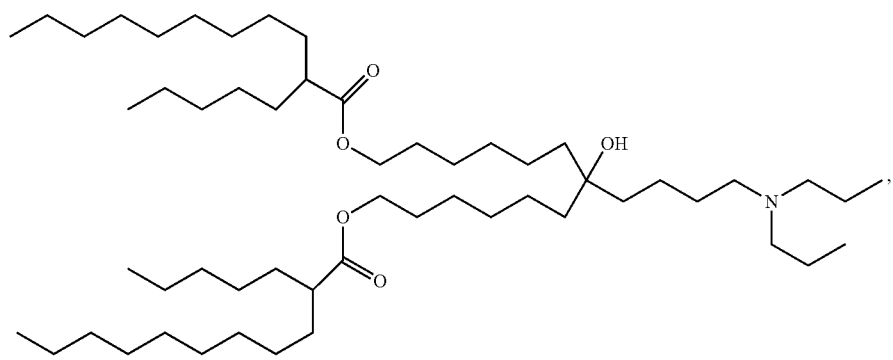
CL4F 11-5
[Chem. 34-5]
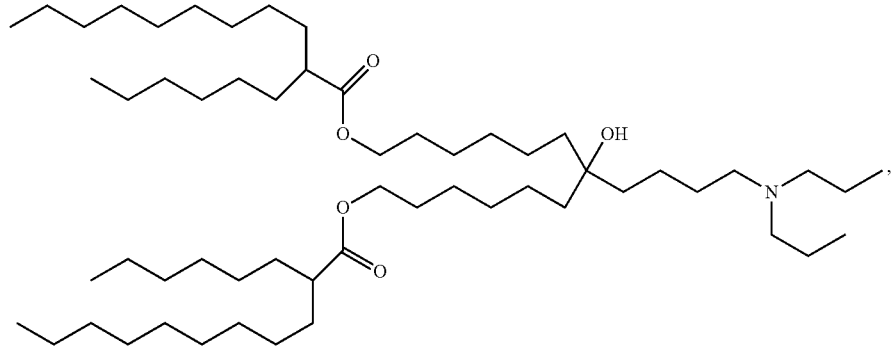
CL4F 11-6
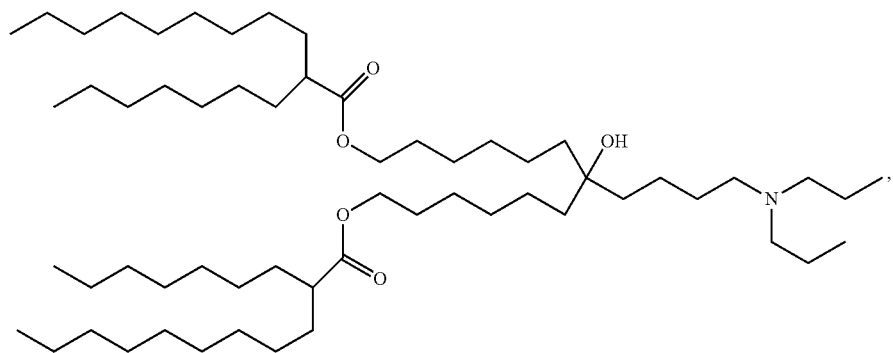
CL4F 11-7

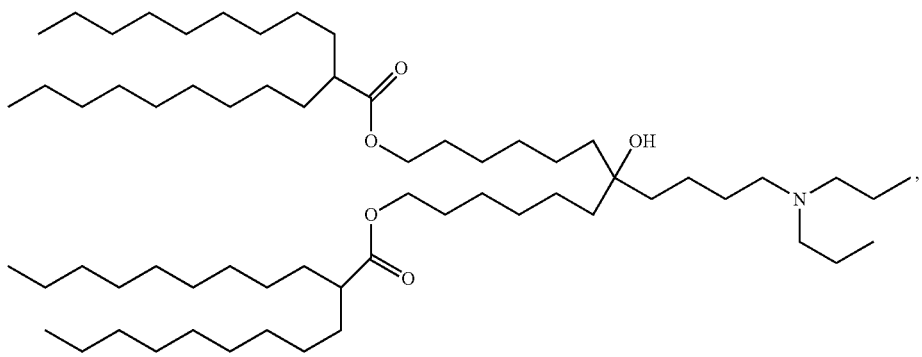
CL4F 11-9
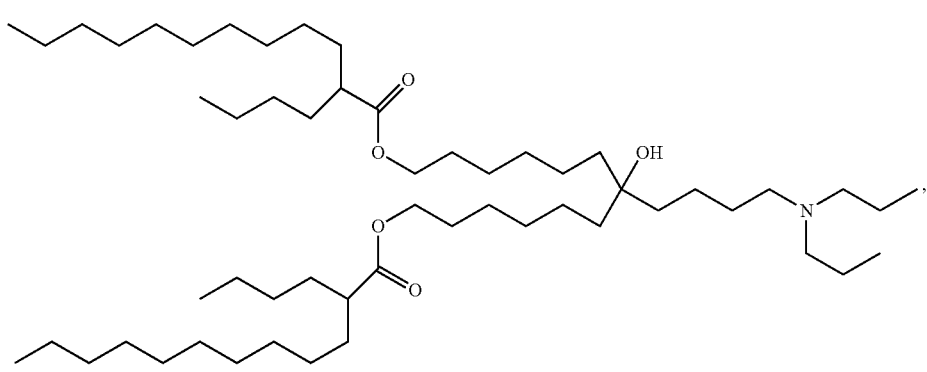
CL4F 12-4
[Chem. 34-6]
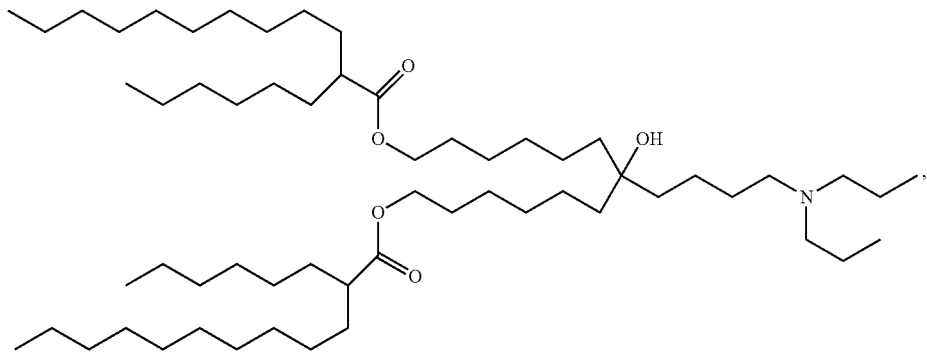
CL4F 12-6
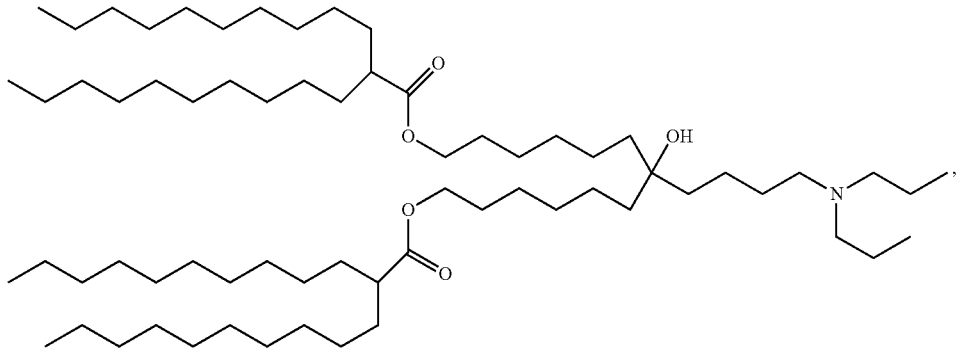
CL4F 12-10

-continued
CL4F 13-3
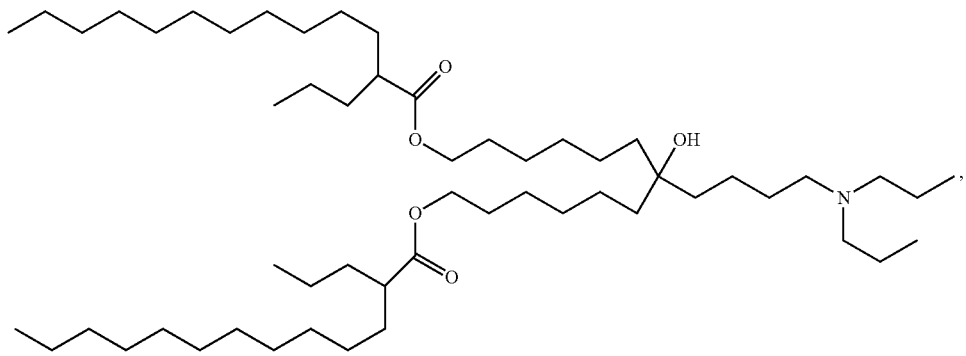
CL4F 14-2
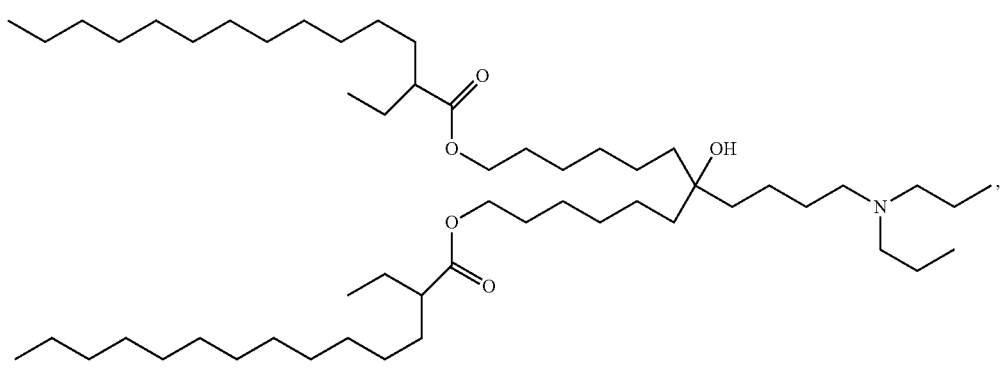
[Chem. 34-7]
CL4F 16-1
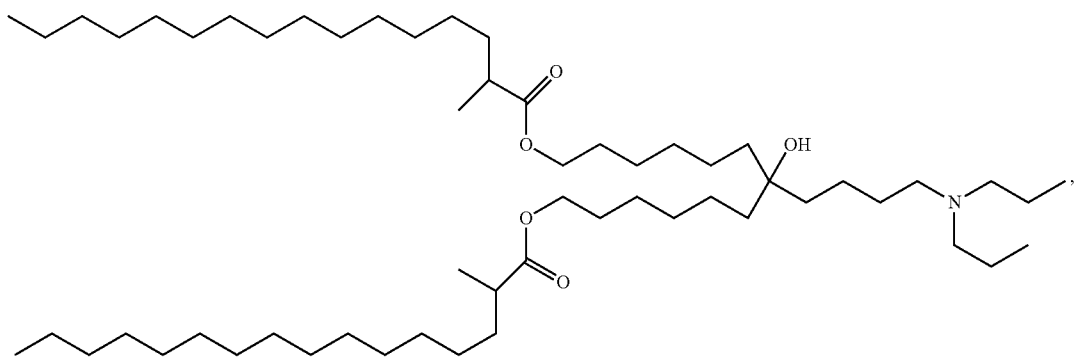
CL15F 6-2
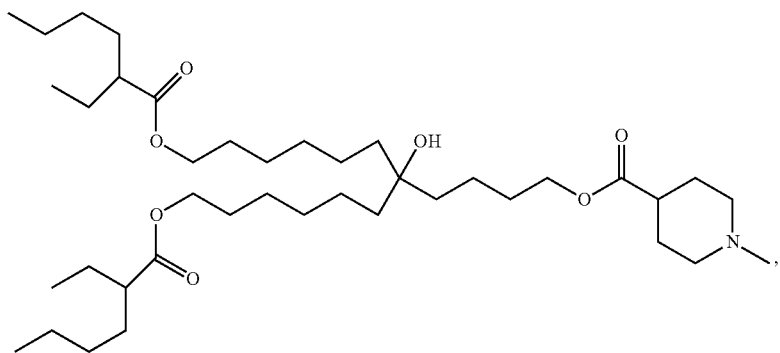

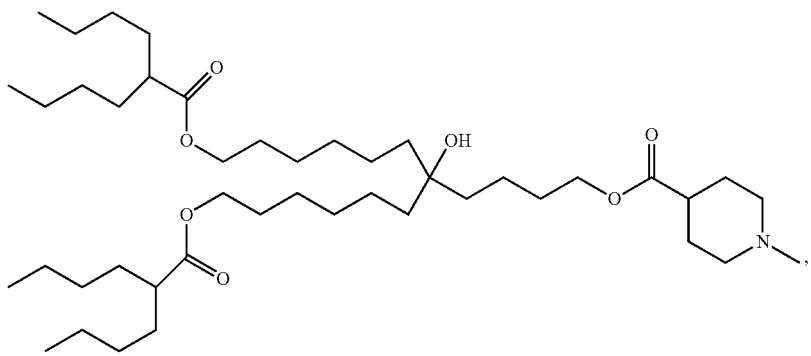
CL15F 6-4
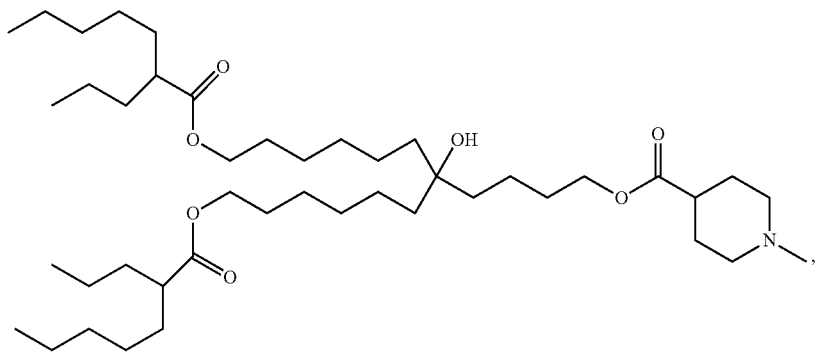
CL15F 7-3
[Chem. 34-8]
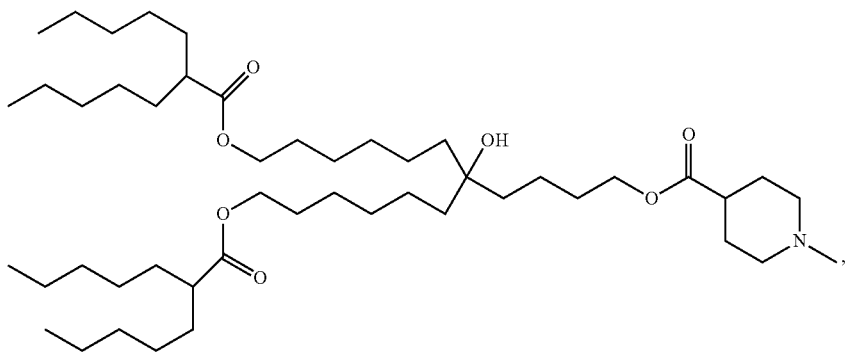
CL15F 7-5
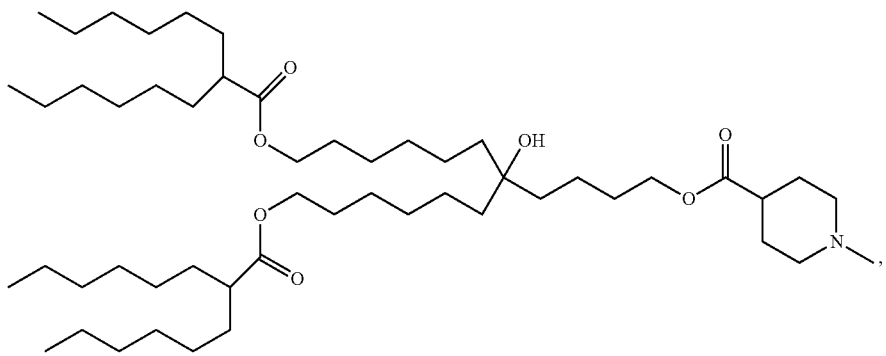
CL15F 8-6

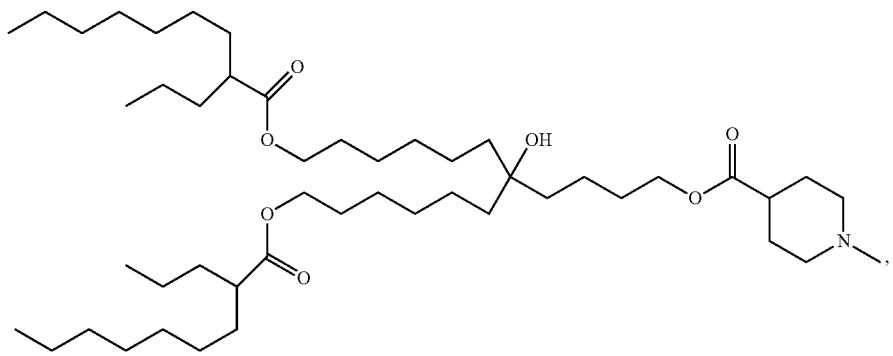
CL15F 9-3
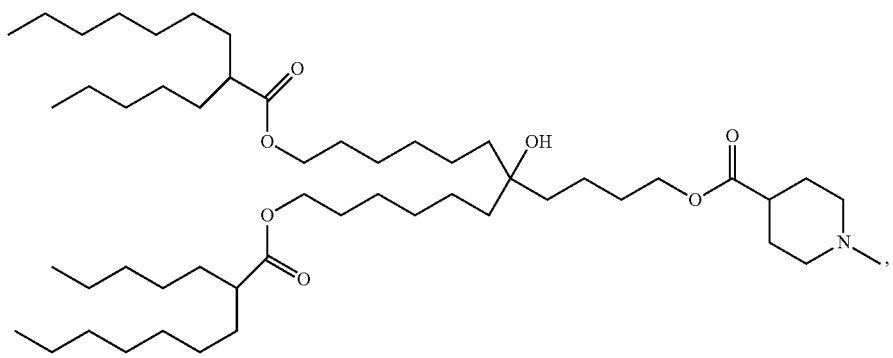
CL15F 9-5
[Chem. 34-9]
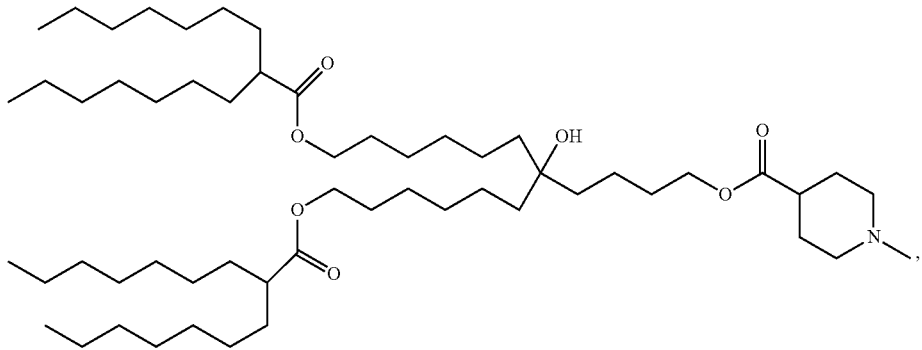
CL15F 9-7
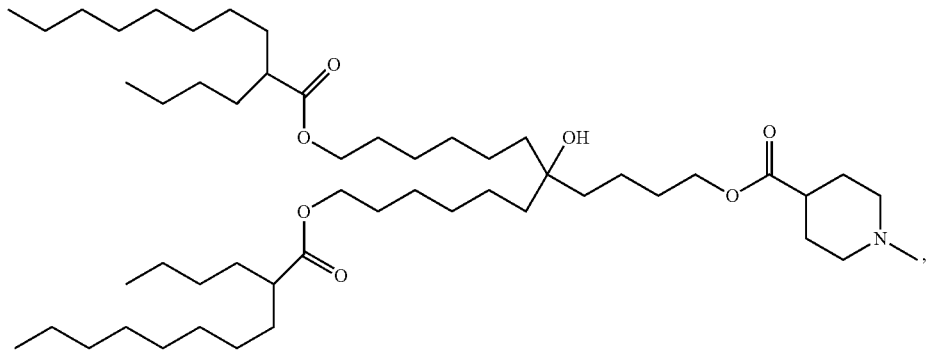
CL15F 10-4

-continued
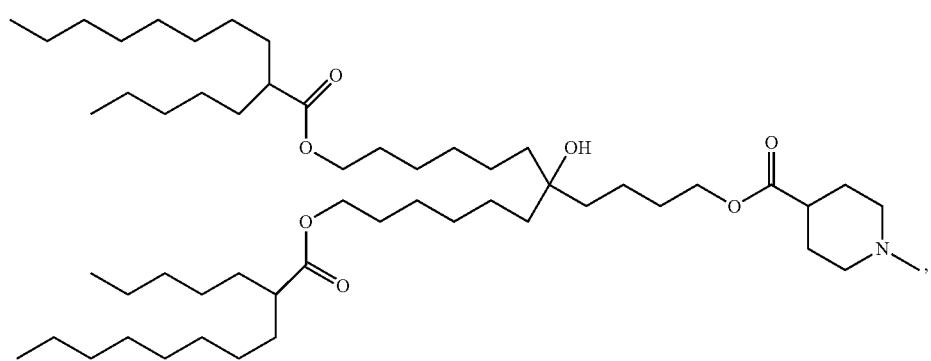
CL15F 10-5
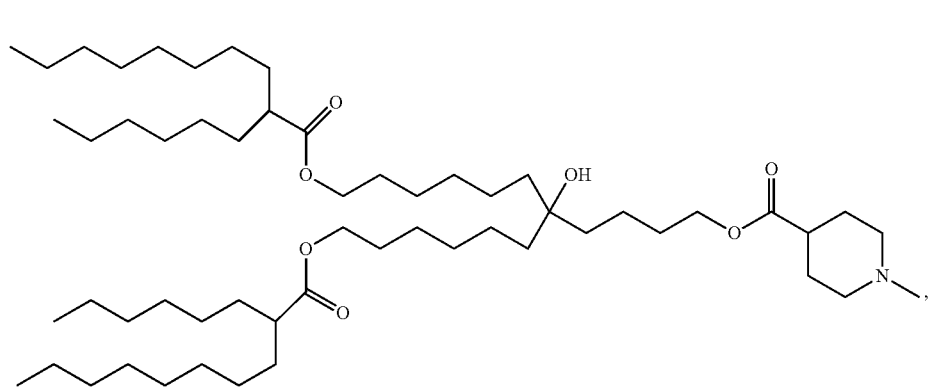
CL15F6
[Chem. 34-10]
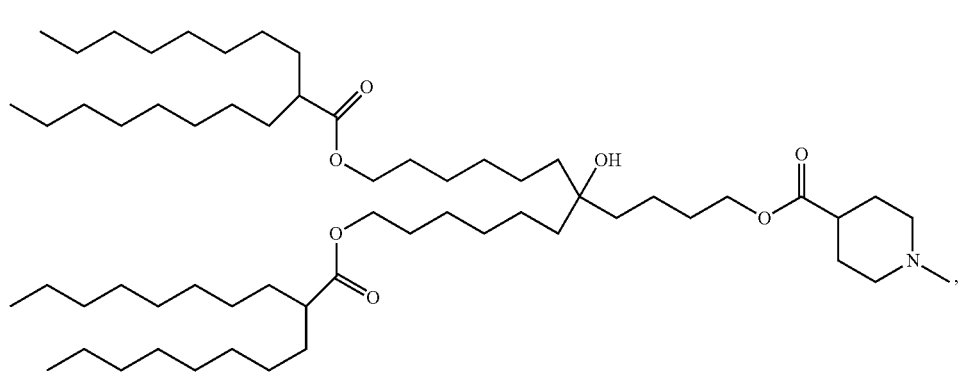
CL15F 10-8
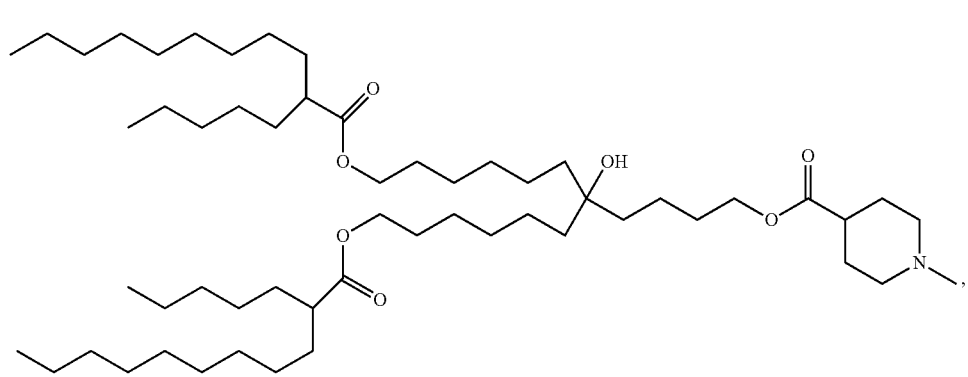
CL15F 11-5

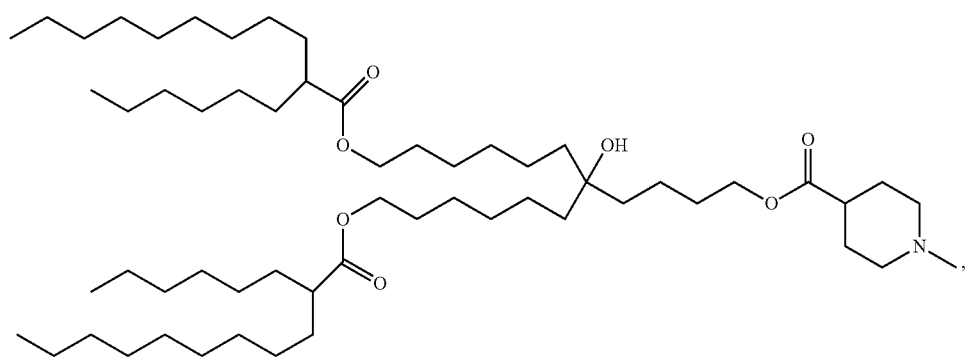
CL15F 11-6
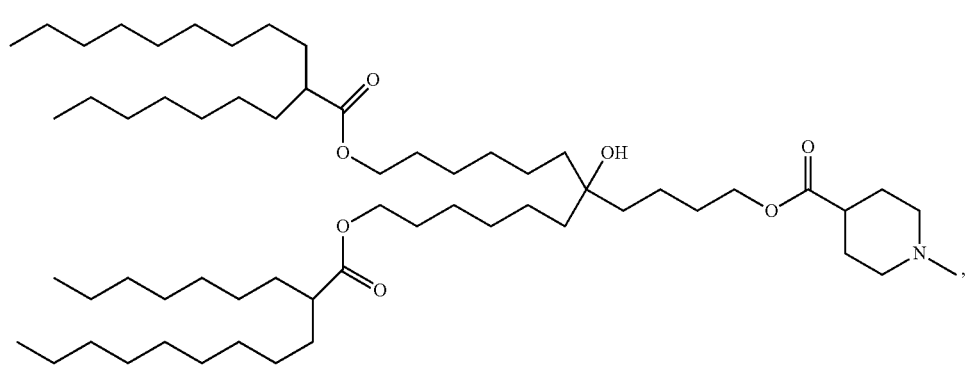
CL15F 11-7
[Chem. 34-11]
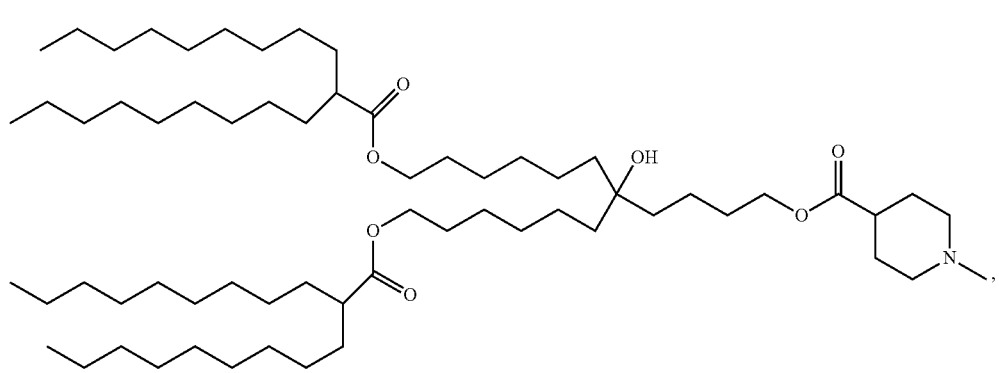
CL15F 11-9
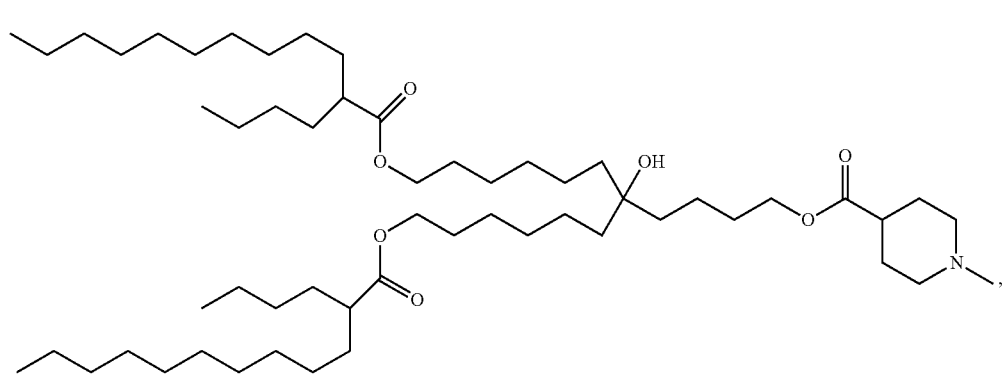
CL15F 12-4

-continued
CL15F 12-10
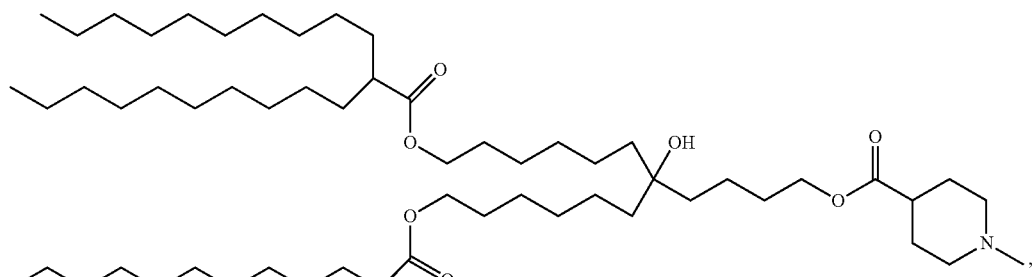
CL15F 13-3
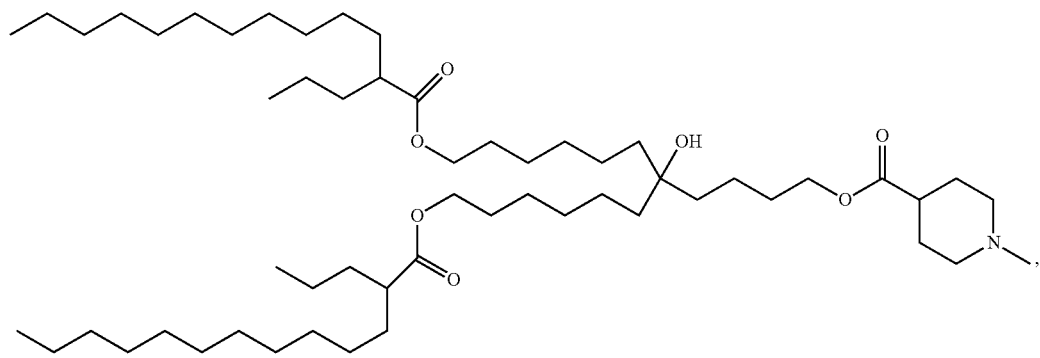
[Chem. 34-12]
CL15F 14-2
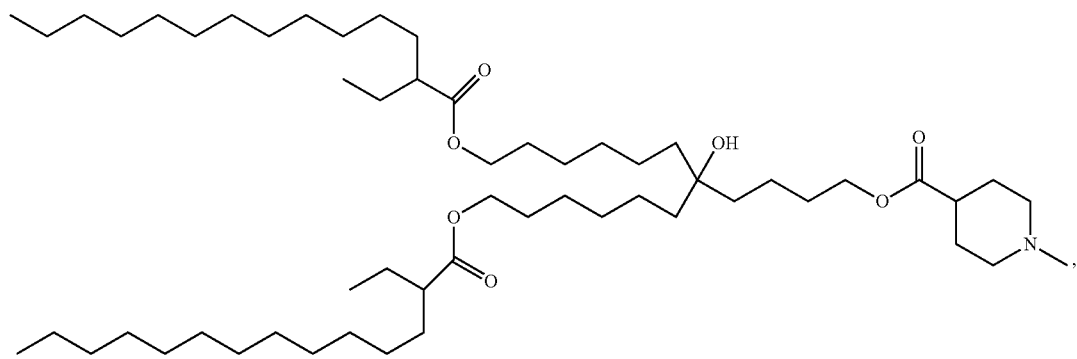
CL15F 16-1
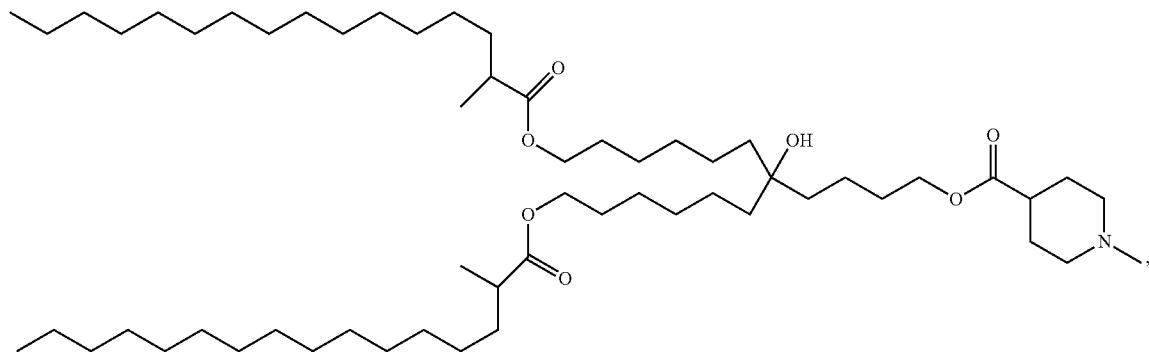

branched fatty acids are obtained in better yield by process B than process A.

In one embodiment of the present invention, the branched fatty acids used in the synthesis of the pH-sensitive cationic lipids of the present invention may be obtained, for example, with the method described in U.S. Pat. No. 2,756,756.

EXAMPLES

The present invention is described in more detail below with examples, but the present invention is not limited to below examples.

I. Synthesis of CL4F6, CL4G6, CL15F6 and CL15G6

[Synthesis Example 1] Synthesis of CL4F6

7-(4-(dipropylamino)butyl)tridecane-1,7,13-triol (1.0 mmol) which was synthesized by the method described in Patent Literature 1 was dissolved in 5 mL dichloromethane, then 2-hexyldecanoic acid (2.20 mmol), DMAP (N,N-dimethyl-4-aminopyridine) (0.20 mmol) and EDCl (1-ethyl-3-(3-dimethylaminopropyl) carbodiimide (3.0 mmol) were added and reacted overnight at room temperature. After the solvent was distilled using a rotary evaporator, suspended with ethyl acetate and insoluble substance was removed by filtration. The filtrate was washed and separated with 0.5N sodium hydroxide solution and saturated saline. The organic layer was dehydrated by adding anhydrous sodium sulfate. After filtration of above, the solvent was distilled using a rotary evaporator to obtain crude product. The crude product was purified by silica gel chromatography [eluting solvent; dichloromethane:methanol (continuous gradient)] to obtain 7-(4-(dipropylamino)butyl)-7-hydroxytridecane-1,13-diyl bis(2-hexyldecanoate) (CL4F6).

[Synthesis Example 2] Synthesis of CL4G6

7-(4-(dipropylamino)butyl)-7-hydroxytridecan-1,13-diyl bis(2-(4.4-dimethylpentan-2-yl)-5,7,7-trimethyloctanoate) (CL4G6) was obtained as in Synthesis Example 1 except that 2-(4,4-dimethylpentan-2-yl)-5,7,7-trimethyloctanoic acid was used instead of 2-hexyldecanoic acid.

[Synthesis Example 3] Synthesis of CL15F6

5,11-dihydroxy5-(6-hydroxyhexyl)undecyl 1-methylpiperidine-4-carboxylate (1.00 mmol) which was synthesized with the method described in Patent Literature 1 was dissolved in 10 mL of dichloromethane. Then 2-hexyldecanoic acid (2.20 mmol), DMAP (0.20 mmol) and EDCl (3.0 mmol) were added and reacted overnight at room temperature. After the solvent was distilled using a rotary evaporator, suspended with ethyl acetate and insoluble substance was removed by filtration. The filtrate was washed with 0.5N sodium hydroxide solution and saturated saline. The organic layer was dehydrated by adding anhydrous sodium sulfate. After filtration of above, the solvent was distilled using a rotary evaporator to obtain crude product. The crude product was purified by silica gel chromatography [eluting solvent; dichloromethane:methanol (continuous gradient)] to obtain 7-hydroxy-7-(4-((1-methylpiperidine)-4-carbonyl)oxy) butyl)tridecan-1,13-diyl bis(2-hexyldecanoate) (CL15F6).

[Synthesis Example 4] Synthesis of CL15G6

7-hydroxy-7-(4-((1-methylpiperidine-4-carbonyl)oxy) butyl)tridecan-1,13-diyl bis(2-(4,4-dimethylpentan-2-yl)-5,7,7-trimethyloctanoate (CL15G6) was obtained as in Synthesis Example 3 except that 2-(4.4-dimethylpentan-2-yl)-5,7,7-trimethyloctanoic acid was used instead of 2-hexyldecanoic acid.

II. Production and Evaluation of Lipid Nanoparticles Using CL4F6, CL4G6, CL15F6, and CL15G6

Preparation of Lipid Nanoparticles

In subsequent experiments, unless otherwise noted, lipid nanoparticles were prepared by the alcohol dilution method using flow channel. Microfluidic device with built-in mixer "iLiNP" (manufactured by Lilac pharma Inc.) was used as the flow channel.

Specifically, first, ethanol solution adjusted to a lipid concentration of 8 mM and acetate buffer solution adjusted to a siRNA concentration of 71.1 µg/mL (25 mM, pH 4.0) were fed into the microchannel at 0.375 mL/minute and 1.125 mL/minute respectively, to collect lipid nanoparticle solution which was excreted from the channel. The lipid nanoparticle solution was inserted into a dialysis membrane (MWCO 12,000-14,000) and dialysis was carried out with 20 mm MES buffer solution (pH 6.0) as outer aqueous phase at 4° C. for more than 2 hours. After that, the outer aqueous phase was replaced with PBS (−) (pH 7.4) and further dialyzed at 4° C. for more than 2 hours, after which the lipid nanoparticle solution was collected from the dialysis membrane.

<Constituent Lipids of Lipid Nanoparticles>

CL4F6, CL4G6, CL15F6, and CL15G6 synthesized in Synthesis Examples 1-4 were used.

7-(4-(dipropylamino)butyl)-7-hydroxytridecane-1,13-diyl dioleate (CL4H6) and 7-hydroxy-7-(4-((1-methylpiperidine-4-carbonyl)oxy)butyl)tridecane-1,13-diyl dioleate (CL15H6) synthesized by the method described in Patent Literature 1 were used.

[Chem. 35-1]
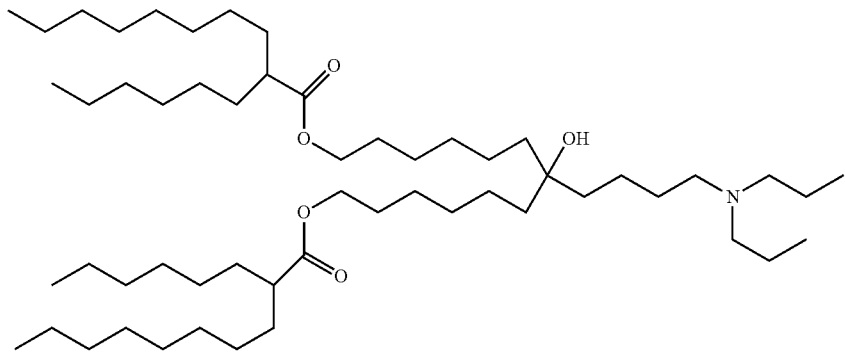
CL4F6
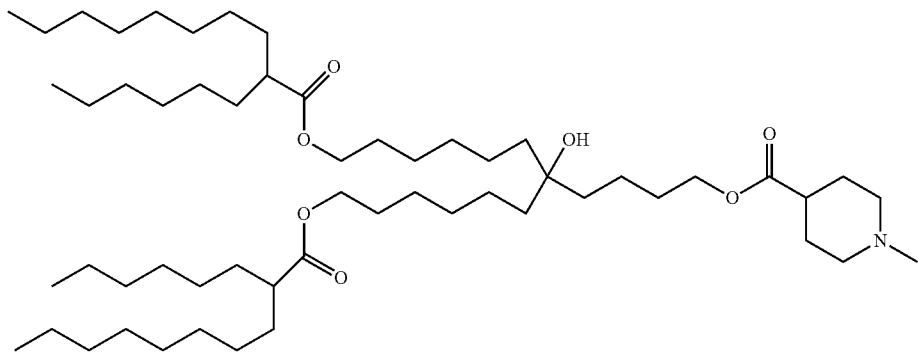
CL15F6
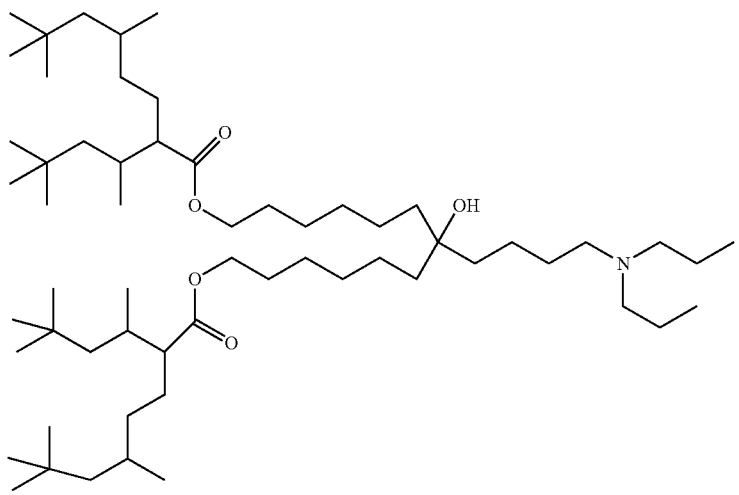
CL4G6

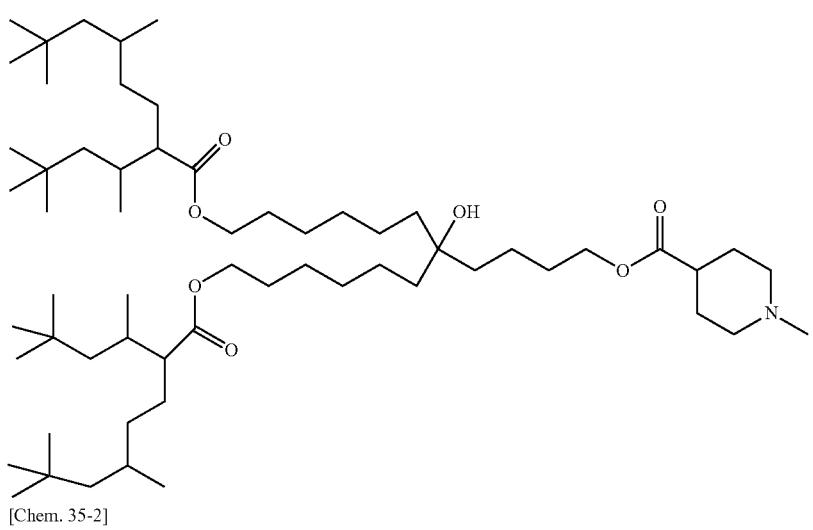

CL15G6

[Chem. 35-2]

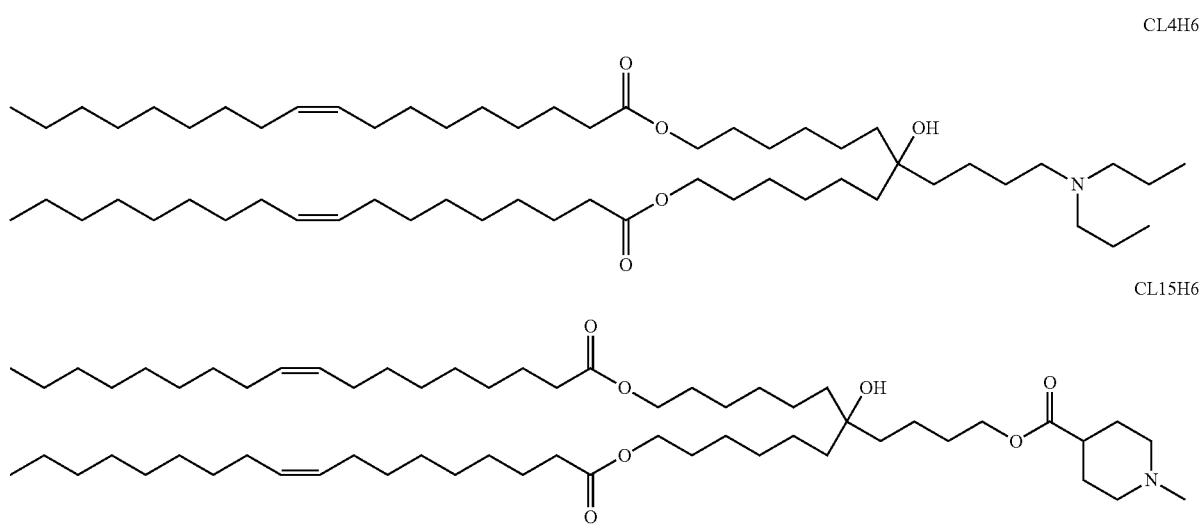

CL4H6

CL15H6

Furthermore, cholesterol (chol) and polyethylene glycol 2000-modified dimyristoyl glycerol (PEG-DMG) were used as neutral lipids.

<Measurement of Average Particle Size, PDI (Polydispersity Index) and Zeta Potential of Lipid Nanoparticles>

The average particle size (number-average value) and PDI in PBS(−) and zeta potential in 10 mM HEPES buffer solution (pH 7.4) of lipid nanoparticles were measured using "Zetasizer Nano ZS ZEN3600", an analyzer utilizing dynamic light scattering (manufactured by Malvern).

<Measurement of pKa of Lipid Nanoparticles>

The pKa of lipid nanoparticles was measured using p-toluidino-2-naphthalenesulfonic acid (TNS). First, TNS (final concentration: 0.75 µM) and lipid nanoparticles (final concentration: 30 mM) were mixed in buffer solution adjusted to each pH. The fluorescence intensity of the prepared mixture was measured with a microplate reader. The highest and lowest values among the measured values were taken as 100% and 0% charge rates respectively, and the pH indicating 50% charge rate was calculated as pKa.

<Nucleic Acid Encapsulation Rate of Lipid Nanoparticles>

The encapsulation rates of siRNA, mRNA, and pDNA of lipid nanoparticles were measured using Ribogreen (manufactured by life technologies).

Example 1

Lipid nanoparticles loaded with siRNA to F7 (F7siRNA-loaded lipid nanoparticles) were produced by alcohol dilution method using pH-sensitive cationic lipids, cholesterol, and PEG-DMG in a molar ratio of 50:50:1 composition. CL4F6, CL4G6, CL4H6, CL15F6, CL15G6, or CL15H6 were used as pH-sensitive cationic lipids. Lipid nanoparticles produced with pH-sensitive cationic lipid X are hereinafter referred to as X-LNP. For example, lipid nanoparticles produced using pH-sensitive cationic lipids CL4F6, CL4G6, CL4H6, CL15F6, CL15G6, or CL15H6 are called CL4F6-LNP, CL4G6-LNP, CL4H6-LNP, CL15F-LNP, CL15G6-LNP, or CL15H6-LNP respectively. The base sequence of siRNA to F7 is shown in Table 1.

In the table, capital letters show natural-type RNA (only T is natural-type DNA), small letters show 2'-fluoro modifications, and * shows phosphorothioate bond respectively.

TABLE 1

| siRNA to F7 | Base sequence | SEQ ID NO: |
|---|---|---|
| Sense strand | GGAucAucucAAGucuuAC*T | 1 |
| Antisense strand | GuAAGAcuuGAGAuGAuccT*T | 2 |

Each prepared lipid nanoparticle had an average particle size of 80-120 nm and an siRNA encapsulation rate of more than 90%. The results of measuring pKa of each lipid nanoparticle are shown in FIG. 1(a) and FIG. 1(b). As shown in FIG. 1, the lipid nanoparticles produced using CL4F6, CL4G6, CL15F6, or CL15G6 whose scaffold structure is branched-chain type showed lower pKa than those produced using CL4H6 or CL15H6 whose scaffold structure is straight-chain type.

Then, each prepared F7siRNA-loaded lipid nanoparticles were administered to ICR mice (4 weeks old, female) and in vivo F7 knockdown activity was examined.

Specifically, each F7siRNA-loaded lipid nanoparticles were intravenously administered to ICR mice at 0.003-0.1 mg siRNA/kg, and plasma F7 enzyme activity at 24 hours later was measured. Relative plasma F7 enzyme activity (%) of mice administered each F7siRNA-loaded lipid nanoparticles was calculated using plasma F7 enzyme activity of untreated mice as 100%. The results are shown in FIG. 2(A) and FIG. 2(B). FIG. 2(B) is the results of intravenous administration of each F7siRNA-loaded lipid nanoparticle at 0.1 mg siRNA/kg. As shown in FIG. 2, the lipid nanoparticles produced using CL4F6, CL4G6, CL15F6, or CL15G6 whose scaffold structure is branched-chain type showed equivalent in vivo F7 knockdown activity compared to those produced using CL4H6 or CL15H6 whose scaffold structure is straight-chain type. From these results, it has been evident that lipid nanoparticles consisting of CL4F6, CL4G6, CL15F6, and CL15G6 as constituent lipids are useful as siRNA delivery carriers.

Example 2

Lipid nanoparticles loaded with mRNA instead of siRNA were prepared and in vivo gene expression activity was examined. mRNA which was prepared by carrying out in vitro transcription reaction to pDNA encoding NanoLuc (registered trademark) luciferase (Nluc) (manufactured by Promega) (NlucmRNA) was used.

First, lipid nanoparticles loaded with NlucmRNA (NlucmRNA-loaded lipid nanoparticles) were produced by alcohol dilution method using pH-sensitive cationic lipids, DSPC (1,2-distearoyl-sn-glycero-3-phosphocholine), cholesterol, and PEG-DMG in a molar ratio of 60:10:40:1 composition. CL4F6, CL4G6, CL4H6, CL15F6, CL15G6, or CL15H6 were used as pH-sensitive cationic lipids.

TABLE 2

| CL | ζ-Average (nm) | PdI | ζ-potential (mV) | % mRNA encapsulation |
|---|---|---|---|---|
| CL4F6 | 127.2 | 0.157 | −3.72 | 90 |
| CL4G6 | 109.6 | 0.13 | −1.76 | 91.7 |
| CL4H6 | 113.4 | 0.139 | −1.23 | 77.6 |
| CL15F6 | 92.52 | 0.162 | −2.16 | 90.3 |
| CL15G6 | 71.65 | 0.201 | 0.419 | 91.8 |
| CL15H6 | 94.34 | 0.495 | 0.123 | 90.5 |

Average particle size, PDI, zeta potential, and mRNA encapsulation rate of the prepared lipid nanoparticles were examined. The results of the measurements are shown in FIG. 2. In Table 2, "CL" means cationic lipid. The average particle sizes calculated by dynamic light scattering were all 70-130 nm (Table 2). Among the prepared lipid nanoparticles, particles with a large PDI and low uniformity were formed only in CL15H6-LNP (Table 2). mRNA encapsulation rate was less than 80% in CL4H6-LNP, while LNP comprising other cationic lipids all showed 90% or more.

Then, each prepared NlucmRNA-loaded lipid nanoparticles were administered to ICR mice (4 weeks old, female) and in vivo gene expression activity was examined. Specifically, each NlucmRNA-loaded lipid nanoparticles were intravenously administered to ICR mice at 0.04 mg mRNA/kg, and Nluc activity in the liver and spleen at 24 hours later was measured. Nluc activity was measured by luminometer (RLU) and corrected with the protein amount quantified by BCA method.

The results of measuring of the Nluc activity (RLU/mg protein) in the liver and spleen of mice administered each NlucmRNA-loaded lipid nanoparticles are shown in FIG. 3. FIG. 3(A) is the result of measurement of Nluc activity in the liver and FIG. 3(B) is the result of measurement of Nluc activity in the spleen. Furthermore, the liver selectivity of gene expression was calculated by dividing the gene expression activity in the liver by the gene expression activity in the spleen. FIG. 3(c) is a figure showing the calculation results of [Nluc activity in the liver]/[Nluc activity in the spleen] of mice administered each NlucmRNA-loaded lipid nanoparticle. As shown in FIG. 3(A), in the liver, the mice administered CL4F6-LNP, CL15F6-LNP, and CL15G6-LNP showed equivalent Nluc activity to the mice administered CL4H6-LNP. In addition, as shown in FIG. 3(C), the mice administered CL4F6-LNP and CL4G6-LNP showed higher liver selectivity compared to the mice administered CL4H6-LNP. Similarly, the mice administered CL15F6-LNP and CL15G6-LNP showed higher liver selectivity compared to the mice administered CL15H6-LNP. From these results, it has been found that lipid nanoparticles comprising pH-sensitive cationic lipids whose scaffold structure is branched-chain type have, when mRNA is encapsulated, higher selectivity to the liver than lipid nanoparticles comprising pH-sensitive cationic lipids whose scaffold structure is straight-chain type, and are useful as a delivery carrier which specifically deliver to the liver.

Example 3

Lipid nanoparticles loaded with pDNA instead of siRNA were prepared and in vivo gene expression activity was examined. For pDNA, plasmid (pFluc) expressing firefly luciferase (Fluc) under CMV promoter was used.

<In Vitro Gene Expression Activity>

First, lipid nanoparticles loaded with pFluc (pFluc-loaded lipid nanoparticles) were prepared by alcohol dilution method using pH-sensitive cationic lipids, DSPC, cholesterol, and PEG-DMG in a molar ratio of 50:10:40:1.5 composition. CL4F6, CL4G6, CL4H6, CL15F6, CL15G6, or CL15H6 were used as pH-sensitive cationic lipids. In addition, the N/P ratio in the microchannel was set to 9.

TABLE 3

| CL | ζ-Average (nm) | PdI | ζ-potential (mV) | % pDNA encapsulation |
|---|---|---|---|---|
| CL4F6 | 91.3 ± 11.2 | 0.19 ± 0.03 | −1.7 ± 0.5 | 94.8 ± 3.3 |
| CL4G6 | 90.6 ± 7 | 0.19 ± 0.05 | −1.3 ± 0.7 | 94.5 ± 3.6 |
| CL4H6 | 113.9 ± 4.2 | 0.2 ± 0.03 | −0.4 ± 0.4 | 70 ± 5.2 |
| CL15F6 | 105.7 ± 8.6 | 0.13 ± 0.02 | −1.2 ± 0.4 | 93.1 ± 3.3 |
| CL15G6 | 100.9 ± 10.7 | 0.12 ± 0.08 | −1.9 ± 0.6 | 91.1 ± 2.1 |
| CL15H6 | 149.9 ± 9.8 | 0.11 ± 0.01 | 0.9 ± 0.9 | 81.9 ± 3 |

Average particle size, PDI, zeta potential, and mRNA encapsulation rate of the prepared lipid nanoparticles were examined. The results of the measurements are shown in FIG. 3. In Table 3, "CL" means cationic lipid. The average particle sizes calculated by dynamic light scattering were all 90-150 nm (Table 3). For pDNA encapsulation rates, CL4H6-LNP and CL15H6-LNP were 70% and 82% respectively. On the other hand, lipid nanoparticles comprising other cationic lipids showed good pDNA encapsulation rate of more than 90%.

pFluc-loaded lipid nanoparticles were introduced into cultured cells and in vitro gene expression activity was examined. Specifically, HeLa-GFP cells cultured in 96-well plate were transfected with pFluc-loaded lipid nanoparticles at 0.0625 μg pDNA/well, and Fluc activity at 24 hours later was measured. As positive control, pFluc was introduced into HeLa-GFP cells using the introduction reagent "Lipofectamine 3000" (manufactured by Thermo Fisher Scientific). Fluc activity was measured by luminometer (RLU) and corrected with the protein amount quantified by BCA method.

The results of measuring Fluc activity of HeLa-GFP cells introduced each pFluc-loaded lipid nanoparticles are shown in FIG. 4. In the figure, "Lipo3K" means positive control in which cell introduction was carried out using Lipofectamine 3000. As shown in FIG. 4, cells introduced CL15F6-LNP showed higher activity than cells introduced CL4H6-LNP, CL15H6-LNP, and positive control.

<In Vitro Gene Expression Activity> pFluc-loaded lipid nanoparticles were prepared as same as above except that the N/P ratio in the microchannel was set to 6.

TABLE 4

| CL | ζ-Average (nm) | PdI | ζ-potential (mV) | % pDNA encapsulation |
|---|---|---|---|---|
| CL4F6 | 79.91 | 0.08 | −5.17 | 97.1 |
| CL4G6 | 74.48 | 0.11 | −2.46 | 97.6 |
| CL4H6 | 105.6 | 0.14 | −0.57 | 41.5 |
| CL15F6 | 109.4 | 0.07 | −2.02 | 95.4 |
| CL15G6 | 86.39 | 0.03 | −5.84 | 94.7 |
| CL15H6 | 121.7 | 0.08 | 0.367 | 72.4 |

Average particle size, PDI, zeta potential, and mRNA encapsulation rate of the prepared lipid nanoparticles were examined. The results of the measurements are shown in FIG. 4. In Table 4, "CL" means cationic lipid. The average particle sizes calculated by dynamic light scattering were all 70-125 nm (Table 4). For pDNA encapsulation rates, CL4F6-LNP, CL4G6-LNP, CL15F6-LNP, and CL15G6-LNP all showed good values of 90% or more.

Then, each prepared pFluc-loaded lipid nanoparticles were administered to ICR mice (4 weeks old, female) and in vivo gene expression activity was examined. Specifically, each pFluc-loaded lipid nanoparticles were intravenously administered to ICR mice at 0.5 mg mRNA/kg, and Fluc activity in the liver and spleen at 6 hours later was measured. Fluc activity was measured by luminometer (RLU) and corrected with the protein amount quantified by BCA method.

The results of measuring of the Fluc activity (RLU/mg protein) in the liver and spleen of mice administered each pFluc-loaded lipid nanoparticles are shown in FIG. 5. FIG. 5(A) is the result of measurement of Fluc activity in the liver and FIG. 5(B) is the result of measurement of Fluc activity in the spleen. Furthermore, the liver selectivity of gene expression was calculated by dividing the gene expression activity in the liver by the gene expression activity in the spleen. FIG. 5(c) is a figure showing the calculation results of [Fluc activity in the liver]/[Fluc activity in the spleen] of mice administered each pFluc-loaded lipid nanoparticle. As shown in FIG. 5(A), Fluc activity in the liver was superior in mice administered CL4F6-LNP and CL15F6-LNP than in mice administered CL4H6-LNP and CL15H6-LNP. In addition, as shown in FIG. 5(C), the mice administered CL4F6-LNP and CL4G6-LNP showed higher liver selectivity compared to the mice administered CL4H6-LNP. Similarly, the mice administered CL15F6-LNP and CL15G6-LNP showed higher liver selectivity compared to the mice administered CL15H6-LNP. From these results, it has been found that, when compared among lipids having the same hydrophilic moiety, lipid nanoparticles comprising pH-sensitive cationic lipids whose scaffold structure is branched-chain type have higher selectivity to the liver than lipid nanoparticles comprising pH-sensitive cationic lipids whose scaffold structure is straight-chain type, and are useful as a delivery carrier which specifically deliver to the liver, even when pDNA was encapsulated.

III. Synthesis of CL4F6 Derivatives and CL15F6 Derivatives

Synthesis of CL4F6 and CL4F6 Derivatives

Synthesis of CL4F6 and CL4F6 derivatives (CL4F 6-2, CL4F 6-4, CL4F 7-3, CL4F 7-4, CL4F 7-5, CL4F 8-4, CL4F 8-5, CL4F 8-6, CL4F 9-3, CL4F 9-4, CL4F 9-5, CL4F 9-6, CL4F 9-7, CL4F 10-2, CL4F 10-4, CL4F 10-5, CL4F 10-7, CL4F 10-8, CL4F 11-5, CL4F 11-6, CL4F 11-7, CL4F 11-9, CL4F 12-4, CL4F 12-6, CL4F 12-10, CL4F 13-3, CL4F 14-2, CL4F 16-0, and CL4F 16-1) was carried out as follows.

7-(4-(dipropylamino)butyl)tridecane,1,7,13-triol (1.0 mmol) which was synthesized by the method described in Patent Literature 1 was dissolved in 5 mL of dichloromethane, then branched fatty acid (2.40 mmol), DMAP (N,N-dimethyl-4-aminopyridine) (0.10 mmol) and EDCl (1-ethyl-3-(3-dimethylaminopropyl) carbodiimide (3.0 mmol) were added and reacted overnight at room temperature. After the solvent was distilled using a rotary evaporator, suspended with ethyl acetate, afterwards, washed with 0.5N sodium hydroxide solution and saturated saline. The organic layer was dehydrated by adding anhydrous sodium sulfate. After filtration of above, the solvent was distilled using a rotary evaporator to obtain crude product. The crude product was purified by ODS silica gel chromatography [eluting solvent; acetonitrile/isopropanol (50:50):water (0.1% TFA) (continuous gradient)] and silica gel chromatography [eluting solvent; dichloromethane:methanol (continuous gradient)] and CL4F6 or CL4F6 derivative was obtained.

Synthesis of CL15F6 and CL15F6 Derivatives

Synthesis of CL15F6 and CL15F6 derivatives (CL15F 6-2, CL15F 6-4, CL15F 7-3, CL15F 7-5, CL15F 8-6, CL15F 9-3, CL15F 9-5, CL15F 9-7, CL15F 10-4, CL15F 10-5, CL15F 10-8, CL15F 11-5, CL15F 11-6, CL15F 11-7, CL15F 11-9, CL15F 12-4, CL15F 12-10, CL15F 13-3, CL15F 14-2, CL15F 16-0, and CL15F 16-1) was carried out as follows.

5,11-dihydroxy-5-(6-hydroxyhexyl)undecyl 1-methylpiperidine-4-carboxylate (1.00 mmol) which was synthesized by the method described in Patent Literature 1 was dissolved in 10 mL of dichloromethane. Then 2-hexyldecanoic acid (2.40 mmol), DMAP (0.10 mmol) and EDCl (3.0 mmol) were added and reacted overnight at room temperature. After the solvent was distilled using a rotary evaporator, suspended with ethyl acetate, afterwards, washed with 0.5N sodium hydroxide solution and saturated saline. The organic layer was dehydrated by adding anhydrous sodium sulfate. After filtration of above, the solvent was distilled using a rotary evaporator to obtain crude product. The crude product was purified by ODS silica gel chromatography [eluting solvent; acetonitrile/isopropanol (50:50):water (0.1% TFA) (continuous gradient)] and silica gel chromatography [eluting solvent; dichloromethane:methanol (continuous gradient)] and CL15F6 or CL15F6 derivative was obtained.

The above branched fatty acids were synthesized as follows using straight-chain fatty acids or dimethyl malonate as a raw material.

Synthesis of Branched Fatty Acids Using Straight-Chain Fatty Acids as Raw Material Straight-chain fatty acid (10.28 mmol) was dissolved in 36 mL of THF, and then lithium diisopropylamide (24 mmol) was dropped at −20° C. or lower and stirred at 0° C. for 30 minutes. Then, DMPU (18 mL) was added and stirred at 0° C. for 60 minutes. Then, iodoalkane (23.2 mmol) was added and reacted overnight at 10° C. After quenching with 2N hydrochloric acid, it was diluted with diethyl ether and washed with saturated saline. The organic layer was dehydrated by adding anhydrous sodium sulfate. After filtration of above, the solvent was distilled using a rotary evaporator to obtain crude product. The crude product was purified by ODS silica gel chromatography [eluting solvent; acetonitrile/isopropanol (50:50):water (10 mM ammonium acetate) (continuous gradient)] and branched fatty acid was obtained.

Synthesis of Branched Fatty Acid Using Dimethyl Malonate as Raw Material

NaH (7.56 mmol) was dissolved in 18 ml of THF and stirred at 0° C. for 10 minutes. Then, dimethyl malonate (7.56 mmol) was added and stirred at 0° C. for 10 minutes. Then, any iodoalkane (7.56 mmol) was added and reacted overnight at room temperature. NaH (11.34 mmol) was added and stirred at 0° C. for 10 minutes. Then, any iodoalkane (11.34 mmol) was added and reacted overnight at room temperature. After quenching with acetic acid, it was diluted with ethyl acetate and washed with saturated saline. The organic layer was dehydrated by adding anhydrous sodium sulfate. After filtration of above, the solvent was distilled using a rotary evaporator. The components of the solvent removal were dissolved in 16 mL of ethanol, 5 mL of 8N sodium hydroxide solution was added, and reacted overnight at 60° C. After neutralizing with 6N hydrochloric acid, it was diluted with ethyl acetate and washed with saturated saline. The organic layer was dehydrated by adding anhydrous sodium sulfate. After filtration of above, the solvent was distilled using a rotary evaporator and heated at 160° C. for two hours to obtain crude product. The crude product was purified by ODS silica gel chromatography [eluting solvent; acetonitrile/isopropanol (50:50):water (10 mM ammonium acetate) (continuous gradient)] and branched fatty acid was obtained.

In branched fatty acids used for the synthesis of CL4F 7-4, CL4F 8-5, CL4F 9-6, and CL4F 10-7, the method using straight-chain fatty acid as raw material could obtain branched fatty acid with better yield than the method using dimethyl malonate as raw material.

In branched fatty acids used for the synthesis of CL4F 6-2, CL4F 6-4, CL4F 7-3, CL4F 7-5, CL4F 8-4, CL4F 8-6, CL4F 9-3, CL4F 9-4, CL4F 9-5, CL4F 9-7, CL4F 10-2, CL4F 10-4, CL4F 10-5, CL4F6, CL4F 10-8, CL4F 11-5, CL4F 11-6, CL4F 11-7, CL4F 11-9, CL4F 12-4, CL4F 12-6, CL4F 12-10, CL4F 13-3, CL4F 14-2, CL4F 16-1, CL15F 6-2, CL15F 6-4, CL15F 7-3, CL15F 7-5, CL15F 8-6, CL15F 9-3, CL15F 9-5, CL15F 9-7, CL15F 10-4, CL15F 10-5, CL15F6, CL15F 10-8, CL15F 11-5 CL15F 11-6, CL15F 11-7, CL15F 11-9, CL15F 12-4, CL15F 12-10, CL15F 13-3, CL15F 14-2, and CL15F 16-1, the method using dimethyl malonate as raw material could obtain branched fatty acid with better yield than the method using straight-chain fatty acid as raw material.

IV. Production and Evaluation of Lipid Nanoparticles Using CL4F6 Derivatives and CL15F6 Derivatives 1. Preparation and Evaluation of mRNA-Loaded Lipid Nanoparticles Preparation of mRNA-Loaded Lipid Nanoparticles (mRNA-LNP)

The lipid nanoparticles were prepared by the alcohol dilution method using flow channel. Microfluidic device with built-in mixer "NanoAssemblr" (manufactured by Precision NanoSystems) was used as the flow channel.

Specifically, first, ethanol solution adjusted to a lipid concentration of 8 mM and citrate buffer solution adjusted to a mRNA concentration of 46.1 µg/mL (50 mM, pH 3.5) were fed into the microchannel at 3 mL/minute and 9 mL/minute respectively and the lipid nanoparticle solution excreted from the channel was collected. The lipid nanoparticle solution was diluted 10-fold with 20 mM HEPES buffer solution (9% sucrose, pH 7.45) and then concentrated in an ultrafiltration unit and the lipid nanoparticle solution was collected.

<Constituent Lipids of Lipid Nanoparticles>

Lipid nanoparticles loaded with FlucmRNA (FlucmRNA-loaded lipid nanoparticles) were produced by alcohol dilution method using pH-sensitive cationic lipids, DSPC (1,2-distearoyl-sn-glycero-3-phosphocholine, YUKA SANGYO CO., LTD), cholesterol (nacalai tesque), and DMG-PEG2K (YUKA SANGYO CO., LTD) in a molar ratio of 50:10:38.5:1.5 composition. CleanCap (registered trademark) FLuc mRNA (5 moU) from TriLink Biotechnologies was used for FlucmRNA.

<Measurements of Average Particle Size and PDI of Lipid Nanoparticles>

The average particle size (ζ-Average) and PDI in PBS(−) of lipid nanoparticles were measured using "Zetasizer Nano ZSP", an analyzer utilizing dynamic light scattering (manufactured by Malvern).

<Measurement of pKa of Lipid Nanoparticles>

The pKa of lipid nanoparticles was measured using p-toluidino-2-naphthalenesulfonic acid (TNS). First, TNS (final concentration: 0.75 µM) and lipid nanoparticles (final concentration: 60 µM) were mixed in buffer solution adjusted to each pH. The fluorescence intensity of the prepared mixture was measured with a microplate reader. The excitation wavelengths were calculated, among measurement values, by taking the measurement value at pH 3.5 as 100% charge and the measurement value at pH 9.5 as 0% charge, and the pH showing 50% charge was calculated as pKa.

<Nucleic Acid Encapsulation Rate of Lipid Nanoparticles>

The encapsulation rates of siRNA and mRNA of lipid nanoparticles were measured with Ribogreen reagent. A solution diluted with TE buffer solution was arranged so that lipid nanoparticle concentration as nucleic acid concentration to be 8 µg/mL, as a solution for measuring nanoparticle surface nucleic acid concentration. In addition, a solution for measuring total nucleic acid concentration was arranged so that lipid nanoparticle concentration as nucleic acid concentration to be 1.2 µg/mL, which is 1% (w/w) concentration of X-triton100, by adding X-triton100. For 100 µL of each solution, 100 µL of Ribogreen (registered trademark) reagent (Quant-iT™ RiboGreen™ RNA Reagent, manufactured by Thermofisher Scientific) was mixed well in the wells of 96-well microplate (black, made of polystyrene, flat bottom, manufactured by Corning), and the fluorescence intensity at an excitation wavelength of 485 nm and a measurement wavelength of 528 nm was measured with a microplate reader. Nucleic acid concentration was calculated by calibration curve created by measuring the fluorescence intensity of nucleic acid solution containing 1% X-triton100 (nucleic acid concentration: 0-2.5 µg/mL) as same as aforementioned. Nucleic acid encapsulation rate of each lipid nanoparticle was calculated by the following formula:

Encapsulation rate %=(nucleic acid concentration in solution for measuring total nucleic acid concentration (µg/mL)−nucleic acid concentration in solution for measuring nanoparticle surface nucleic acid concentration (µg/mL))/nucleic acid concentration in solution for measuring total nucleic acid concentration (µg/mL)×100.

<Results>

Average particle size, PDI, mRNA encapsulation rate, and pKA of the prepared lipid nanoparticles were examined. The results of measurement of CL4F6 derivative nanoparticles are shown in Tables 5 and 6, and results of measurement of CL15F6 derivative nanoparticles in Table 7. As a control, D-Lin-MC3-DMA (MC3) (manufactured by MedChemExpress) having following structure was used.

[Chem. 36]

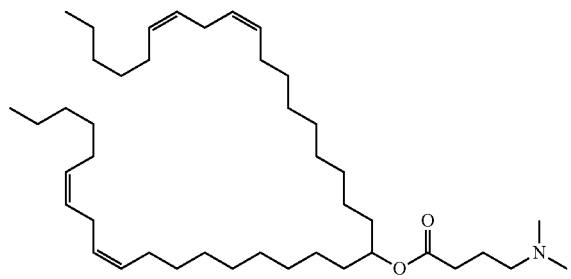

The average particle sizes of the CL4F6 derivative nanoparticles in Table 5, calculated by dynamic light scattering, were all 60-220 nm, particles with small PDI and high uniformity were formed except for CL4F 16-0-LNP. mRNA encapsulation rates were less than 80% in CL4F 6-2-LNP and CL4F 16-1-LNP, while LNPs comprising other cationic lipids all showed 80% or more.

For the average particle sizes of CL15F6 derivative nanoparticles in Table 7, CL15F 6-4-LNP and CL15F 7-3-LNP exceeded 300 nm, while LNPs comprising other cationic lipids were all 90-200 nm. For PDI, particles with small PDI and high uniformity were formed except for CL15F 6-4-LNP, CL15F 7-3-LNP, CL15F 16-0-LNP, and CL15H6-LNP. mRNA encapsulation rates were less than 80% in CL15F 6-4-LNP and CL15F 7-3-LNP, while LNPs comprising other cationic lipids all showed 80% or more.

Then, each prepared FlucmRNA-loaded lipid nanoparticles were administered to Balb/c mice (Charles River Laboratories Japan, Inc., 7 weeks old, female) and in vivo gene expression activity was examined. Specifically, each FlucmRNA-loaded lipid nanoparticles were intravenously administered to Balb/c mice at 0.1 mg mRNA/kg, and Fluc activities in the liver and spleen at 6 hours later were measured. Fluc activity was measured by in vivo imaging system (Perkin Elmer, IVIS200) after administration of VivoGlo Luciferin, In Vivo Grade (Promega, P1041) dissolved with PBS to 15 mg/mL, via tail vein at a dose of 1.5 mg per mouse. The unit of Fluc activity is the emission intensity per unit area (Avg Radiance [p/s/cm2/sr]) at the maximum emission wavelength of about 560 nm.

The results of measurement of the Fluc activity (Avg Radiance [p/s/cm2/sr]) in the liver and spleen of mice administered each FlucmRNA-loaded lipid nanoparticles are shown in Tables 5-7.

The Fluc activity in the liver of CL4F6 derivative nanoparticles in Tables 5 and 6 showed higher Fluc activity in the mice administered FlucmRNA-loaded lipid nanoparticles comprising CL4F 8-6, CL4F 9-7, or CL4F 11-6 than in the mice administered FlucmRNA-loaded lipid nanoparticles comprising CL4F6. On the other hand, the Fluc activity of CL4F6 derivative nanoparticles in the spleen showed higher Fluc activity in the mice administered FlucmRNA lipid nanoparticles comprising CL4F 7-5, CL4F 8-4, CL4F 9-3, CL4F 10-2, CL4F 8-6 CL4F 10-4, CL4F 10-5, CL4F 12-4, CL4F 13-3, CL4F 14-2, CL4F 7-4, CL4F 8-5, CL4F 9-4, or CL4F 9-5 than in the mice administered FlucmRNA lipid nanoparticles comprising CL4F6.

The Fluc activity in the liver of CL15F6 derivative nanoparticles in Table 7 showed higher Fluc activity in the mice administered FlucmRNA-loaded lipid nanoparticles comprising CL15F 9-7, CL15F 11-5, CL15F 11-6, CL15F 10-8, CL15F 11-7, CL15F 11-9, CL15F 12-10, or CL15F 14-2 than in the mice administered FlucmRNA lipid nanoparticles comprising CL15F6. The Fluc activity in the spleen of CL15F6 in Table 7 showed higher Fluc activity in the mice administered FlucmRNA lipid nanoparticles comprising CL5F 6-4, CL5F 7-3, CL15F 7-5, CL15F 9-3, CL15F 9-5, CL15F 10-5, CL45F 13-3, CL15F 11-6, CL15F 10-8, CL15F 11-7, CL15F 11-9, or CL5F 14-2 than in the mice administered FlucmRNA lipid nanoparticles comprising CL15F6.

TABLE 5

| Lipid name | ζ-Average (nm) | PDI | % mRNA encapsulation | pKa | Fluc Activity in liver | Fluc Activity in spleen |
|---|---|---|---|---|---|---|
| CL4F 6-2 | 218.20 | 0.069 | 41.4 | 6.40 | 1.34E+03 | 1.24E+05 |
| CL4F 7-5 | 109.80 | 0.057 | 99.9 | 6.27 | 4.56E+07 | 1.47E+07 |
| CL4F 8-4 | 101.60 | 0.020 | 99.7 | 6.27 | 6.09E+07 | 1.41E+07 |
| CL4F 9-3 | 102.80 | 0.030 | 99.6 | 6.34 | 2.96E+07 | 8.17E+06 |
| CL4F 10-2 | 93.60 | 0.068 | 98.6 | 6.35 | 3.02E+07 | 6.40E+06 |
| CL4F 8-6 | 88.78 | 0.022 | 99.4 | 6.14 | 1.80E+08 | 9.58E+06 |
| CL4F 10-4 | 84.92 | 0.041 | 99.8 | 6.19 | 1.20E+08 | 6.70E+06 |
| CL4F 10-5 | 84.62 | 0.021 | 99.7 | 6.07 | 1.06E+08 | 4.64E+06 |
| CL4F 9-7 | 81.30 | 0.004 | 99.2 | 6.05 | 1.55E+08 | 2.43E+06 |
| CL4F 11-5 | 81.81 | 0.019 | 99.6 | 6.19 | 4.50E+07 | 1.03E+06 |
| CL4F 12-4 | 84.57 | 0.015 | 99.0 | 6.16 | 7.70E+07 | 3.19E+06 |
| CL4F 13-3 | 83.05 | 0.044 | 96.3 | 6.22 | 7.34E+07 | 7.30E+06 |
| CL4F 14-2 | 74.02 | 0.078 | 94.0 | 6.29 | 4.08E+07 | 3.66E+06 |
| CL4F 10-7 | 79.68 | 0.039 | 99.8 | 5.99 | 1.19E+08 | 2.03E+06 |
| CL4F 11-6 | 84.50 | 0.020 | 99.8 | 6.02 | 1.38E+08 | 2.54E+06 |
| CL4F 16-0 | 158.30 | 0.225 | 86.2 | 7.46 | 2.32E+04 | 2.83E+05 |
| CL4F 16-1 | 69.08 | 0.045 | 65.9 | 6.40 | 8.52E+06 | 1.93E+06 |
| CL4F 10-8 | 81.99 | 0.021 | 99.8 | 5.99 | 5.14E+07 | 8.04E+05 |
| CL4F 11-7 | 79.45 | 0.021 | 99.7 | 5.98 | 1.23E+08 | 2.03E+06 |
| CL4F 11-9 | 81.13 | 0.014 | 99.8 | 5.92 | 6.86E+07 | 1.19E+06 |
| CL4F 12-10 | 75.85 | 0.019 | 99.6 | 5.85 | 3.09E+07 | 2.77E+05 |
| CL4F6 | 82.66 | 0.006 | 99.6 | 6.05 | 1.26E+08 | 2.81E+06 |
| CL4G6 | 81.21 | 0.030 | 99.8 | 6.02 | 4.58E+07 | 2.08E+06 |
| CL4H6 | 71.28 | 0.072 | 80.1 | 6.53 | 1.06E+07 | 2.10E+06 |
| MC3 | 68.60 | 0.042 | 99.0 | 6.31 | 7.60E+06 | 6.48E+05 |

TABLE 6

| Lipid name | ζ-Average (nm) | PDI | % mRNA encapsulation | pKa | Fluc Activity in liver | Fluc Activity in spleen |
|---|---|---|---|---|---|---|
| CL4F 6-4 | 141.10 | 0.023 | 97.2 | 6.38 | 2.17E+05 | 2.95E+05 |
| CL4F 7-3 | 133.90 | 0.025 | 98.1 | 6.39 | 3.43E+05 | 6.64E+05 |
| CL4F 7-4 | 113.50 | 0.032 | 98.8 | 6.33 | 5.05E+06 | 7.43E+06 |
| CL4F 8-5 | 94.65 | 0.043 | 99.1 | 6.23 | 4.80E+07 | 1.45E+07 |
| CL4F 9-4 | 95.29 | 0.002 | 99.1 | 6.26 | 2.55E+07 | 8.69E+06 |
| CL4F 9-5 | 89.41 | 0.048 | 99.0 | 6.16 | 6.84E+07 | 9.53E+06 |
| CL4F 9-6 | 89.18 | 0.021 | 99.1 | 6.10 | 9.61E+07 | 3.89E+06 |
| CL4F 12-6 | 82.84 | 0.017 | 99.7 | 6.03 | 5.86E+07 | 1.72E+06 |
| CL4F6 | 88.07 | 0.020 | 99.4 | 6.05 | 1.25E+08 | 4.01E+06 |

TABLE 7

| Lipid name | ζ-Average (nm) | PDI | % mRNA encapsulation | pKa | Fluc Activity in liver | Fluc Activity in spleen |
|---|---|---|---|---|---|---|
| CL15F 6-4 | 312.10 | 0.316 | 66.7 | 6.90 | 1.84E+06 | 3.39E+07 |
| CL15F 7-3 | 370.30 | 0.369 | 64.2 | 6.85 | 5.34E+06 | 1.48E+07 |
| CL15F 7-5 | 196.00 | 0.007 | 97.6 | 6.33 | 2.15E+06 | 1.37E+07 |
| CL15F 9-3 | 196.80 | 0.044 | 95.5 | 6.62 | 1.16E+06 | 7.47E+06 |
| CL15F 8-6 | 132.00 | 0.011 | 99.2 | 6.57 | 1.92E+06 | 5.02E+06 |
| CL15F 9-5 | 135.00 | 0.037 | 99.1 | 6.57 | 1.86E+06 | 5.77E+06 |
| CL15F 10-4 | 146.10 | 0.030 | 98.7 | 6.48 | 2.07E+06 | 3.97E+06 |
| CL15F 10-5 | 113.90 | 0.047 | 99.4 | 6.59 | 2.70E+06 | 7.55E+06 |
| CL15F 9-7 | 107.60 | 0.010 | 99.5 | 6.64 | 6.76E+06 | 4.23E+06 |
| CL15F 11-5 | 108.90 | 0.010 | 99.8 | 6.71 | 9.38E+06 | 5.01E+06 |
| CL15F 12-4 | 116.60 | 0.009 | 99.7 | 6.62 | 2.87E+06 | 5.10E+06 |
| CL15F 16-0 | 195.90 | 0.234 | 100.1 | 7.15 | 1.97E+05 | 4.59E+05 |
| CL15F 13-3 | 142.90 | 0.048 | 98.62 | 6.73 | 3.51E+06 | 6.11E+06 |
| CL15F 11-6 | 106.50 | 0.007 | 99.75 | 6.48 | 9.09E+06 | 8.19E+06 |
| CL15F 16-1 | 187.70 | 0.182 | 94.0 | 7.13 | 2.18E+05 | 1.27E+06 |
| CL15F 10-8 | 99.84 | 0.026 | 99.78 | 6.24 | 1.35E+07 | 8.42E+06 |
| CL15F 11-7 | 102.50 | 0.002 | 99.86 | 6.29 | 1.10E+07 | 7.13E+06 |
| CL15F 11-9 | 99.31 | 0.023 | 99.78 | 6.60 | 3.66E+07 | 7.55E+06 |
| CL15F 12-10 | 97.59 | 0.030 | 99.78 | 6.60 | 4.33E+07 | 5.58E+06 |
| CL15F 14-2 | 158.90 | 0.117 | 95.70 | 7.00 | 1.03E+07 | 7.58E+06 |
| CL15F6 | 115.50 | 0.002 | 99.69 | 6.39 | 6.28E+06 | 5.76E+06 |
| CL15G 6 | 102.40 | 0.012 | 100.24 | 6.15 | 6.52E+06 | 2.77E+06 |

TABLE 7-continued

| Lipid name | ζ-Average (nm) | PDI | % mRNA encapsulation | pKa | Fluc Activity in liver | Fluc Activity in spleen |
|---|---|---|---|---|---|---|
| CL15H 6 | 180.90 | 0.238 | 83.8 | 7.14 | 1.17E+05 | 6.17E+05 |
| MC3 | 71.49 | 0.072 | 99.04 | 6.31 | 5.69E+06 | 2.02E+05 |

2. Preparation and Evaluation of siRNA-Loaded Lipid Nanoparticles

Preparation of siRNA-Loaded Lipid Nanoparticles

Lipid nanoparticles loaded with siRNA instead of mRNA were prepared and in vivo F7 knockdown activity was examined. siRNA-loaded lipid nanoparticles were prepared as same as above, except that the N/P ratio in the microchannel was set to 6. The base sequence of siRNA to F7 is shown in Table 8. In the table, capital letters show natural-type RNA (only T is natural-type DNA), small letters show 2'-fluoro modifications, and * shows phosphorothioate bond respectively.

TABLE 8

| siRNA to F7 | Base sequence | SEQ ID NO: |
|---|---|---|
| Sense strand | GGAucAucucAAGucuuAC*T | 1 |
| Antisense strand | GuAAGAcuuGAGAuGAuccT*T | 2 |

First, lipid nanoparticles loaded with siRNA to F7 (F7siRNA-loaded lipid nanoparticles) were produced by alcohol dilution method using pH-sensitive cationic lipids, DSPC (1,2-distearoyl-sn-glycero-3-phosphocholine), cholesterol, and PEG-DMG in a molar ratio of 50:10:38.5:1.5 composition.

<Results>

Average particle size, PDI, siRNA encapsulation rate, and pKA of the prepared lipid nanoparticles were examined. The results of measurement of CL4F6 derivative nanoparticles are shown in Tables 9 and 10, and results of measurement of CL15F6 derivative nanoparticles in Table 11. The average particle size of CL4F6 derivative nanoparticles was 60-280 nm and siRNA encapsulation rate was less than 90% in CL4F 6-2-LNP, while LNPs comprising other cationic lipids all showed 90% or more. Particles with small PDI and high uniformity were formed except for CL4F 16-2-LNP.

The average particle size of CL15F6 derivative nanoparticles exceeded 300 nm in CL15F 6-2-LNP, while LNPs comprising other cationic lipids were all 85-290 nm. siRNA encapsulation rates showed 90% or more in all LNPs. Particles with small PDI and high uniformity were formed except for CL15F 6-2-LNP, CL15F 6-4-LNP, CL15F 7-3-LNP, and CL15F 16-0-LNP.

Then, each prepared F7siRNA-loaded lipid nanoparticles were administered to Balb/c mice (Charles River Laboratories Japan, Inc., 5 weeks old, female) and in vivo F7 knockdown activity was examined. Specifically, BALB/c mice were intravenously administered F7siRNA-loaded lipid nanoparticles comprising the lipids described in Table 9 at 0.025 mg siRNA/kg and F7siRNA-loaded lipid nanoparticles comprising the lipids described in Tables 10 and 11 at 0.025 mg siRNA/kg, and the plasma F7 enzyme activity at 24 hours later was measured using BIOPHEN FVII (Biophen, A221304). Relative plasma F7 enzyme activity (%) of mice administered each F7siRNA-loaded lipid nanoparticles was calculated using plasma F7 enzyme activity of untreated mice as 100%. Furthermore, the ratio was calculated using the relative plasma F7 enzyme activity (%) of mice administered MC3-comprising F7siRNA-loaded lipid nanoparticles as 1. The results of measurement of CL4F6 derivative nanoparticles are shown in Tables 9 and 10, and results of measurement of CL15F6 derivative nanoparticles in Table 11.

F7siRNA-loaded lipid nanoparticles comprising CL4F 10-4, CL4F 8-5, CL4F 9-5, or CL4F 12-6 in Tables 9 and 10 showed higher knockdown activity than F7siRNA-loaded lipid nanoparticles comprising MC3.

F7siRNA-loaded lipid nanoparticles comprising CL15F 9-7, CL15F 11-5, CL15F 12-4, CL15F 11-6, CL15F 10-8, CL15F 11-7, CL15F 11-9, or CL15F 12-10 in Table 11 showed higher knockdown activity than F7siRNA-loaded lipid nanoparticles comprising MC3.

TABLE 9

| Lipid name | ζ-Average (nm) | PDI | % siRNA encapsulation | pKa | F7 enzyme activity (%) |
|---|---|---|---|---|---|
| CL4F 6-2 | 274.50 | 0.298 | 56.9 | 6.34 | 54.8 |
| CL4F 7-5 | 120.20 | 0.021 | 100.1 | 6.45 | 35.7 |
| CL4F 8-4 | 110.00 | 0.006 | 100.0 | 6.43 | 5.6 |
| CL4F 9-3 | 114.40 | 0.022 | 99.9 | 6.33 | 11.7 |
| CL4F 10-2 | 115.60 | 0.024 | 99.6 | 6.46 | 11.4 |
| CL4F 8-6 | 99.72 | 0.010 | 100.0 | 6.31 | 3 |
| CL4F 10-4 | 95.37 | 0.021 | 100.1 | 6.36 | 1.7 |
| CL4F 10-5 | 98.70 | 0.006 | 100.1 | 6.27 | 3 |
| CL4F 9-7 | 97.03 | 0.020 | 99.9 | 6.31 | 4.3 |
| CL4F 11-5 | 89.72 | 0.012 | 100.1 | 6.38 | 4.3 |
| CL4F 12-4 | 94.55 | 0.011 | 100.1 | 6.40 | 5 |
| CL4F 13-3 | 92.25 | 0.023 | 99.7 | 6.41 | 8.4 |
| CL4F 14-2 | 80.87 | 0.076 | 98.0 | 6.38 | 7.9 |
| CL4F 10-7 | 89.34 | 0.013 | 100.1 | 6.27 | 4.1 |
| CL4F 11-6 | 92.98 | 0.034 | 99.9 | 6.29 | 6 |
| CL4F 16-1 | 64.81 | 0.092 | 94.9 | 6.33 | 103.6 |
| CL4F 10-8 | 91.44 | 0.007 | 99.9 | 6.14 | 8.1 |
| CL4F 11-7 | 94.76 | 0.019 | 99.8 | 6.13 | 14.1 |
| CL4F 12-6 | 92.28 | 0.012 | 99.3 | 6.21 | 6 |
| CL4F 11-9 | 90.93 | 0.009 | 100.1 | 5.98 | 47.7 |
| CL4F 12-10 | 85.62 | 0.015 | 99.2 | 5.87 | 80.6 |
| CL4F6 | 92.27 | 0.014 | 99.9 | 6.22 | 6.8 |
| CL4G6 | 85.14 | 0.048 | 100.1 | 6.14 | 7.6 |
| CL4H6 | 68.86 | 0.102 | 96.1 | 6.53 | 47.2 |
| MC3 | 81.68 | 0.048 | 99.1 | 6.28 | 2.5 |

TABLE 10

| Lipid name | ζ-Average (nm) | PDI | % siRNA encapsulation | pKa | F7 enzyme activity (Ratio using MC3 as 1) |
|---|---|---|---|---|---|
| CL4F 8-5 | 103.40 | 0.034 | 99.7 | 6.43 | 0.38 |
| CL4F 9-5 | 99.72 | 0.032 | 99.9 | 6.40 | 0.43 |
| CL4F 12-6 | 94.26 | 0.008 | 99.6 | 6.21 | 0.18 |
| MC3 | 85.73 | 0.013 | 99.1 | 6.28 | 1 |

TABLE 11

| Lipid name | ζ-Average (nm) | PDI | % siRNA encapsulation | pKa | F7 enzyme activity (Ratio using MC3 as 1) |
|---|---|---|---|---|---|
| CL15F 6-2 | 390.7 | 0.534 | 100.4 | 7.35 | 1.87 |
| CL15F 6-4 | 230.7 | 0.255 | 91.5 | 6.75 | 2.28 |
| CL15F 7-3 | 287.9 | 0.398 | 95.7 | 6.93 | 2.08 |
| CL15F 7-5 | 180.6 | 0.039 | 98.8 | 6.41 | 1.74 |
| CL15F 9-3 | 200.4 | 0.172 | 98.3 | 6.73 | 1.50 |
| CL15F 8-6 | 121.2 | 0.056 | 100.2 | 6.19 | 1.60 |
| CL15F 9-5 | 129.5 | 0.035 | 100.1 | 6.29 | 1.11 |
| CL15F 10-4 | 126.8 | 0.021 | 100.3 | 6.31 | 2.00 |
| CL15F 10-5 | 111.7 | 0.003 | 100.5 | 6.23 | 1.33 |
| CL15F 9-7 | 103.1 | 0.023 | 100.3 | 6.42 | 0.60 |
| CL15F 11-5 | 109.6 | 0.017 | 100.3 | 6.48 | 0.78 |
| CL15F 12-4 | 113.2 | 0.065 | 100.2 | 6.48 | 0.81 |
| CL15F 16-0 | 109.6 | 0.238 | 101.0 | 7.60 | 1.48 |
| CL15F 13-3 | 126.0 | 0.081 | 100.3 | 6.65 | 1.11 |
| CL15F 11-6 | 101.2 | 0.025 | 100.3 | 6.36 | 0.81 |
| CL15F 16-1 | 122.5 | 0.088 | 99.0 | 7.39 | 1.37 |
| CL15F 10-8 | 99.44 | 0.041 | 100.6 | 6.41 | 0.52 |
| CL15F 11-7 | 102.5 | 0.049 | 100.6 | 6.48 | 0.85 |
| CL15F 11-9 | 104.9 | 0.029 | 101.1 | 6.14 | 0.50 |
| CL15F 12-10 | 100.2 | 0.014 | 100.5 | 6.36 | 0.51 |
| CL15F 14-2 | 143.9 | 0.13 | 100.2 | 7.14 | 1.82 |
| CL15F6 | 105.9 | 0.044 | 100.5 | 6.23 | 1.52 |
| CL15G6 | 97.73 | 0.021 | 100.7 | 5.76 | 2.69 |
| CL15H6 | 123.50 | 0.142 | 100.2 | 7.57 | 1.99 |
| MC3 | 87.69 | 0.048 | 97.6 | 6.28 | 1.00 |

3. Preparation and Evaluation of pDNA-Loaded Lipid Nanoparticles

Preparation of pDNA-Loaded Lipid Nanoparticles

Lipid nanoparticles loaded with pDNA encoding eGFP instead of mRNA were prepared and eGFP emission in vitro was examined. The pDNA encoding eGFP was produced by inserting the gene encoding eGFP to pCMV-LacI from LacSwitch II Mammalian Expression System (Agilent).

The pDNA-loaded lipid nanoparticles were prepared in the same way as the mRNA-loaded lipid nanoparticles.

<Constituent Lipids of Lipid Nanoparticles> pH-sensitive cationic lipids, DSPC (1,2-distearoyl-sn-glycero-3-phosphocholine, YUKA SANGYO CO., LTD), cholesterol (nacalai tesque), and DMG-PEG2K (YUKA SANGYO CO., LTD) were used in a molar ratio of 50:10:38.5:1.5 composition.

<Measurement of Average Particle Size and PDI of Lipid Nanoparticles>

Measurement of average particle size and PDI of the lipid nanoparticles were carried out with the same method as the measurement of average particle size of mRNA-LNP.

<Nucleic Acid Encapsulation Rate of the Lipid Nanoparticles>

The encapsulation rate of pDNA of the lipid nanoparticles was measured using Picogreen (registered trademark) reagent (Quant-iT™ dsDNA Assay Kit, broad range, manufactured by Thermofisher Scientific). In encapsulation rate measurement of pDNA, the nucleic acid concentration in solution for measuring nanoparticle surface nucleic acid concentration was set at 1.6 µg/mL, the nucleic acid concentration in solution for measuring total nucleic acid concentration 24 ng/mL, and the nucleic acid concentration used for calibration curve 0-0.5 µg/mL, and the same method as the method for measuring encapsulation rate of siRNA and mRNA was carried out except that Picogreen (registered trademark) reagent (Quant-iT™ dsDNA Assay Kit, broad range, manufactured by Thermofisher Scientific) was used as measurement reagent.

Encapsulation rate %=(nucleic acid concentration in solution for measuring total nucleic acid concentration (µg/mL)−nucleic acid concentration in solution for measuring nanoparticle surface nucleic acid concentration (µg/mL))/(nucleic acid concentration in solution for measuring total nucleic acid concentration (µg/mL))×100.

<Results>

The results are shown in the table below. Prepared lipid nanoparticles were allowed to stand at 40° C., and after keeping for each period, they were evaluated whether quality was well remained according to the following criteria:

Good (O): particle size is within +/−20 nm of the particle size immediately after preparation, and PDI is 0.2 or less, and encapsulation rate is 80% or more;

No good (X): particle size is greater than +/−20 nm of the particle size immediately after preparation, or encapsulation rate is less than 80%.

The lipid nanoparticles which remain in good quality with standing at 40° C. for one week or more can be evaluated as having excellent stability.

TABLE 12

| Lipid name | Immediately after the preparation | | 40° C. 1 W | | 40° C. 1 M | | Quality 40° C. 1 W | Quality 40° C. 1 M |
|---|---|---|---|---|---|---|---|---|
| | Particle size (nm) | encapsulation rate (%) | Particle size (nm) | encapsulation rate (%) | Particle size (nm) | encapsulation rate (%) | | |
| CL4F 10-5 | 101.6 | 98.2 | 101.0 | 98.3 | 104.2 | 98.5 | ○ | ○ |
| CL4F 9-7 | 98.2 | 98.1 | 97.1 | 98.0 | 101.4 | 98.1 | ○ | ○ |
| CL4F 8-4 | 104.7 | 98.0 | 109.1 | 97.8 | 116.4 | 98.1 | ○ | ○ |

4. Storage Stability Evaluation of Lipid Nanoparticles

Storage of Lipid Nanoparticles

Lipid nanoparticles were prepared by the alcohol dilution method using flow channel. Microfluidic device with built-in mixer "NanoAssemblr" (manufactured by Precision NanoSystems) was used as the flow channel.

Specifically, first, ethanol solution adjusted to a lipid concentration of 8 mM and citrate buffer solution adjusted to a mRNA concentration of 46.1 μg/mL (50 mM, pH 3.5) were fed into the microchannel at 3 mL/minute and 9 mL/minute respectively and the lipid nanoparticle solution excreted from the channel was collected. The lipid nanoparticle solution was diluted 10-fold with 20 mM HEPES buffer solution (9% sucrose, pH 7.45) and then concentrated in an ultrafiltration unit and the lipid nanoparticle solution was collected.

<Constituent Lipids of Lipid Nanoparticles>

Lipid nanoparticles loaded with FlucmRNAs (FlucmRNA-loaded lipid nanoparticles) were produced by alcohol dilution method using pH-sensitive cationic lipids, DSPC (1,2-distearoyl-sn-glycero-3-phosphocholine), cholesterol, and PEG-DMG in a molar ratio of 50:10:38.5:1.5 composition. CleanCap (registered trademark) FLuc mRNA (5 moU) from TriLink Biotechnologies was used for FlucmRNA.

<Measurement of Average Particle Size and PDI of Lipid Nanoparticles>

The average particle size (ζ-Average) and PDI in PBS (−) of lipid nanoparticles were measured using "Zetasizer Nano ZSP", an analyzer utilizing dynamic light scattering (manufactured by Malvern).

<Nucleic Acid Encapsulation Rate of Lipid Nanoparticles>

The encapsulation rate of mRNA of lipid nanoparticles was measured using Ribogreen (manufactured by life technologies).

<Storage Stability Evaluation>

Lipid nanoparticles were allowed to stand at each temperature of −80° C., 5° C., 25° C., and 40° C., and after keeping for each period of time, average particle size, PDI, and nucleic acid encapsulation rate were measured. Lipid nanoparticles which satisfy following all three conditions were defined that the quality was remained well: the average particle size is maintained within +/−20 nm based on the date of LNP preparation; PDI remains high uniformity with a value of 0.2 or less; and the nucleic acid encapsulation rate is also maintained at 80% or more.

<Results>

As a result of measuring average particle size, PDI, and nucleic acid encapsulation rate after each FlucmRNA-loaded lipid nanoparticle was allowed to stand at −80° C., 5° C., 25° C., and 40° C. respectively and kept for each period of time, periods of time defined as the quality of the lipid nanoparticles was remained well are shown in Tables 13 and 14. The lipid nanoparticles which remain in good quality with standing at 5° C. for one week or more can be evaluated as having excellent stability.

TABLE 13

| Lipid name ( ): Maximum storage period | −80° C. (1 week) | 5° C. (5 weeks) | 25° C. (5 weeks) | 40° C. (5 weeks) |
|---|---|---|---|---|
| CL4F 6-2 | Does not meet the criteria for "good" at production | | | |
| CL4F 6-4 | 0 week | 5 weeks | 5 weeks | 3 days |
| CL4F 7-3 | 0 week | 5 weeks | 5 weeks | 0 day |
| CL4F 7-4 | 0 week | 5 weeks | 5 weeks | 1 week |
| CL4F 7-5 | 1 week | 2 weeks | 5 weeks | 1 week |
| CL4F 8-4 | 1 week | 5 weeks | 5 weeks | 1 week |
| CL4F 8-5 | 1 week | 5 weeks | 5 weeks | 5 weeks |
| CL4F 8-6 | 1 week | 5 weeks | 5 weeks | 1 week |
| CL4F 9-3 | 1 week | 5 weeks | 5 weeks | 0 day |
| CL4F 9-4 | 1 week | 5 weeks | 5 weeks | 1 week |
| CL4F 9-5 | 1 week | 5 weeks | 5 weeks | 5 weeks |
| CL4F 9-6 | 1 week | 5 weeks | 5 weeks | 5 weeks |
| CL4F 9-7 | 1 week | 5 weeks | 5 weeks | 5 weeks |
| CL4F 10-2 | 0 week | 5 weeks | 1 weeks | 0 day |
| CL4F 10-4 | 1 week | 5 weeks | 5 weeks | 0 day |
| CL4F 10-5 | 1 week | 5 weeks | 5 weeks | 5 weeks |
| CL4F 10-7 | 1 week | 5 weeks | 5 weeks | 5 weeks |
| CL4F 10-8 | 1 week | 5 weeks | 5 weeks | 5 weeks |
| CL4F 11-5 | 1 week | 5 weeks | 5 weeks | 1 week |
| CL4F 11-6 | 1 week | 5 weeks | 5 weeks | 5 weeks |
| CL4F 11-7 | 1 week | 5 weeks | 5 weeks | 5 weeks |
| CL4F 11-9 | 1 week | 5 weeks | 5 weeks | 5 weeks |
| CL4F 12-4 | 1 week | 5 weeks | 5 weeks | 1 week |
| CL4F 12-6 | 1 week | 5 weeks | 5 weeks | 5 weeks |
| CL4F 12-10 | 1 week | 5 weeks | 5 weeks | 5 weeks |
| CL4F 13-3 | 0 week | 0 week | 0 week | 0 day |
| CL4F 14-2 | 0 week | 0 week | 0 week | 0 day |
| CL4F 16-0 | Does not meet the criteria for "good" at production | | | |
| CL4F 16-1 | Does not meet the criteria for "good" at production | | | |
| CL4F6 | 1 week | 5 weeks | 5 weeks | 5 weeks |
| CL4G6 | 1 week | 5 weeks | 5 weeks | 5 weeks |
| CL4H6 | 0 week | 0 week | 1 week | 0 day |

TABLE 14

| Lipid name ( ): Maximum storage period | −80° C. (1 week) | 5° C. (5 weeks) | 25° C. (5 weeks) | 40° C. (5 weeks) |
|---|---|---|---|---|
| CL15F 6-2 | Does not meet the criteria for "good" at production | | | |
| CL15F 6-4 | Does not meet the criteria for "good" at production | | | |
| CL15F 7-3 | Does not meet the criteria for "good" at production | | | |
| CL15F 7-5 | 0 week | 5 weeks | 5 weeks | 5 weeks |
| CL15F 8-6 | 1 week | 5 weeks | 5 weeks | 5 weeks |
| CL15F 9-3 | 0 week | 5 weeks | 5 weeks | 5 weeks |
| CL15F 9-5 | 1 week | 5 weeks | 5 weeks | 5 weeks |
| CL15F 9-7 | 1 week | 5 weeks | 5 weeks | 5 weeks |
| CL15F 10-4 | 1 week | 5 weeks | 5 weeks | 5 weeks |
| CL15F 10-5 | 1 week | 5 weeks | 5 weeks | 5 weeks |
| CL15F 10-8 | 1 week | 5 weeks | 5 weeks | 5 weeks |
| CL15F 11-5 | 1 week | 5 weeks | 5 weeks | 5 weeks |
| CL15F 11-6 | 1 week | 5 weeks | 5 weeks | 5 weeks |
| CL15F 11-7 | 1 week | 5 weeks | 5 weeks | 5 weeks |
| CL15F 11-9 | 1 week | 5 weeks | 5 weeks | 5 weeks |
| CL15F 12-4 | 1 week | 5 weeks | 5 weeks | 5 weeks |
| CL15F 12-10 | 1 week | 5 weeks | 5 weeks | 5 weeks |
| CL15F 13-3 | 0 week | 5 weeks | 5 weeks | 5 weeks |
| CL15F 14-2 | 1 week | 5 weeks | 5 weeks | 5 weeks |
| CL15F 16-0 | Does not meet the criteria for "good" at production | | | |
| CL15F 16-1 | 0 week | 0 weeks | 0 weeks | 0 weeks |
| CL15F6 | 1 week | 5 weeks | 5 weeks | 5 weeks |
| CL15G | 1 week | 5 weeks | 5 weeks | 5 weeks |
| CL15H | Does not meet the criteria for "good" at production | | | |
| MC3 | 0 week | 0 weeks | 1 weeks | 0 weeks |

5. Production and Evaluation of Lipid Nanoparticles Having Various Compositions

Preparation of Lipid Nanoparticles

Lipid nanoparticles were prepared by the alcohol dilution method using flow channel. Microfluidic device with built-in mixer "NanoAssemblr" (manufactured by Precision NanoSystems) was used as the flow channel.

Specifically, first, ethanol solution adjusted to a lipid concentration of 8 mM and citrate buffer solution adjusted to a nucleic acid concentration of 46.1 µg/mL (50 mM, pH 3.5) were fed into the microchannel at 3 mL/minute and 9 mL/minute respectively and the lipid nanoparticle solution excreted from the channel was collected. The lipid nanoparticle solution was diluted 10-fold with 20 mM HEPES buffer solution (9% sucrose, pH 7.45) and then concentrated in an ultrafiltration unit and the lipid nanoparticle solution was collected.

<Constituent Lipids of Lipid Nanoparticles>

Lipids were prepared according to the compositions described in Tables 15-18. CL4F 10-5, CL4F 9-7, CL4F 8-4, CL4F6, CL15 10-5 and CL15F6 were used as pH-sensitive cationic lipids. As other lipids, cholesterol (nacalai tesque), β-sitosterol (22,23-Dihydrostigmasterol, beta-Sitosterol, 5-Stigmasten-3β-ol, α-Dihydrofucosterol, 24α-Ethylcholesterol, Sigma-Aldrich), DSPC (1,2-Distearoyl-sn-glycero-3-phosphocholine, COATSOME MC-8080, YUKA SANGYO CO., LTD), DMG-PEG2K (1,2-Dimyristoyl-rac-glycero-3-methylpolyoxyethylen, SUNBRIGHT GM-020, YUKA SANGYO CO., LTD), DOPC (1,2-Dioleoyl-sn-glycero-3-phosphocholine, COATSOME MC-8181, YUKA SANGYO CO., LTD), DOPE (1,2-Dioleoyl-sn-glycero-3-phosphoethanolamine, COATSOME ME-8181, YUKA SANGYO CO., LTD), and DPPC (1,2-Dipalmitoyl-sn-glycero-3-phosphocholine, COATSOME MC-6060, YUKA SANGYO CO., LTD) were used. As mRNA, Fluc-expressing mRNA (CleanCap Fluc mRNA (5 moU), TriLink Biotechnologies) and mCherry-expressing mRNA (CleanCap mCherry mRNA (5 moU), TriLink Biotechnologies) were used.

<Preservation Stability Evaluation>

Prepared lipid nanoparticles were allowed to stand at 40° C., and after keeping for each period of time, average particle size, PDI, and nucleic acid encapsulation rate were measured. They were evaluated whether the quality was remained well according to the following criteria:

Good (O): particle size is within +/−20 nm of the particle size immediately after preparation, and PDI is 0.2 or less, and encapsulation rate is 80% or more;

No good (X): particle size is greater than +/−20 nm of the particle size immediately after preparation, or encapsulation rate is less than 80%.

The lipid nanoparticles which remain in good quality with standing at 40° C. for one week or more can be evaluated as having excellent stability.

<Measurement of Luciferase Expression Activity In Vitro>

10% of fetal bovine serum (Fetal Bovine Serum Characterized, Corning) and 1% of antibiotic (Penicillin-Streptomycin (10,000 U/mL), Thermo Fisher Scientific) were added to E-MEM culture medium (containing L-glutamine, phenol red, sodium pyruvate, nonessential amino acids, and 1,500 mg/L sodium bicarbonate) (product code 055-08975, Wako Pure Chemical Industries, Ltd.), which was used as cell culture medium. Human embryonal kidney cells 293 (HEK293 cells) were added to 96-well white plate (Sigma-Aldrich) at $2.0 \times 10^4$ cells/well and cultured overnight at 37° C. in a 5% $CO_2$ atmosphere, and then 100 ng/well in terms of mRNA content of lipid nanoparticles were added. After 24 hours of culture under the same conditions, 100 µg/well of 300 µg/mL luciferin solution (Beetle luciferin, Promega Corporation) was added, and emission intensity was measured with a multi-plate reader (EnSight multimode plate reader, PerkinElmer). At that time, aforementioned luciferin solution was added to the well to which only culture medium was added and to the cell well to which no lipid nanoparticles were added, and the same measurements were carried out, and the value obtained by subtracting the emission intensity of the culture medium wells as background was adopted. In addition, the emission intensity of the cell wells to which no lipid nanoparticles were added was lower than the background.

<Measurement of mCherry Expression Activity In Vitro>

10% of fetal bovine serum (Fetal Bovine Serum Characterized, Corning) and 1% of antibiotic (Penicillin-Streptomycin (10,000 U/mL), Thermo Fisher Scientific) were added to E-MEM culture medium (containing L-glutamine, phenol red, sodium pyruvate, nonessential amino acids, and 1,500 mg/L sodium bicarbonate) (product code 055-08975, FUJIFILM Wako Pure Chemical Corporation), which was used as cell culture medium. Human embryonal kidney cells 293 (HEK293 cells) were added to 96-well black plate (Sigma-Aldrich) at $2.0 \times 10^4$ cells/well and cultured overnight at 37° C. in a 5% $CO_2$ atmosphere, and then 1000 ng/well in terms of mRNA content of lipid nanoparticles were added. After 24 hours of culture under the same conditions, fluorescence intensity was measured (excitation wavelength 587 nm/fluorescence wavelength 610 nm) with a multi-plate reader (EnSight multimode plate reader, PerkinElmer). At that time, the well to which only culture medium was added and the cell well to which no lipid nanoparticles were added were arranged, the same measurements were carried out, and the value obtained by subtracting the emission intensity of the culture medium wells as background was adopted. In addition, the fluorescence intensity of the cell wells to which no lipid nanoparticles were added was lower than the background.

TABLE 15

| | Lipid composition (molar ratio) | | | | | | | | | | | | |
|---|---|---|---|---|---|---|---|---|---|---|---|---|---|
| Lipid | 5-1 | 5-2 | 5-3 | 5-4 | 5-5 | 5-6 | 5-7 | 5-8 | 5-9 | 5-10 | 5-11 | 5-12 | 5-13 |
| CL4F 10-5 | 50 | — | — | — | 50 | — | — | — | 50 | — | — | — | — |
| CL4F 9-7 | — | 50 | — | — | — | 50 | — | — | — | 50 | — | — | — |
| CL4F 8-4 | — | — | 50 | — | — | — | 50 | — | — | — | 50 | — | — |
| CL4F6 | — | — | — | 50 | — | — | — | 50 | — | — | — | 50 | 50 |
| DOPC | 10 | 10 | 10 | 10 | — | — | — | — | — | — | — | — | — |
| DPPC | — | — | — | — | 10 | 10 | 10 | 10 | — | — | — | — | — |

TABLE 15-continued

| Lipid | Lipid composition (molar ratio) | | | | | | | | | | | | |
|---|---|---|---|---|---|---|---|---|---|---|---|---|---|
| | 5-1 | 5-2 | 5-3 | 5-4 | 5-5 | 5-6 | 5-7 | 5-8 | 5-9 | 5-10 | 5-11 | 5-12 | 5-13 |
| DOPE | — | — | — | — | — | — | — | — | 10 | 10 | 10 | 10 | — |
| DSPC | — | — | — | — | — | — | — | — | — | — | — | — | 10 |
| Cholesterol | 38.5 | 38.5 | 38.5 | 38.5 | 38.5 | 38.5 | 38.5 | 38.5 | 38.5 | 38.5 | 38.5 | 38.5 | 38.5 |
| DMG-PEG2K | 1.5 | 1.5 | 1.5 | 1.5 | 1.5 | 1.5 | 1.5 | 1.5 | 1.5 | 1.5 | 1.5 | 1.5 | 1.5 |
| Total | 100 | 100 | 100 | 100 | 100 | 100 | 100 | 100 | 100 | 100 | 100 | 100 | 100 |
| Nucleic acid | Fluc-expressing mRNA | | | | | | | | | | | | |

TABLE 16

| Lipid | Lipid composition (molar ratio) | | | | |
|---|---|---|---|---|---|
| | 5-14 | 5-15 | 5-16 | 5-17 | 5-18 |
| CL4F 10-5 | 50 | — | — | — | — |
| CL4F 9-7 | — | 50 | — | — | — |
| CL4F 8-4 | — | — | 50 | — | — |
| CL4F6 | — | — | — | 50 | 50 |
| DSPC | 10 | 10 | 10 | 10 | 10 |
| Cholesterol | — | — | — | — | 38.5 |
| β-sitosterol | 38.5 | 38.5 | 38.5 | 38.5 | — |
| DMG-PEG2K | 1.5 | 1.5 | 1.5 | 1.5 | 1.5 |
| Total | 100 | 100 | 100 | 100 | 100 |
| Nucleic acid | Fluc-expressing mRNA | | | | |

TABLE 17

| Lipid | Lipid composition (molar ratio) | | | | |
|---|---|---|---|---|---|
| | 5-19 | 5-20 | 5-21 | 5-22 | 5-23 |
| CL4F 9-7 | 20 | 30 | 40 | 50 | 60 |
| CL4F6 | — | — | — | — | — |
| DSPC | 10 | 10 | 10 | 10 | 10 |
| Cholesterol | 68.5 | 58.5 | 48.5 | 38.5 | 28.5 |
| DMG-PEG2K | 1.5 | 1.5 | 1.5 | 1.5 | 1.5 |
| Total | 100 | 100 | 100 | 100 | 100 |
| Nucleic acid | Fluc-expressing mRNA | | | | |

TABLE 18

| Lipid | Lipid composition (molar ratio) | | | |
|---|---|---|---|---|
| | 5-24 | 5-25 | 5-26 | 5-27 |
| CL4F 10-5 | 50 | — | — | — |
| CL4F 9-7 | — | 50 | — | — |
| CL15F 10-5 | — | — | 50 | — |
| CL15F6 | — | — | — | 50 |
| DSPC | 10 | 10 | 10 | 10 |
| Cholesterol | 38.5 | 38.5 | 38.5 | 38.5 |
| DMG-PEG2K | 1.5 | 1.5 | 1.5 | 1.5 |
| Total | 100 | 100 | 100 | 100 |
| Nucleic acid | mCherry-expressing mRNA | | | |

<Results>

The results are shown in the below tables 19-23.

TABLE 19

| Example | Ionic lipid | Phospho-lipid | Nucleic acid | Immediately after the preparation | | 40° C. 1 W | | 40° C. 1 M | | Quality 40° C. 1 W | Quality 40° C. 1 M | Fluc emission intensity |
|---|---|---|---|---|---|---|---|---|---|---|---|---|
| | | | | Particle size [nm] | Encapsulation rate [%] | Particle size [nm] | Encapsulation rate [%] | Particle size [nm] | Encapsulation rate [%] | | | |
| 5-1 | CL4F 10-5 | DOPC | Fluc-expressing mRNA | 92.9 | 99.1 | 100.5 | 98.7 | 102.8 | 99.1 | ○ | ○ | 4.2E+05 |
| 5-2 | CL4F 9-7 | | | 94.9 | 99.2 | 101.7 | 99.0 | 100.9 | 99.5 | ○ | ○ | 4.1E+05 |
| 5-3 | CL4F 8-4 | | | 113.9 | 98.3 | 126.4 | 97.3 | 154.8 | 95.0 | ○ | x | 1.9E+06 |
| 5-4 | CL4F6 | | | 94.8 | 98.9 | 99.9 | 98.7 | 102.4 | 97.8 | ○ | ○ | 9.3E+05 |
| 5-5 | CL4F 10-5 | DPPC | | 117.1 | 98.4 | 121.1 | 98.1 | 124.1 | 96.1 | ○ | ○ | 4.9E+05 |
| 5-6 | CL4F 9-7 | | | 103.4 | 99.3 | 105.2 | 99.6 | 103.0 | 99.4 | ○ | ○ | 3.2E+05 |
| 5-7 | CL4F 8-4 | | | 163.0 | 96.6 | 175.2 | 84.6 | 184.8 | 77.1 | ○ | x | 1.7E+06 |
| 5-8 | CL4F6 | | | 97.9 | 99.4 | 112.3 | 94.1 | 251.8 | 56.3 | ○ | x | 8.1E+05 |
| 5-9 | CL4F 10-5 | DOPE | | 90.9 | 99.2 | 94.3 | 99.2 | 93.8 | 99.2 | ○ | ○ | 1.4E+05 |
| 5-10 | CL4F 9-7 | | | 89.7 | 99.2 | 92.7 | 99.2 | 91.4 | 99.4 | ○ | ○ | 1.9E+05 |
| 5-11 | CL4F 8-4 | | | 98.8 | 98.6 | 104.0 | 98.9 | 108.6 | 98.9 | ○ | ○ | 2.3E+05 |
| 5-12 | CL4F6 | | | 89.3 | 98.5 | 91.6 | 99.1 | 92.7 | 99.0 | ○ | ○ | 4.8E+05 |
| 5-13 | CL4F6 | DSPC | | 112.1 | 99.8 | 121.1 | 99.2 | 120.9 | 87.4 | ○ | ○ | 4.0E+05 |

TABLE 20

| Example | Ionic lipid | Cholesterols | Nucleic acid | Immediately after the preparation Particle size [nm] | Immediately after the preparation Encapsulation rate [%] | 40° C. 1 W Particle size [nm] | 40° C. 1 W Encapsulation rate [%] | 40° C. 1 M Particle size [nm] | 40° C. 1 M Encapsulation rate [%] | Quality 40° C. 1 W | Quality 40° C. 1 M | Fluc emission intensity |
|---|---|---|---|---|---|---|---|---|---|---|---|---|
| 5-14 | CL4F 10-5 | β-sitosterol | Fluc-expressing mRNA | 214.4 | 99.9 | 337.4 | 75.1 | 492.4 | 47.7 | x | x | 8.1E+05 |
| 5-15 | CL4F 9-7 | β-sitosterol |  | 228.1 | 99.9 | 275.2 | 79.0 | 327.0 | 58.8 | x | x | 8.5E+05 |
| 5-16 | CL4F 8-4 | β-sitosterol |  | 224.5 | 98.4 | 409.4 | 74.7 | 1040.0 | 54.5 | x | x | 7.3E+05 |
| 5-17 | CL4F6 | β-sitosterol |  | 312.1 | 99.0 | 392.8 | 77.8 | 501.9 | 58.8 | x | x | 9.2E+05 |
| 5-18 | CL4F6 | Cholesterol |  | 112.1 | 99.8 | 121.1 | 99.2 | 120.9 | 87.4 | ○ | ○ | 3.3E+05 |

TABLE 21

| Example | Ionic lipid | Ionic lipid ratio | Nucleic acid | Immediately after the preparation Particle size [nm] | Immediately after the preparation Encapsulation rate [%] | 40° C. 1 W Particle size [nm] | 40° C. 1 W Encapsulation rate [%] | 40° C. 1 M Particle size [nm] | 40° C. 1 M Encapsulation rate [%] | Quality 40° C. 1 W | Quality 40° C. 1 M | Fluc emission intensity |
|---|---|---|---|---|---|---|---|---|---|---|---|---|
| 5-19 | CL4F 9-7 | 20 | Fluc emission intensity | 78.13 | 100.4 | 80.81 | 99.9 | 77.6 | 99.5 | ○ | ○ | 2.3E+05 |
| 5-20 |  | 30 |  | 73.36 | 100.2 | 71.91 | 99.8 | 73.1 | 99.8 | ○ | ○ | 3.2E+05 |
| 5-21 |  | 40 |  | 79.28 | 100.0 | 77.55 | 99.8 | 78.0 | 99.8 | ○ | ○ | 3.9E+05 |
| 5-22 |  | 50 |  | 104.3 | 100.2 | 101.4 | 99.9 | 104.6 | 100.2 | ○ | ○ | 9.3E+04 |
| 5-23 |  | 60 |  | 94.26 | 100.0 | 95.64 | 99.5 | 95.4 | 99.6 | ○ | ○ | 1.4E+04 |

TABLE 22

| Example | Ionic lipid | Cholesterols/ Phospholipid | Nucleic acid | Immediately after the preparation Particle size [nm] | Immediately after the preparation Encapsulation rate [%] | 40° C. 1 W Particle size [nm] | 40° C. 1 W Encapsulation rate [%] | 40° C. 1 M Particle size [nm] | 40° C. 1 M Encapsulation rate [%] | Quality 40° C. 1 W | Quality 40° C. 1 M |
|---|---|---|---|---|---|---|---|---|---|---|---|
| 5-24 | CL4F 10-5 | Chol/DSPC | mCherry-expressing mRNA | 100.2 | 99.5 | 103.2 | 98.3 | 111.6 | 85.4 | ○ | ○ |
| 5-25 | CL4F 9-7 |  |  | 98.9 | 99.7 | 100.9 | 99.6 | 99.8 | 99.7 | ○ | ○ |

TABLE 23

| Example | Ionic lipid | Cholesterols/ Phospholipid | Nucleic acid | Immediately after the preparation Particle size [nm] | Immediately after the preparation Encapsulation rate [%] | 40° C. 1 W Particle size [nm] | 40° C. 1 W Encapsulation rate [%] | 40° C. 1 M Particle size [nm] | 40° C. 1 M Encapsulation rate [%] | Quality 40° C. 1 W | Quality 40° C. 1 M | mCherry-emission intensity |
|---|---|---|---|---|---|---|---|---|---|---|---|---|
| 5-26 | CL15F 10-5 | Chol/DSPC | mCherry-expressing mRNA | 107.9 | 99.3 | 108.3 | 99.6 | 114.3 | 99.4 | ○ | ○ | 1351 |
| 5-27 | CL15F6 |  |  | 99.0 | 99.4 | 100.3 | 99.7 | 106.7 | 99.3 | ○ | ○ | 1092 |
|  | HEPES Buffer |  |  |  |  |  |  |  |  |  |  | 753 |

[Sequence Table]

What is claimed is:

1. A lipid nanoparticle which comprises a pH-sensitive cationic lipid represented by formula (I):

[Chem. 1]

$(R^1)(R^2)C(OH)—(CH_2)a—(O—CO)b-X$      (I)

wherein:
a represents an integer of 3-5;
b represents 0 or 1;
$R^1$ and $R^2$ each independently represent a group represented by general formula (A):

[Chem. 2]

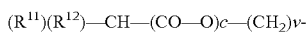

$(R^{11})(R^{12})—CH—(CO—O)c—(CH_2)v-$      (A)

wherein:
$R^{11}$ and $R^{12}$ each independently represent a linear or branched $C_{2-15}$ alkyl group;
c represents 0 or 1;
V represents an integer of 4-12; and
X represents a group represented by general formula (B):

[Chem. 3]

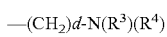

$—(CH_2)d-N(R^3)(R^4)$      (B)

wherein:
d represents an integer of 0-3; and
$R^3$ and $R^4$ each independently represent a $C_{1-4}$ alkyl group or $C_{2-4}$ alkenyl group (in said $C_{1-4}$ alkyl group or $C_{2-4}$ alkenyl group, one or two hydrogen atoms may be replaced with phenyl group(s)), while $R^3$ and $R^4$ may be bound to each other to form a 5- to 7-membered non-aromatic heterocycle (one or two hydrogen atoms of said ring may be replaced with $C_{1-4}$ alkyl group or $C_{2-4}$ alkenyl group) or represents a 5- to 7-membered non-aromatic heterocyclic group (wherein, said group is bound to (O—CO)b- by a carbon atom and one or two hydrogen atoms of said ring may be replaced with $C_{1-4}$ alkyl group or $C_{2-4}$ alkenyl group).

2. The lipid nanoparticle of claim 1, further comprising a sterol and a polyalkylene glycol-modified lipid.

3. The lipid nanoparticle of claim 1, containing a nucleic acid.

4. The lipid nanoparticle of claim 3, wherein the nucleic acid is siRNA.

5. The lipid nanoparticle of claim 3, wherein the nucleic acid is mRNA or plasmid DNA.

6. The lipid nanoparticle of claim 3, wherein the nucleic acid is a gene to be expressed in liver cells.

7. A pharmaceutical composition comprising the lipid nanoparticle of claim 1 as an active ingredient.

8. The pharmaceutical composition of claim 7, used for gene therapy.

9. A method for expressing a foreign gene of interest to be expressed in liver cells, the method comprising:
administering the lipid nanoparticle of claim 3 encapsulating the foreign genes to a human or a test animal in need of gene therapy; and
expressing the foreign gene in the liver of the human or the test animal.

10. A method for expressing a foreign gene of interest to be expressed in liver cells, the method comprising:
administering the lipid nanoparticle of claim 4 encapsulating the foreign genes to a human or a test animal in need of gene therapy; and
expressing the foreign gene in the liver of the human or the test animal.

11. A method for expressing a foreign gene of interest to be expressed in liver cells, the method comprising:
administering the lipid nanoparticle of claim 5 encapsulating the foreign genes to a human or a test animal in need of gene therapy; and
expressing the foreign gene in the liver of the human or the test animal.

12. A method for expressing a foreign gene of interest to be expressed in liver cells, the method comprising:
 administering the lipid nanoparticle of claim 5 encapsulating the foreign genes to a human or a test animal in need of gene therapy; and
 expressing the foreign gene in the liver of the human or the test animal.

13. A pharmaceutical composition comprising the lipid nanoparticle of claim 2 as an active ingredient.

14. A pharmaceutical composition comprising the lipid nanoparticle of claim 3 as an active ingredient.

15. A pharmaceutical composition comprising the lipid nanoparticle of claim 4 as an active ingredient.

16. A pharmaceutical composition comprising the lipid nanoparticle of claim 5 as an active ingredient.

17. A pharmaceutical composition comprising the lipid nanoparticle of claim 6 as an active ingredient.

\* \* \* \* \*